US012405567B2

(12) United States Patent
Ueno et al.

(10) Patent No.: US 12,405,567 B2
(45) Date of Patent: Sep. 2, 2025

(54) PROCESS CARTRIDGE, ELECTROPHOTOGRAPHIC IMAGE FORMING APPARATUS, AND ELECTROPHOTOGRAPHIC PHOTOSENSITIVE DRUM UNIT

(71) Applicant: CANON KABUSHIKI KAISHA, Tokyo (JP)

(72) Inventors: Takahito Ueno, Mishima (JP); Shigeo Miyabe, Numazu (JP); Masanari Morioka, Numazu (JP); Masato Hisano, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/785,232

(22) Filed: Jul. 26, 2024

(65) Prior Publication Data

US 2024/0419122 A1 Dec. 19, 2024

Related U.S. Application Data

(60) Division of application No. 18/201,265, filed on May 24, 2023, which is a division of application No. (Continued)

(30) Foreign Application Priority Data

Dec. 22, 2006 (JP) ................................ 2006-346190
Feb. 22, 2007 (JP) ................................ 2007-042665
Dec. 21, 2007 (JP) ................................ 2007-330303

(51) Int. Cl.
*G03G 21/18* (2006.01)
*G03G 15/00* (2006.01)
*G03G 21/16* (2006.01)

(52) U.S. Cl.
CPC ....... *G03G 21/1842* (2013.01); *G03G 15/751* (2013.01); *G03G 15/757* (2013.01);
(Continued)

(58) Field of Classification Search
CPC .......... G03G 21/1842; G03G 21/1647; G03G 21/1821; G03G 21/1857; G03G 21/186; G03G 21/1803
See application file for complete search history.

(56) References Cited

U.S. PATENT DOCUMENTS 899,913 A 9/1908 Shaw
2,292,676 A 8/1942 Thiry
(Continued)

FOREIGN PATENT DOCUMENTS

CN 1179559 A 4/1998
CN 1205459 1/1999
(Continued)

OTHER PUBLICATIONS

Smith Corona 5H Series Personal Word Processors Service Manuel, dated Sep. 1989.
(Continued)

*Primary Examiner* — Francis C Gray
(74) *Attorney, Agent, or Firm* — Venable LLP

(57) ABSTRACT

A cartridge includes a photosensitive drum having a rotational axis about which the photosensitive drum is rotatable. The cartridge also includes a developing roller having a rotational axis about which the developing roller is rotatable. A developing frame rotatably supports the developing roller. A drum flange is connected to an end of the photosensitive drum, with the drum flange including an inner surface facing the rotational axis of the photosensitive drum and a hollow portion inside of the drum flange. A casing including a bearing member rotatably supports the photosensitive drum.

13 Claims, 108 Drawing Sheets

Related U.S. Application Data

17/528,299, filed on Nov. 17, 2021, now Pat. No. 11,720,054, which is a division of application No. 17/104,379, filed on Nov. 25, 2020, now Pat. No. 11,237,517, which is a division of application No. 16/815,477, filed on Mar. 11, 2020, now Pat. No. 10,877,433, which is a division of application No. 16/421,683, filed on May 24, 2019, now Pat. No. 10,671,018, which is a division of application No. 16/113,422, filed on Aug. 27, 2018, now Pat. No. 10,539,923, which is a division of application No. 15/171,291, filed on Jun. 2, 2016, now Pat. No. 10,551,793, which is a division of application No. 14/068,149, filed on Oct. 31, 2013, now Pat. No. 9,678,471, which is a division of application No. 13/570,671, filed on Aug. 9, 2012, now Pat. No. 8,630,564, which is a continuation of application No. 11/964,518, filed on Dec. 26, 2007, now Pat. No. 8,280,278.

(52) U.S. Cl.
CPC ..... *G03G 21/1647* (2013.01); *G03G 21/1814* (2013.01); *G03G 21/1817* (2013.01); *G03G 21/1821* (2013.01); *G03G 21/185* (2013.01); *G03G 21/1853* (2013.01); *G03G 21/1857* (2013.01); *G03G 21/186* (2013.01); *G03G 2221/1657* (2013.01)

(56) References Cited

U.S. PATENT DOCUMENTS

| | | | |
|---|---|---|---|
| 2,300,514 | A | 11/1942 | Mallman |
| 3,381,497 | A | 5/1968 | Allen |
| 3,390,546 | A | 7/1968 | Jewell |
| 3,406,534 | A | 10/1968 | Chapper |
| 3,490,841 | A | 1/1970 | Celry, Jr. et al. |
| 3,512,375 | A | 5/1970 | Madarasz et al. |
| 3,537,275 | A | 11/1970 | Smith |
| 3,747,368 | A | 7/1973 | Morin |
| 3,815,380 | A | 6/1974 | Esmay |
| 3,818,380 | A | 6/1974 | Tyre |
| 3,922,883 | A | 12/1975 | Bevacqua |
| 3,996,821 | A | 12/1976 | Murray |
| 4,065,941 | A | 1/1978 | Aoki |
| 4,106,611 | A | 8/1978 | Suzuki et al. |
| 4,167,321 | A | 9/1979 | Miyashita et al. |
| 4,320,429 | A | 3/1982 | Knerich et al. |
| 4,433,767 | A | 2/1984 | Thor |
| 4,439,257 | A | 3/1984 | Sato et al. |
| 4,451,117 | A | 5/1984 | Goode' |
| 4,457,738 | A | 7/1984 | Gross et al. |
| 4,607,734 | A | 8/1986 | Watashi et al. |
| 4,692,127 | A | 9/1987 | Wagner |
| 4,753,626 | A | 6/1988 | Hazebrook et al. |
| 4,829,335 | A | 5/1989 | Kanemitsu et al. |
| 4,833,502 | A | 5/1989 | Azuma |
| 4,835,565 | A | 5/1989 | Nagatsuna et al. |
| 4,839,690 | A | 6/1989 | Onoda et al. |
| 4,873,549 | A | 10/1989 | Tada et al. |
| 4,941,862 | A | 7/1990 | Hazenbrook et al. |
| 5,009,446 | A | 4/1991 | Davis |
| 5,019,867 | A | 5/1991 | Yamakawa et al. |
| 5,023,660 | A | 6/1991 | Ebata et al. |
| 5,106,224 | A | 4/1992 | van Gelderen |
| 5,128,715 | A | 7/1992 | Furyama et al. |
| 5,132,728 | A | 7/1992 | Suzaki et al. |
| 5,168,319 | A | 12/1992 | Kimura et al. |
| 5,177,854 | A | 1/1993 | Herbert, Jr. et al. |
| 5,210,574 | A | 5/1993 | Kita |
| 5,247,847 | A | 9/1993 | Gu |
| 5,277,659 | A | 1/1994 | Cornay |
| 5,290,203 | A | 3/1994 | Krude |
| 5,331,373 | A | 7/1994 | Nomura et al. |
| 5,452,056 | A | 9/1995 | Nomura et al. |
| 5,463,446 | A | 10/1995 | Watanabe et al. |
| 5,562,357 | A | 10/1996 | Sandell |
| 5,579,085 | A | 11/1996 | Miyabe et al. |
| 5,583,618 | A | 12/1996 | Takeuchi et al. |
| 5,583,630 | A | 12/1996 | Kimura et al. |
| 5,585,889 | A | 12/1996 | Shishido et al. |
| 5,640,650 | A | 6/1997 | Watanabe et al. |
| 5,738,586 | A | 4/1998 | Arriaga |
| 5,740,500 | A | 4/1998 | Hashimoto |
| 5,749,028 | A | 5/1998 | Damji et al. |
| 5,766,081 | A | 6/1998 | Desmarais |
| 5,809,380 | A | 9/1998 | Katakabe et al. |
| 5,815,782 | A | 9/1998 | Yokomori et al. |
| 5,839,028 | A | 11/1998 | Nomura et al. |
| 5,845,175 | A | 12/1998 | Kumar et al. |
| 5,848,334 | A | 12/1998 | Kamola |
| 5,855,519 | A | 1/1999 | Kadota |
| 5,878,309 | A | 3/1999 | Normura et al. |
| 5,878,310 | A | 3/1999 | Noda et al. |
| 5,878,492 | A | 3/1999 | Gleasman et al. |
| 5,903,802 | A | 5/1999 | Watanabe et al. |
| 5,903,803 | A | 5/1999 | Kawai et al. |
| 5,907,750 | A | 5/1999 | Yamada et al. |
| 5,920,753 | A | 7/1999 | Sasaki et al. |
| 5,926,666 | A | 7/1999 | Miura et al. |
| 5,926,672 | A | 7/1999 | Nishibata et al. |
| 5,930,562 | A | 7/1999 | Noda et al. |
| 5,943,529 | A | 8/1999 | Miyabe et al. |
| 5,946,531 | A | 8/1999 | Miura et al. |
| 5,950,047 | A | 9/1999 | Miyabe et al. |
| 5,953,562 | A | 9/1999 | Kawaguchi et al. |
| 5,966,567 | A | 10/1999 | Matsuzaki et al. |
| 5,983,055 | A | 11/1999 | Bito et al. |
| 5,987,287 | A | 11/1999 | Huang |
| 5,991,571 | A | 11/1999 | Yamada et al. |
| 5,993,101 | A | 11/1999 | Kohno et al. |
| 6,011,942 | A | 1/2000 | Taniguchi et al. |
| 6,029,027 | A | 2/2000 | Yokomori et al. |
| 6,029,031 | A | 2/2000 | Yokomori et al. |
| 6,032,002 | A | 2/2000 | Yokomori et al. |
| 6,032,008 | A | 2/2000 | Kolodziej |
| 6,036,369 | A | 3/2000 | Ichiyama |
| 6,041,203 | A | 3/2000 | Suzuki et al. |
| 6,058,280 | A | 5/2000 | Kumar et al. |
| 6,061,535 | A | 5/2000 | Yokomori et al. |
| 6,064,843 | A | 5/2000 | Isobe et al. |
| 6,070,028 | A | 5/2000 | Odagawa et al. |
| 6,072,968 | A | 6/2000 | Nomura et al. |
| 6,081,676 | A | 6/2000 | Inomata |
| 6,074,304 | A | 7/2000 | Olbrich et al. |
| 6,101,350 | A | 8/2000 | Suzuki et al. |
| 6,115,569 | A | 9/2000 | Akutsu |
| 6,118,962 | A | 9/2000 | Casper et al. |
| 6,128,452 | A | 10/2000 | Miyabe et al. |
| 6,137,970 | A | 10/2000 | Sasago |
| 6,152,826 | A | 11/2000 | Profeta et al. |
| 6,154,623 | A | 11/2000 | Suzuki et al. |
| 6,167,219 | A | 12/2000 | Miyamoto et al. |
| 6,169,865 | B1 | 1/2001 | Miyabe et al. |
| 6,173,140 | B1 | 1/2001 | Suzuki et al. |
| 6,173,145 | B1 | 1/2001 | Chadani et al. |
| 6,175,705 | B1 | 1/2001 | Harada et al. |
| 6,198,891 | B1 | 3/2001 | Ishida et al. |
| 6,208,818 | B1 | 3/2001 | Noda |
| 6,215,969 | B1 | 4/2001 | Namura et al. |
| 6,226,476 | B1 | 5/2001 | Miyabe et al. |
| 6,226,478 | B1 | 5/2001 | Watanabe et al. |
| 6,235,383 | B1 | 5/2001 | Hong et al. |
| 6,240,266 | B1 | 5/2001 | Watanabe et al. |
| 6,249,663 | B1 | 6/2001 | Alzawa et al. |
| 6,257,798 | B1 | 6/2001 | Wormsbaecher |
| 6,256,467 | B1 | 7/2001 | Yokomori et al. |
| 6,282,390 | B1 | 8/2001 | Miyabe et al. |
| 6,282,395 | B1 | 8/2001 | Nittani et al. |
| 6,301,458 | B1 | 10/2001 | Mori et al. |
| 6,317,572 | B1 | 11/2001 | Miyabe et al. |

(56) References Cited

U.S. PATENT DOCUMENTS 6,336,012 B1 1/2002 Noda et al.
6,336,017 B1 1/2002 Miyamoto et al.
6,336,018 B1 1/2002 Kawai et al.
6,343,192 B1 1/2002 Miyabe et al.
6,438,347 B2 1/2002 Nittani et al.
6,349,191 B1 2/2002 Willis
6,351,620 B1 2/2002 Miyabe et al.
6,366,748 B1 4/2002 Takeuchi et al.
6,381,430 B1 4/2002 Yokomori et al.
6,385,416 B1 5/2002 Horikawa et al.
6,385,420 B1 5/2002 Morioka
6,397,029 B1 5/2002 Portig
6,400,914 B1 6/2002 Noda et al.
6,415,121 B1 7/2002 Suzuki et al.
6,418,296 B1 7/2002 Aizawa et al.
6,452,826 B1 9/2002 Kim et al.
6,463,242 B1 10/2002 Kojima et al.
6,473,578 B2 10/2002 Miyabe et al.
6,473,580 B1 10/2002 Inomata
6,490,426 B1 12/2002 Zaman
6,501,926 B1 12/2002 Watanabe et al.
6,517,439 B1 2/2003 Sears
6,519,431 B1 2/2003 Toba et al.
6,542,706 B2 4/2003 Toba et al.
6,546,220 B1 4/2003 Asakura et al.
6,549,736 B2 4/2003 Miyabe et al.
6,549,738 B2 4/2003 Otani et al.
6,556,799 B2 4/2003 Saito
6,572,480 B1 6/2003 Huang
6,574,446 B2 6/2003 Kitayama
6,577,831 B1 6/2003 Kojima et al.
6,587,660 B2 7/2003 Ueno et al.
6,603,939 B1 8/2003 Toba et al.
6,608,980 B2 8/2003 Murayama et al.
6,654,580 B2 11/2003 Yamaguchi et al.
6,671,473 B2 12/2003 Miyabe
6,678,488 B2 1/2004 Toba et al.
6,699,550 B2 3/2004 Suzuki et al.
6,704,522 B2 3/2004 Sasago et al.
6,708,010 B2 3/2004 Miyabe et al.
6,714,746 B2 3/2004 Morioka et al.
6,714,752 B2 3/2004 Ueno et al.
6,725,004 B2 4/2004 Ahn et al.
6,768,890 B2 7/2004 Cho et al.
6,795,666 B2 9/2004 Miyabe et al.
6,823,153 B2 11/2004 Ueno et al.
6,823,160 B2 11/2004 Okabe
6,827,206 B2 12/2004 Brase
6,829,455 B2 12/2004 Yasumoto et al.
6,834,175 B2 12/2004 Marayama et al.
6,836,629 B2 12/2004 Miyabe et al.
6,898,391 B2 5/2005 Numagami et al.
6,898,399 B2 5/2005 Morioka et al.
6,912,365 B2 6/2005 Ueno et al.
6,931,226 B2 8/2005 Chadani et al.
6,934,485 B2 8/2005 Miyabe et al.
6,937,832 B2 8/2005 Sato et al.
6,947,677 B2 9/2005 Uyama et al.
6,950,621 B2 9/2005 Himes
6,954,600 B2 10/2005 Fujita et al.
6,954,601 B2 10/2005 Numagami et al.
6,963,706 B2 11/2005 Morioka et al.
6,968,141 B2 11/2005 Fujita et al.
6,968,144 B2 11/2005 Mizoguchi
6,968,146 B1 11/2005 Fujita et al.
6,970,668 B2 11/2005 Ueno et al.
6,978,099 B2 12/2005 Ueno et al.
6,980,758 B2 12/2005 Murayama et al.
7,003,247 B2 2/2006 Koishi et al.
7,016,626 B2 3/2006 Yokomori et al.
7,020,410 B2 3/2006 Zogg et al.
7,024,131 B2 4/2006 Komatsu et al.
7,035,573 B2 4/2006 Yamaguchi et al.
6,984,012 B2 6/2006 Asauchi
7,062,200 B2 6/2006 Ueno et al.
7,079,783 B2 7/2006 Yokoi
7,079,787 B2 7/2006 Ogino et al.
7,092,658 B2 8/2006 Yasumoto et al.
7,121,205 B2 10/2006 Ono et al.
7,127,192 B2 10/2006 Batori et al.
7,136,604 B2 11/2006 Chadani et al.
7,139,502 B2 11/2006 Koishi et al.
7,147,457 B2 12/2006 Iten
7,149,457 B2 12/2006 Miyabe et al.
7,155,141 B2 12/2006 Sato et al.
7,158,735 B2 1/2007 Murayama et al.
7,158,736 B2 1/2007 Sato et al.
7,164,875 B2 1/2007 Miyabe et al.
7,174,122 B2 2/2007 Fujita et al.
7,184,690 B2 2/2007 Ueno et al.
7,200,349 B2 4/2007 Sato et al.
7,209,682 B2 4/2007 Numagami et al.
7,212,768 B2 5/2007 Numagami et al.
7,212,773 B2 5/2007 Sudo et al.
7,224,925 B2 5/2007 Sato et al.
7,228,090 B2 6/2007 Toso et al.
7,236,722 B2 6/2007 Portig
7,242,890 B2 7/2007 Yokota
7,242,893 B2 7/2007 Murakami et al.
7,248,810 B2 7/2007 Miyabe et al.
7,289,752 B2 10/2007 Yamazaki et al.
7,315,710 B2 1/2008 Ueno et al.
7,349,657 B2 3/2008 Sato et al.
7,366,443 B2 4/2008 Ohashi et al.
7,366,445 B2 4/2008 Hoashi et al.
7,366,452 B2 4/2008 Fujita et al.
7,403,733 B2 7/2008 Watanabe et al.
7,421,235 B2 9/2008 Choi
7,424,244 B2 9/2008 Williams et al.
7,424,247 B2 9/2008 Iwasaki
7,433,622 B2 10/2008 Chadani et al.
7,433,628 B2 10/2008 Kweon et al.
7,491,161 B2 2/2009 Taguchi
7,509,075 B2 3/2009 Hayakawa
7,526,228 B2 4/2009 Shiraki
7,529,507 B2 5/2009 Ohashi et al.
7,537,410 B2 5/2009 Parisi et al.
7,603,059 B2 10/2009 Marumoto
7,623,811 B2 11/2009 Sato
7,630,667 B2 12/2009 Huang et al.
7,651,436 B2 1/2010 Sugitani
7,672,611 B2 3/2010 Nakaya
7,684,729 B2 3/2010 Goda
7,720,405 B2 5/2010 Okabe
7,756,443 B2 7/2010 Okabe et al.
7,817,938 B2 10/2010 Igarashi
7,869,735 B2 1/2011 Hattori
7,899,364 B2 3/2011 Chadani et al.
7,942,426 B2 5/2011 Peters
7,953,330 B2 5/2011 Ishikawa
7,979,008 B2 7/2011 Kim et al.
8,249,485 B2 * 8/2012 Horikawa ............ G03G 21/185 399/111
8,417,154 B2 4/2013 Nieda
8,467,701 B2 * 6/2013 Kikuchi ............. G03G 15/0194 399/262
8,676,090 B1 3/2014 Ueno et al.
8,682,215 B1 3/2014 Ueno et al.
8,688,008 B2 4/2014 Norioka et al.
8,731,438 B2 5/2014 Okabe
9,026,006 B2 5/2015 Kawai
9,880,518 B2 1/2018 Wen et al.
10,571,850 B2 2/2020 Matsuoka et al.
2001/0041079 A1 11/2001 Michlin et al.
2001/0041080 A1 11/2001 Higeta et al.
2002/0018666 A1 2/2002 Noda et al.
2002/0025191 A1 2/2002 Kitayama
2002/0034398 A1 3/2002 Higeta et al.
2002/0044794 A1 4/2002 Nishiuwatoko et al.
2002/0057928 A1 5/2002 Yasumoto et al.
2002/0110385 A1 8/2002 Terada et al.
2002/0110388 A1 8/2002 Yokomori et al.
2003/0049051 A1 3/2003 Takahashi et al.
2003/0059233 A1 3/2003 Jang et al.

(56) References Cited

U.S. PATENT DOCUMENTS

| | | | | |
|---|---|---|---|---|
| 2003/0123904 | A1 | 7/2003 | Maeshima et al. | |
| 2003/0138270 | A1 | 7/2003 | Matsuoka | |
| 2003/0156848 | A1 | 8/2003 | Kawai et al. | |
| 2003/0235429 | A1 | 12/2003 | Sato et al. | |
| 2004/0013446 | A1 | 1/2004 | Morioka et al. | |
| 2004/0037590 | A1 | 2/2004 | Morioka et al. | |
| 2004/0086300 | A1 | 5/2004 | Kawai et al. | |
| 2004/0131370 | A1 | 7/2004 | Yamauchi | |
| 2004/0136746 | A1 | 7/2004 | Komatsu et al. | |
| 2004/0179862 | A1 | 9/2004 | Ono et al. | |
| 2004/0190937 | A1 | 9/2004 | Mercer et al. | |
| 2005/0031374 | A1 | 2/2005 | Nagashima et al. | |
| 2005/0105936 | A1 | 5/2005 | Morioka et al. | |
| 2005/0111881 | A1 | 5/2005 | Arimitsu et al. | |
| 2005/0111882 | A1 | 5/2005 | Sudo et al. | |
| 2005/0117934 | A1 | 6/2005 | Murayama et al. | |
| 2005/0143179 | A1 | 6/2005 | Delaney et al. | |
| 2005/0191092 | A1 | 9/2005 | Toso et al. | |
| 2005/0254858 | A1 | 11/2005 | Numagami et al. | |
| 2005/0281586 | A1 | 12/2005 | Ohashi et al. | |
| 2005/0286931 | A1 | 12/2005 | Kim et al. | |
| 2006/0002735 | A1 | 1/2006 | Tamaru et al. | |
| 2006/0008289 | A1 | 1/2006 | Sato et al. | |
| 2006/0029435 | A1 | 2/2006 | Kasai et al. | |
| 2006/0034637 | A1 | 2/2006 | Kim et al. | |
| 2006/0051133 | A1 | 3/2006 | Koishi et al. | |
| 2006/0056878 | A1 | 3/2006 | Okabe et al. | |
| 2006/0062488 | A1 | 3/2006 | Smeijers | |
| 2006/0067737 | A1 | 3/2006 | Yamazaki et al. | |
| 2006/0093398 | A1 | 5/2006 | Hayakawa | |
| 2006/0140648 | A1 | 6/2006 | Takegawa | |
| 2006/0140672 | A1 | 6/2006 | Taguchi | |
| 2006/0146371 | A1 | 7/2006 | Hoashi et al. | |
| 2006/0182465 | A1 | 8/2006 | Funamoto et al. | |
| 2006/0228127 | A1 | 10/2006 | Miyabe et al. | |
| 2006/0240896 | A1 | 10/2006 | Ohashi et al. | |
| 2006/0257164 | A1 | 11/2006 | Hoshi et al. | |
| 2006/0269318 | A1 | 11/2006 | Ueno et al. | |
| 2007/0042826 | A1 | 2/2007 | Furusawa | |
| 2007/0065183 | A1 | 3/2007 | Tomita | |
| 2007/0104510 | A1 | 5/2007 | Kawai et al. | |
| 2007/0110478 | A1 | 5/2007 | Numagami et al. | |
| 2007/0122188 | A1 | 5/2007 | Igarashi | |
| 2007/0196131 | A1 | 8/2007 | Sato | |
| 2007/0237545 | A1 | 10/2007 | Cho et al. | |
| 2007/0264048 | A1 | 11/2007 | Kuroda | |
| 2008/0025757 | A1 | 1/2008 | Sato et al. | |
| 2008/0102966 | A1 | 5/2008 | Gleasman | |
| 2008/0138113 | A1 | 6/2008 | Murrell et al. | |
| 2008/0138114 | A1 | 6/2008 | Chadani et al. | |
| 2008/0152388 | A1 | 6/2008 | Ueno et al. | |
| 2008/0159773 | A1 | 7/2008 | Murayama et al. | |
| 2008/0199212 | A1 | 8/2008 | Tsui et al. | |
| 2008/0240796 | A1 | 10/2008 | Morioka et al. | |
| 2008/0260428 | A1 | 10/2008 | Ueno et al. | |
| 2009/0196655 | A1 | 8/2009 | Takigawa et al. | |
| 2009/0317132 | A1 | 12/2009 | Asanuma et al. | |
| 2009/0317134 | A1 | 12/2009 | Miyabe et al. | |
| 2009/0317135 | A1 | 12/2009 | Miyabe et al. | |
| 2010/0054778 | A1 | 3/2010 | Adachi et al. | |
| 2010/0054823 | A1 | 3/2010 | Takasaka et al. | |
| 2010/0142991 | A1 | 6/2010 | Holmes et al. | |
| 2010/0239311 | A1* | 9/2010 | Kikuchi | G03G 15/1605 399/111 |
| 2011/0038649 | A1 | 2/2011 | Miyabe et al. | |
| 2011/0091239 | A1 | 4/2011 | Ueno et al. | |
| 2011/0299882 | A1* | 12/2011 | Tanaami | G03G 15/326 399/110 |
| 2012/0275824 | A1 | 11/2012 | Gu et al. | |
| 2013/0136492 | A1 | 5/2013 | Xu | |
| 2013/0302066 | A1 | 11/2013 | Kawai | |
| 2014/0270845 | A1 | 9/2014 | Kawakami et al. | |
| 2015/0177683 | A1 | 6/2015 | Gu et al. | |
| 2015/0331386 | A1* | 11/2015 | Tanaami | G03G 21/1666 399/110 |
| 2016/0154376 | A1 | 6/2016 | Xiao et al. | |
| 2017/0219985 | A1 | 8/2017 | Iljima et al. | |
| 2019/0227481 | A1* | 7/2019 | Chadani | G03G 21/1821 |
| 2019/0286048 | A1* | 9/2019 | Fukuma | G03G 21/1619 |
| 2020/0150580 | A1* | 5/2020 | Matsumoto | G03G 21/1647 |

FOREIGN PATENT DOCUMENTS

| | | | |
|---|---|---|---|
| CN | 1346077 | | 4/2002 |
| CN | 1158583 | | 7/2004 |
| CN | 1696839 | | 11/2005 |
| CN | 1763638 | A | 4/2006 |
| CN | 1851282 | | 10/2006 |
| CN | 1851282 | A | 10/2006 |
| EP | 0511203 | | 11/1992 |
| EP | 0 827 049 | A1 | 4/1998 |
| EP | 0 886 075 | A1 | 12/1998 |
| EP | 1178370 | A2 | 2/2002 |
| EP | 1199610 | | 4/2002 |
| EP | 2003-202727 | | 7/2003 |
| EP | 1628165 | | 2/2006 |
| EP | 1791034 | | 5/2007 |
| EP | 1 207 437 | A2 | 5/2022 |
| GB | 2141520 | | 12/1984 |
| JP | 57-153844 | | 9/1982 |
| JP | S59228281 | | 12/1984 |
| JP | 60-249729 | | 12/1985 |
| JP | S60249729 | | 12/1985 |
| JP | 61-092967 | | 6/1986 |
| JP | 1-164818 | | 6/1989 |
| JP | H03125166 | | 5/1991 |
| JP | 4-119363 | | 4/1992 |
| JP | H04-119363 | | 4/1992 |
| JP | 4-240870 | | 8/1992 |
| JP | H04240870 | | 8/1992 |
| JP | U05-019658 | | 3/1993 |
| JP | U05-030857 | | 4/1993 |
| JP | H05172152 | | 7/1993 |
| JP | 5-341589 | | 12/1993 |
| JP | H07217655 | | 8/1995 |
| JP | H07217665 | | 8/1995 |
| JP | H07-295461 | A | 11/1995 |
| JP | 8-030168 | | 2/1996 |
| JP | H09160274 | | 6/1997 |
| JP | H09177807 | | 7/1997 |
| JP | H09230654 | | 9/1997 |
| JP | 63-004252 | | 1/1998 |
| JP | U53-115630 | | 7/1998 |
| JP | 11-15265 | | 1/1999 |
| JP | 11-325097 | | 11/1999 |
| JP | H11325097 | | 11/1999 |
| JP | 2000-075660 | A | 3/2000 |
| JP | 2000075732 | | 3/2000 |
| JP | 2000-120715 | | 4/2000 |
| JP | 2000-132040 | A | 5/2000 |
| JP | 2000-137360 | | 5/2000 |
| JP | 2000170783 | | 6/2000 |
| JP | 2000257646 | | 9/2000 |
| JP | 2000280348 | | 10/2000 |
| JP | 2001-083753 | A | 3/2001 |
| JP | 2001194954 | | 7/2001 |
| JP | 2002-031153 | | 1/2002 |
| JP | 2002-48148 | | 2/2002 |
| JP | 2002-048148 | | 2/2002 |
| JP | 2002217574 | | 8/2002 |
| JP | 2002-250435 | | 9/2002 |
| JP | 2003-162137 | | 6/2003 |
| JP | 2003-202727 | | 7/2003 |
| JP | 2003247535 | | 9/2003 |
| JP | 2004-45603 | | 2/2004 |
| JP | 2004045603 | | 2/2004 |
| JP | 2004-85593 | | 3/2004 |
| JP | 2004144240 | | 5/2004 |
| JP | 2004198822 | | 7/2004 |
| JP | 2004-233876 | A | 8/2004 |
| JP | 2004246058 | | 9/2004 |
| JP | 2004251401 | | 9/2004 |
| JP | 2004-361719 | A | 12/2004 |
| JP | 2005076734 | | 3/2005 |

(56) References Cited

FOREIGN PATENT DOCUMENTS

| | | | |
|---|---|---|---|
| JP | 2005164684 | | 6/2005 |
| JP | 2005-299788 | A | 10/2005 |
| JP | 2005-300846 | A | 10/2005 |
| JP | 2005296235 | | 10/2005 |
| JP | 3728104 | | 12/2005 |
| JP | 2009-0000661 | A | 1/2006 |
| JP | 2006039364 | | 2/2006 |
| JP | 2006-072160 | | 3/2006 |
| JP | 2006084935 | | 3/2006 |
| JP | 2006106681 | | 4/2006 |
| JP | 2006133436 | | 5/2006 |
| JP | 2006139230 | | 6/2006 |
| JP | 2006163232 | | 6/2006 |
| JP | 2007032794 | | 2/2007 |
| JP | 2007-52185 | | 3/2007 |
| JP | 2007069868 | | 3/2007 |
| JP | 2007121774 | | 5/2007 |
| JP | 2007-218403 | | 8/2007 |
| JP | 2007-218403 | A | 8/2007 |
| JP | 2007-240007 | | 9/2007 |
| JP | 2007-303615 | | 11/2007 |
| JP | 2009-104101 | | 5/2009 |
| JP | 2009300516 | | 12/2009 |
| KR | 100270224 | B1 | 10/2000 |
| KR | 10-2006-0000661 | A | 1/2006 |
| KR | 20090044054 | | 5/2009 |
| RU | 2003123803 | A | 2/2005 |
| RU | 2266553 | C2 | 12/2005 |
| RU | 2 289 835 | C2 | 12/2006 |
| WO | 2006014821 | | 2/2006 |

OTHER PUBLICATIONS

John W. Weigl, "Electrophotography", 16 Angew. Chem. Int. Ed. Engl., 374-392 (Jun. 1977).

Kawamoto, "Vibration Induced in Driving Mechanism of Photoconductor Drum in Color Laser Printer", 48 Jour. of Image Sci. and Tech., 306-311 (Jul./Aug. 2004).

Knight et al., "Robust Control for Carriage Drum Printer", Control Applications, Proceedings of the Third IEEE International Conference on Control and Applications, 971-976 (Aug. 1994).

Pai et al., "Physics of Electrophotography", 65 Reviews of Mod. Physics, 163-211 (Jan. 1993).

Respondents' Ninestar Corporation, Ninestar Image Tech Limited, Ninestar Technology Company, Ltd., and Apex Mictrotech Ltd.'s Response to Canon's Interrogatory Nos. 20-30 in ITC Investigation No. 337-TA-1106, dated May 7, 2018 (including claim charts asserting invalidity of claims of U.S. Pat. Nos. 9,874,846; 9,869,960; 9,857,765; 9,836,021; 9,746,826).

Respondents' Ninestar Corporation, Ninestar Image Tech Limited, Ninestar Technology Company, Ltd., and Apex Mictrotech Ltd.'s Supplemental Response to Canon's Interrogatory Nos. 21 in ITC Investigation No. 337-TA-1106, dated May 25, 2018 (including claim charts asserting invalidity of claims of U.S. Pat. Nos. 9,874,846; 9,869,960; 9,857,765; 9,836,021; 9,746,826).

Respondents' Ninestar Corporation, Ninestar Image Tech Limited, Ninestar Technology Company, Ltd., and Apex Mictrotech Ltd.'s Second Supplemental Response to Canon's Interrogatory Nos. 21 in ITC Investigation No. 337-TA-1106, dated Jun. 22, 2018 (including claim charts asserting invalidity of claims of U.S. Pat. Nos. 9,874,846; 9,869,960; 9,857,765; 9,836,021; 9,746,826).

Respondents' Ninestar Corporation, Ninestar Image Tech Limited, Ninestar Technology Company, Ltd., and Apex Mictrotech Ltd.'s Third Supplemental Response to Canon's Interrogatory Nos. 21 in ITC Investigation No. 337-TA-1106, dated Jul. 11, 2018 (including claim charts asserting invalidity of claims of U.S. Pat. Nos. 9,874,846; 9,869,960; 9,857,765; 9,836,021; 9,746,826).

Respondents' Ninestar Corporation, Ninestar Image Tech Limited, Ninestar Technology Company, Ltd., and Apex Mictrotech Ltd.'s Fourth Supplemental Response to Canon's Interrogatory Nos. 21 in ITC Investigation No. 337-TA-1106, dated Aug. 13, 2018 (including claim charts asserting invalidity of claims of U.S. Pat. Nos. 9,874,846; 9,869,960; 9,857,765; 9,836,021; 9,746,826).

Respondent's Notice of Prior Art in ITC Investigation No. 337-TA-1106, dated Sep. 4, 2018.

Initial Expert Report of Alexander J. Solcum, Ph.D., on invalidity of U.S. Pat. Nos. 9,746,826; U.S. Pat. No. 9,836,021; U.S. Pat. No. 9,857,765; U.S. Pat. No. 9,869,960; and U.S. Pat. No. 9,874,846, in ITC Investigation No. 337-TA-1106, dated Oct. 1, 2018 (redacted).

Canon's Initial Markman Brief in ITC Investigation No. 337-TA-1106, dated Jul. 26, 2018.

Respondents' Initial Markman Brief in ITC Investigation No. 337-TA-1106, dated Jul. 26, 2018.

Commission Investigative Staff's Opening Markman Brief in ITC Investigation No. 337-TA-1106, dated Jul. 27, 2018.

Canon's Rebuttal Markman Brief in ITC Investigation No. 337-TA-1106, dated Aug. 16, 2018.

Respondents' Rebuttal Markman Brief in ITC Investigation No. 337-TA-1106, dated Aug. 16, 2018.

Commission Investigative Staff's Rebuttal Markman Brief in ITC Investigation No. 337-TA-1106, dated Aug. 16, 2018.

The Ninestar Respondent's Contingent Motion for Summary Determination of Invalidity for Failure to Satisfy the Written Description Requirement in ITC Investigation No. 337-TA-1106, dated Nov. 28, 2018.

Reply Memorandum of Points and Authorities in Support of the Ninestar Respondents' Contingent Motion for Summary Determination of Invalidity for Failure to Satisfy the Written Description Requirement (Motion 1106-022) in ITC Investigation No. 337-TA-1106, dated Dec. 13, 2018.

Markman Order and Order Addressing Motions for Summary Determination and Prehearing Briefs in ITC Investigation No. 337-TA-1106, dated Feb. 28, 2019.

Transcript of Nov. 9, 2018 Deposition of Alexander H. Slocumb, Ph.D. in ITC Investigation No. 337-TA-1106 (redacted).

Transcript of Nov. 1, 2018 Deposition of Richard A. Lux, Ph.D. in ITC Investigation No. 337-TA-1106 (redacted).

Initial Expert Report of Richard A. Lux, Ph.D. in ITC Investigation No. 337-TA-1106, dated Oct. 1, 2018 (redacted).

Contingent Direct Witness Statement of Richard A. Lux, Ph.D. Pursuant to Order No. 34 in ITC Investigation No. 337-TA-1106.

Direct Witness Statement of Richard A. Lux, Ph.D. in ITC Investigation No. 337-TA-1106 (redacted).

Rebuttal Witness Statement of Richard A. Lux, Ph.D. in ITC Investigation No. 337-TA-1106.

Rebuttal Report of Richard A. Lux, Ph.D. in ITC Investigation No. 337-TA-1106, dated Oct. 24, 2018.

Rebuttal Witness Statement of Alexander Slocum to the Witness Statement of Shigeo Miyabe (CX-0018C) and the Witness Statements of Richard Lux (CX-0161C and CX-0162) in ITC Investigation No. 337-TA-1106.

Witness Statement of Alexander Slocum in ITC Investigation No. 337-TA-1106 (redacted).

An Anti-Backlash Two-Part Shaft Coupling with Interlocking Elastically Averaged Teeth, Balasubramaniam et al., 26 J. of Int. Societies for Precision Eng. and Nanotech., 314-330 (2002).

Design of Three-Groove Kinematic Couplings, Alexander H. Slocum (1992).

FUNdaMENTALS of Design, Alexander H. Solcum (2008).

McGraw Hill Series in Mechanical Engineering: Design of Machinery, Norton, pp. 22-23 (2001).

Physics of Electrophotography, Damodar et al., pp. 163-211 (1993).

Jul. 30, 2019 Office Action in Vietnamese Patent Application No. 1-2009-01264 (with English translation).

Jul. 22, 2019 Examination Report in Indian Patent Application No. 201648003029 (with English translation).

International Search Report and Written Opinion of the International Searching Authority dated Dec. 25, 2007, in International Application No. PCT/JP2007/075364.

Singapore Search Report and Written in Singapore Application No. 900903015-6, issued Jan. 5, 2010.

Japanese Office Action dated Mar. 16, 2010, in counterpart Japanese Application No. 2007-330303.

(56) References Cited

OTHER PUBLICATIONS

Office Action in Taiwanese Patent Application No. 096149780, mailed Jun. 11, 2012 (with English translation).
Decision on Grant in Russian Patent Application No. 2009128196/(039172), mailed Apr. 18, 2012 (with English translation).
Notice of Allowance in Korean Patent Application No. 10-2009-7022510, mailed May 3, 2011.
Notice of Acceptance in Australian Patent Application No. 200739163, dated Feb. 3, 2012.
Official Communication in Canadian Patent Application No. 2,670,502, dated Nov. 10, 2011.
Office Action in Japanese Patent Application No. 2007-330304, dated Nov. 22, 2011, with English translation.
Office Action in Indonesia Patent Application No. W-002000901748, dated Mar. 30, 2011 (with partial translation).
Official Communication in Korean Patent Application No. 10-2009-7022510, issued Aug. 8, 2011.
English Translation of Jan. 17, 2011 Office Action in Korean Patent Application No. 10-2009-7015430.
Office Action in Korean Patent Application No. 10-2009-7015474, dated Jan. 17, 2011, with English translation.
Office Action in Korean Patent Application No. 10-2009-7022191, dated Feb. 17, 2011.
English translation of Japanese Laid-open Patent Application Hei No. 1-164818.
Office Action in Chinese Patent Application No. 207780047584.6, dated Nov. 1, 2010, with English translation.
Office Action in Korean Patent Application No. 10-2009-7015430, dated Nov. 17, 2011.
Australian Search Report and Written Opinion, dated Nov. 24, 2009, which was enclosed with an Invitation to Respond to Written Opinion dated Dec. 22, 2009, in Singapore Application No. 200903732-6.
English-language translation of Japanese Patent Document No. 11-15265 A.
English-language translation of Japanese Patent Document No. 2003-202727 A.
International Search Report and Written Opinion in PCT/JP2008/056259, dated Jun. 16, 2008.
Singapore Search Report and Written Opinion in Singapore Application No. 200903005-7, issued Jan. 5, 2010.
International Search Report and Written Opinion of the International Searching Authority dated Apr. 11, 2008, in International Application No. PCT/JP2007/075366.
Office Action in Russian Patent Application No. 2009128196, dated Nov. 3, 2010, with English translation.
Singapore Search Report and Written Opinion in Singapore Application No. 200903015-6, issued Jan. 5, 2010.
Notice of Allowance in Korean Patent Application No. 10-2009-7015430, mailed Aug. 6, 2012.
Official Communication in European Patent Application No. 07 860 559.9, mailed Jul. 17, 2012.
Office Action in Korean Patent Application No. 10-2012-7000630, mailed Jan. 29, 2013.
Office Action in Korean Patent Application No. 10-2012-7000629, mailed Jan. 29, 2013.
Office Action in Taiwanese Patent Application No. 098135943, dated Jul. 17, 2013, with English translation.
Notice of Acceptance in Australian Patent Application No. 2012200109, mailed Apr. 16, 2014.
Notice of Allowance in Australian Patent Application No. 2015203129, mailed Jun. 28, 2016.
Apr. 20, 2016 Office Action in German Patent Application No. 11 2007 003 045.3.
Jan. 19, 2016 Office Action in Brazilian Patent Application No. BR122015008873-9 (with partial translation).
Jan. 19, 2016 Office Action in Brazilian Patent Application No. BR122015008874-7 (with partial translation).
Notice of Allowance in Korean Patent Application No. 10-2014-7013438, dated Apr. 14, 2015.
Notice of Allowance in Korean Patent Application No. 10-2014-7013436, dated Apr. 14, 2015.
Office Action in Taiwanese Patent Application No. 102102866, mailed Jul. 13, 2015 (with English translation).
Office Action in Taiwanese Patent Application No. 102102869, mailed Jul. 13, 2015 (with English translation).
Office Action in Malaysian Patent Application No. PI 20092602, dated Jul. 15, 2015.
Office Action in Chinese Patent Application No. 201310224833.1, dated Feb. 28, 2015 (with English translation).
Office Action in Indian Patent Application No. 3622/CHENP/2009, dated Dec. 17, 2014.
Office Action in Chinese Patent Application No. 201310224834.6, dated Feb. 2, 2015 (with English translation).
Office Action in Brazilian Patent Application No. PI 0720506.6, dated Feb. 3, 2015 (with English translation).
Office Action in Chinese Patent Application No. 20130223491.1, dated Nov. 3, 2014 (with English translation).
Office Action in Chinese Patent Application No. 201301224820.4, dated Nov. 3, 2014.
Decision on Russian Patent Application No. 2012130722, dated Sep. 16, 2014 (with English translation).
ITC Investigation No. 337-TA-918—Canon's Proposed Claim Constructions, dated Sep. 15, 2014.
ITC Investigation No. 337-TA-918—The Ninestar Respondents' Supplemental Objections and Responses to Complainants' Interrogatory Nos. 32-43, 45-47, and 49-51, dated Sep. 19, 2014.
ITC Investigation No. 337-TA-918—Respondents' Notice of Prior Art, dated Sep. 26, 2014.
ITC Investigation No. 337-TA-918—Canon's Supplemental Proposed Claim Constructions, dated Oct. 10, 2014.
ITC Investigation No. 337-TA-918—Canon's Objections and Supplemental Responses to ILG's Interrogatory Nos. 1, 5, 7, 10, 12, 43, 47, 60-65, 85, 87, and 120 to Complainants, dated Oct. 17, 2014.
ITC Investigation No. 337-TA-918—Respondent International Laser Group, Inc.'s Oct. 17, 2014 Supplemental Responses to Complainants Canon, Inc., Canon U.S.A., Inc. and Canon Virginia, Inc.'s Interrogatories (Nos. 33-46, 49, 58), dated Oct. 17, 2014.
ITC Investigation No. 337-TA-918—Initial Expert Report of Charles M. Curley Regarding Invalidity of Certain Claims of U.S. Pat. Nos. 8,280,278; 8,630,564; 8,682,215; and 8,688,008, dated Oct. 21, 2014.
ITC Investigation No. 337-TA-918—Initial Expert Report of Richard A. Lux, Ph.D., dated Oct. 17, 2014.
ITC Investigation No. 337-TA-918—Expert Report of Dr. Alexander Slocum on the Invalidity of the Asserted Claims of Canon's Patents, dated Oct. 20, 2014.
ITC Investigation No. 337-TA-918—Supplemental Joint Chart Regarding Claim Construction, dated Oct. 23, 2014.
Petition for Inter Partes Review of U.S. Pat. No. 8,280,278, dated Oct. 27, 2014.
Declaration of Charles M. Curley in Support of Petition for Inter Partes Review of U.S. Pat. No. 8,280,278, dated Oct. 9, 2014.
ITC Investigation No. 337-TA-918—Rebuttal Expert Report of Richard A. Lux, Ph.D., dated Nov. 7, 2014.
ITC Investigation No. 337-TA-918—Rebuttal Expert Report of Alexander Slocum, dated Nov. 7, 2014.
ITC Investigation No. 337-TA-918—Deposition of Richard A. Lux, Ph.D. (vol. 1), dated Nov. 11, 2014.
ITC Investigation No. 337-TA-918—Deposition of Richard A. Lux, Ph. D. (vol. 2), dated Nov. 12, 2014.
ITC Investigation No. 337-TA-918—Deposition of Alexander Henry Slocum, Ph.D., dated Nov. 14, 2014.
ITC Investigation No. 337-TA-918—Deposition of Charles Michael Curley, dated Dec. 3, 2014.
ITC Investigation No. 337-TA-918—Canon's Prehearing Brief (redacted), dated Dec. 22, 2014.
ITC Investigation No. 337-TA-918—Commission Investigative Staff's Combined Prehearing Brief and Prehearing Statement (redacted), dated Jan. 14, 2015.
ITC Investigation No. 337-TA-918—Pre-hearing Statement and Brief of Respondents International Laser Group, the Ninestar Respondents, and Katun Corp. (redacted), dated Dec. 22, 2014.

(56) References Cited

OTHER PUBLICATIONS

ITC Investigation No. 337-TA-918—Direct Witness Statement of Charles M. Curley, dated Dec. 22, 2014.
ITC Investigation No. 337-TA-918—Witness Statement of Alexander Slocum, dated Dec. 21, 2014.
ITC Investigation No. 337-TA-918—Rebuttal Witness Statement of Richard A. Lux, Ph.D., dated Jan. 9, 2015.
ITC Investigation No. 337-TA-918—Initial Determination Granting Complainants' Motion for Summary Determination of Violations by the Defaulting Respondents and Non-participating Respondents and Recommended Determination on Remedy and Bonding (public version), dated May 12, 2015.
Corrected Petition in IPR2015-00508 (Inter Partes Review of U.S. Pat. No. 8,688,008), dated Jan. 22, 2015.
Expert Declaration of Charles M. Curley in IPR 2015-00508 (Inter Partes Review of U.S. Pat. No. 8,688,008) dated Dec. 31, 2014.
Office Action in Chinese Patent Application No. 201310224839.9, dated Sep. 12, 2014 (with English translation).
Notice of Allowance in Korean Patent Application No. 10-2012-700629, dated Jul. 30, 2014.
Notice of Allowance in Korean Patent Application No. 10-2012-700730, dated Jul. 30, 2014.
Communication in European Patent Application No. 13169114.9, dated Aug. 8, 2014.
Communication in European Patent Application No. 13169112.3, dated Aug. 7, 2014.
Hearing Notice in Indian Patent Application No. 3622/CHENP/2009, dated Sep. 12, 2016.
Remanufacturing toner cartridges for Lexmark CRG, from Reciclamais Magazine 2003 (with English translation).
Decision on Grant in Russian Patent Application No. 2015101995, mailed Feb. 22, 2017 (with English translation).
Search Report in European Patent Application No. 17174142.4, dated Oct. 18, 2017.
Office Action in Taiwanese Patent Application No. 105105936, dated Aug. 11, 2017 (with English translation).
NTN Corporation Tri-Ball Joint Contstant Velocity Joints (Small and Medium Size) Cat. No. 5602-IV/E (2013).
NTN Corporation Constant Velocity Joints for Industrial Machines Cat. No. 5603-V/E (2005).
Mar. 9, 2017 Office Action in U.S. Appl. No. 15/377,079.
Apr. 3, 2017 Office Action in U.S. Appl. No. 15/377,135.
Mar. 31, 2017 Office Action in U.S. Appl. No. 15/377,183.
U.S. Appl. No. 16/421,683; U.S. Appl. No. 16/421,683; U.S. Appl. No. 16/421,683; U.S. Appl. No. 16/421,683; U.S. Appl. No. 16/421,683; 15/377, 106; U.S. Appl. No. 16/421,683; U.S. Appl. No. 16/421,683; U.S. Appl. No. 16/421,683; U.S. Appl. No. 16/421,683; U.S. Appl. No. 16/421,683; U.S. Appl. No. 16/421,683; U.S. Appl. No. 16/421,683; U.S. Appl. No. 16/421,683; U.S. Appl. No. 16/421,683; U.S. Appl. No. 16/421,683; U.S. Appl. No. 16/421,683; U.S. Appl. No. 16/421,683; U.S. Appl. No. 16/421,683; U.S. Appl. No. 16/421,683; U.S. Appl. No. 16/421,683; U.S. Appl. No. 16/421,683; U.S. Appl. No. 16/421,683; U.S. Appl. No. 16/421,683; U.S. Appl. No. 16/421,683; and U.S. Appl. No. 16/421,683.
English translation of Japanese Patent Laid-Open No. 2006-163232.
Decision on Grant in Russian Patent Application No. 2017122580, mailed Mar. 27, 2018 (with English translation).
Notice of Acceptance in Australian Patent Application No. 2017245286, mailed Jun. 28, 2018.
Response of Ninestar Corporation, Ninestar Image Tech Limited, Ninstar Technology Company, Ltd, and Apex Microtech Ltd. to Complaint of Canon Inc., Canon U.S.A., and Canon Virginia, Inc., and Notice of Investigation Under Section 337 in ITC Investigation No. 337-YA-1106, filed Apr. 20, 2018 (public version).
Jul. 22, 2019 Office Action in Indian Patent Application No. 201648003029.
English translation of Japanese Patent Application Pub. No. 2004-361719 A.
English translation of Japanese Patent Application Pub. No. 2005-300846 A.
Sep. 3, 2021 Notice of Allowance in Russian Patent Application No. 2021103157 (with English translation).
Sep. 23, 2021 Office Action in Malaysian Patent Application No. PI 2018000507.
Sep. 23, 2021 Office Action in Malaysian Patent Application No. PI 2018000508.
Sep. 23, 2021 Office Action in Malaysian Patent Application No. PI 2018000509.
Sep. 23, 2021 Office Action in Malaysian Patent Application No. PI 2018000510.
Nov. 3, 2021 Extended Search Report in European Patent Application No. 21 189 623.8.
Jul. 22, 2021 Notice of Allowance in Taiwanese Patent Application No. 10906076.1.
May 7, 2021 Notice of Acceptance in Australian Patent Application No. 2019236605.
Jun. 16, 2022 Office Action in Taiwan Patent Application No. 110138994.
Oct. 28, 2021 Office Action in Malaysian Patent Application No. PI 2018000519.
Oct. 28, 2021 Office Action in Malaysian Patent Application No. PI 2018000515.
Jun. 8, 2022 Decision to Grant in Russian Patent Application No. 2021131857 (with English translation).
Dec. 22, 2022 Notice of Acceptance in Australian Patent Application No. 2021203403.
Oct. 20, 2021 Office Action in Malaysian Patent Application No. PI 2018000513.
Oct. 20, 2021 Office Action in Malaysian Patent Application No. PI 2018000511.
May 29, 2023 Office Action in Indian Patent Application No. 201648003029.
Decision to Grant in Russian Patent Application No. 2018115941, dated Feb. 14, 2019 (with English translation).
Decision to Grant in Russian Patent Application No. 2018115943, dated Feb. 14, 2019 (with English translation).
Decision to Grant in Russian Patent Application No. 2018115945, dated Feb. 14, 2019 (with English translation).
Decision to Grant in Russian Patent Application No. 2018115947, dated Feb. 14, 2019 (with English translation).
Decision to Grant in Russian Patent Application No. 2018115949, dated Feb. 14, 2019 (with English translation).
Decision to Grant in Russian Patent Application No. 2018115952, dated Mar. 26, 2019 (with English translation).
Decision to Grant in Russian Patent Application No. 2018115955, dated Feb. 14, 2019 (with English translation).
Decision to Grant in Russian Patent Application No. 2018115957, dated Feb. 14, 2019 (with English translation).
Decision to Grant in Russian Patent Application No. 2018115958, dated Feb. 14, 2019 (with English translation).
Decision to Grant in Russian Patent Application No. 2018115959, dated Feb. 14, 2019 (with English translation).
Decision to Grant in Russian Patent Application No. 2018115961, dated Mar. 6, 2019 (with English translation).
Decision to Grant in Russian Patent Application No. 2018115962, dated Feb. 14, 2019 (with English translation).
Decision to Grant in Russian Patent Application No. 2018115964, dated Feb. 14, 2019 (with English translation).
May 21, 2020 Decision to Grant in Russian Patent Application No. 2020102902 (with English translation).
Apr. 20, 2020 Judgment by the United States Court of Appeals for the Federal Circuit in Appeal from United States International Trade Commission Investigation No. 337-TA-1106.
Notice of Acceptance dated Dec. 10, 2020 in counterpart Russian Application 2020124264/28, together with English translation thereof.
Aug. 30, 2021 Office Action in Indian Patent Application No. 201648035034.

* cited by examiner (a)

(b)

(a)

(b)

(a)

(b)

(a)

(b)

(a)

(b)

(a)

(b)

(a)

(b)

(a)

(b)

(a)

(b)

PROCESS CARTRIDGE, ELECTROPHOTOGRAPHIC IMAGE FORMING APPARATUS, AND ELECTROPHOTOGRAPHIC PHOTOSENSITIVE DRUM UNIT

FIELD OF THE INVENTION AND RELATED ART

The present invention relates to a process cartridge, an electrophotographic image forming apparatus to which the process cartridge is detachably mountable, and an electrophotographic photosensitive drum unit.

Examples of the electrophotographic image forming apparatus include an electrophotographic copying machine, an electrophotographic printer (a laser beam printer, an LED printer, and so on), and the like.

The process cartridge is prepared by integrally assembling an electrophotographic photosensitive member and process means acting on the electrophotographic photosensitive member into a unit (cartridge) and is mounted to and demounted from a main assembly of the electrophotographic image forming apparatus. For example, the process cartridge is prepared by integrally assembling the electrophotographic photosensitive member and at least one of a developing means, a charging means, and a cleaning means as the process means into a cartridge. Accordingly, examples of the process cartridge include a process cartridge prepared by integrally assembling the electrophotographic photosensitive member and three process means consisting of the developing means, the charging means, and the cleaning means into a cartridge; a process cartridge prepared by integrally assembling the electrophotographic photosensitive member and the charging means as the process means into a cartridge; and a process cartridge prepared by integrally assembling the electrophotographic photosensitive member and two process means consisting of the charging means and the cleaning means.

The process cartridge is detachably mountable to an apparatus main assembly by a user by himself (herself). Accordingly, maintenance of the apparatus can be performed by the user by himself without relying on a service person. As a result, operability of the maintenance of the electrophotographic image forming apparatus.

In a conventional process cartridge, the following constitution for receiving a rotational driving force, for rotating a drum shaped electrophotographic photosensitive member (hereinafter referred to as a "photosensitive drum"), from an apparatus main assembly is known.

On a main assembly side, a rotatable member for transmitting a driving force of a motor and a non circular twisted hole, which is provided at a center portion of the rotatable member and has a cross section integrally rotatable with the rotatable member and provided with a plurality of corners, are provided.

On a process cartridge side, a non circular twisted projection, which is provided at one of longitudinal ends of a photosensitive drum and has a cross section provided with a plurality of corners, is provided.

When the rotatable member is rotated in an engaged state between the projection and the hole in the case where the process cartridge is mounted to the apparatus main assembly, a rotational force of the rotatable member is transmitted to the photosensitive drum in a state in which an attraction force toward the hole is exerted on the projection. As a result, the rotational force for rotating the photosensitive drum is transmitted from the apparatus main assembly to the photosensitive drum (U.S. Pat. No. 5,903,803).

Further, a method in which a photosensitive drum is rotated by engaging a gear fixed to the photosensitive drum constituting a process cartridge has been known (U.S. Pat. No. 4,829,335).

However, in the conventional constitution described in U.S. Pat. No. 5,903,803, the rotatable member is required to be moved in a horizontal direction when the process cartridge is mounted to or demounted from the main assembly by being moved in a direction substantially perpendicular to an axial line of the rotatable member. That is, the rotatable member is required to be horizontally moved by an opening and closing operation of a main assembly cover provided to the apparatus main assembly. By the opening operation of the main assembly cover, the hole is moved apart from the projection. On the other hand, by the closing operation of the main assembly cover, the hole is moved toward the projection so as to be engaged with the projection.

Accordingly, in the conventional process cartridge, a constitution for moving the rotatable member in a rotational axis direction by the opening and closing operation of the main assembly cover is required to be provided to the main assembly.

In the constitution described in U.S. Pat. No. 4,829,335, without moving the driving gear provided to the main assembly along the axial line direction thereof, the cartridge can be mounted to and demounted from the main assembly by being moved in a direction substantially perpendicular to the axial line. However, in this constitution a driving connection portion between the main assembly and the cartridge is an engaging portion between gears, so that it is difficult to prevent rotation non uniformity of the photosensitive drum.

SUMMARY OF THE INVENTION

A principal object of the present invention is to provide a process cartridge, a photosensitive drum unit used in the process cartridge, and an electrophotographic image forming apparatus to which the process cartridge is detachably mountable, capable of solving the above described problems of the conventional process cartridges.

Another object of the present invention is to provide a process cartridge capable of smoothly rotating a photosensitive drum by being mounted to a main assembly provided with no mechanism for moving a main assembly side coupling member, in its axial line direction, for transmitting a rotational force to the photosensitive drum by an opening and closing operation of a main assembly cover. A further object of the present invention is to provide a photosensitive drum unit used in the process cartridge and an electrophotographic image forming apparatus to which the process cartridge is mountable and from which the process cartridge is demountable.

A further object of the present invention is to provide a process cartridge demountable from a main assembly of an electrophotographic image forming apparatus provided with a driving shaft in a direction perpendicular to an axial line of the driving shaft. A further object of the present invention is to provide a photosensitive drum unit used in the process cartridge and an electrophotographic image forming apparatus to which the process cartridge is detachably mountable.

A further object of the present invention is to provide a process cartridge mountable to a main assembly of an electrophotographic image forming apparatus provided with a driving shaft in a direction substantially perpendicular to an axial line of the driving shaft. A further object of the present invention is to provide a photosensitive drum unit used in the process cartridge and an electrophotographic image forming apparatus to which the process cartridge is detachably mountable.

A further object of the present invention is to provide a process cartridge mountable to and demountable from a main assembly of an electrophotographic image forming apparatus provided with a driving shaft in a direction substantially perpendicular to an axial line of the driving shaft. A further object of the present invention is to provide a photosensitive drum unit used in the process cartridge and an electrophotographic image forming apparatus to which the process cartridge is detachably mountable.

A further object of the present invention is to provide a process cartridge which compatibly realized that the process cartridge is demountable from a main assembly provided with a driving shaft in a direction substantially perpendicular to an axial line of the driving shaft and is capable of smoothly rotating the photosensitive drum. A further object of the present invention is to provide a photosensitive drum unit used in the process cartridge and an electrophotographic image forming apparatus to which the process cartridge is detachably mountable.

A further object of the present invention is to provide a process cartridge which compatibly realizes that the process cartridge is mountable to a main assembly provided with a driving shaft in a direction substantially perpendicular to an axial line of the driving shaft and is capable of smoothly rotating the photosensitive drum. A further object of the present invention is to provide a photosensitive drum unit used in the process cartridge and an electrophotographic image forming apparatus to which the process cartridge is detachably mountable.

A further object of the present invention is to provide a process cartridge which compatibly realizes that the process cartridge is mountable to and demountable from a main assembly provided with a driving shaft in a direction substantially perpendicular to an axial line of the driving shaft and is capable of smoothly rotating the photosensitive drum. A further object of the present invention is to provide a photosensitive drum unit used in the process cartridge and an electrophotographic image forming apparatus to which the process cartridge is detachably mountable.

According to the present invention, there is provided a process cartridge which can be demounted from a main assembly of an electrophotographic image forming apparatus provided with the drive shaft in a direction substantially perpendicular to an axis of a drive shaft According to the present invention, there is provided a photosensitive drum unit usable with the process cartridge and an electrophotographic image forming apparatus to which the process cartridge is detachably mountable According to the present invention, there is provided a process cartridge mountable, in a direction substantially perpendicular to an axis of a drive shaft, to a main assembly of an electrophotographic image forming device provided with the drive shaft According to the present invention, there is provided a photosensitive drum unit usable with the process cartridge and an electrophotographic image forming apparatus with the detachably mountable process cartridge According to the present invention, there is provided a process cartridge which can be mounted and dismounted, in a direction substantially perpendicular to an axis of a drive shaft, to a main assembly of an electrophotographic image forming apparatus provided with the drive shaft According to the present invention, there is provided a photosensitive drum unit usable with the process cartridge and an electrophotographic image forming apparatus relative to which the process cartridge can be mounted and demounted According to the present invention, a process cartridge is mounted to a main assembly which is not provided with a mechanism for moving a main assembly side drum coupling member for transmitting a rotational force to a photosensitive drum to an axial direction, and can rotate the photosensitive drum smoothly According to the present invention, a process cartridge can be demounted in a direction substantially perpendicular to an axis of a drive shaft provided in a main assembly, and simultaneously, the smooth rotation of a photosensitive drum can be carried out According to the present invention, a process cartridge can be mounted in a direction substantially perpendicular to an axis of a drive shaft provided in a main assembly, and simultaneously, the smooth rotation of a photosensitive drum can be carried out According to the present invention, a process cartridge is mountable and dismountable in a direction substantially perpendicular to an axis of a drive shaft provided in a main assembly, and simultaneously, the smooth rotation of a photosensitive drum can be carried out.

These and other objects, features, and advantages of the present invention will become more apparent upon consideration of the following description of the preferred embodiments of the present invention, taken in conjunction with the accompanying drawings.

DESCRIPTION OF THE PREFERRED EMBODIMENTS

The process cartridge and an electrophotographic image forming apparatus according to according to an embodiment of the present invention will be described.

Embodiment 1

(1) Brief description of process cartridge

Figure 1:
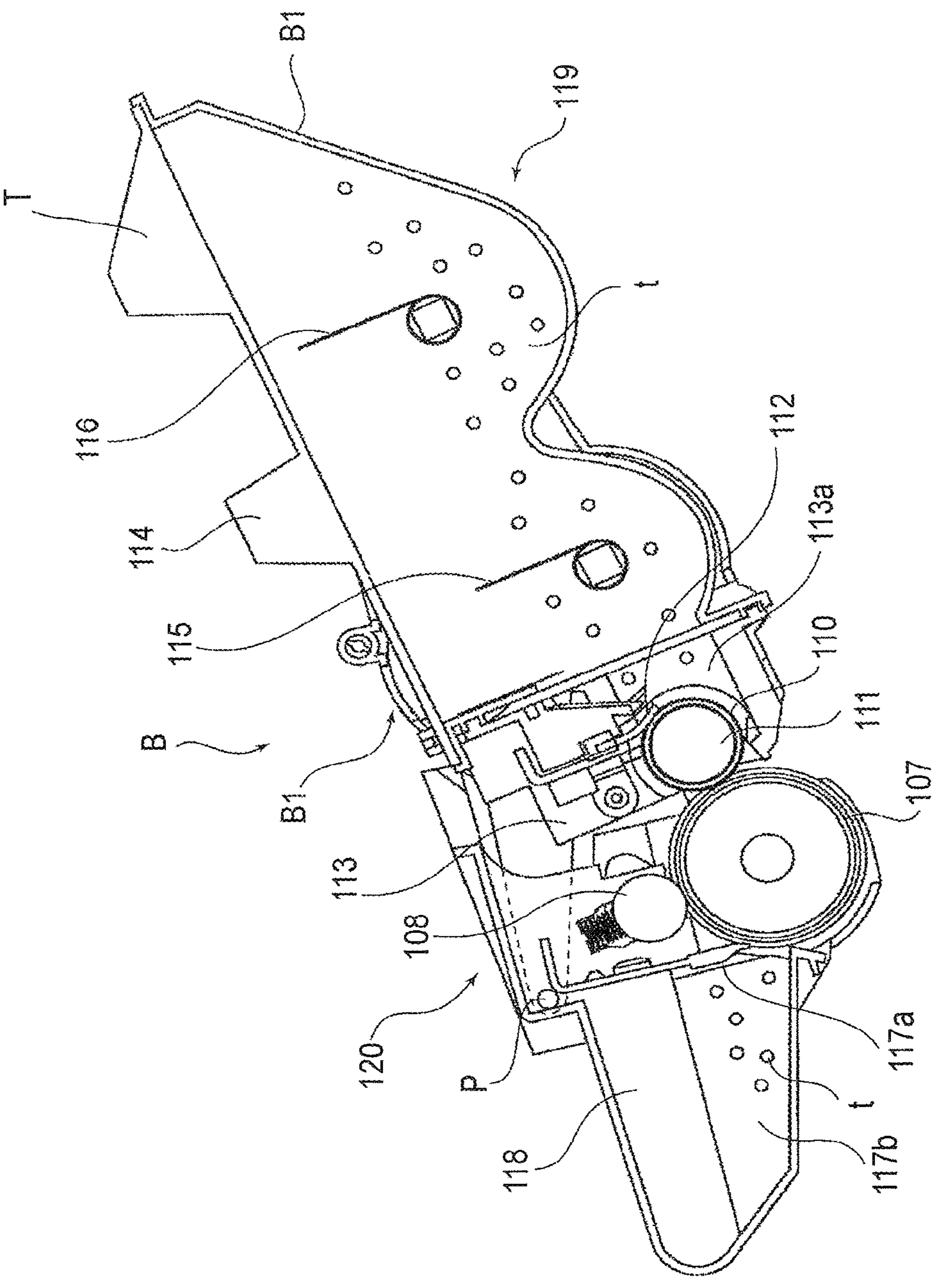
FIG. 1 is a sectional side elevation of a cartridge according to an embodiment of the present invention.
Figure 2:
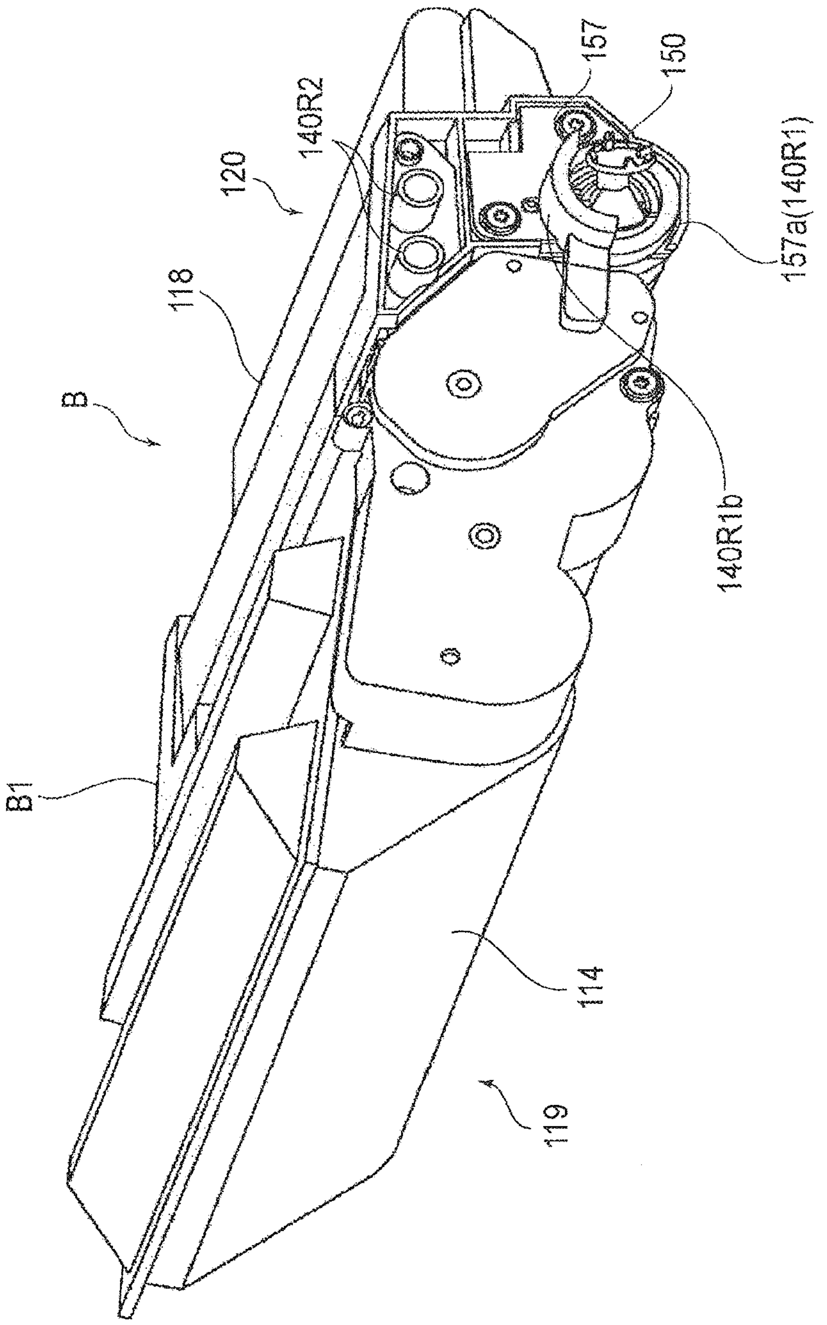
FIG. 2 is a perspective view of the cartridge according to the embodiment of the present invention.
Figure 3:
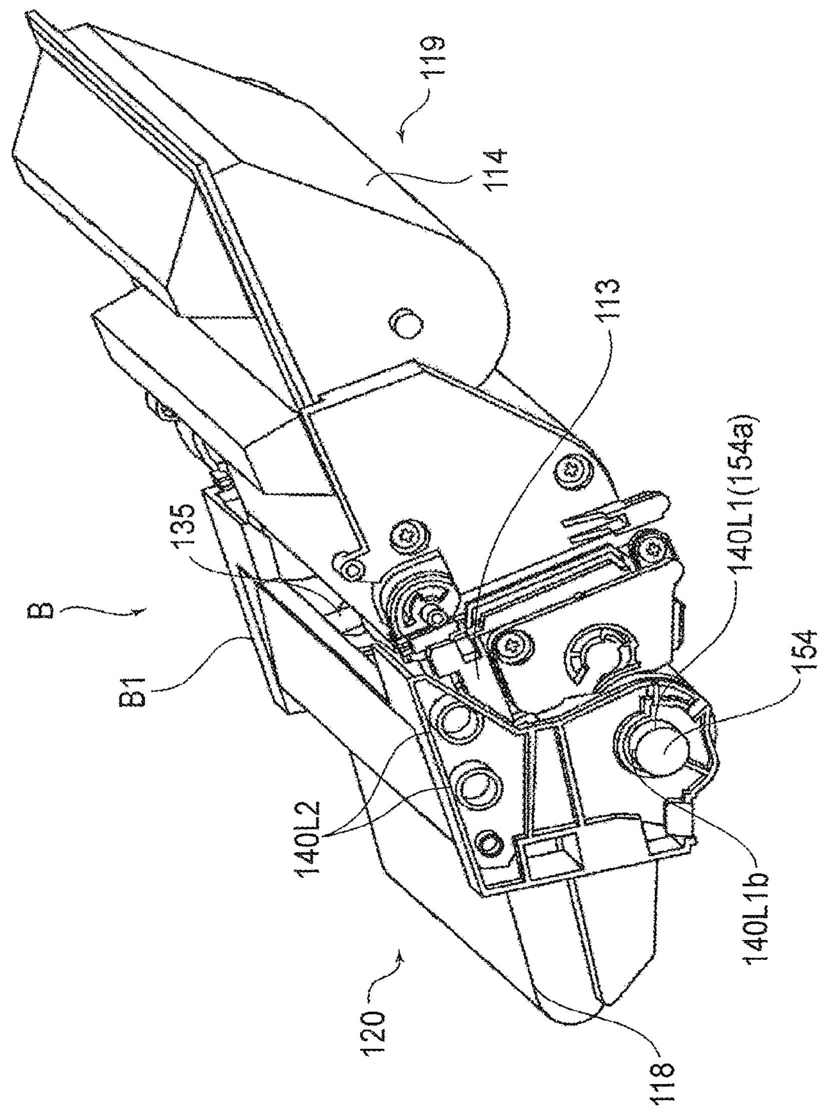
FIG. 3 is a perspective view of the cartridge according to the embodiment of the present invention.
Figure 4:
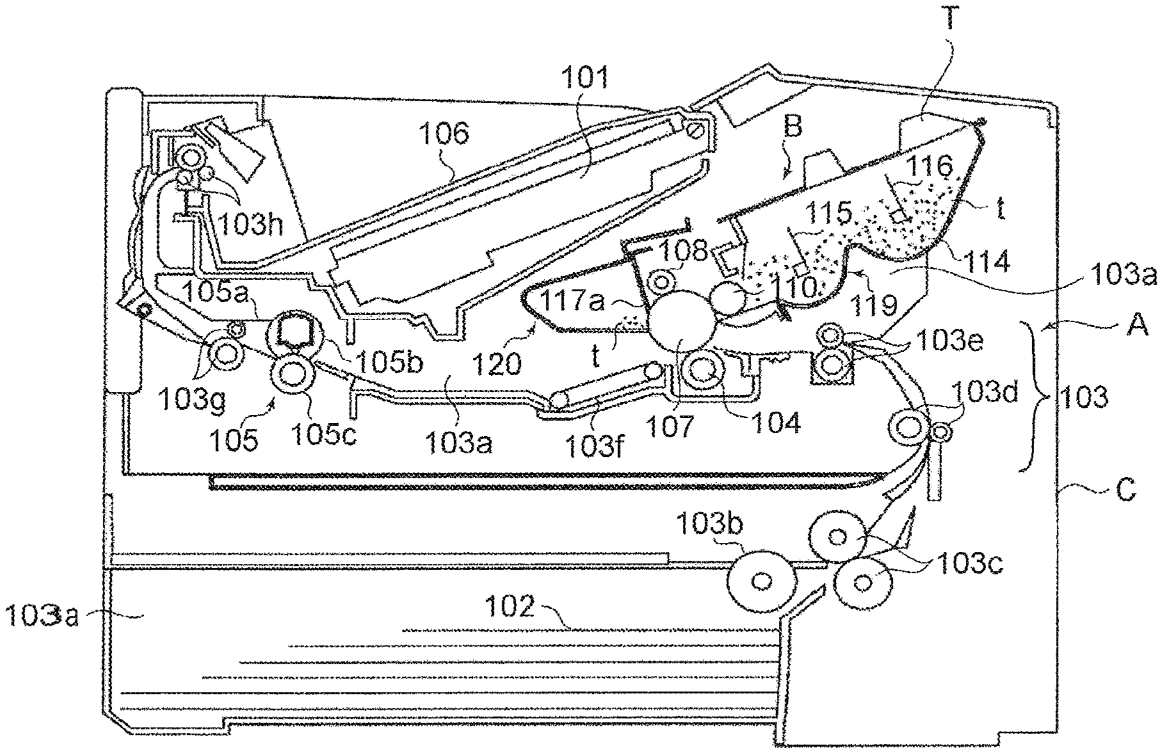
FIG. 4 is a sectional side elevation of an apparatus main assembly according to the embodiment of the present invention.

A process cartridge B to which an embodiment of the present invention is applied will be described with reference to FIGS. 1 to 4. FIG. 1 is a sectional view of the cartridge B. FIGS. 2 and 3 are perspective views of the cartridge B. FIG. 4 is a sectional view of an electrophotographic image forming apparatus main assembly A (hereinafter referred to as an "apparatus main assembly A"). The apparatus main assembly A corresponds to a portion of the electrophotographic image forming apparatus from which the cartridge B is excluded.

Referring to FIGS. 1 to 3, the cartridge B includes an electrophotographic photosensitive drum 107. The photosensitive drum 107 is rotated by receiving a rotational force from the apparatus main assembly A by a coupling mechanism when the cartridge B is mounted in the apparatus main assembly A as shown in FIG. 4. The cartridge B is mountable to and demountable from the apparatus main assembly A by a user.

A charging roller 108 as a charging means (process means) is provided in contact with an outer peripheral surface of the photosensitive drum 107. The charging roller 108 electrically charges the photosensitive drum 107 by voltage application from the apparatus main assembly A. The charging roller 108 is rotated by the rotation of the photosensitive drum 107.

The cartridge B includes a developing roller 110 as a developing means (process means). The developing roller 110 supplies a developer to a developing area of the photosensitive drum 107. The developing roller 110 develops an electrostatic latent image formed on the photosensitive drum 107 with the developer t. The developing roller 110 contains therein a magnet roller (fixed magnet) 111. In contact with a peripheral surface of the developing roller 110, a developing blade 112 is provided. The developing blade 112 defines an amount of the developer t to be deposited on the peripheral surface of the developing roller 110. The developing blade 112 imparts triboelectric charges to the developer t.

The developer t contained in a developer accommodating container 114 is sent to a developing chamber 113*a* by rotation of stirring members 115 and 116, so that the developing roller 110 supplied with a voltage is rotated. As a result, a developer layer to which the electric charges are imparted by the developing blade 112 is formed on the surface of the developing roller 110. The developer t is transferred onto the photosensitive drum 107 depending on the latent image. As a result, the latent image is developed.

The developer image formed on the photosensitive drum 107 is transferred onto a recording medium 102 by a transfer roller 104. The recording medium 102 is used for forming an image of the developer thereon and, e.g., is recording paper, label, OHP sheet, and so on In contact with the outer peripheral surface of the photosensitive drum 107, an elastic cleaning blade 117*a* as a cleaning means (process means) is disposed. The cleaning blade 117*a* elastically contacts the photosensitive drum 107 at its end and removes the developer t remaining on the photosensitive drum 107 after the developer image is transferred onto the recording medium 102. The developer t removed from the surface of the photosensitive drum 107 by the cleaning blade 117*a* is accommodated in a removed developer reservoir 117*b*.

The cartridge B is integrally constituted by a first frame unit 119 and a second frame unit 120.

The first frame unit 119 is constituted by a first frame 113 as a part of a cartridge frame B1. The first frame unit 119 includes the developing roller 110, the developing blade 112, the developing chamber 113*a*, the developer accommodating container 114, and the stirring members 115 and 116.

The second frame unit 120 is constituted by a second frame 118 as a part of the cartridge frame B1. The second frame unit 120 includes the photosensitive drum 107, the cleaning blade 117*a*, the removed developer reservoir 117*b*, and the charging roller 108.

The first frame unit 119 and the second frame unit 120 are rotatably connected with each other by a pin P. By an elastic member 135 (FIG. 3) provided between the first and second frame units 119 and 120, the developing roller 110 is pressed against the photosensitive drum 107.

The user attaches (mounts) the cartridge B to a cartridge mounting portion 130*a* of the apparatus main assembly A by gripping a grip. During the mounting, as described later, a driving shaft 180 (FIG. 17) of the apparatus main assembly A and a coupling member 150 (described later) as a rotational force transmitting part of the cartridge B are connected with each other in synchronism with the mounting operation of the cartridge B. The photosensitive drum 107 or the like is rotated by receiving the rotational force from the apparatus main assembly A.

(2) Description of Electrophotographic Image Forming Apparatus

With reference to FIG. 4, the electrophotographic image forming apparatus using the above described cartridge B will be described.

In the following, a laser beam printer will be described as an example of the apparatus main assembly A.

During image formation, the surface of the rotating photosensitive drum 107 is electrically charged uniformly by the charging roller 108. Then, the surface of the photosensitive drum 107 is irradiated with laser light, depending on image information, emitted from an optical means 101 including unshown members such as a laser diode, a polygonal mirror, a lens, and a reflecting mirror. As a result, on the photosensitive drum 107, an electrostatic latent image depending on the image information is formed. The latent image is developed by the above described developing roller 110.

On the other hand, in synchronism with the image formation, the recording medium 102 set in a cassette 103*a* is conveyed to a transfer position by a feeding roller 103*b* and conveying roller pairs 103*c*, 103*d* and 103*e*. At the transfer position, the transfer roller 104 as a transfer means is disposed. To the transfer roller 104, a voltage is applied. As a result, the developer image formed on the photosensitive drum 107 is transferred onto the recording medium 102.

The recording medium 102 onto which the developer image is transferred is conveyed to a fixing means 105 through a guide 103*f*. The fixing means 105 includes a driving roller 105*c* and a fixing roller 105*b* containing therein a heater 105*a*. To the passing recording medium 102, heat and pressure are applied, so that the developer image is fixed on the recording medium 102. As a result, on the recording medium 102, an image is formed. Thereafter, the recording medium 102 is conveyed by roller pairs 103*g* and 103*h* and discharged on a tray 106. The above described roller 103*b*, the conveying roller pairs 103*c*, 103*d* and 103*e*, the guide 103*f*, the roller pairs 103*g* and 103*h*, and the like constitute a conveying means 103 for conveying the recording medium 102.

The cartridge mounting portion 130*a* is a portion (space) for mounting the cartridge B therein. In a state in which the cartridge B is positioned in the space, the coupling member 150 (described later) of the cartridge B is connected with the driving shaft of the apparatus main assembly A. In this embodiment, the mounting of the cartridge B to the mounting portion 130*a* is referred to as mounting of the cartridge B to the apparatus main assembly A. Further, demounting (removal) of the cartridge B from the mounting portion 130*b* is referred to as demounting of the cartridge B from the apparatus main assembly A.

(3) Description of Constitution of Drum Flange

Figure 5:
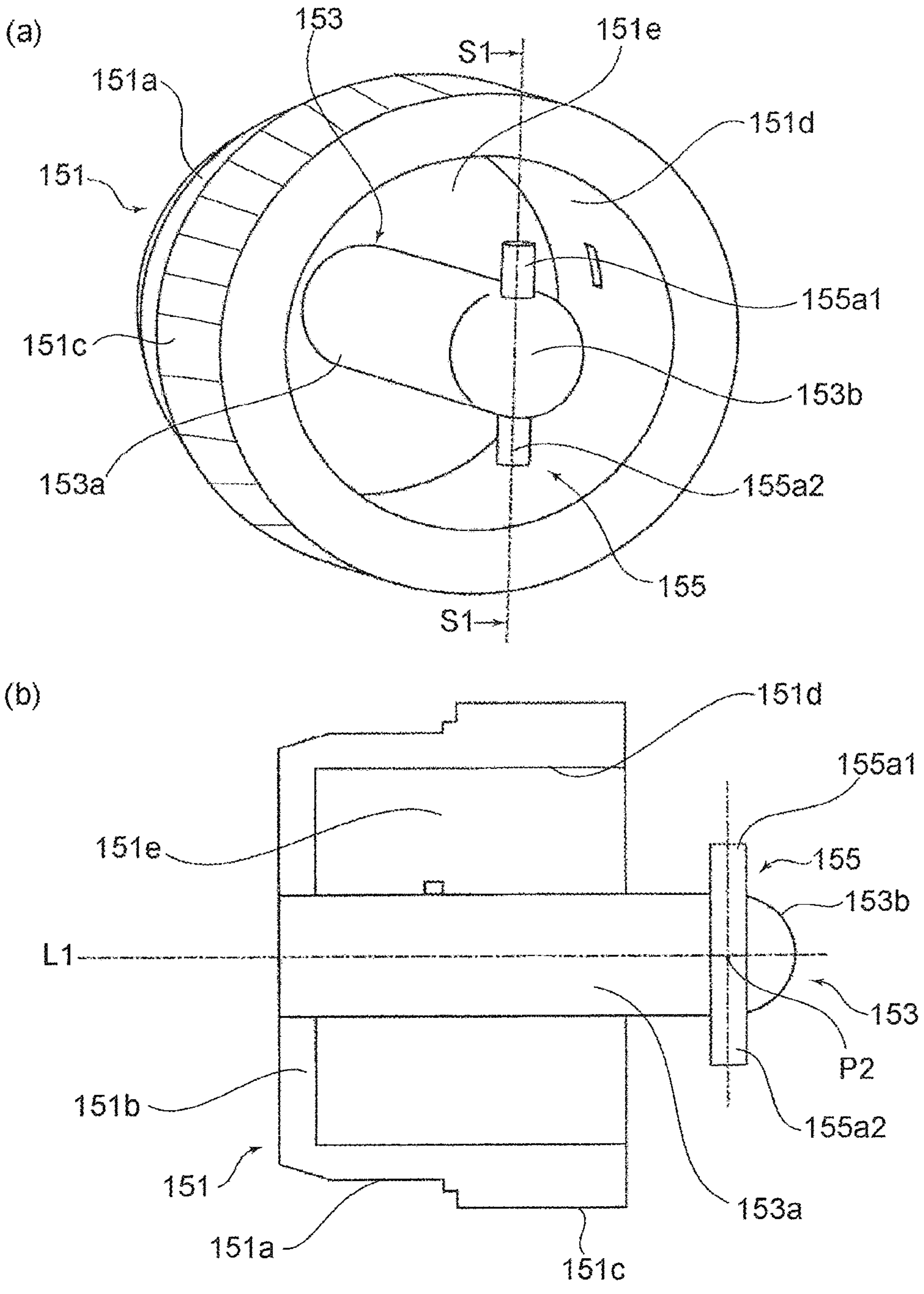
FIG. 5 is a perspective view and a longitudinal sectional view of a drum flange (drum shaft) according to the embodiment of the present invention.

First, a drum flange at a side where the rotational force is transmitted from the apparatus main assembly A to the photosensitive drum 107 (hereinafter simply referred to a "drive side") will be described with reference to FIG. 5. FIG. 5(*a*) is a perspective view of the drum flange at the drive side and FIG. 5(*b*) is a sectional view of the drum flange taken along S1-S1 line shown in FIG. 5(*a*). Incidentally, with respect to an axial line direction of the photosensitive drum, a side opposite from the drive side is referred to as a "non-drive side").

A drum flange 151 is formed of a resinous material by ejection molding. Examples of the resinous material may include polyacetal, polycarbonate, and so on A drum shaft 153 is formed of a metallic material such as iron, stainless steel, or the like. Depending on a load torque for rotating the photosensitive drum 107, it is possible to select appropriately the materials for the drum flange 151 and the drum shaft 153. For example, the drum flange 151 may also be formed of the metallic material and the drum shaft 153 may also be formed of the resinous material. When both of the drum flange 151 and the drum shaft 153 are formed of the resinous material, they can be integrally molded.

Figure 7:
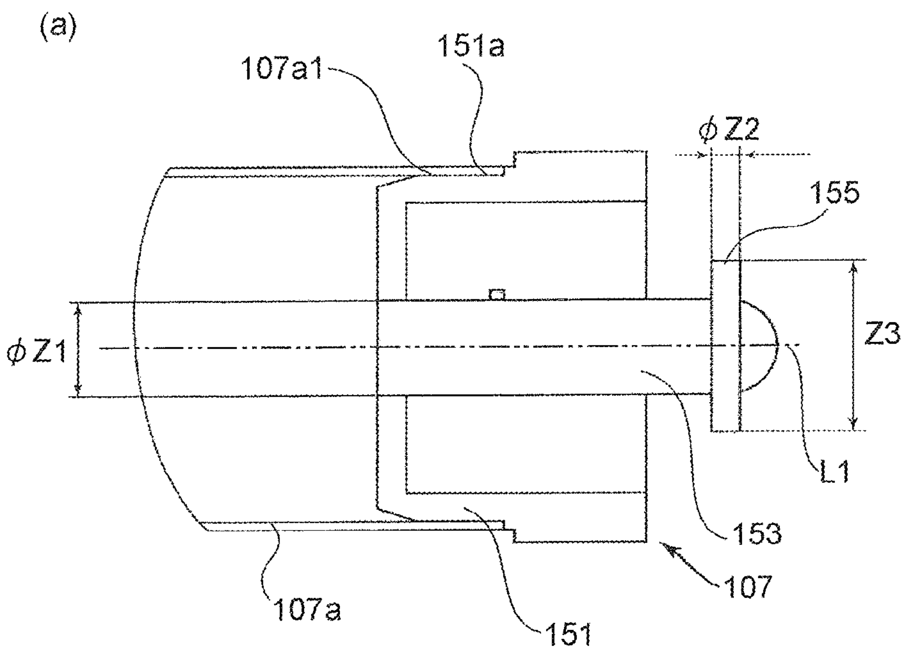
FIG. 7 is longitudinal sectional views of the photosensitive drum according to the embodiment of the present invention.
Figure 7:
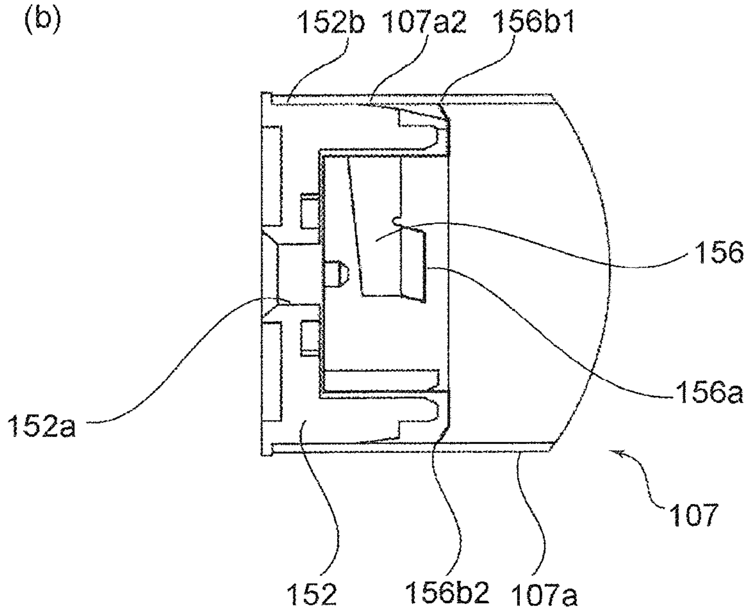

The flange 151 is provided with an engaging portion 151*a* which engages with an inner surface of the photosensitive drum 107, a gear portion (helical gear or spur gear) 151*c* for transmitting a rotational force to the developing roller 110, and an engaging portion 151*d* rotatably supported on a drum bearing. More specifically, as for the flange 151, the engaging portion 151*a* engages with one end of a cylindrical drum 107*a* as will be described hereinafter. These are disposed co-axially with a rotation axis L1 of the photosensitive drum 107. And, the drum engaging portion 151*a* has a cylindrical shape, and a base 151*b* perpendicular thereto is provided. The base 151*b* is provided with a drum shaft 153 outwardly projected with respect to the direction of the axis L1. This drum shaft 153 is co-axial with the drum engaging portion 151*a*. These are fixed so as to be co-axial with the rotation axis L1. As for the fixing method thereof the press-fitting, the bonding, the insert molding, and so on are available, and they are selected properly. As shown in FIG. 7 (*a*), the drum flange 151 includes an inner surface adjacent to a hollow portion in the drum flange 151. The hollow portion is open to outside of the drum flange 151.

The drum shaft 153 comprises the circular column portion 153*a* which has a projection configuration, and is disposed so as to be co-axially with the rotation axis of the photosensitive drum 107. The drum shaft 153 is provided on the end part of the photosensitive drum 107 on the axis L1 of the photosensitive drum 107. In addition, the drum shaft 153 is about 5-15 mm in diameter in consideration of the material, the load, and the space. A free end portion 153*b* of the circular column portion 153*a* has a semi-spherical surface configuration so that it can incline smoothly, when an axis of a drum coupling member 150 which is a rotating force transmitting portion inclines, as will be described in detail hereinafter. In addition, in order to receive the rotational force from the drum coupling member 150, a rotating force transmitting pin (rotating force receiving member (portion) 155 are provided on the photosensitive drum 107 side of the free end of the drum shaft 153. The pin 155 is extended in the direction substantially perpendicular to the axis of the drum shaft 153.

The pin 155 as the rotational force receiving member has a cylindrical shape which has a diameter smaller than that of the circular column portion 153*a* of the drum shaft 153, and is made of the metal or the resin material. And, it is fixed by press-fitting, bonding, and so on to the drum shaft 153. And, the pin 155 is fixed in the direction which the axis thereof intersects the axis L1 of the photosensitive drum 107. Preferably, it is desirable to dispose the axis of the pin 155 so as to pass the center P2 of the spherical surface of the free end portion 153*b* of the drum shaft 153 (FIG. 5(*b*)). Although the free end portion 153*b* is the semi-spherical surface configuration actually, the center P2 is the center of a phantom spherical surface that the semispherical surface makes the part thereof. In addition, the number of the pins 155 can be selected properly. In this embodiment, a single pin 155 is used from the standpoint of the assembling property and in order to transmit driving torque assuredly. The pin 155 passes said center P2, and is through the drum shaft 153. And, the pin 155 is outwardly projected at the positions of the peripheral surface of the drum shaft 153 which are diametrically opposite (155*a*1, 155*a*2). More particularly, the pin 155 is projected in the direction perpendicular to the axis (axis L1) of the drum shaft 153 relative to the drum shaft 153 at the two opposite places (155a1, 155a2). By this, the drum shaft 153 receives the rotational force from the drum coupling member 150 at the two places. In this embodiment, the pin 155 is mounted to the drum shaft 153 in the range of 5 mm from the free end of the drum shaft 153. However, this does not limit the present invention.

In addition, a space portion 151e formed by the engaging portion 151d and the base 151b receives a part of drum coupling member 150, in mounting the drum coupling member 150 (which will be described hereinafter) to the flange 151.

In this embodiment, the gear portion 151a for transmitting the rotational force to the developing roller 110 is mounted to the flange 151. However, the rotation of the developing roller 110 may be transmitted not through the flange 151. In that case, the gear portion 151c is unnecessary. However, in the case of disposing the gear portion 151a at the flange 151, integral molding, with the flange 151, of the gear portion 151a can be utilized.

The flange 151, the drum shaft 153, and the pin 155 function as the rotational force receiving member which receives the rotational force from the drum coupling member 150 as will be described hereinafter.

(4) Structure of Electrophotographic Photosensitive Member Drum Unit

Figure 6:
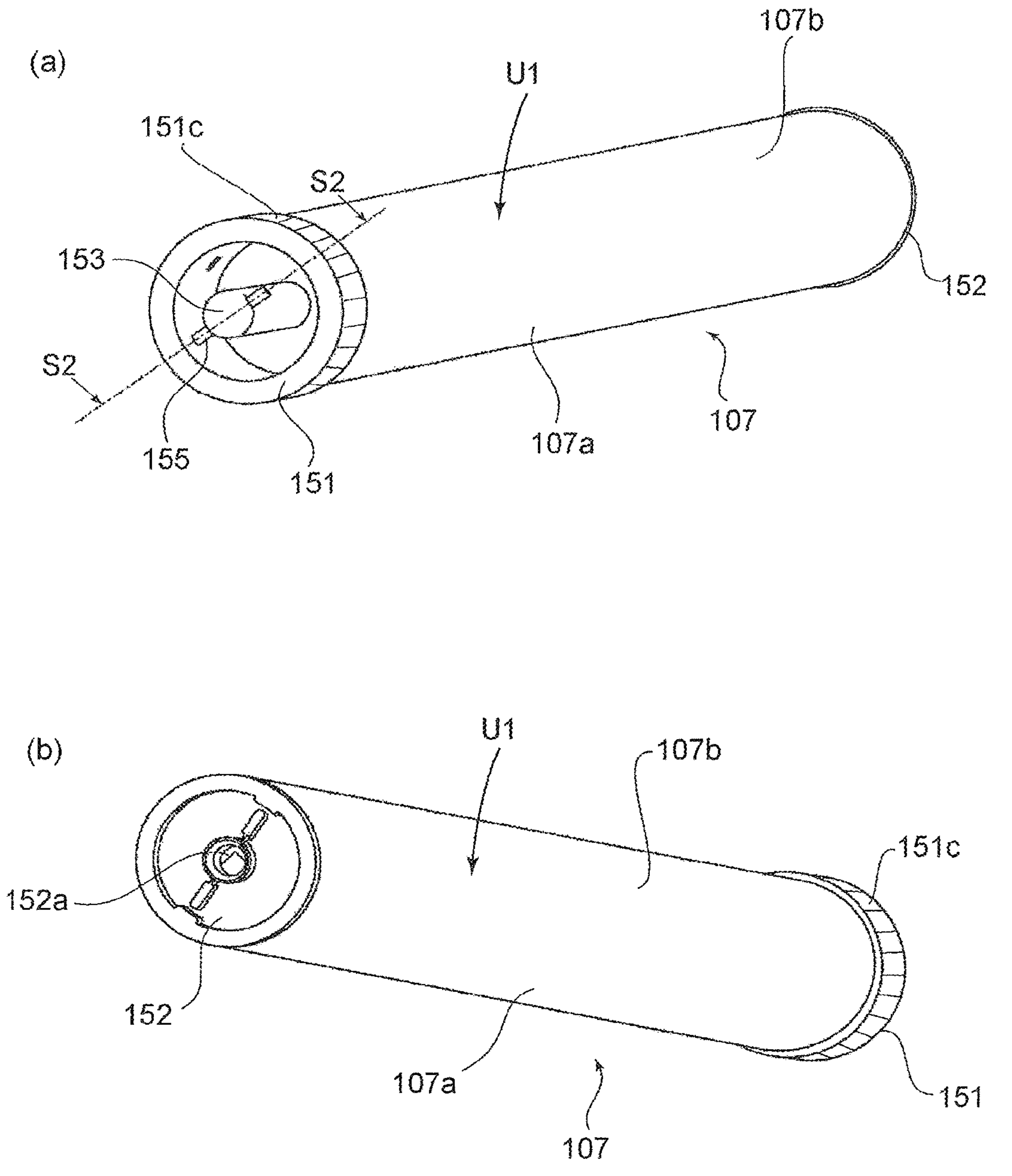
FIG. 6 is a perspective view of a photosensitive drum according to the embodiment of the present invention.

Referring to FIG. 6 and FIG. 7, the structure of an electrophotographic photosensitive member drum unit ("drum unit") will be described. FIG. 6(*a*) is a perspective view, as seen from the driving side, of the drum unit U1, and FIG. 6(*b*) is a perspective view as seen from the non-driving side. In addition, FIG. 7 is a sectional view taken along S2-S2 of FIG. 6(*a*).

The photosensitive drum 107 has a cylindrical drum 107a coated with a photosensitive layer 107b on the peripheral surface.

The cylindrical drum 107a has an electroconductive cylinder, such as the aluminum, and the photosensitive layer 107b applied thereon. The opposite ends thereof are provided with the drum surface and the substantially co-axial opening 107a1, 107a2, in order to engage the drum flange (151, 152). More particularly, the drum shaft 153 is provided on the end part of the cylindrical drum 107a co-axially with the cylindrical drum 107a. Designated by 151c is a gear and transmits a rotational force which the coupling 150 received from a drive shaft 180 to a developing roller 110. The gear 151c is integrally molded with the flange 15.

The cylinder 107a may be hollow or solid.

As to the drum flange 151 of the driving side, since it has been described in the foregoing, the description is omitted.

A drum flange 152 of the non-driving side is made of the resin material similarly to the driving side with injection molding. And, a drum engaging portion 152b and a bearing portion 152a are substantially co-axially disposed with each other. In addition, the flange 152 is provided with a drum grounding plate 156. The drum grounding plate 156 is an electroconductive thin plate (metal). The drum grounding plate 156 includes contact portions 156b1, 156b2 which contact the inner surface of the electroconductive cylindrical drum 107a, and a contact portion 156a which contacts the drum grounding shaft 154 (which will be described hereinafter). And, for the purpose of grounding the photosensitive drum 107, the drum grounding plate 156 is electrically connected with the apparatus main assembly A.

A drum flange 152 of the non-driving side is made of the resin material, similarly to the driving side with injection molding. And, a drum engaging portion 152b and a bearing portion 152a are substantially co-axially disposed with each other. In addition, the flange 152 is provided with a drum grounding plate 156. The drum grounding plate 156 is an electroconductive thin plate (metal). The drum grounding plate 156 includes contact portions 156b1, 156b2 which contact the inner surface of the electroconductive cylindrical drum 107a, and a contact portion 156a which contacts the drum grounding shaft 154 (which will be described hereinafter). And, for the purpose of grounding the photosensitive drum 107, the drum grounding plate 156 is electrically connected with the apparatus main assembly A.

Although it has been described that the drum grounding plate 156 is provided in the flange 152, the present invention is not limited to such an example. For example, the drum grounding plate 156 may be disposed at the drum flange 151, and it is possible to select properly the position which can be connected with the ground.

Thus, the drum unit U1 comprises the photosensitive drum 107 which has the cylinder 107a, the flange 151, the flange 152, the drum shaft 153, the pin 155, and the drum grounding plate 156.

(5) Rotational Force Transmitting Portion (Drum Coupling Member)

Figure 8:
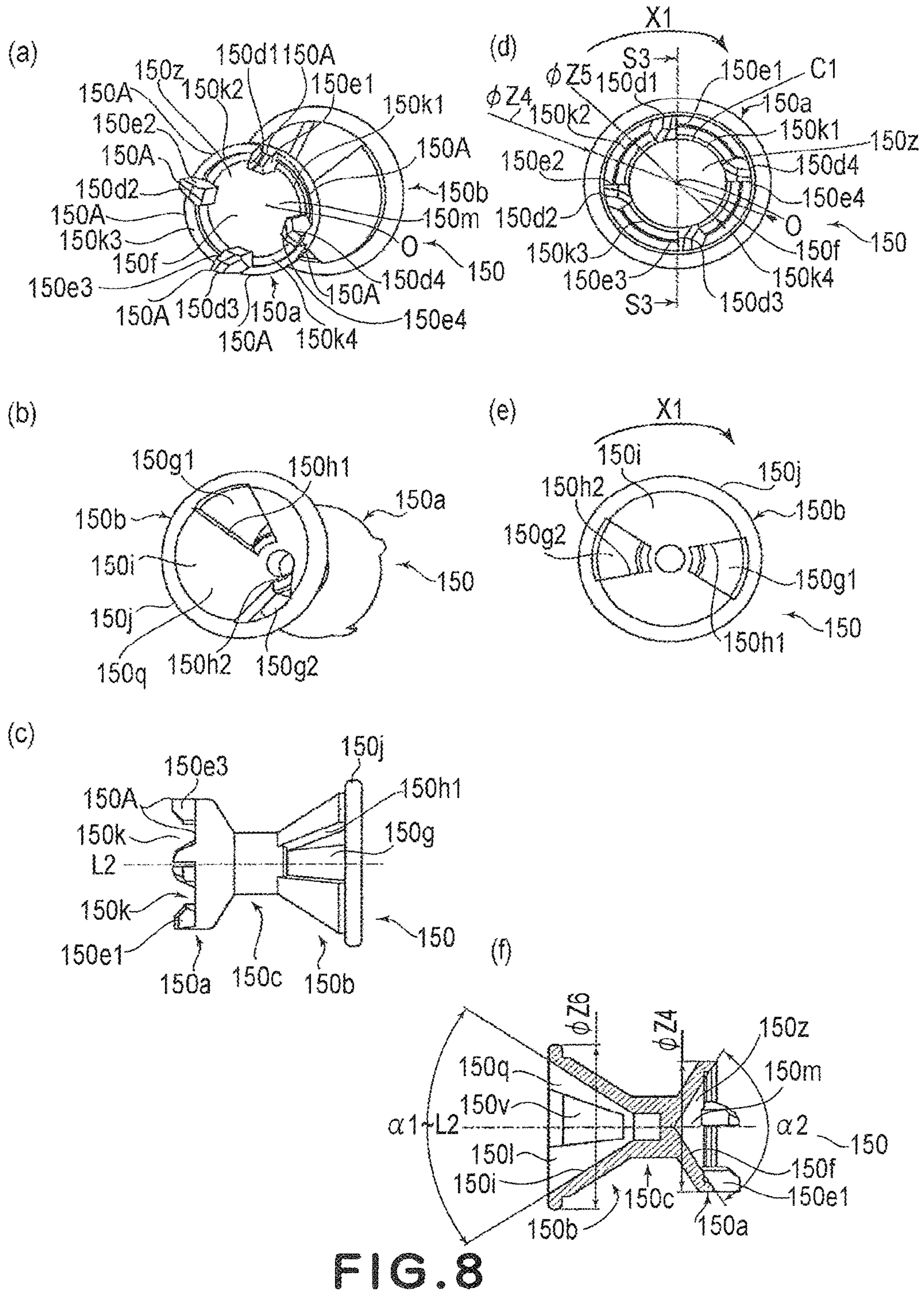
FIG. 8 is perspective views and a longitudinal sectional view of a coupling according to the embodiment of the present invention.

The description will be made, referring to FIG. 8 as to an example of the drum coupling member which is the rotational force transmitting portion. FIG. 8 (*a*) is a perspective view, as seen from the apparatus main assembly side, of the drum coupling member, FIG. 8 (*b*) is a perspective view, as seen from the photosensitive drum side, of the drum coupling member, and FIG. 8 (*c*) is a view seen in the direction perpendicular to the direction of the coupling rotation shaft L2. In addition, FIG. 8 (*d*) is the side view, as seen from the apparatus main assembly side, of the drum coupling member, FIG. 8 (*e*) is the Figure, as seen from the photosensitive drum side, and FIG. 8 (*f*) is a sectional view taken along S3 in FIG. 8 (*d*).

The drum coupling member ("coupling") 150 engages with a drive shaft 180 (FIG. 17) of the apparatus main assembly A in the state where the cartridge B is mounted set to the installation section 130a. In addition, the coupling 150 is disengaged from the drive shaft 180, when the cartridge B is taken out from the apparatus main assembly A. And, the coupling 150 receives a rotational force from a motor provided in the apparatus main assembly A through the drive shaft 180 in the state where it is engaged with the drive shaft 180. In addition, the coupling 150 transmits the rotational force thereof to the photosensitive drum 107. The materials available for the coupling 150 are the resin materials, such as polyacetal and the polycarbonate PPS. However, in order to raise a rigidity of the coupling 150, the glass fibers, the carbon fibers, and so on may be mixed in the above described resin material correspondingly to a required load torque. In the case of mixing said material, the rigidity of the coupling 150 can be raised. In addition, in the resin material, the metal may be inserted, then the rigidity may further be raised, and the whole coupling may be manufactured from the metal and so on.

The coupling 150 mainly comprises three portions.

The first portion is engageable with the drive shaft 180 (which will be described hereinafter), and it is a coupling side driven portion 150a for receiving the rotational force from the rotational force transmitting pin 182 which is a rotational force applying portion (main assembly side rotational force transmitting portion) provided on the drive shaft

180. In addition, the second portion is engageable with the pin 155, and it is a coupling side driving portion 150*b* for transmitting the rotational force to the drum shaft 153. In addition, the third portion is a connecting portion 150*c* for connecting the driven portion 150*a* and the driving portion 150*b* with each other (FIGS. 8 (*c*) and (*f*)).

The driven portion 150*a*, the driving portion 150*b*, and the connecting portion 150*c* may be molded integrally, or, alternatively, the separate parts may be connected with each other. In this embodiment, these are integrally molded with resin material. By this, the manufacturing of the coupling 150 is easy and the accuracy as the parts is high. As shown in FIG. 8 (*f*) the driven portion 150*a* is provided with a drive shaft insertion opening portion 150*m* which expands toward the rotation axis L2 of the coupling 150. The driving portion 150*b* has a drum shaft insertion opening portion 150*l*, which expands toward the rotation axis L2.

The opening 150*m* has a conical driving shaft receiving surface 150*f* as an expanded part which expands toward the drive shaft 180 side in the state where the coupling 150 is mounted to the apparatus main assembly A. The receiving surface 150*f* constitutes a recess 150*z* as shown in FIG. 8 (*f*). The recess 150*z* includes the opening 150*m* at a position opposite the side adjacent the photosensitive drum 107 with respect to the direction of the axis L2.

By this, regardless of rotation phase of the photosensitive drum 107 in the cartridge B, the coupling 150 can pivot among a rotational force transmitting angular position, a pre-engagement angular position, and a disengaging angular position relative to the axis L1 of the photosensitive drum 107 without being prevented by the free end portion of the drive shaft 180. The rotational force transmitting angular position, the pre-engagement angular position, and the disengaging angular position will be described hereinafter.

A plurality of projections (the engaging portions) 150*d*1-150*d*4 are provided at equal intervals on a circumference about the axis L2 on an end surface of the recess 150*z*. Between the adjacent projections 150*d* 1, 150*d* 2, 150*d*3, 150*d*4, the standing-by portions 150*k*1, 150*k*2, 150*k*3, 150*k*4 are provided. An intervals between the adjacent projections 150*d*1-150*d*4 is larger than the outer diameter of the pin 182, so that the rotational force transmitting pins of the drive shaft 180 provided in the apparatus main assembly A (rotational force applying portions) 182 are received. The recesses between the adjacent projections are the standing-by portions 150*k*1-*k*4. When the rotational force is transmitted to the coupling 150 from the drive shaft 180, the transmission pins 182*a*1, 182*a*2 are received by any of the standing-by portions 150*k*1-*k*4. In addition, in FIG. 8 (*d*), the rotational force reception surfaces (rotational force receiving portions) 150*e* crossing with a rotational direction of the coupling 150 and (150*e*1-150*e*4) are provided in the downstream with respect to the clockwise direction (X1) of each projection 150*d*. More particularly, the projection 150*d*1 has a receiving surface 150*e*1, the projection 150*d*2 has a receiving surface 150*e*2, the projection 150*d*3 has a receiving surface 150*e*3, and, and, a projection 150*d*4 has a receiving surface 150*e*4. In the state where the drive shaft 180 rotates, the pin 182*a*1, 182*a*2 contacts to any of the receiving surface 150*e*1-150*e*4. By doing so, the receiving surface 150*e* contacted by the pin 182*a*1, 182*a*2 is pushed by the pin 182. By this, the coupling 150 rotates about the axis L2. The receiving surface 150*e*1-150*e*4 is extended in the direction crossing with the rotational direction of the coupling 150.

In order to stabilize the running torque transmitted to the coupling 150 as much as possible, it is desirable to dispose the rotational force receiving surfaces 150*e* on the same circumference that has the center on the axis L2. By this, the rotational force transmission radius is constant and the running torque transmitted to the coupling 150 is stabilized. In addition, as for the projections 150*d*1-150*d*4, it is preferable that the position of the by coupling 150 is stabilized by the balance of the forces which the coupling receives. For that reason, in this embodiment, the receiving surfaces 150*e* are disposed at the diametrically opposed positions (180 degrees). More particularly, in this embodiment, the receiving surface 150*e*1 and the receiving surface 150*e*3 are diametrically opposed relative to each other, and the receiving surface 150*e*2 and the surface 150*e*4 are diametrically opposed relative to each other (FIG. 8 (*d*)). By this arrangement, the forces which the coupling 150 receives constitute a force couple. Therefore, the coupling 150 can continue rotary motion only by receiving the force couple. For this reason, the coupling 150 can rotate without the necessity of being specified in the position of the rotation axis L2 thereof. In addition, as for the number thereof, as long as the pins 182 of the drive shaft 180 (the rotational force applying portion) can enter the standing-by portions 150*k*1-150*k*2, it is possible to select suitably. In this embodiment, as shown in FIG. 8 the four receiving surfaces are provided. This embodiment is not limited to this example. For example, the receiving surfaces 150*e* (projections 150*d*1-150*d*4) do not need to be disposed on the same circumference (the phantom circle C1 and FIG. 8 (*d*)). Or, it is not necessary to dispose at the diametrically opposed positions. However, the effects described above can be provided by disposing the receiving surfaces 150*e* as described above.

Here, in this embodiment, the diameter of the pin is approximately 2 mm, and a circumferential length of the stand-by portion 150*k* is approximately 8 mm. The circumferential length of the stand-by portion 150*k* is an interval between adjacent projections 150*d* (on the phantom circle). The dimensions are not limiting to the present invention.

Similarly to the opening 150*m*, a drum shaft insertion opening portion 150*l* has a conical rotational force receiving surface 150*i* of an as an expanded part which expands toward the drum shaft 153 in the state where it is mounted to the cartridge B. The receiving surface 150*i* constitutes a recess 150*q*, as shown in FIG. 8 (*f*).

By this, irrespective of the rotation phase of the photosensitive drum 107 in the cartridge B, the coupling 150 can pivot among a rotational force transmitting angular position, a pre-engagement angular position, and a disengaging angular position to the drum axis L1 without being prevented by the free end portion of the drum shaft 153. The recess 150*q* is constituted in the illustrated example by a conical receiving surface 150*i* which it has centering on the axis L2. The standby openings 150*g* 1 or 150*g*2 ("opening") are provided in the receiving surface 150*i* (FIG. 8*b*). As for the coupling 150, the pins 155 can be inserted into the inside of this opening 150*g* 1 or 150*g*2 so that it may be mounted to the drum shaft 153. And, the size of the openings 150*g* 1 or 150*g*2 is larger than the outer diameter of the pin 155. By doing so, irrespective of the rotation phase of the photosensitive drum 107 in the cartridge B, the coupling 150 is pivotable among the rotational force transmitting angular position and the pre-engagement angular position (or disengaging angular position) as will be described hereinafter without being prevented by the pin 155.

More particularly, the projection 150*d* is provided adjacent to the free end of the recess 150*z*. And, the projections (projections) 150*d* project in the intersection direction crossing with the rotational direction in which the coupling 150 rotates, and are provided with the intervals along the rotational direction. And, in the state where the cartridge B is mounted to the apparatus main assembly A, the receiving surfaces 150*e* engage to or abutted to the pin 182, and are pushed by the pin 182.

By this, the receiving surfaces 150*e* receive the rotational force from the drive shaft 180. In addition, the receiving surfaces 150*e* are disposed in equidistant from the axis L2, and constitute a pair interposing the axis L2 they are constituted by the surface in the intersection direction in the projections 150*d*. In addition, the standing-by portions (recesses) 150*k* are provided along the rotational direction, and they are depressed in the direction of the axis L2.

The standing-by portion 150*k* is formed as a space between the adjacent projections 150*d*. In the state where the cartridge B is mounted to the apparatus main assembly A, the pin 182 enters the standing-by portion 150*k*, and it stands by for being driven. And, when the drive shaft 180 rotates, the pin 182 pushes the receiving surface 150*e*.

By this, the coupling 150 rotates.

The rotational force receiving surface (rotational force receiving member (portion)) 150*e* may be disposed inside of the driving shaft receiving surface 150*f*. Or, the receiving surface 150*e* may be provided in the portion outwardly projected from the receiving surface 150*f* with respect to the direction of the axis L2. When the receiving surface 150*e* is disposed inside of the receiving surface 150*f*, the standing-by portion 150*k* is disposed inside of the receiving surface 150*f*

More particularly, the standing-by portion 150*k* is the recess provided between the projections 150*d* in the inside of the arc part of the receiving surface 150*f*. In addition, when the receiving surface 150*e* is disposed at the position which outwardly projects, the standing-by portion 150*k* is the recess positioned between the projections 150*d*. Here, the recess may be a through hole extended in the direction of the axis L2, or it may be closed at one end thereof. More particularly, the recess is provided by the space region provided between the projection 150*d*. And, what is necessary is just to be able to enter the pin 182 into the region in the state where the cartridge B is mounted to the apparatus main assembly A.

These structures of the standing-by portion apply similarly to the embodiments as will be described hereinafter.

In FIG. 8 (*e*), the rotational force transmission surfaces (the rotational force transmitting portions) 150*h* and (150*h* 1 or 150*h*2) are provided in the upstream, with respect to the clockwise direction (X1), of the opening 150*g* 1 or 150*g*2. And, the rotational force is transmitted to the photosensitive drum 107 from the coupling 150 by the convection sections 150*h* 1 or 150*h*2 contacting to any of the pins 155*a*1, 155*a*2. More particularly, the transmitting surfaces 150*h* 1 or 150*h*2 push the side surface of the pin 155. By this, the coupling 150 rotates with the center thereof aligned with the axis L2. The transmitting surface 150*h* 1 or 150*h*2 is extended in the direction crossing with the rotational direction of the coupling 150.

Similarly to the projection 150*d*, it is desirable to dispose the transmitting surfaces 150*h* 1 or 150*h*2 diametrically opposed relative to each other on the same circumference.

At the time of manufacturing the drum coupling member 150 with an injection molding, the connecting portion 150*c* may become thin. This is because the coupling is manufactured so that the driving force receiving portion 150*a*, the driving portion 150*b* and the connecting portion 150*c* have a substantially uniform thickness. When the rigidity of the connecting portion 150*c* is insufficient, therefore, it is possible to make the connecting portion 150*c* thick so that driven portion 150*a*, the driving portion 150*b*, and the connecting portion 150*c* have the substantially equivalent thickness.

(6) Drum Bearing Member

Figure 9:
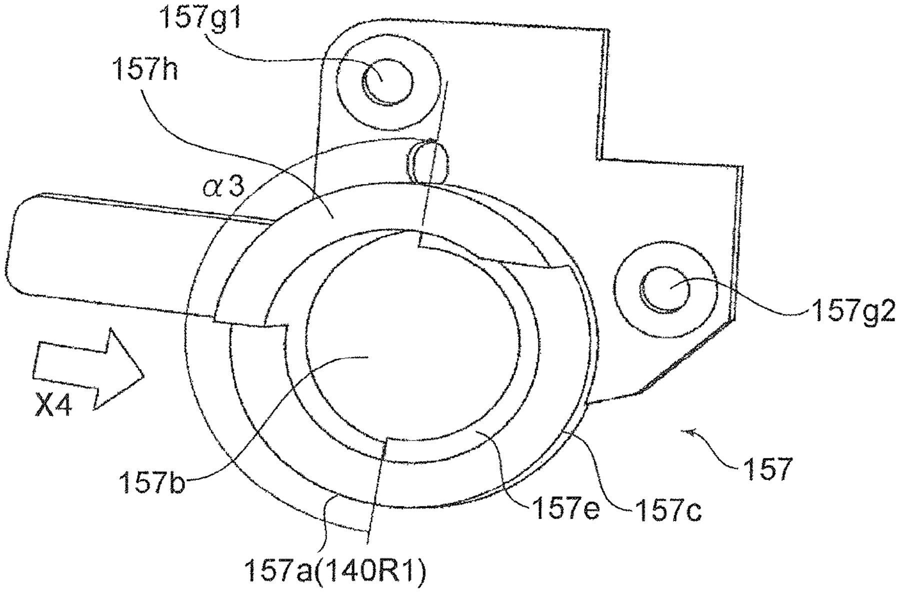
FIG. 9 is perspective views of a drum bearing member according to the embodiment of the present invention.
Figure 9:
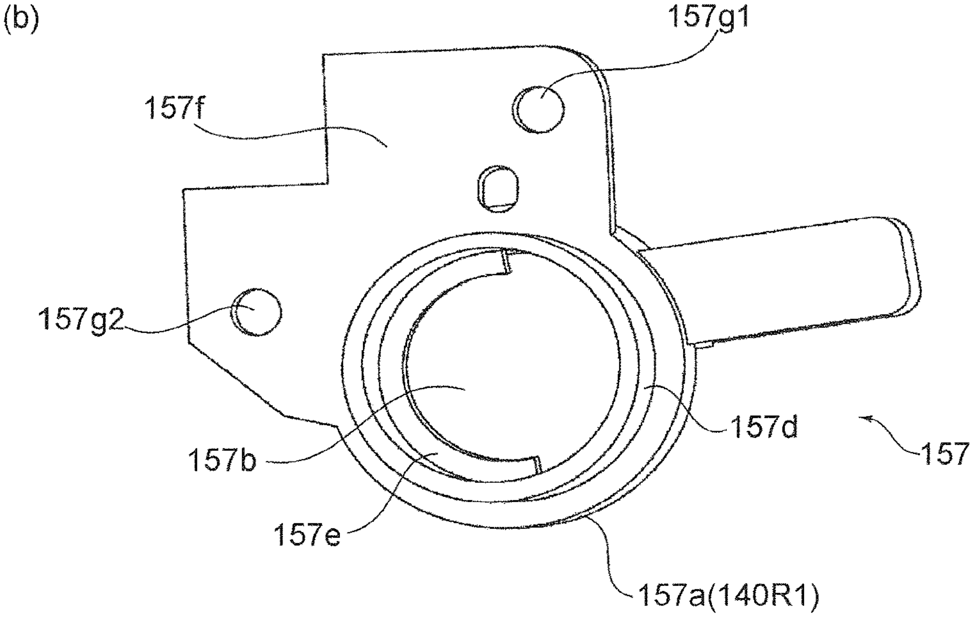

The description will be made, referring to FIG. 9, about a drum bearing member. FIG. 9(*a*) is a perspective view, as seen from a drive shaft side, and FIG. 9(*b*) is a perspective view, as seen from the photosensitive drum side.

The drum bearing member 157 rotatably supports the photosensitive drum 107 on the second frame 118. In addition, the bearing member 157 has a function of positioning the second frame unit 120 in the apparatus main assembly A. Further, it has the function of retaining the coupling 150 so that the rotational force can be transmitted to the photosensitive drum 107. As shown in FIG. 2, the bearing member 157 faces outside of the casing of the cartridge at a first end portion of the casing, which is opposite to a second end portion of the casing.

As shown in FIG. 9 an engaging portion (supporting projection) 157*d* positioned to the second frame 118 and a peripheral part 157*c* positioned in the apparatus main assembly A are substantially co-axially disposed. The engaging portion 157*d* and the peripheral part 157*c* are annular. And, the coupling 150 is disposed in the space portion 157*b* inside thereof. The engaging portion 157*d* and the peripheral part 157*c* are provided with a rib 157*e* for retaining the coupling 150 in the cartridge B in the neighborhood of the central portion with respect to the axial direction. The bearing member 157 is provided with holes 157*g* 1 or 157*g*2 which penetrate the abutment surface 157*f* and the fixing screw for fixing the bearing member 157 to the second frame 118. As will be described hereinafter, the guide portion 157*a* for mounting and demounting on and the cartridge B relative to the apparatus main assembly A is integrally provided on the bearing member 157. As also shown in FIG. 9 (*a*), the bearing member 157 includes a projected part 157*h* projecting in a direction away from the second end portion of the casing in the direction of the rotational axis of the photosensitive drum 107*a*, and a surface of the bearing member 157 is adjacent to an open space that extends to the rotational axis of the photosensitive drum 107*a* in a direction perpendicular to the rotational axis of the photosensitive drum 107*a*.

Figure 12:
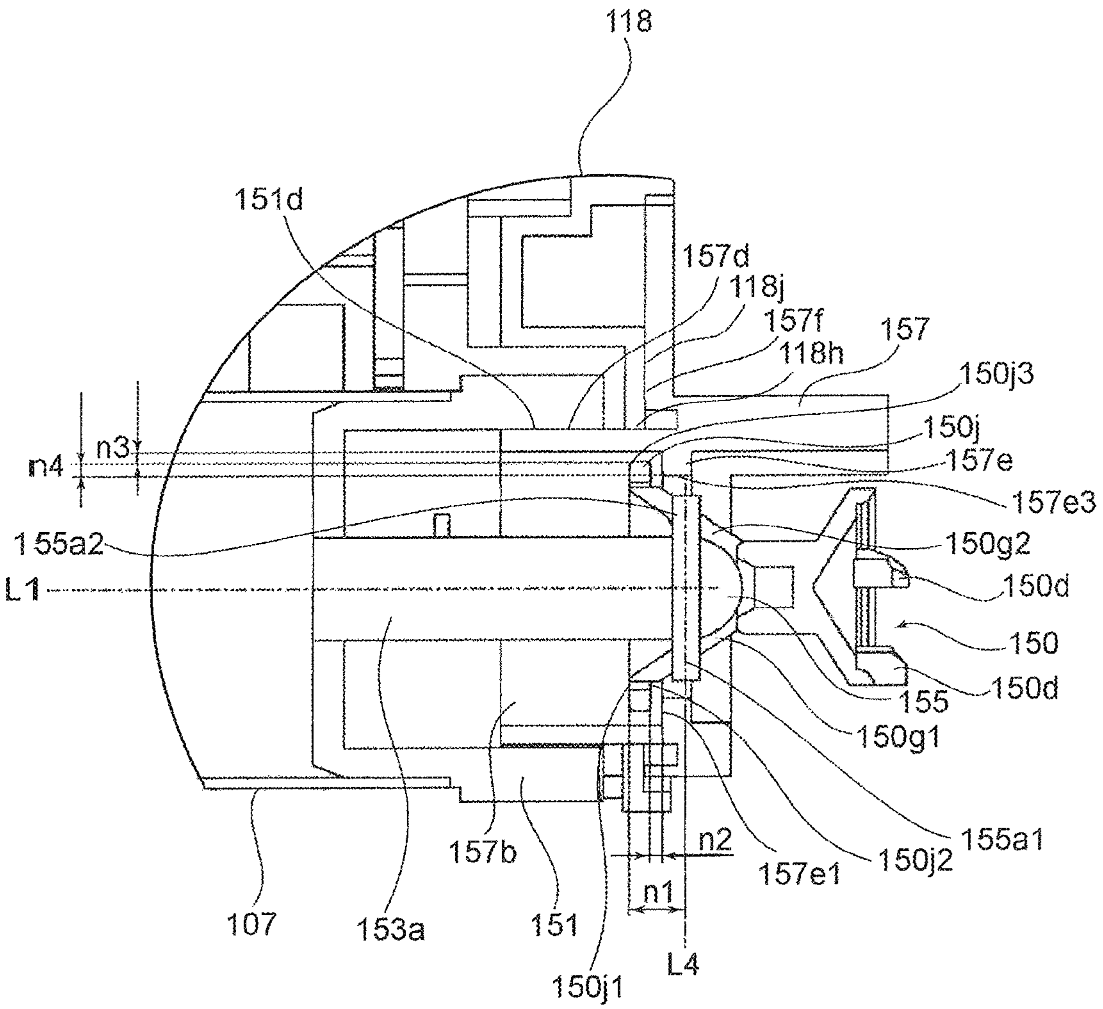
FIG. 12 is a longitudinal sectional view after the assembling of the cartridge according to the embodiment of the present invention.

As can be seen and understood from FIGS. 9, 12, and the other figures, a distance between at least a part of the supporting projection 157*d* and the second end portion of the casing in the direction of the rotational axis of the photosensitive drum 107*a* is shorter than a distance between the surface of the bearing member and the second end portion of the casing in the direction of the rotational axis of the photosensitive drum 107*a*, and a distance between at least a part of the projected part 157*h* and the second end portion of the casing in the direction of the rotational axis of the photosensitive drum 107*a* is longer than the distance between the surface of the bearing member and the second end portion of the casing in the direction of the rotational axis of the photosensitive drum 107*a*.

As can be seen and understood from FIG. 1, 2, 9, 12, and the other figures, the rotational axis of the developing roller 110, the rotational axis of the photosensitive drum 107*a*, and a part of the surface of the bearing member 157 are positioned in this order along a first line. Further, a distance from the rotational axis of the photosensitive drum 107*a* to at least a part of the projected part 157*h* as measured along a second line that is perpendicular to the rotational axis of the photosensitive drum 107*a* is shorter than a radius of the photosensitive drum that extends from the rotational axis of the photosensitive drum 107*a* to an outer surface of the photosensitive drum 107*a*. Also, a distance from the rotational axis of the photosensitive drum 107*a* to at least a part of the surface of the bearing member 157 as measured along a third line that is perpendicular to the rotational axis of the photosensitive drum 107*a* and is different than the second line is shorter than the radius of the photosensitive drum 107*a*.

(7) Coupling Mounting Method

Figure 10:
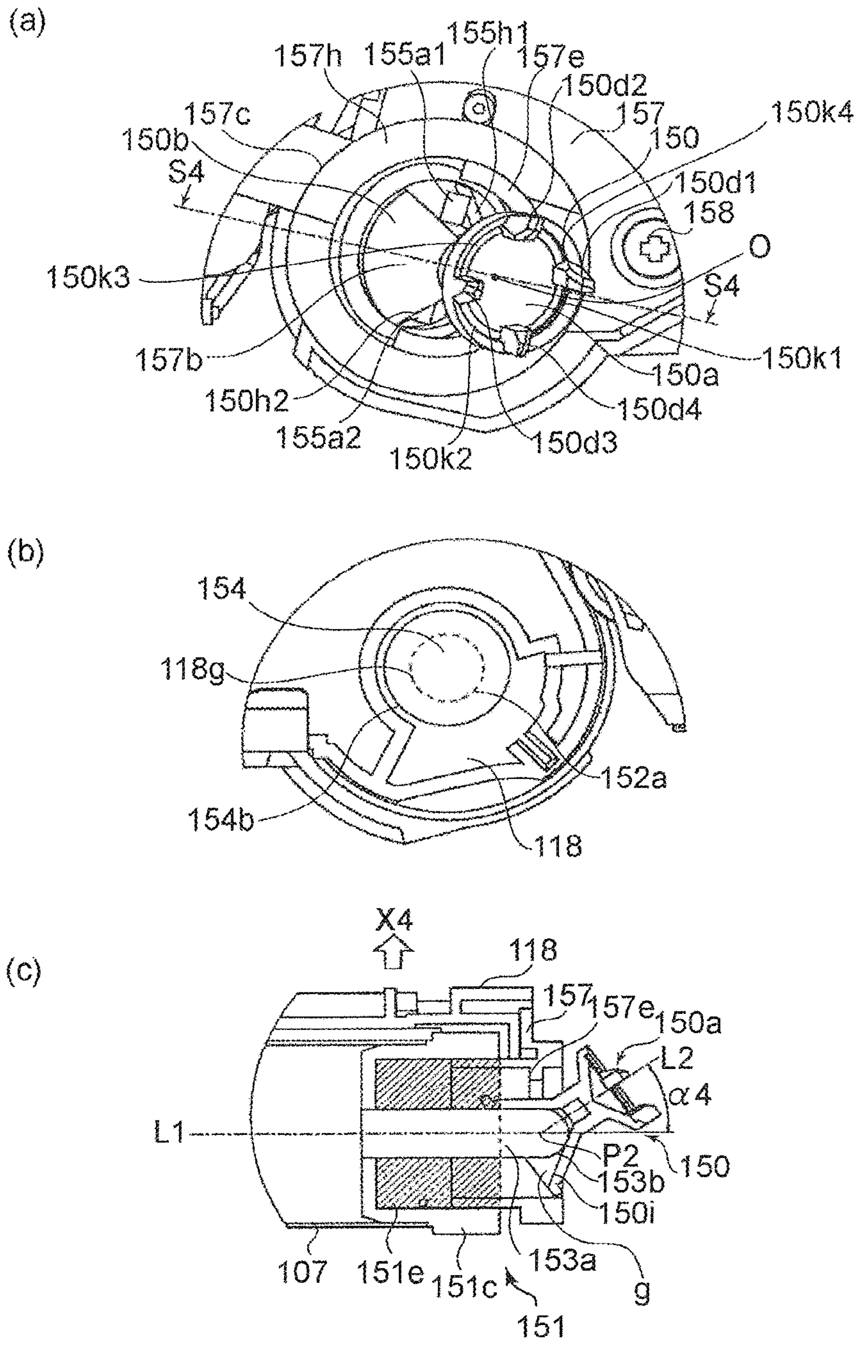
FIG. 10 is detailed views of a side surface of the cartridge according to the embodiment of the present invention.
Figure 11:
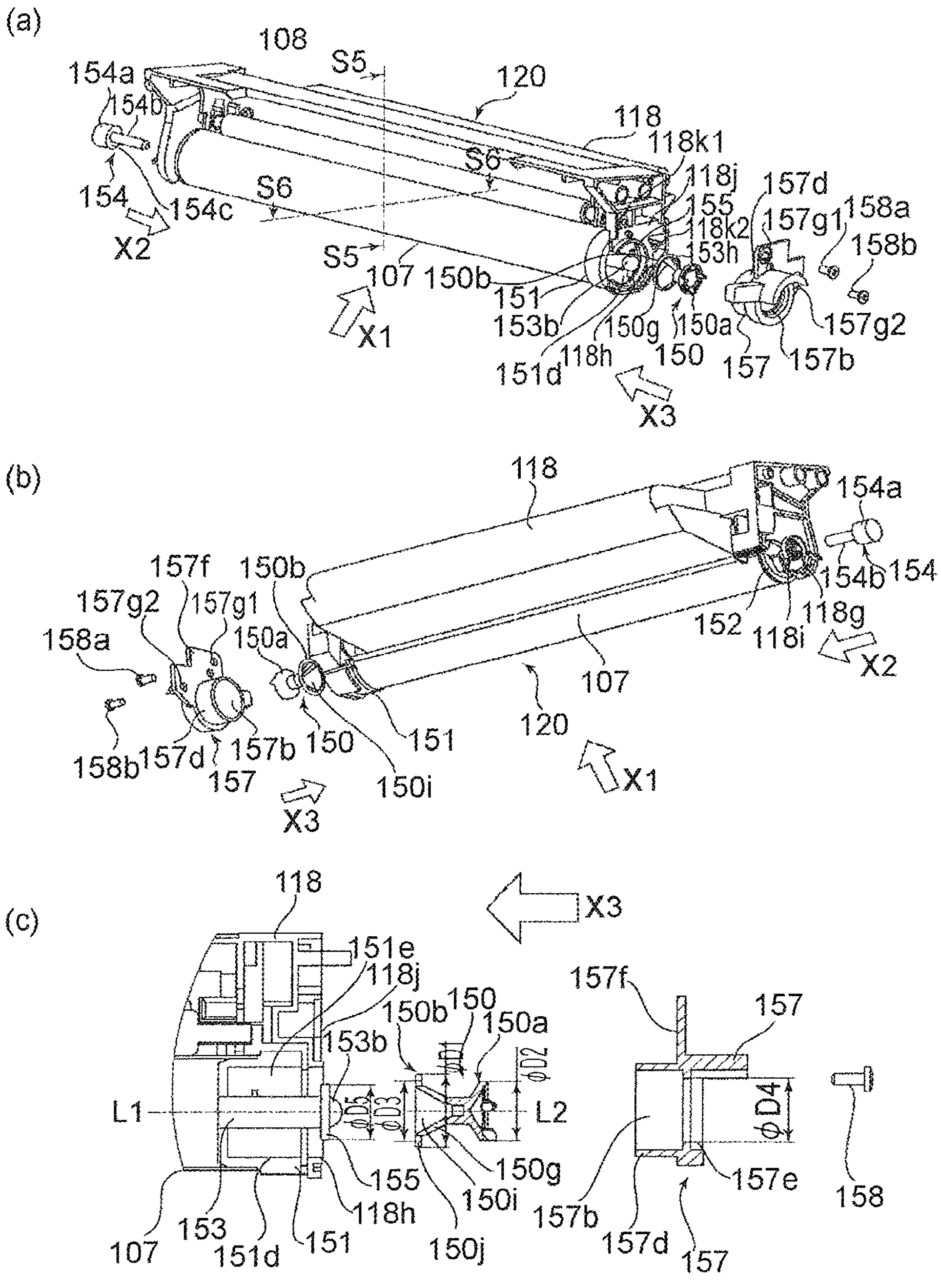
FIG. 11 is exploded perspective views and longitudinal sectional views of the coupling and the bearing member according to the embodiment of the present invention.
Figure 13:
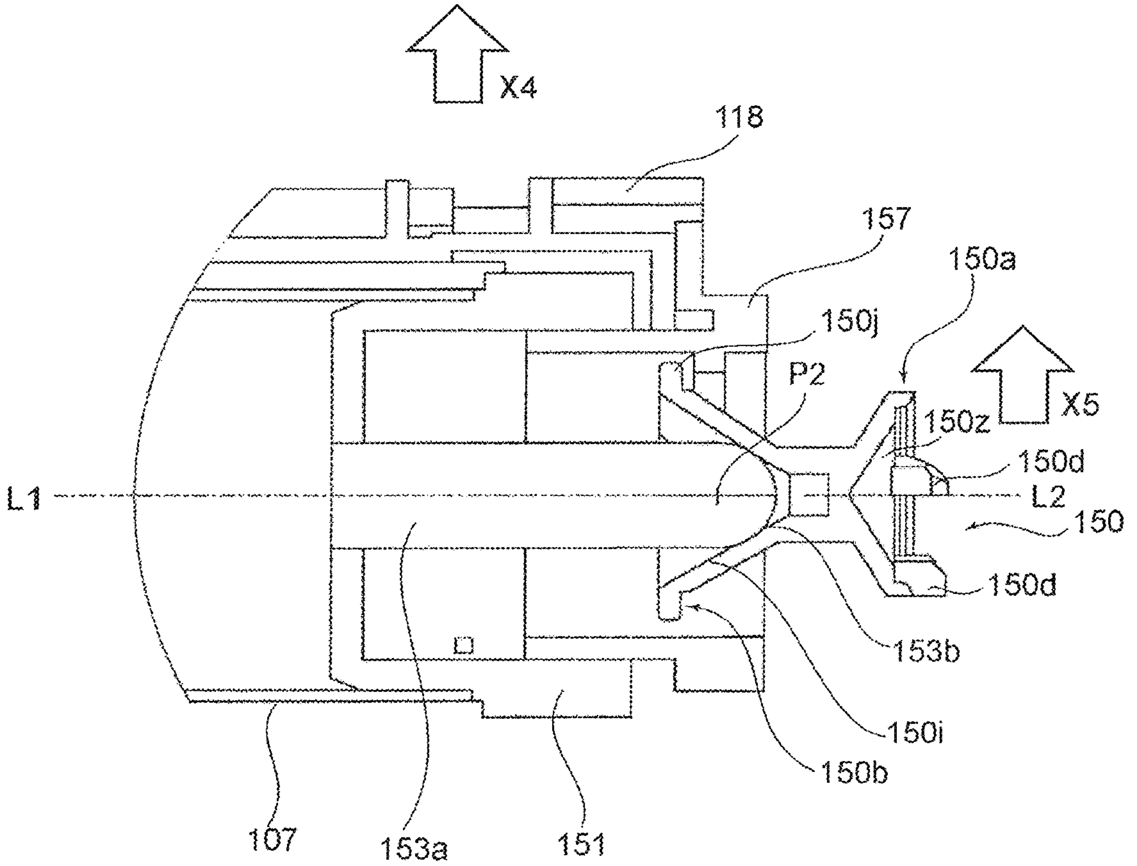
FIG. 13 is a longitudinal sectional view after the assembling of the cartridge according to the embodiment of the present invention.
Figure 14:
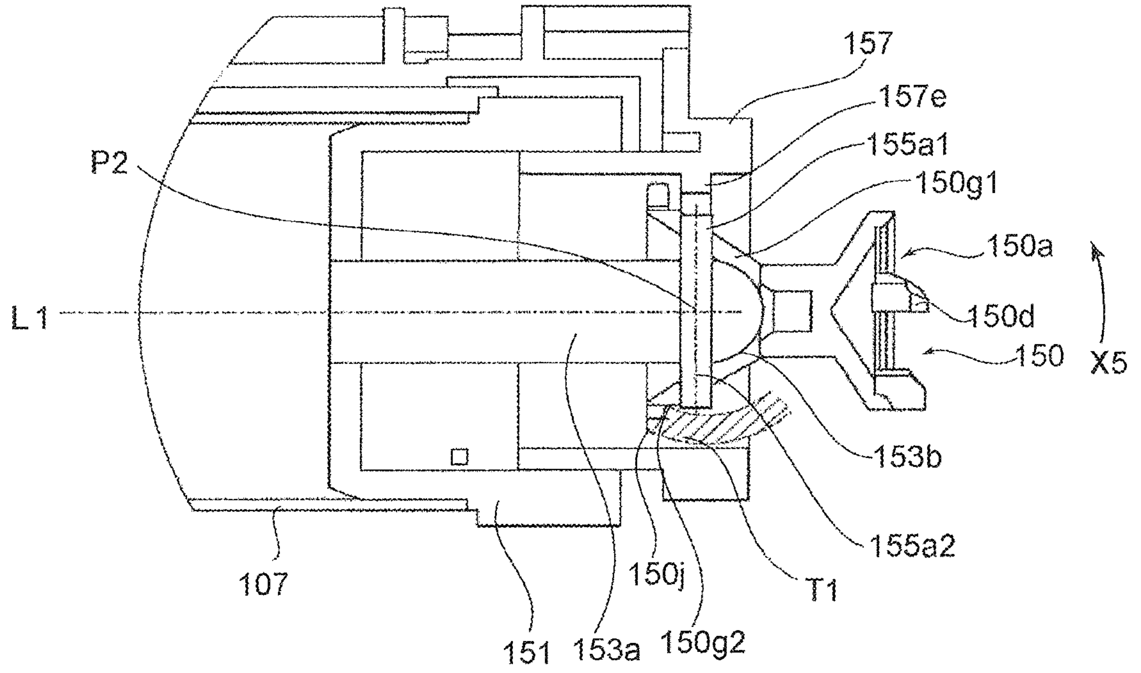
FIG. 14 is a longitudinal sectional view of the cartridge according to the embodiment of the present invention.
Figure 15:
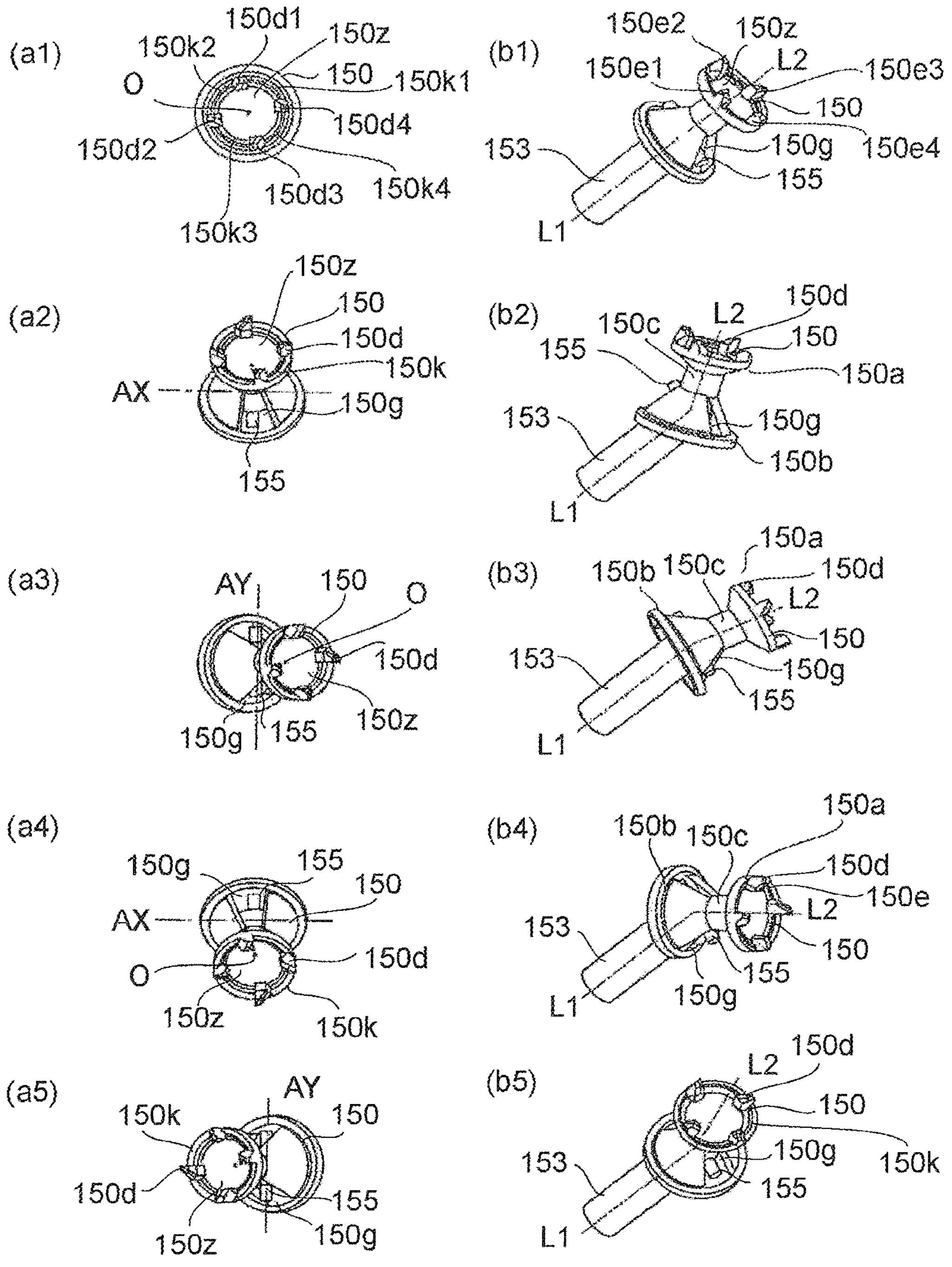
FIG. 15 is perspective views which illustrate a combined state of the drum shaft and the coupling.
Figure 16:
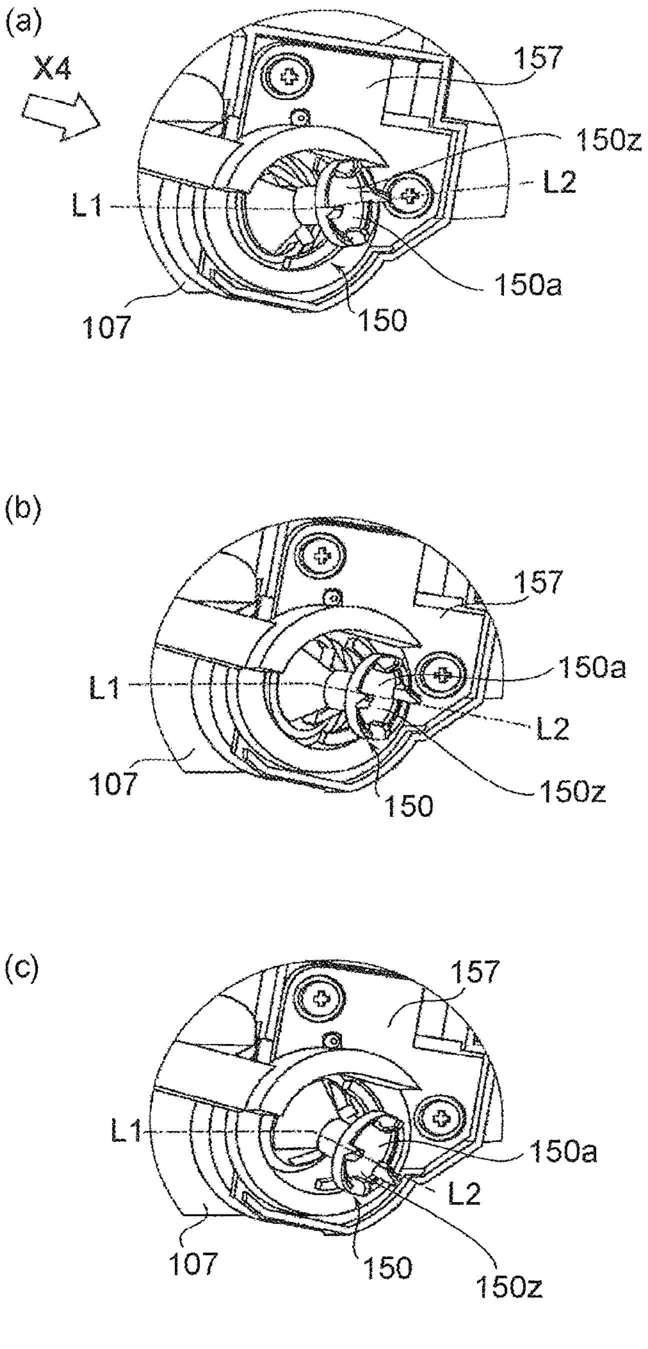
FIG. 16 is perspective views which illustrate an inclined state of the coupling.

Referring to FIG. 10-FIG. 16, the description will be made as to the mounting method of the coupling. FIG. 10 (*a*) is an enlarged view, as seen from the driving side surface, of the major part around the photosensitive drum. FIG. 10 (*b*) is an enlarged view, as seen from the non-driving side surface, of the major part. FIG. 10 (*c*) is a sectional view taken along S4-S4 of FIG. 10 (*a*). FIGS. 11 (*a*) and (*b*) are an exploded perspective views which illustrate the state before attachment of the primary members of the second frame unit. FIG. 11 (*c*) is a sectional view taken along S5-S5 in FIG. 11 (*a*). FIG. 12 is a sectional view which illustrates a state after attaching. FIG. 13 is a sectional view taken along S6-S6 of FIG. 11 (*a*). FIG. 14 is a sectional view which illustrates a state after rotating the coupling and the photosensitive drum through 90 degrees from the state of FIG. 13. FIG. 15 is a perspective view which illustrates the combined state of the drum shaft and the coupling. FIGS. 15(*a*1)-(a5) are front views, as seen from the axial direction of the photosensitive drum, and FIGS. 15(*b*1)-(b5) are perspective views. FIG. 16 is a perspective view which illustrates the state where the coupling is inclined in the process cartridge.

As shown in FIG. 15 the coupling 150 is mounted so that the axis L2 thereof can incline in any direction relative to the axis L1 of the drum shaft 153 (coaxial with the photosensitive drum 107).

In FIG. 15 (*a*1) and FIG. 15 (*b*1), the axis L2 of the coupling 150 is co-axial with the axis L1 of the drum shaft 153. The state when the coupling 150 is inclined upward from this state is illustrated in FIG. 15 (*a*2) and (*b*2). As shown in this Figure, when the coupling 150 is inclined toward the opening 150*g* side, the opening 150*g* moves along the pin 155. As a result, the coupling 150 is inclined about an axis AX perpendicular to the axis of the pin 155.

In FIG. 15 (*a*3) and (*b*3), the state where the coupling 150 is inclined rightward is shown. As shown in this Figure, when the coupling 150 inclines in the orthogonality direction of the opening 150*g*, the opening 150*g* rotates about the pin 155. The axis of rotation is the axis line AY of the pin 155.

The state where the coupling 150 is inclined downward is shown in FIG. 15 (*a*4) and (*b*4), and the state where the coupling 150 is inclined leftward is shown in FIG. 15 (*a*5) and (*b*5). The rotation axes AX and AY have been described in the foregoing.

In the directions different from the inclining direction described in the foregoing, for example, in the 45-degree direction in FIG. 15 (*a*1) and so on, the inclination is made by combining the rotations in the axes AX and the directions of AY. Thus, the axis L2 can be pivoted in any direction relative to the axis L1.

More particularly, the transmitting surface (rotational force transmitting portion) 150*h* is movable relative to the pin (rotational force receiving portion) 155. The pin 155 has the transmitting surface 150 in the movable condition. And, the transmitting surface 150*h* and the pin 155 are engaged to each other in the rotational direction of the coupling 150. In this manner, the coupling 150 is mounted to the cartridge. In order to accomplish this, the gap is provided between the transmitting surface 150*h* and the pin 155. By this, the coupling 150 is pivotable in all directions substantially relative to the axis L1.

As described above, the opening 150*g* is extended in the direction (the rotational axis direction of the coupling 150) crossing with the projection direction of the pins 155 at least. Therefore, as has been described hereinbefore, the coupling 150 is pivotable in all the directions.

It has been mentioned that the axis L2 is slantable or inclinable in any direction relative to the axis L1. However, the axis L2 does not necessarily need to be linearly slantable to the predetermined angle in the full range of 360-degree direction in the coupling 150. For example, the opening 150*g* can be selected to be slightly wider in the circumferential direction. By doing so, the time of the axis L2 inclining relative to the axis L1, even if it is the case where it cannot incline to the predetermined angle linearly, the coupling 150 can rotate to a slight degree around the axis L2. Therefore, it can be inclined to the predetermined angle. In other words, the amount of the play in the rotational direction of the opening 150*g* is selected properly if necessary.

In this manner, the coupling 150 is revolvable or swingable over the full-circumference substantially relative to drum shaft (rotational force receiving member) 153. More particularly, the coupling 150 is pivotable over the full-circumference thereof substantially relative to the drum shaft 153.

Furthermore, as will be understood from the foregoing explanation, the coupling 150 is capable of whirling in and substantially over the circumferential direction of the drum shaft 153. Here, the whirling motion is not a motion with which the coupling itself rotates about the axis L2, but the inclined axis L2 rotates about the axis L1 of the photosensitive drum, although the whirling here does not preclude the rotation of the coupling per se about the axis L2 of the coupling 150.

The process of the assembling the parts will be described.

First, the photosensitive drum 107 is mounted in the direction X1 in FIG. 11(*a*) and FIG. 11 (*b*). At this time, the bearing portion 151*d* of the flange 151 is made to substantially co-axially engage with the centering portion 118*h* of the second frame 118. In addition, bearing hole 152*a* (FIG. 7 of the flange 152(*a*)) is substantially co-axially engaged with the centering portion 118*g* of the second frame 118.

The drum grounding shaft 154 is inserted into the direction X2. And, the centering portion 154*b* is penetrated through the bearing hole 152*a* (FIG. 6*b*) and the centering hole 118*g* (FIG. 10 (*b*)). At this time, the centering portion 154*b* and the bearing hole 152*a* are supported so that the photosensitive drum 107 is rotatable. On the other hand, the centering portion 154*b* and the centering hole 118*g* are supported fixedly by the press-fitting and so on. By this, the photosensitive drum 107 is rotatably supported relative to the second frame. Alternatively, it may be fixed non-rotatably relative to the flange 152, and the drum grounding shaft 154 (centering portion 154*b*) may be rotatably mounted to the second frame 118.

The coupling 150 and the bearing member 157 are inserted in the direction X3. First, the driving portion 150*b* is inserted toward the direction X3 downstream, while maintaining the axis L2 (FIG. 11*c*) in parallel with X3. At this time, the phase of the pin 155 and the phase of the opening 150*g* are matched with each other, and the pin 155 is made inserted into the openings 150*g* 1 or 150*g*2. And, the free end portion 153*b* of the drum shaft 153 is abutted to the drum bearing surface 150*i*. The free end portion 153*b* is the spherical surface and the drum bearing surface 150*i* is a conic surface. That is, the drum bearing surface 150*i* of the conic surface which is the recess, and the free end portion 153*b* of the drum shaft 153 which is the projection contact to each other. Therefore, the driving portion 150*b* side is positioned relative to the free end portion 153*b*. As has been described hereinbefore, when the coupling 150 rotates by the transmission of the rotational force from the apparatus main assembly A, the pin 155 positioned in the opening 150*g* will be pushed by the rotational force transmission surfaces (the rotational force transmitting portions) 150*h* 1 or 150*h*2 and (FIG. 8*b*). By this, the rotational force is transmitted to the photosensitive drum 107. Thereafter, the engaging portion 157*d* is inserted downstream with respect to the direction X3. By this, a part of coupling 150 is received in the space portion 157*b*. And, the engaging portion 157*d* supports the bearing portion 151*d* of the flange 151, so that the photosensitive drum 107 is rotatable. In addition, the engaging portion 157*d* engages with the centering portion 118*h* of the second frame 118. The abutment surface 157*f* of the bearing member 157 abuts to the abutment surface 118*j* of the second frame 118. And, the screws 158*a*, 158*b* are penetrated through the holes 157*g* 1 or 157*g*2, and they are fixed to the screw holes 118*k*1, 118*k*2 of the second frame 118, so that the bearing member 157 is fixed to the second frame 118 (FIG. 12).

The dimensions of the various portions of the coupling 150 will be described. As shown in FIG. 11 (*c*), a maximum outer diameter of the driven portion 150*a* is ΦD2, a maximum outer diameter of the driving portion 150*b* is ΦD1, and a small diameter of the standby opening 150*g* is ΦD3. In addition, a maximum outer diameter of the pin 155 is ΦD5, and an inner diameter of the retention rib 157*e* of the bearing member 157 is ΦD4. Here, the maximum outer diameter is the outer diameter of a maximum rotation locus about the axis L1 or the axis L2. At this time, since ΦD5<ΦD3 is satisfied, the coupling 150 can be assembled to the predetermined position by the straight mounting operation in the direction X3 therefore, the assembling property is high (the state after the assembly is shown in FIG. 12). The diameter of the inner surface ΦD4 of the retention rib 157*e* of the bearing member 157 is larger than ΦD2 of the coupling 150, and smaller than ΦD1 (ΦD2<ΦD4<ΦD1). By this, just the step attached to the direction X3 straight is sufficient to assemble the bearing member 157 to the predetermined position. For this reason, the assembling property can be improved (the state after the assembly is shown in FIG. 12).

As shown in FIG. 12, the retention rib 157*e* of the bearing member 157 is disposed closely to a flange portion 150*j* of the coupling 150 in the direction of the axis L1. More specifically, in the direction of the axis L1, the distance from an end surface 150*j*1 of the flange portion 150*j* to the axis L4 of the pin 155 is n1. In addition, the distance from an end surface 157*e*1 of the rib 157*e* to the other end surface 157*j*2 of the flange portion 150*j* is n2. The distance n2<distance n1 is satisfied.

In addition, with respect to the direction perpendicular to the axis L1, the flange portion 150*j* and the rib 157*e* are disposed so that they are overlapped relative to each other. More specifically, the distance n4 from the inner surface 157*e*3 of the rib 157*e* to the outer surface 150*j*3 of the flange portion 150*j* is the overlap amount n4 with respect to the orthogonality direction of the axis L1.

By such settings, the pin 155 is prevented from disengaging from the opening 150*g*. That is, the movement of the coupling 150 is limited by the bearing member 157. Thus, the coupling 150 does not disengage from the cartridge. The prevention of disengagement can be accomplished without additional parts. The dimensions described above are desirable from the standpoint of reduction of manufacturing and assembling costs. However, the present invention is not limited to these dimensions.

As described above (FIG. 10 (*c*) and FIG. 13), the receiving surface 150*i* which is the recess 150*q* of the coupling 150 is in contact with the free end surface 153*b* of the drum shaft 153 which is the projection. Therefore, the coupling 150 is swung along the free end portion (the spherical surface) 153*b* about the center P2 of the free end portion (the spherical surface) 153*b* in other words, the axis L2 is pivotable substantially in all directions irrespective of the phase of the drum shaft 153. The axis L2 of the coupling 150 is pivotable in all directions substantially. As will be described hereinafter, in order that the coupling 150 may engage with the drive shaft 180, the axis L2 is inclined toward the downstream with respect to the mounting direction of the cartridge B relative to the axis L1, just before the engagement. In other words, as shown in FIG. 16, the axis L2 inclines so that the driven portion 150*a* positions at the downstream side with respect to the mounting direction X4 relative to the axis L1 of the photosensitive drum 107 (the drum shaft 153). In FIGS. 16 (*a*)-(*c*), although the positions of the driven portion 150*a* slightly differ relative to each other, they are positioned at the downstream side with respect to the mounting direction X4 in any case.

The still more detailed description will be made.

As shown in FIG. 12, a distance n3 between a maximum outer diameter part and bearing member 157 of the driving portion 150*b* is selected so that a slight gap is provided between them. By this, as has been described hereinbefore, the coupling 150 is pivotable.

As shown in FIG. 9, the rib 157*e* is a semi-circular rib. The rib 157*e* is disposed at the downstream with respect to the mounting direction X4 of the cartridge B. Therefore, as shown in FIG. 10 (*c*), the driven portion 150*a* side of the axis L2 is greatly pivotable in the direction X4. In other words, the driving portion 150*b* side of the axis L2 is greatly pivotable in the direction of angle α3) at phase (FIG. 9(*a*) at which the rib 157*e* is not disposed. FIG. 10 (*c*) illustrates the state where the axis L2 inclined. In addition, it can also be pivoted to the state substantially parallel to the axis L1 by which it is shown in FIG. 13 from the state of the inclined axis L2 shown in FIG. 10 (*c*). In this manner, the rib 157*e* is disposed. By this, the coupling 150 can be mounted by the simple method to the cartridge B. Further, in addition, no matter the drum shaft 153 may stop with what phase, the axis L2 is pivotable relative to the axis L1. The rib is not limited to the semi-circular rib. As long as the coupling 150 is pivotable to the predetermined direction, and it is possible to mount the coupling 150 to Cartridge B (photosensitive drum 107), any rib is usable. In this manner, the rib 157*e* has a function as the regulating means for regulating the inclining direction of the coupling 150.

In addition, a distance n2 (FIG. 12) in the direction of the axis L1 from the rib 157*e* to the flange portion 150*j* is shorter than a distance n1 from the center of the pin 155 to the driving portion 150*b* side edge. By this, the pin 155 does not disengage from the opening 150*g*.

As described above, the coupling 150 is supported by the both of the drum shaft 153 and the drum bearing 157 substantially. More particularly, the coupling 150 is mounted to the cartridge B by the drum shaft 153 and the drum bearing 157 substantially.

The coupling 150 has a play (the distance n2) in the direction of the axis L1 relative to the drum shaft 153. Therefore, the receiving surface 150*i* (the conic surface) may not contact snuggly the drum shaft free end portion 153*b* (the spherical surface). In other words, the center of the pivoting may deviate from the center of curvature P2 of the spherical surface. However, even in such a case, the axis L2 is pivotable relative to the axis L1. For this reason, the purpose of this embodiment can be accomplished.

In addition, maximum possible inclination angle α4 (FIG. 10 (*c*)) between the axis L1 and the axis L2 is the one half of the taper angle (α1, FIG. 8(*f*)) between the axis L2 and the receiving surface 150*i*. The receiving surface 150*i* has conical shape and the drum shaft 153 has the cylindrical shape. For this reason, the gap g of angle α1/2 is provided between them. By this, the taper angle α1 changes, and therefore, the inclination angle α4 of the coupling 150 are set to the optimal value. In this manner, since the receiving surface 150*i* is the conic surface, the circular column portion 153*a* of the drum shaft 153 is satisfactory with the simple cylindrical shape. In other words, the drum shaft does not need to have a complicated configuration. Therefore, the machining cost of the drum shaft can be suppressed.

In addition, as shown in FIG. 10 (*c*), when the coupling 150 inclines, a part of coupling can circumvent into illustration) by space portion 151*e* (hatching of the flange 151. By this, the lightening cavity (Space portion 151*e*) of the gear portion 151*c* can be used without futility. Therefore, effective use of the space can be done. Incidentally, the lightening cavity (Space portion 151*e*) is not usually used.

As described above, in the embodiment of FIG. 10 (*c*), the coupling 150 is mounted so that a part of a coupling 150 may locate at the position which overlaps the gear portion 151*c* with respect to the direction of the axis L2. In the case of the flange which does not have the gear portion 151*c*, a part of coupling 150 can further enter into the cylinder 107*a*.

When the axis L2 inclines, the width of the opening 150*g* is selected in consideration of the size of the pin 155 so that the pin 155 may not interfere.

More particularly, the transmitting surface (rotational force transmitting portion) 150*h* is movable relative to the pin (rotational force receiving portion) 155. The pin 155 has the transmitting surface 150 in the movable condition. And, the transmitting surface 150*h* and the pin 155 are engaged to each other in the rotational direction of the coupling 150. In this manner, the coupling 150 is mounted to the cartridge. In order to accomplish this, the gap is provided between the transmitting surface 150*h* and the pin 155. By this, the coupling 150 is pivotable in all directions substantially relative to the axis L1.

The locus of the flange portion 150*j* when the driven portion 150*a* side inclines in the direction X5 is illustrated by the region T1 in FIG. 14. As shown in the Figure, even if the coupling 150 inclines, the interference with the pin 155 does not occur, and therefore, the flange portion 150*j* can be provided over the full-circumference of the coupling 150 (FIG. 8 (*b*)). In other words, the shaft receiving surface 150*i* has conical shape, and therefore, when the coupling 150 inclines, the pin 155 does not enter in the region T1. For this reason, the cutting away range of the coupling 150 is minimized. Therefore, the rigidity of the coupling 150 can be assured.

In the above described mounting process, the process (the non-driving side) in the direction X2 and the process (the driving side) in the direction X3 may be exchanged.

The bearing member 157 has been described as being fixed on the screws to the second frame 118. However, the present invention is not limited to such an example. For example, like the bonding, if the bearing member 157 is fixable to the second frame 118, the any method will be usable.

(8) Drive Shaft and Driving Structure of the Apparatus Main Assembly

Figure 17:
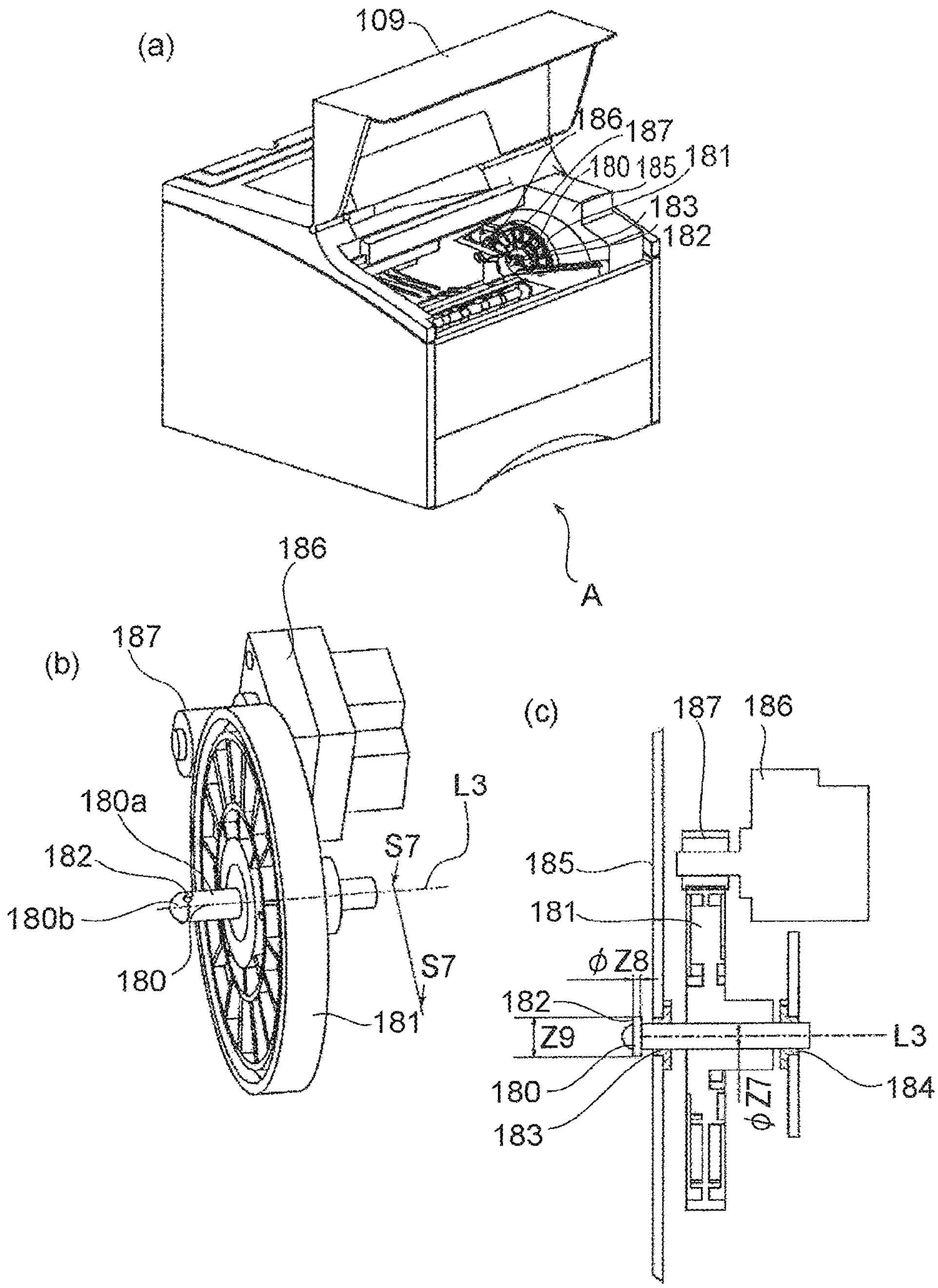
FIG. 17 is perspective views and a longitudinal sectional view of a driving structure of the apparatus main assembly according to the embodiment of the present invention.

Referring to FIG. 17, the description will be made as to the structure for driving the photosensitive drum 107 in the apparatus main assembly A. FIG. 17(*a*) is a partly broken perspective view of the side plate of the driving side in the state where the cartridge B is not mounted to the apparatus main assembly A. FIG. 17(*b*) is a perspective view which illustrates only the drum driving structure. FIG. 17(*c*) is the sectional view taken along S7-S7 of FIG. 17(*b*).

The drive shaft 180 has the substantially similar structure as the above described drum shaft 153. In other words, the free end portion 180*b* thereof forms a semispherical surface. In addition, it has a rotational force transmitting pin 182 as a rotational force applying portion of the main part 180*a* of the cylindrical shape which penetrates the center substantially. The rotational force is transmitted to the coupling 150 by this pin 182.

A drum driving gear 181 substantially co-axial with the axis of the drive shaft 180 is provided on the longitudinally opposite side of the free end portion 180*b* of the drive shaft 180. The gear 181 is fixed non-rotatably relative to the drive shaft 180. Therefore, the rotation of the gear 181 will also rotate the drive shaft 180.

In addition, the gear 181 is engaged with a pinion gear 187 for receiving the rotational force from the motor 186. Therefore, the rotation of the motor 186 will rotate the drive shaft 180 through the gear 181.

In addition, the gear 181 is rotatably mounted to the apparatus main assembly A by the bearing members 183, 184. At this time, the gear 181 does not move relative to the direction of the axial direction L3 of the drive shaft 180 (the gear 181), that is, it is positioned with respect to the axial direction L3. Therefore, the gears 181 and the bearing members 183 and 184 can be closely disposed relative to each other with respect to the axial direction. In addition, the drive shaft 180 does not move with respect to the direction thereof of the axis L3. Therefore, the drive shaft 180 and the gap between the bearing members 183 and 184 have the sizes which permit the rotation of the drive shaft 180. For this reason, the position of the gear 181 with respect to the diametrical direction relative to the gear 187 is determined correctly.

In addition, although it has been described that the drive is directly transmitted to the gear 181 from the gear 187, the present invention is not limited to such an example. For example, it is the satisfactory using a plurality of gears on account of the motor disposed at the apparatus main assembly A. Alternatively, it is possible to transmit the rotational force by a belt and so on.

(9) Main Assembly Side Mounting Guide for Guiding Cartridge B

Figure 18:
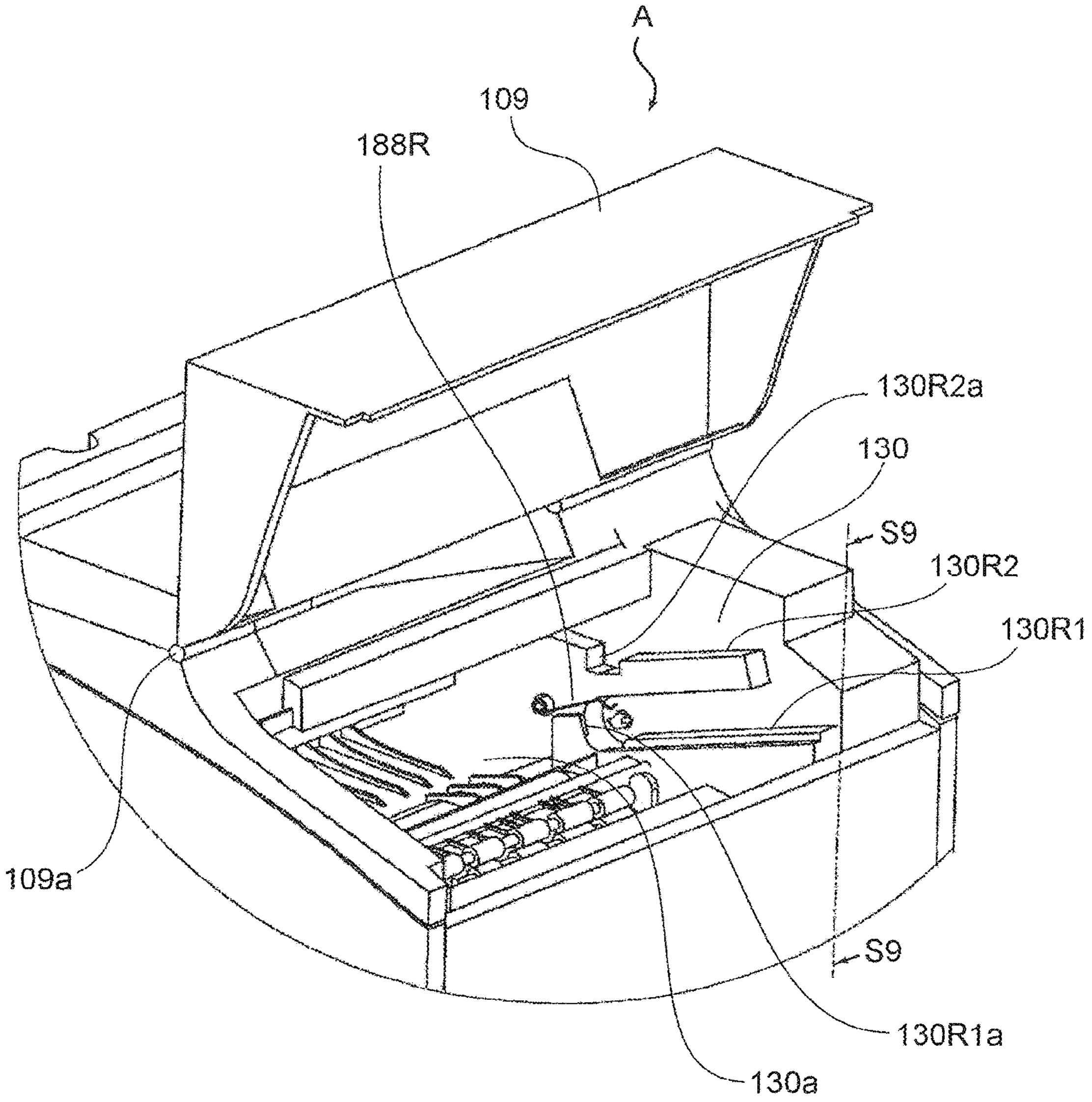
FIG. 18 is a perspective view of a cartridge set portion of the apparatus main assembly according to the embodiment of the present invention.
Figure 19:
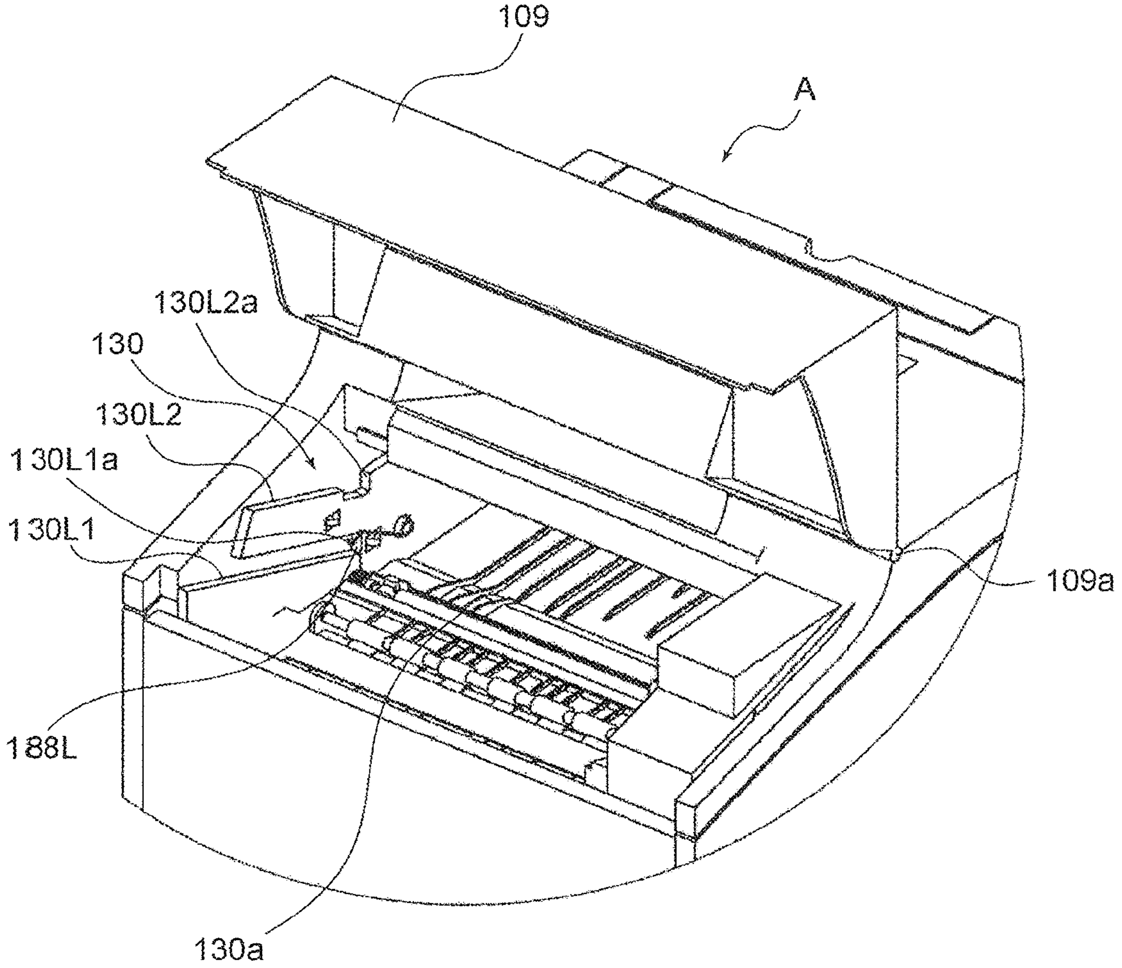
FIG. 19 is a perspective view of the cartridge set portion of the apparatus main assembly according to the embodiment of the present invention.

As shown in FIGS. 18 and 19, the mounting means 130 of this embodiment includes main assembly guides 130R1, 130R2, 130L1, 130L2 provided in the apparatus main assembly A.

They are provided opposed to the both side surfaces of the cartridge mounting space (the cartridge set portion 130*a*) provided in the apparatus main assembly A (the driving side surface in FIG. 18) (the side surface in FIG. 19 in which it does not drive). The main assembly guides 130R1, 130R2 are provided in the main assembly opposed to the driving side of the cartridge B, and they are extended along the mounting direction of the cartridge B. On the other hand, the main assembly guides 130L1, 130L2 are provided in the main assembly side opposed to the non-driving side of the cartridge B, and they are extended along the mounting direction of the cartridge B. The main assembly guides 130R1, 130R2 and the main assembly guides 130L1, 130L2 are opposed to each other. At the time of mounting the cartridge B to the apparatus main assembly A these guides 130R1, 130R2, 130L1, 130L2 guide the cartridge guides as will be described hereinafter. At the time of mounting the cartridge B to the apparatus main assembly A, the cartridge door 109 which can be opened and closed relative to the apparatus main assembly A about a shaft 109*a* is opened. And, the mounting, into the apparatus main assembly A, of the cartridge B is completed by closing the door 109. At the time of taking out the cartridge B from the apparatus main assembly A, the door 109 is opened. These operations are effected by the user.

(10) Positioning Portion, Relative to Mounting Guide and Apparatus Main Assembly a for Cartridge B As shown in FIGS. 2 and 3, in this embodiment, the outer periphery 157*a* of the outside end of the bearing member 157 functions also as a cartridge guide 140R1. In addition, the outer periphery 154*a* of the outside end of the drum grounding shaft 154 functions also as a cartridge guide 140L1.

In addition, the one longitudinal end (the driving side) of the second frame unit 120 is provided with the cartridge guide 140R2 on the upper portion of the cartridge guide 140R1. And, the other end (the non-driving side) in the longitudinal direction is provided with the cartridge guide 140L2 on the upper portion of the cartridge guide 140L1.

More particularly, the one longitudinal end of the photosensitive drum 107 is provided with the cartridge side guides 140R1, 140R2 outwardly projected from the cartridge frame B1. In addition, the other end in the longitudinal direction is provided with the cartridge side guides 140L1, 140L2 outwardly projected from the cartridge frame B1. The guides 140R1, 140R2, 140L1, 140L2 is projected toward the along said longitudinal direction here and there outside. More particularly, the guides 140R1, 140R2, 140L1, 140L2 are projected from the cartridge frame B1 along the axis L1. And, at the time of mounting the cartridge B to the apparatus main assembly A, and at the time of demounting the cartridge B from the apparatus main assembly A the guide 140R1 is guided by the guide 130R1, and the guide 140R2 is guided by the guide 130R2. In addition, at the time of mounting the cartridge B to the apparatus main assembly A and at the time of demounting the cartridge B from the apparatus main assembly A the guide 140L1 is guided by the guide 130L1, and the guide 140L2 is guided by the guide 130L2. In this manner, the cartridge B is mounted to the apparatus main assembly A, moving in the direction substantially perpendicular to the axial direction L3 of the drive shaft 180, and it is similarly demounted from the apparatus main assembly A. In addition, in this embodiment, the cartridge guides 140R1, 140R2 are molded integrally with the second frame 118. However, separate members are usable as the cartridge guides 140R1, 140R2.

(11) Mounting Operation of Process Cartridge

Figure 20:
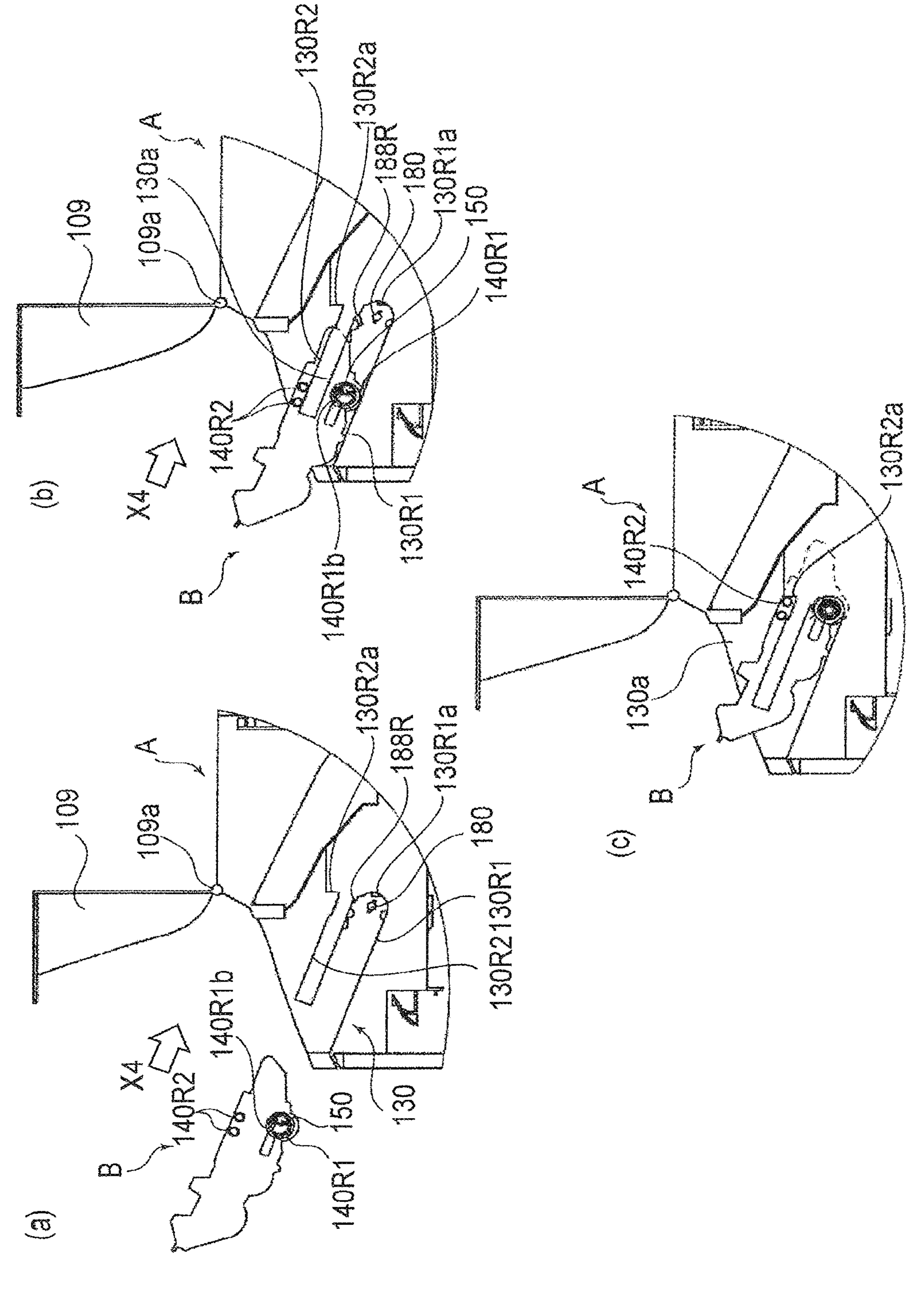
FIG. 20 is sectional views which illustrate a process of the mounting of the cartridge to the apparatus main assembly according to the embodiment of the present invention.

Referring to FIG. 20, the mounting operation, into the apparatus main assembly A, of the cartridge B will be described. FIG. 20 shows the mounting process. FIG. 20 is a sectional view taken along S9-S9 of FIG. 18.

As shown in FIG. 20(*a*), the door 109 is opened by the user. And, the cartridge B is dismountably mounted relative to the cartridge mounting means 130 (the installation section 130*a*) provided in the apparatus main assembly A.

At the time of mounting the cartridge B to the apparatus main assembly A, in the driving side, the cartridge guides 140R1, 140R2 are inserted along the main assembly guides 130R1, 130R2, as shown in FIG. 20(*b*). In addition, also about the non-driving side, the cartridge guides 140L1, 140L2 (FIG. 3) are inserted along the main assembly guides 130L1, 130L2 (FIG. 19).

When the cartridge B is further inserted in the direction of the arrow X4, the coupling between the drive shaft 180 and the cartridge B is established and then, the cartridge B is mounted to the predetermined position (the installation section 130*a*) (the provision). In other words, as shown in FIG. 20 (*c*), the cartridge guide 140R1 contacts to the positioning portion 130R1*a* of the main assembly guide 130R1, and the cartridge guide 140R2 contacts to the positioning portion 130R2*a* of the main assembly guide 130R2. In addition, the cartridge guide 140L1 contacts to the positioning portion 130L1*a* (FIG. 19) of the main assembly guide 130L1, and the cartridge guide 140L2 contacts to the positioning portion 130L2*a* of the main assembly guide 130L2 since this state is substantially symmetrical, the illustration is not made. In this manner, the cartridge B is dismountably mounted to the installation section 130*a* by the mounting means 130. More particularly, the cartridge B is mounted in the state positioned in the apparatus main assembly A. And, in the state where the cartridge B is mounted to the installation section 130*a*, the drive shaft 180 and the coupling 150 are in the engaged state relative to each other.

More particularly, the coupling 150 is in a rotational force transmitting angular position as will be described hereinafter.

The image forming operation is enabled by the cartridge B being mounted to the set portion 130*a*.

When the cartridge B is provided at the predetermined position, a pressing receptor portion 140R1*b* (FIG. 2) of the cartridge B receives the urging force from an urging spring 188R (FIG. 18, FIG. 19, and FIG. 20). In addition, from an urging spring 188L, a pressing receptor portion 140L1*b* (FIG. 3) of the cartridge B receives the urging force. By this, the cartridge B (photosensitive drum 107) is correctly positioned relative to the transfer roller, the optical means, and so on of the apparatus main assembly A.

The user may enter the cartridge B to the set portion 130*a* as described above. Alternatively, the user enters the cartridge B to the position halfway, and the last mounting operation may be effected by another means. For example, utilizing the operation which shuts the door 109, a part of door 109 acts on the cartridge B which is in the position in the course of the mounting to push the cartridge B into the final mounted position. Further alternatively, the user pushes, into the cartridge B to the middle, the cartridge B, and lets it fall into the set portion 130*a* by the weight, after that.

Here, as shown in FIG. 18-20, the mounting and demounting of the cartridge B relative to the apparatus main assembly A is effected by the movement in the direction substantially perpendicular to the direction of the axis L3 of the drive shaft 180 (FIG. 21) corresponding to these operations, the position between the drive shaft 180 and the coupling 150 change between the engaged state and the disengagement state.

Here, the description will be made about "perpendicular substantially".

Between the cartridge B and the apparatus main assembly A, in order to mount and demount the cartridge B smoothly, small gaps are provided. More specifically, the small gaps are provided between the guide 140R1 and the guide 130R1 with respect to the longitudinal direction, between the guide 140R2 and the guide 130R2 with respect to the longitudinal direction, between the guide 140L1 and the guide 130L1 with respect to the longitudinal direction, and between the guide 140L2 and the guide 130L2 with respect to the longitudinal direction. Therefore, at the time of the mounting and demounting of the cartridge B relative to the apparatus main assembly A, the whole cartridge B can slightly incline within the limits of the gaps. For this reason, the perpendicularity is not meant strictly. However, even in such a case, the present invention is accomplished with the effects thereof. Therefore, the term "perpendicular substantially" covers the case where the cartridge slightly inclines.

(12) Coupling Engaging Operations and Drive Transmission

Figure 21:
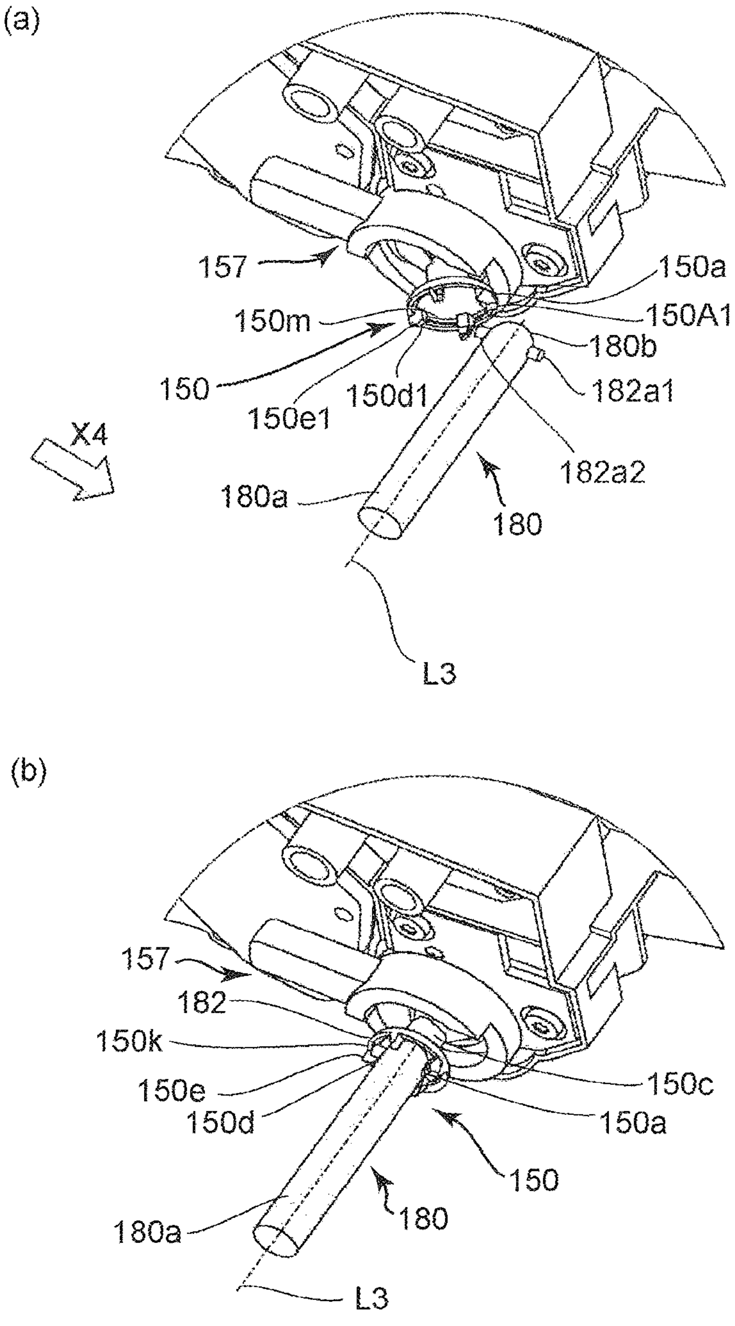
FIG. 21 is perspective views which illustrate a process of the engagement between the drive shaft and the coupling according to the embodiment of the present invention.
Figure 22:
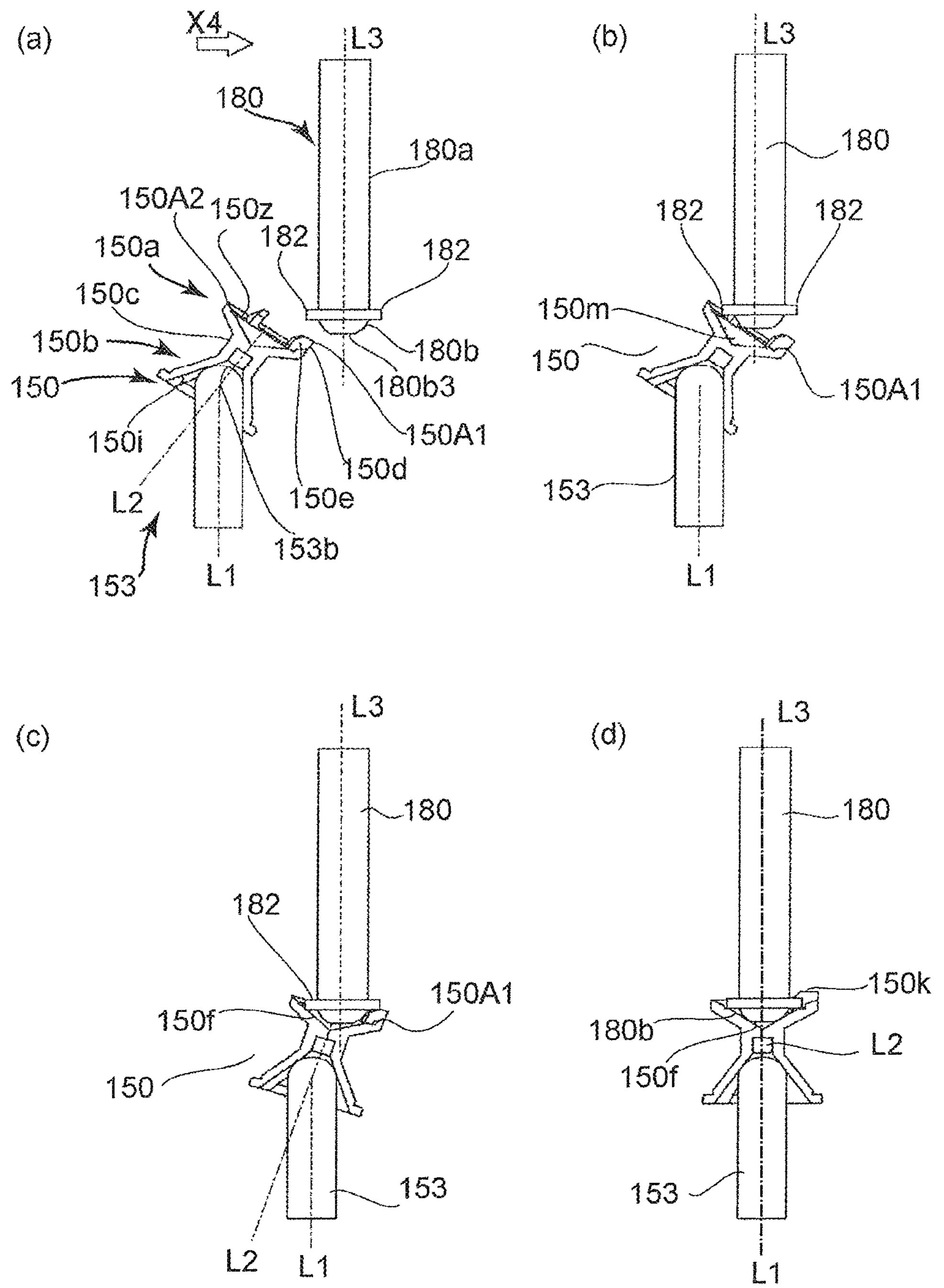
FIG. 22 is perspective views which illustrate a process of the engagement between the drive shaft and the coupling according to the embodiment of the present invention.
Figure 23:
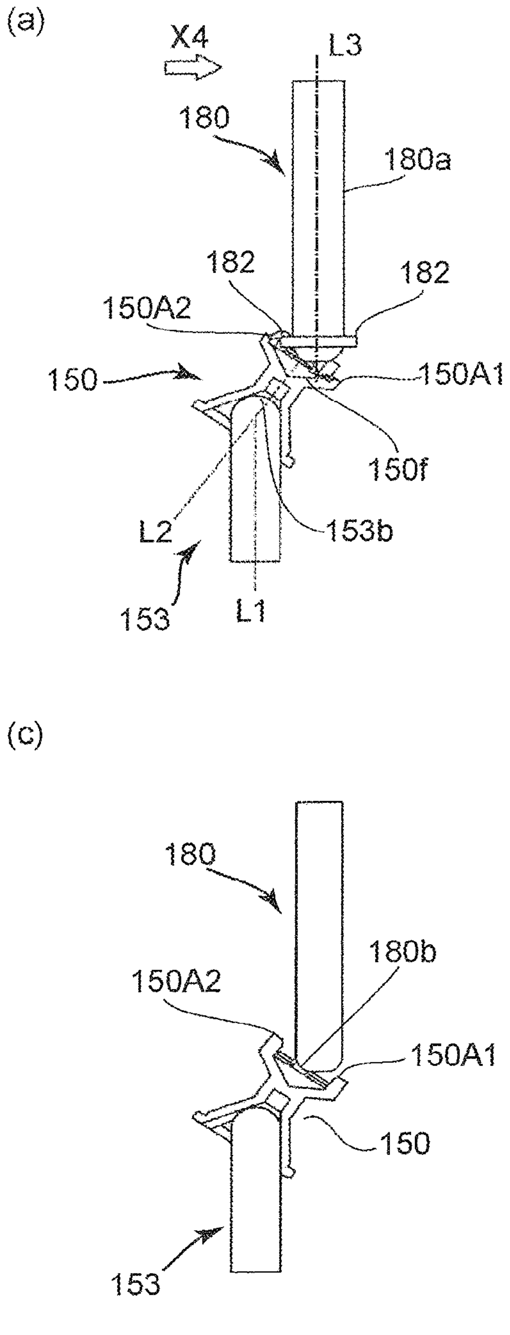
FIG. 23 is perspective views which illustrate the coupling of the apparatus main assembly and the coupling of the cartridge according to the embodiment of the present invention.

As stated in the foregoing, immediately before or substantially simultaneously with positioning in a predetermined position of the apparatus main assembly A, the coupling 150 is engaged with the drive shaft 180. More particularly, the coupling 150 positions at the rotational force transmitting angular position. Here, the predetermined position is the set portion 130*a*. Referring to FIGS. 21, 22, and 23, the description will be made with respect to the engaging operation of this coupling. FIG. 21 is a perspective view which illustrates the major part of the drive shaft and the driving side of the cartridge. FIG. 22 is a longitudinal sectional view, as seen from the lower part of the apparatus main assembly. FIG. 23 is a longitudinal sectional view, as seen from the lower part of the apparatus main assembly. Here, the engagement means the state in which the axis L2 and the axis L3 are substantially co-axial relative to each other, and the drive transmission is possible.

As shown in FIG. 22, the cartridge B is mounted to the apparatus main assembly A in the direction (arrow X4) substantially perpendicular to the axis L3 of the drive shaft 180. Or, it is demounted from the apparatus main assembly A. In the pre-engagement angular position, the axis L2 (FIG. 22 a) of the coupling 150 inclines toward downstream with respect to the mounting direction X4 beforehand relative to the axis L1 (FIG. 22(*a*) of the drum shaft 153 (FIG. 21 a and FIG. 22(*a*).

In order to incline the coupling toward the pre-engagement angular position beforehand, the structure of the embodiment 3-embodiment 9 as will be described hereinafter is used, for example.

Because of the inclination of the coupling 150, the downstream free end 150A1 with respect to the mounting direction X4 is closer to the photosensitive drum 107 than the drive shaft free end 180*b*3 in the direction of the axis L1. In addition, the upstream free end 150A2 with respect to the mounting direction is closer to the pin 182 than the drive shaft free end 180*b*3 (FIG. 22(*a*), (*b*)). Here, the free end position is the position nearest to the drive shaft of the driven portion 150*a* shown in FIGS. 8(*a*) and (*c*) with respect to the direction of the axis L2, and it is the remotest position from the axis L2. In other words, it is an edge line of the driven portion 150*a* of the coupling 150, or an edge line of the projection 150*d* depending on the rotation phase of the coupling 150 (150A) in FIGS. 8(*a*) and (*c*).

The free end position 150A1 of the coupling 150 passes by the drive shaft free end 180*b*3. And, after the coupling 150 carries out by passage of the drive shaft free end 180*b*3, the receiving surface (cartridge side contact portion) 150*f* or the projection (cartridge side contact portion) 150*d* contacts with the free end portion 180*b* of drive shaft (main assembly side engaging portion) 180, or pin (main assembly side engaging portion) (rotational force applying portion) 182. And, corresponding to the mounting operation of the cartridge (B), the axis L2 is inclined so that it may align substantially with the axis L1 (FIG. 22(*c*)). And, when the coupling 150 inclines from said pre-engagement angular position and the axis L2 thereof aligns substantially with the axis L1, the rotational force transmitting angular position is reached. And, finally, the position of the cartridge (B) is determined relative to the apparatus main assembly (A). Here, the drive shaft 180 and the drum shaft 153 are substantially co-axial relative to each other. In addition, the receiving surface 150*f* opposes to the spherical free end portion 180*b* of the drive shaft 180. This state is the engaged state between the coupling 150 and the drive shaft 180 (FIG. 21(*b*) and FIG. 22(*d*)). At this time, the pin 155 (unshown) is positioned in the opening 150*g* (FIG. 8 (*b*)). In other words, the pin 182 takes the standing-by portion 150*k*. Here, the coupling 150 covers the free end portion 180*b*.

The receiving surface 150*f* constitutes the recess 150*z*. And, the recess 150*z* has the conical shape.

As has been described above, the coupling 150 is pivotable relative to the axis L1. And, corresponding to the movement of the cartridge (B), a part of coupling 150 (the receiving surface 150*f* and/or 150*d* of projections) which is the cartridge side contact portion contacts to the main assembly side engaging portion (the drive shaft 180 and/or the pin 182). By this, the pivoting motion of the coupling 150 is effected. As shown in FIG. 22, the coupling 150 is mounted with the state of overlapping, with respect to the direction of the axis L1, with the drive shaft 180. However, the coupling 150 and the drive shaft 180 are engageable relative to each other with the overlapping state by the pivoting motion of the couplings, as described above.

The mounting operation of the coupling 150 described above can be performed regardless of the phases of the drive shaft 180 and the coupling 150. Referring to FIG. 15 and FIG. 23, the detailed description will be made. FIG. 23 illustrates the phase relation between the coupling and the drive shaft. In FIG. 23(*a*), in a downstream position with respect to the mounting direction X4 of the cartridge, the pin 182 and the receiving surface 150*f* face to each other. In FIG. 23(*b*), the pin 182 and the projection 150*d* face to each other. In FIG. 23(*c*), the free end portion 180*b* and the projection 150*d* face to each other. In FIG. 23(*d*), the free end portion 180*b* and the receiving surface 150*f* face to each other.

As shown in FIG. 15, the coupling 150 is pivotably mounted in any direction relative to the drum shaft 153. More particularly, the coupling 150 is revolvable. Therefore, as shown in FIG. 23, it can incline toward the mounting direction X4 irrespective of the phase of the drum shaft 153 relative to the mounting direction X4 of the cartridge (B). In addition, the inclination angle of the coupling 150 is set, so that regardless of the phases of the drive shaft 180 and the coupling 150, the free end position 150A1 is made closer to the photosensitive drum 107 than the axial free end 180*b*3 with respect to the direction of the axis L1. In addition, the inclination angle of the coupling 150 is set, so that the free end position 150A2 is made closer to the pin 182 than the axial free end 180*b*3. With such a setting, corresponding to the mounting operation of the cartridge (B), the free end position 150A1 is passed by the axial free end 180*b*3 in the mounting direction X4. And, in the case of FIG. 23(*a*), the receiving surface 150*f* contacts the pin 182. In the case of FIG. 23(*b*), the projection (the engaging portion) 150*d* contacts the pin (rotational force applying portion) 182. In the case of FIG. 23(*c*), the projection 150*d* contacts to the free end portion 180*b*. In the case of FIG. 23(*d*), the receiving surface 150*f* contacts to the free end portion 180*b*. In addition, by the contact force generated at the time of mounting the cartridge (B), the axis L2 of the coupling 150 moves so that it substantially becomes co-axial with the axis L1. By this, the coupling 150 is engaged with the drive shaft 180. More particularly, the coupling recess 150*z* covers the free end portion 180*b*. For this reason, the coupling 150 can be engaged with the drive shaft 180 (the pin 182) irrespective of the phases of the drive shaft 180, the coupling 150 and the drum shaft 153.

In addition, as shown in FIG. 22, the gap is provided between the drum shaft 153 and the coupling 150, so that the coupling is swingable (revolvable, pivotable).

In this embodiment, the coupling 150 moves in a plane of the sheet of the drawing of FIG. 22. However, the coupling 150 of this embodiment is capable of whirling, as described above. Therefore, the motion of the coupling 150 may include motion not included in the plane of the sheet of the drawing of FIG. 22. In such a case, the change from the state of FIG. 22(*a*) to the state of FIG. 22(*d*) occurs. This applies to the embodiments which will be described hereinafter unless otherwise stated.

Figure 24:
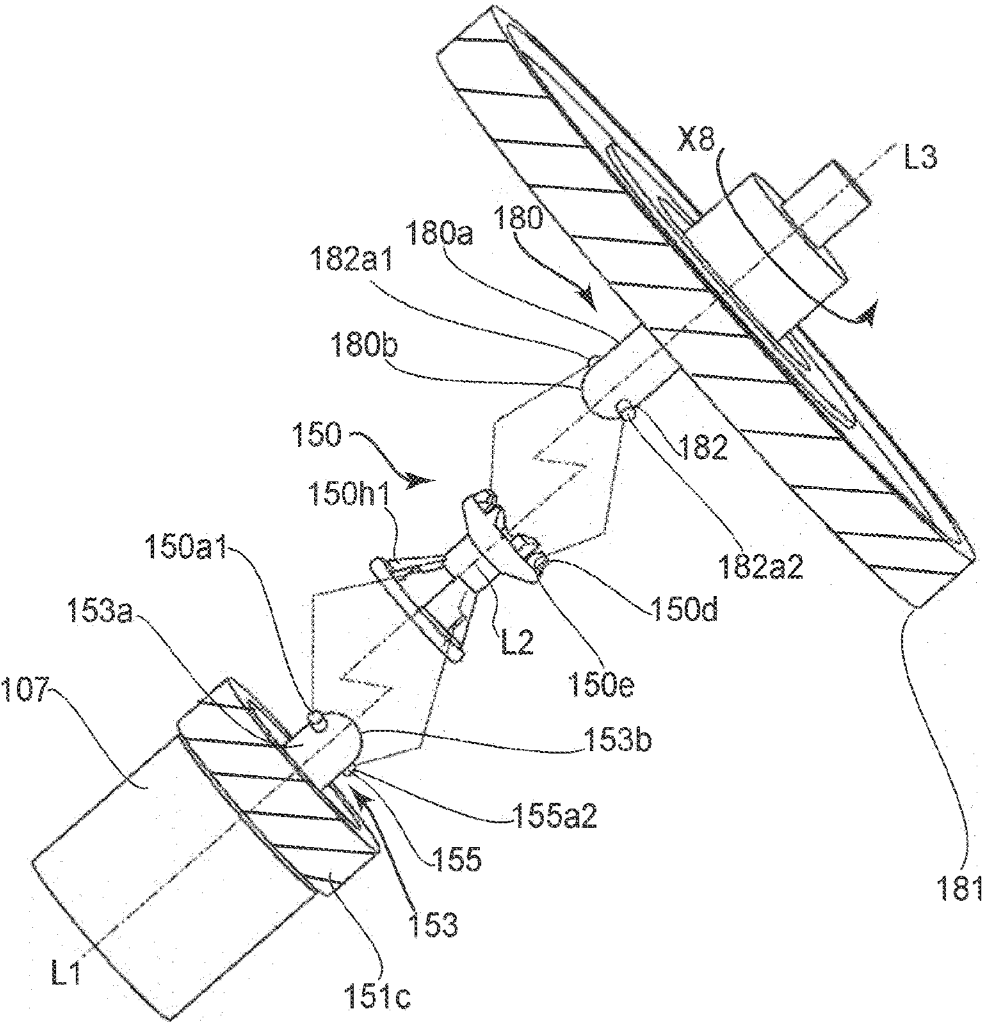
FIG. 24 is an exploded perspective view which illustrates the drive shaft, the driving gear, the coupling, and the drum shaft according to the embodiment of the present invention.

Referring to FIG. 24, the rotational force transmitting operation at the time of rotating the photosensitive drum 107 will be described. The drive shaft 180 rotates with the gear 181 in the direction (Figure, X8) by the rotational force received from the driving source (the motor 186). And, the pin 182 integral with the drive shaft 180 (182*a*1, 182*a*2) contacts to any of the rotational force receiving surfaces (rotational force receiving portion) 150*e*1-150*e*4. More particularly, the pin 182*a*1 contacts any one of the rotational force receiving surfaces 150*e*1-150*e*4. In addition, the pin 182*a*2 contacts with any of the rotational force receiving surfaces 150*e*1-150*e*4. By this, the rotational force of the drive shaft 180 is transmitted to the coupling 150 to rotate the coupling 150. Furthermore, by the rotation of the coupling 150, the rotational force transmission surfaces (the rotational force transmitting portion) 150*h* 1 or 150*h*2 of the coupling 150 contact to the pin 155 integral with the drum shaft 153. By this, the rotational force of the drive shaft 180 is transmitted to the photosensitive drum 107 through the coupling 150, the rotational force transmission surface 150*h* 1 or 150*h*2, the pin 155, the drum shaft 153, and the drum flange 151. In this manner, the photosensitive drum 107 is rotated.

In the rotational force transmitting angular position, the free end portion 153*b* is contacted with the receiving surface 150*i*. And, the free end portion (the positioning portion) 180*b* of the drive shaft 180 is contacted with the receiving surface (the positioning portion) 150*f*. By this, the coupling 150 is positioned relative to the drive shaft 180 in the state where it is over the drive shaft 180 (FIG. 22(*d*)).

Here, in this embodiment, even if the axis L3 and the axis L1 deviate from the co-axial relations somewhat, the coupling 150 can effect the transmission of the rotational force because the coupling 150 inclines slightly. Even if it is such a case, the coupling 150 can rotate without covering the large additional load over the drum shaft 153 and the drive shaft 180. Therefore, the high precision position arrangement operation of the drive shaft 180 and the drum shaft 153 at the time of the assembling is easy. For this reason, the assembling operativity can be improved.

This is also one of the effects of this embodiment.

In addition, in FIG. 17, as has been described, the position of the drive shaft 180 and the gear 181 is positioned with respect to the diametrical direction and the axial direction in the predetermined position (Set portion 130*a*) of the apparatus main assembly (A). In addition, the cartridge (B) is positioned in the predetermined position of the apparatus main assembly as described above. And, the drive shaft 180 positioned in said predetermined position and the cartridge (B) positioned in said predetermined position are coupled by the coupling 150. The coupling 150 is swingable (pivotable) relative to the photosensitive drum 107. For this reason, as described above, the coupling 150 can transmit the rotational force smoothly between the drive shaft 180 positioned in the predetermined position and the cartridge (B) positioned in the predetermined position. In other words, even if there is some axial deviation between the drive shaft 180 and the photosensitive drum 107, the coupling 150 can transmit the rotational force smoothly.

This is also one of the effects of this embodiment.

In addition, as described above, the cartridge (B) is positioned in the predetermined position. For this reason, the photosensitive drum 107 which is the constituent-element of the cartridge (B) is correctly positioned relative to the apparatus main assembly (A). Therefore, the spatial relationship between the photosensitive drum 107, and the optical means 101, the transfer roller 104 or recording material 102 can be maintained with high precision. In other words, those position deviations can be reduced.

The coupling 150 contacts to the drive shaft 180. By this, although it has been mentioned that the coupling 150 swings from the pre-engagement angular position to the rotational force transmitting angular position, the present invention is not limited to such an example. For example, it is possible to provide the abutting portion as the main assembly side engaging portion in the position other than the drive shaft of the apparatus main assembly. And, in the mounting process of the cartridge (B), after the free end position 150A1 passes by the drive shaft free end 180*b*3, a part of coupling 150 (cartridge side contact portion) contacts with this abutting portion. By this, the coupling can receive the force of the shaking direction (pivoting direction), and it can also be made to swing so that the axis L2 becomes substantially co-axial with the axis L3 (the pivoting). In other words, another means is sufficient, if the axis L1 can substantially co-axially position with the axis L3 in interrelation with the mounting operation of the cartridge (B).

Figure 25:
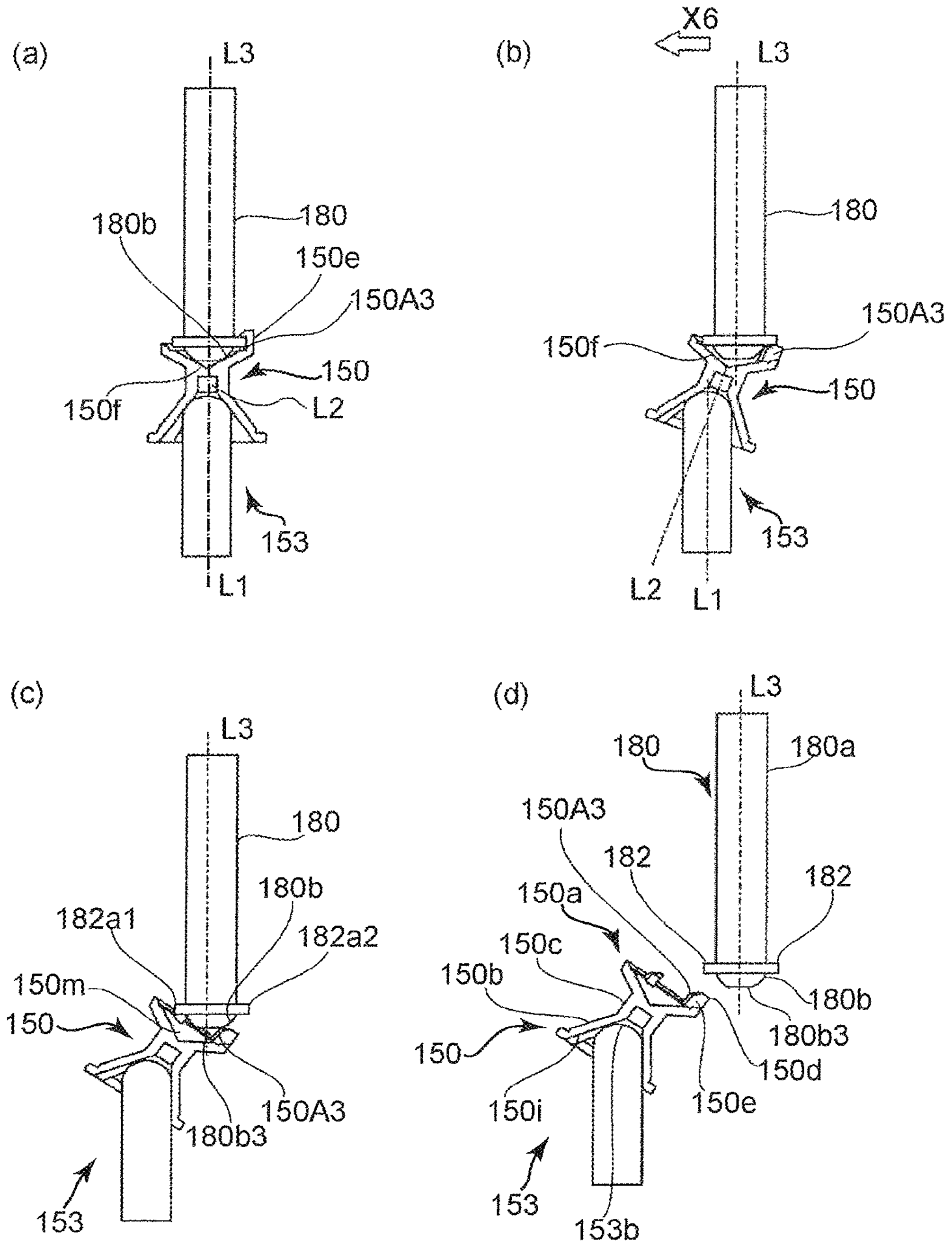
FIG. 25 is perspective views which illustrate a process of the disengagement of the coupling from the drive shaft according to the embodiment of the present invention.

(13) The Disengaging Operation of the Coupling, and the Removing Operation of the Cartridge Referring to FIG. 25, the operation for disengaging the coupling 150 from the drive shaft 180 will be described at the time of taking out the cartridge (B) from the apparatus main assembly (A). FIG. 25 is the longitudinal sectional view, as seen from the apparatus main assembly lower.

First, the position of the pin 182 at the time of demounting the cartridge (B) will be described. After the image formation finishes, as will be apparent from the foregoing description, the pin 182 is positioned at any 2 of the standing-by portions 150*k*1-150*k*4 (FIG. 8). And, the pin 155 is positioned in the opening 150*g* 1 or 150*g*2.

The description will be made with respect to the operation for disengaging the coupling 150 from the drive shaft 180 in interrelation with the operation for taking out the cartridge (B).

As shown in FIG. 25, the cartridge (B) is drawn out in the direction (the direction of the arrow X6) substantially perpendicular to the axis L3, at the time of demounting from the apparatus main assembly (A).

In the state where the drive for the drum shaft 153 has stopped, the axis L2 is substantially co-axial relative to the axis L1 in the coupling 150 (rotational force transmitting angular position) (FIG. 25(*a*)). And, the drum shaft 153 moves in the dismounting direction X6 with the cartridge (B), and the receiving surface 150*f* or the projection 150*d* in the upstream of the coupling 150 with respect to the dismounting direction contacts at least to the free end portion 180*b* of the drive shaft 180 (FIG. 25 (*a*)). And, the axis L2 begins to incline toward the upstream with respect to the dismounting direction X6 (FIG. 25(*b*)). This direction is the same as that of the inclination of the coupling 150 at the time of the mounting of the cartridge (B) (the pre-engagement angular position). It moves, while the upstream free end portion 150 A3 with respect to the dismounting direction X6 contacts to the free end portion 180*b* by the dismounting operation from the apparatus main assembly (A) of this cartridge (B). In more detail, corresponding to the movement to the dismounting direction of the cartridge (B), while a part of coupling 150 (the receiving surface 150*f* and/or 150*d* of projections) which is the cartridge side contact portion contacts with the main assembly side engaging portion (the drive shaft 180 and/or the pin 182), the coupling moves. And, in the axis L2, the free end portion 150 A3 inclines to the free end 180*b*3 (disengaging angular position) (FIG. 25(*c*)). And, in this state, the coupling 150 is passed by the drive shaft 180, contacting to the free end 180*b*3, and is disengaged from the drive shaft 180 (FIG. 25(*d*)). Thereafter, the cartridge (B) follows the process opposite from that of the mounting process described in FIG. 20, and is taken out from the apparatus main assembly (A).

As will be apparent from the foregoing description, the angle of the pre-engagement angular position relative to the axis L1 is larger than the angle of the disengaging angular position relative to the axis L1. This is because it is preferable that the free end position 150A1 passes assuredly by the free end portion 180*b*3 in the pre-engagement angular position in consideration of the dimensional tolerance of the parts at the time of the engagement of the coupling. More particularly, it is preferable that the gap exists between the coupling 150 and the free end portion 180*b*3 in the pre-engagement angular position (FIG. 22(*b*)). On the contrary, at the time of the coupling disengagement, the axis L2 inclines in interrelation with the dismounting operation of the cartridge in the disengaging angular position. Therefore, the coupling 150 A3 moves along the free end portion 180*b*3. In other words, the upstream portion, with respect to the cartridge dismounting direction, of the coupling and the free end portion of the drive shaft are in the substantially same position (FIG. 25(*c*)). For this reason, the angle of the pre-engagement angular position relative to the axis L1 is larger than the angle of the disengaging angular position relative to the axis L1.

In addition, similarly to the case of mounting the cartridge (B) to the apparatus main assembly (A), the cartridge (B) can be taken out irrespective of the phase difference between the coupling 150 and the pin 182.

As shown in FIG. 22, in the rotational force transmitting angular position of the coupling 150, the angle relative to the axis L1 of the coupling 150 is such that in the state where the cartridge (B) is mounted to the apparatus main assembly (A), the coupling 150 receives the transmission of the rotational force from the drive shaft 180, and it rotates.

The rotational force transmitting angular position of the coupling 150, the rotational force for rotating the photosensitive drum is transmitted to the drum.

In addition, in the pre-engagement angular position of the coupling 150, the angular position relative to the axis L1 of the coupling 150 is such that it is in the state immediately before the coupling 150 engages with the drive shaft 180 in the mounting operation to the apparatus main assembly (A) of the cartridge (B). More particularly, it is the angular position relative to the axis L1 which the downstream free end portion 150A1 of the coupling 150 can pass by the drive shaft 180 with respect to the mounting direction of the cartridge (B).

In addition, the disengaging angular position of the coupling 150 is the angular position relative to the axis L1 of the coupling 150 at the time of taking out the cartridge (B) from the apparatus main assembly (A), in the case that the coupling 150 disengages from the drive shaft 180. More particularly, as shown in FIG. 25, it is the angular position relative to the axis L1 with which the free end portion 150 A3 of the coupling 150 can pass by the drive shaft 180 with respect to the removing direction of the cartridge (B).

In the pre-engagement angular position or the disengaging angular position, the angle theta 2 which the axis L2 makes with the axis L1 is larger than the angle theta 1 which the axis L2 makes with the axis L1 in the rotational force transmitting angular position. As for the angle theta 1, 0 degree is preferable. However, in this embodiment, if the angle theta 1 is less than about 15 degrees, the smooth transmission of the rotational force is accomplished. This is also one of the effects of this embodiment. As for the angle theta 2, the range of about 20-60 degrees is preferable.

As has been described hereinbefore, the coupling is pivotably mounted to the axis L1. And, the coupling 150 in the state in which it overlaps with the drive shaft 180 with respect to the direction of the axis L1 can be disengaged from the drive shaft 180 because the coupling inclines correspondingly to the dismounting operation of the cartridge (B). More particularly, by moving the cartridge (B) in the direction substantially perpendicular to the axial direction of the drive shaft 180, the coupling 150 which covers the drive shaft 180 can be disengaged from the drive shaft 180.

In the above described description, the receiving surface 150*f* of the coupling 150 or the projection 150*d* contacts with the free end portion 180*b* (the pin 182) in interrelation with the movement of the cartridge (B) in the dismounting direction X6. By this, it has been described that the axis L1 starts the inclination to the dismounting direction upstream. However, the present invention is not limited to such an example For example, the coupling 150 has a structure beforehand, so that it is urged toward the upstream in the dismounting direction. And, corresponding to the movement of the cartridge (B), this urging force starts the inclination of the axis L1 toward the downstream in the dismounting direction. And, the free end 150 A3 passes by the free end 180*b*3, and the coupling 150 disengages from the drive shaft 180. In other words, the receiving surface 150*f* in the upstream side with respect to the dismounting direction or projection 150*d* does not contact with the free end portion 180*b*, and therefore, it can be disengaged from the drive shaft 180. For this reason, the any structure can be applied if the axis L1 can be inclined in interrelation with the dismounting operation of the cartridge (B).

By the point of time immediately before the coupling 150 is mounted to the drive shaft 180, the driven portion of the coupling 150 is inclined, so that it is inclines toward the downstream with respect to the mounting direction. In other words, the coupling 150 is beforehand put on in the state of the pre-engagement angular position.

In the foregoing, the motion in the plane in the sheet of the drawing of FIG. 25 has been described, but the motion may include the whirling motion as in the case of FIG. 22.

As to the structure therefor, the structure of any that will be described in Embodiment 2 et seq. is usable.

Figure 26:
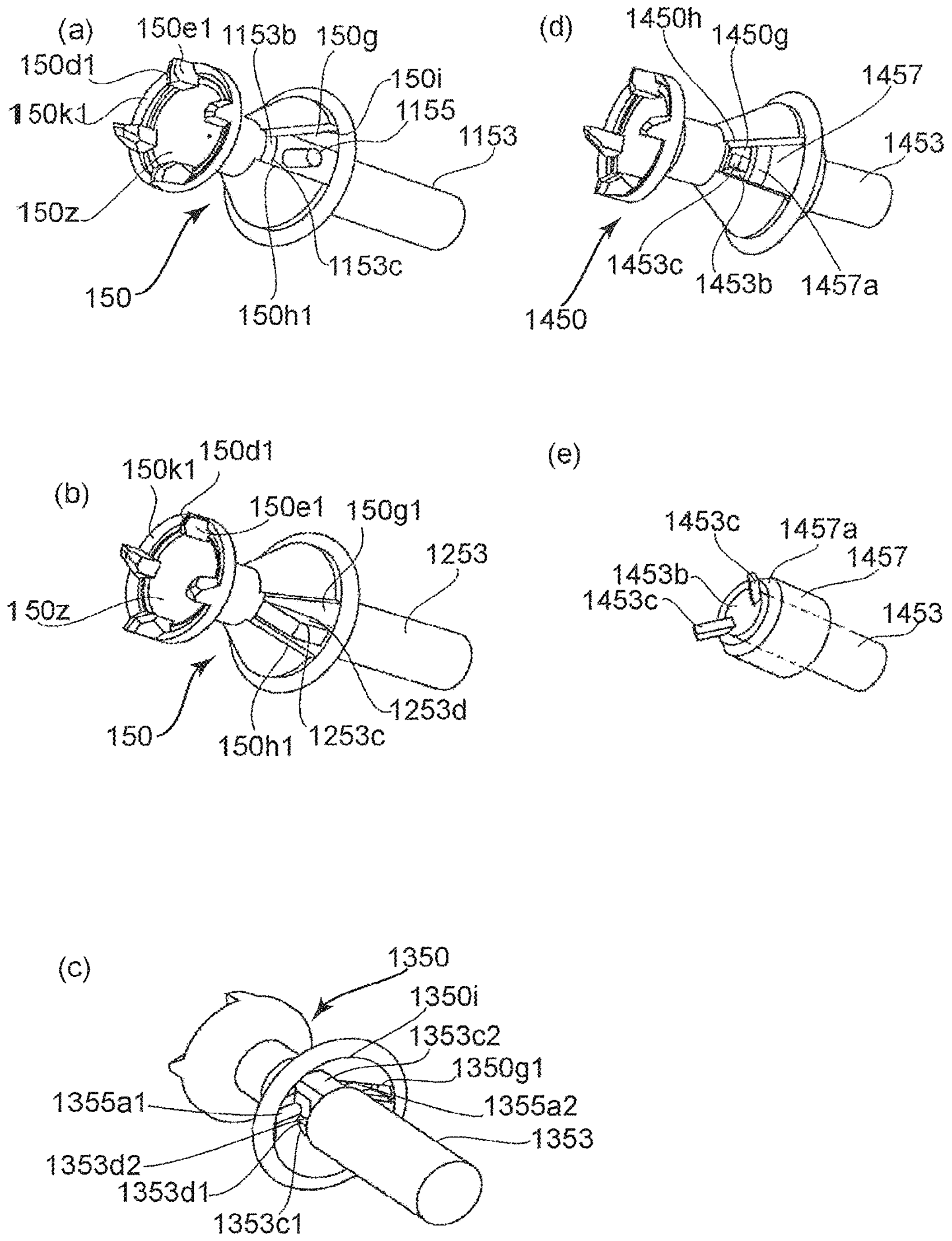
FIG. 26 is perspective views which illustrate the coupling and the drum shaft according to the embodiment of the present invention.
Figure 27:
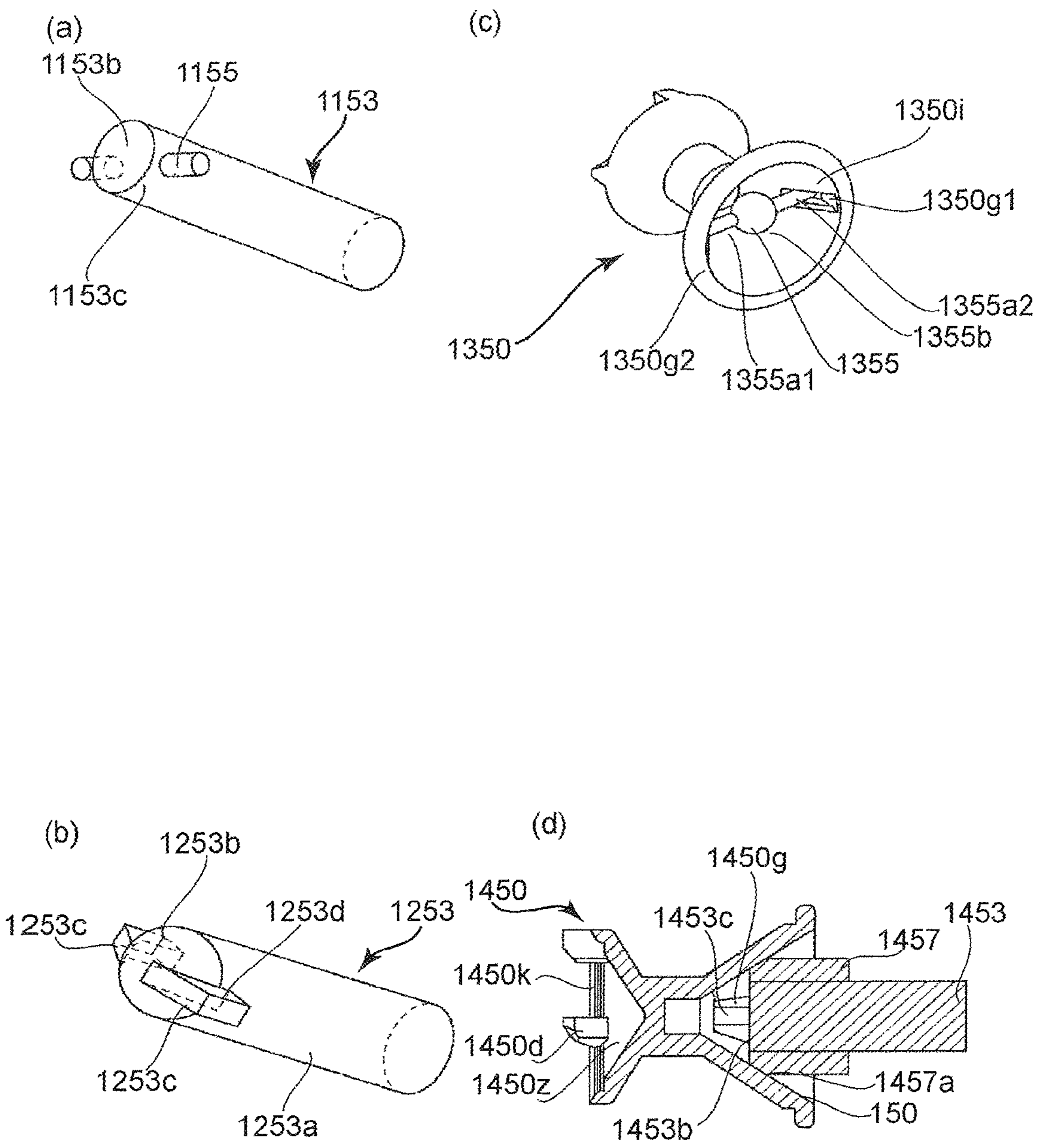
FIG. 27 is perspective views which illustrate the drum shaft according to the embodiment of the present invention.

Referring to FIG. 26 and FIG. 27, the description will be made about the other embodiment of the drum shaft. FIG. 26 is a perspective view of the neighborhood of the drum shaft. FIG. 27 illustrates a characteristic portion.

In the embodiment described above, the free end of the drum shaft 153 is formed into the spherical surface, and the coupling 150 is in contact with the spherical surface thereof. However, as shown in FIGS. 26(*a*) and 27(*a*), the free end 1153*b* of the drum shaft 1153 may be a flat surface. In the case of this embodiment, the edge portion 1153*c* of the peripheral surface thereof contacts the conic surface of the coupling 150, by which the rotation is transmitted. Even with such a structure, the axis L2 can be assuredly inclined relative to the axis L1. In the case of this embodiment, there is no necessity for the spherical surface machining. Therefore, the machining cost can be reduced.

In the embodiment described above, another rotational force transmitting pin is mounted to the drum shaft. However, as shown in FIGS. 26(*b*) and 27 (*b*), it is possible to mold the drum shaft 1253 and the pin 1253*c* integrally. In the case of integral molding using injection molding and so on, the geometrical latitude becomes high. In this case, the pin 1253*c* can be integrally formed with the drum shaft 1253. For this reason, the wide area of the drive transmitting portion 1253*d* can be provided. Therefore, the running torque can be assuredly transmitted to the drum shaft made of the resin material. In addition, since integral molding is utilized, the manufacturing cost is reduced.

As shown in FIGS. 26(*c*) and 27(*c*), the opposite ends 1355*a*1, 1355*a*2 of rotational force transmitting pin (rotational force receiving member) 1355 are beforehand fixed by the press-fitting and so on to the standby opening 1350*g* 1 or 1350*g*2 of the coupling 1350. Thereafter, it is possible to insert the drum shaft 1353 which has a free end portion 1353*c*1, 1353*c*2 formed into a screw slotted shape (concave). At this time, in order to provide a pivotability of the coupling 1350, the engaging portion 1355*b* of the pin 1355 relative to the free end portion (unshown) of the drum shaft 1353 is formed into a spherical shape. Thus, the pin 1355 (rotational force applying portion) is fixed beforehand. By this, the size of the opening 1350*g* of the coupling 1350 can be reduced. Therefore, the rigidity of the coupling 1350 can be increased.

In the foregoing, the structure by which the inclination of the axis L1 is made along the free end of the drum shaft has been described. However, as shown in FIGS. 26(*d*), 26(*e*), and 27(*d*), it is possible to incline along the contact surface 1457*a* of the contact member 1457 on the axis of the drum shaft 1453. In this case, the free end surface 1453*b* of the drum shaft 1453 has a height comparable to the end surface of the contact member 1457. In addition, the rotational force transmitting pin (the rotational force receiving member) 1453*c* projected beyond the free end surface 1453*b* is inserted into the standby opening 1450*g* of the coupling 1450. The pin 1453*c* contacts to the rotational force transmission surface (the rotational force transmitting portion) 1450*h* of the coupling 1450. By this, the rotational force is transmitted to the drum 107. In this manner, the contact surface 1457*a* at the time of the coupling 1450 inclining is provided in the contact member 1457. By this, there is no necessity of processing the drum shaft directly. Therefore, the machining cost can be lowered.

In addition, similarly, the spherical surface at the free end may be a molded resin part of separate member. In this case, the machining cost of the shaft can be lowered. This is because the configuration of the shaft to be processed by the cutting and so on can be simplified. In addition, when the range of the spherical surface at the axial free end is decreased, the range of the processing which requires high degree of accuracy can be made small. By this, the machining cost can be lowered.

Figure 28:
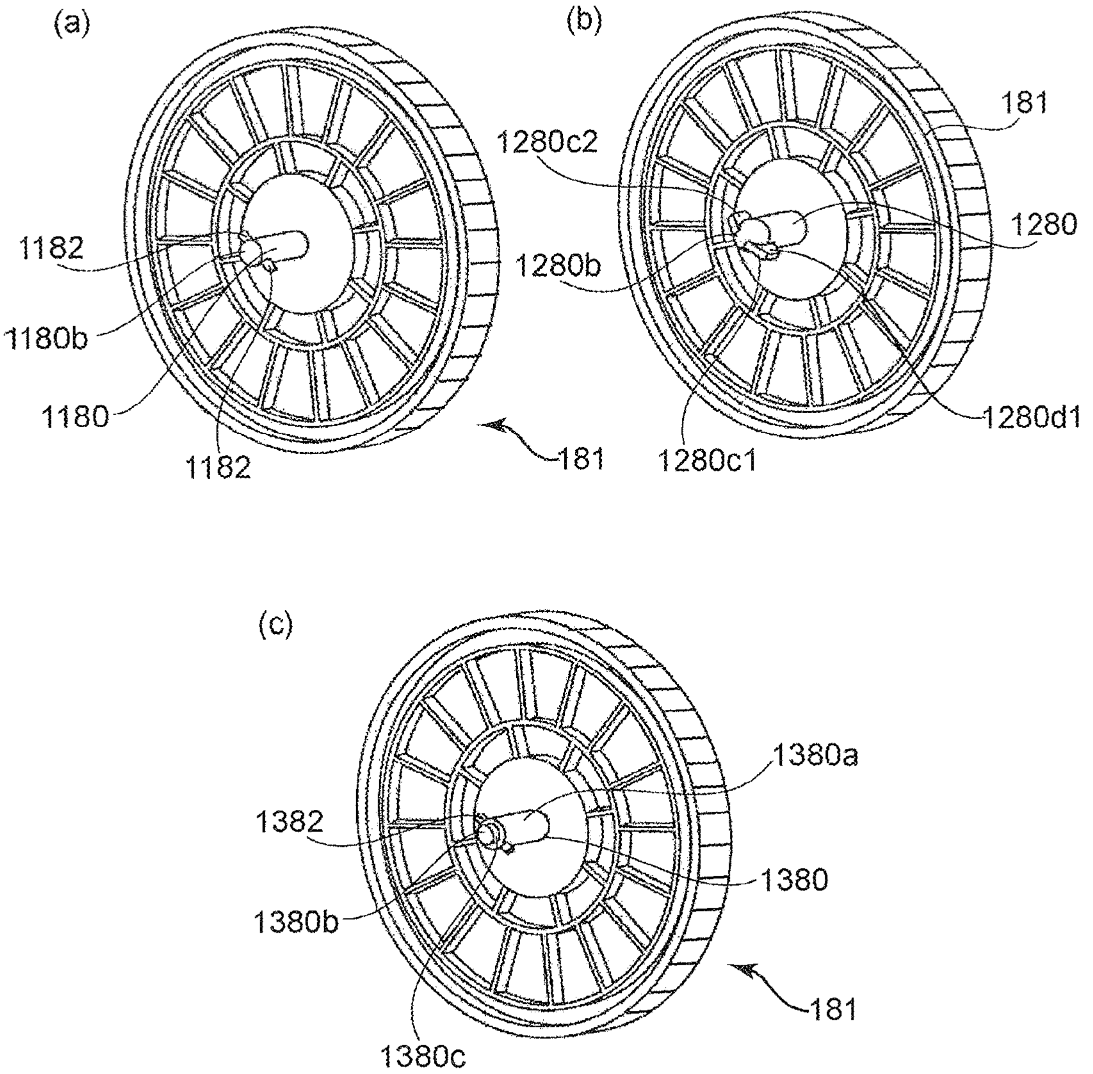
FIG. 28 is perspective views which illustrate a drive shaft and a driving gear according to the embodiment of the present invention.

Referring to FIG. 28, the description will be made about another embodiment of the drive shaft. FIG. 28 is perspective views of a drive shaft and a drum driving gear.

First, as shown in FIG. 28(*a*), the free end of the drive shaft 1180 is made into the flat surface 1180*b*. By this, since the configuration of the shaft is simple, the machining cost can be lowered.

In addition, as shown in FIG. 28(*b*), it is possible to mold the rotational force applying portion (drive transmitting portion) 1280 (1280*c*1, 1280*c*2) integrally with the drive shaft 1280. When the drive shaft 1280 is the molded resin part, the rotational force applying portion can be molded integrally. Therefore, the cost reduction can be accomplished. Designated by 1280*b* is the flat surface portion.

In addition, as shown in FIG. 28(*c*), the range of the free end portion 1380*b* of the drive shaft 1380 is decreased. For this purpose, it is possible to make the outer diameter of the shaft free end 1380*c* smaller than the outer diameter of the main part 1380*a*. As described above, the free end portion 1380*b* requires a certain amount of accuracy, in order to determine the position of the coupling 150. Therefore, the spherical range is limited only to the contact portion of the coupling. By this, the portion other than the surface where accuracy of finishing is required is omitted. By this, the machining cost is lowered. In addition, similarly, it is possible to cut the free end of the unnecessary spherical surface. Designated by 1382 is a pin (the rotational force applying portion).

Figure 29:
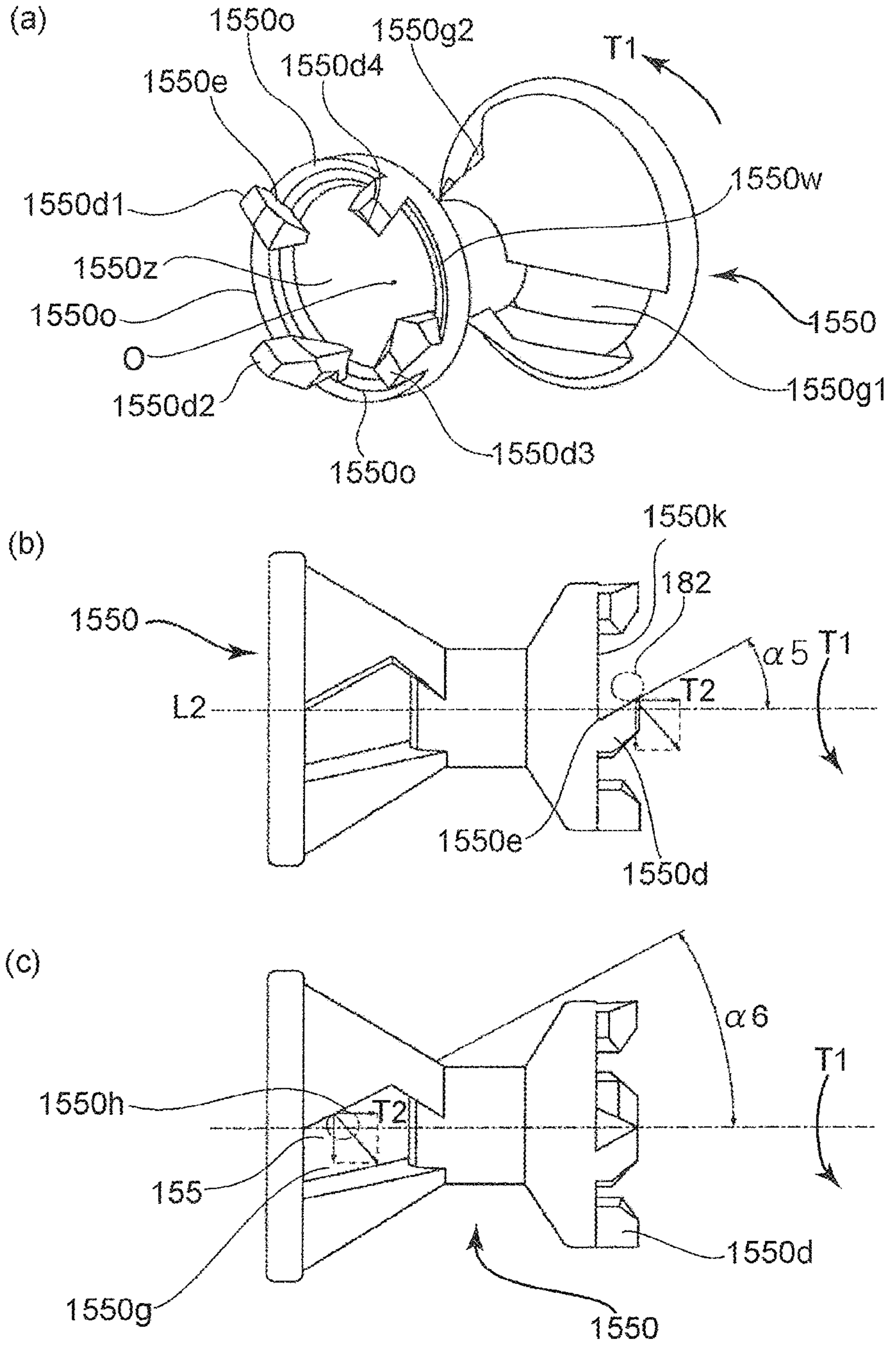
FIG. 29 is perspective views which illustrate the coupling according to the embodiment of the present invention, and side views.
Figure 30:
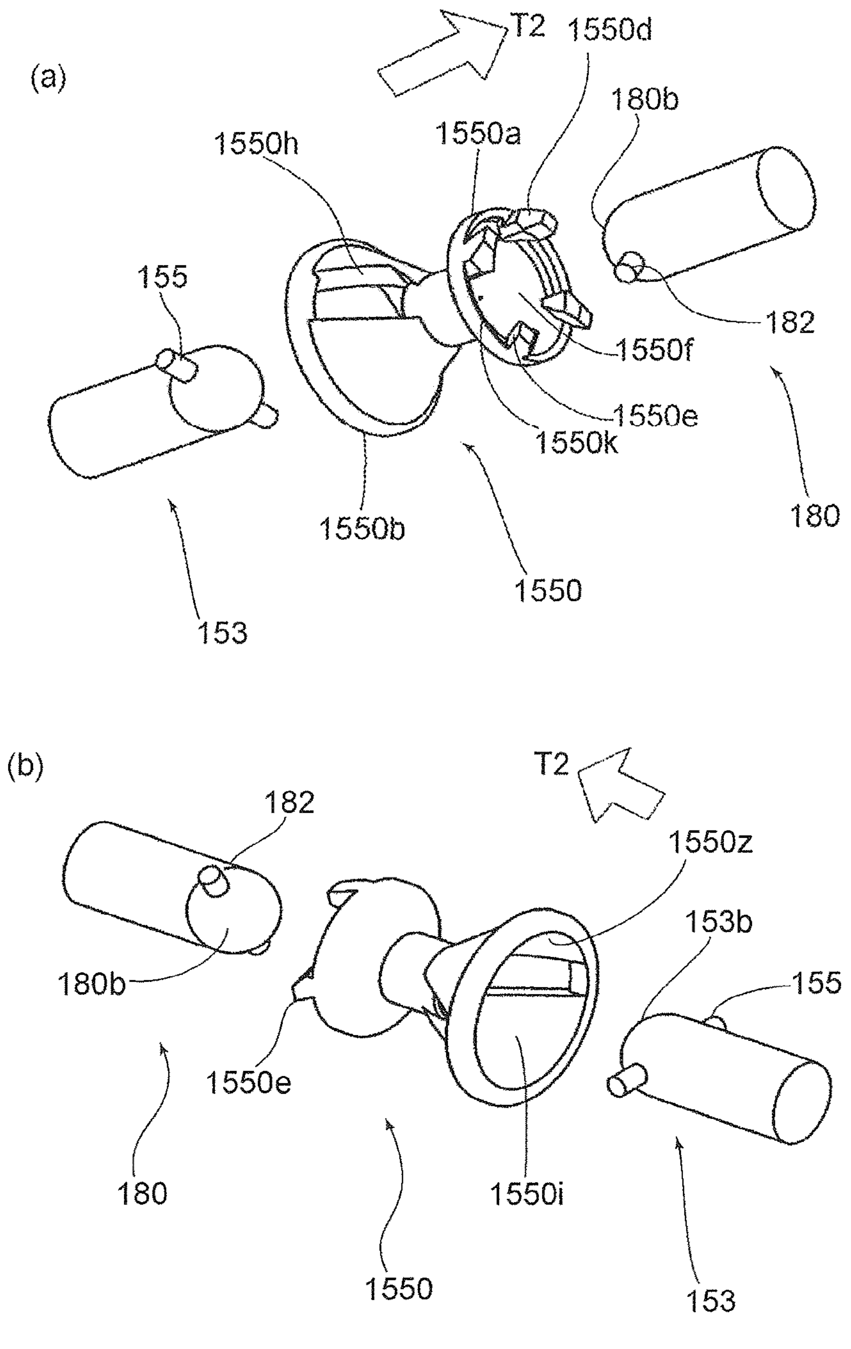
FIG. 30 is exploded perspective views which illustrate the drum shaft, the drive shaft, and the coupling according to the embodiment of the present invention.

The positioning method of the photosensitive drum 107 with respect to the direction of the axis L1 will be described. In other words, the coupling 1550 is provided with a tapered surface (the inclined plane) 1550*e*, 1550*h*. And, a force is produced in the thrust direction by the rotation of the drive shaft 181. The positioning, with respect to the direction of the axis L1, of the coupling 1550 and the photosensitive drum 107 is effected by this thrust force. Referring to FIG. 29 and FIG. 30, this will be described in detail. FIG. 29 is a perspective view and a top plan view of the coupling alone. FIG. 30 is an exploded perspective view which illustrates the drive shaft, the drum shaft, and the coupling.

As shown in FIG. 29(*b*), the rotational force receiving surface 1550*e* (the inclined plane) (rotational force receiving portion) is inclined by the angle α5 relative to the axis L2. When the drive shaft 180 rotates in the direction T1, the pin 182 and the rotational force receiving surface 1550*e* contact to each other. Then, a component force is applied to the coupling 1550 in the direction T2, and it moves in the direction T2. And, the coupling 1550 moves to the axial direction until the driving shaft receiving surface 1550*f* (FIG. 30*a*) abuts to the free end 180*b* of the drive shaft 180. By this, the position of the coupling 1550 with respect to the direction of the axis L2 is determined. In addition, the free end 180*b* of the drive shaft 180 is formed into the spherical surface, and the receiving surface 1550*f* has the conic surface. Therefore, with respect to the direction perpendicular to the axis L2, the position of the driven portion 1550*a* relative to the drive shaft 180 is determined. In cases where the coupling 1550 is mounted to the drum 107, the drum 107 also moves to the axial direction depending on the size of the force in which it is added in the direction T2. In this case, with respect to the longitudinal direction, the position of the drum 107 relative to the apparatus main assembly is determined. The drum 107 is mounted with play in the longitudinal direction thereof in the cartridge frame B1.

As shown in FIG. 29(*c*), the rotational force transmission surface (the rotational force transmitting portion) 1550*h* is inclined by the angle α6 relative to the axis L2. When the coupling 1550 rotates in the direction T1, the transmitting surface 1550*h* and the pin 155 abut relative to each other. Then, a component force is applied to the pin 155 in the direction T2, and it moves in the direction T2. And, the drum shaft 153 moves until the free end 153*b* of the drum shaft 153 contacts to the drum bearing surface 1550*i* (FIG. 30(*b*)) of the coupling 1550. By this, the position of the drum shaft 155 (the photosensitive drum) with respect to the direction of the axis L2 is determined. In addition, the drum bearing surface 1550*i* has a conic surface, and the free end 153*b* of the drum shaft 153 is formed into a spherical surface. Therefore, with respect to the direction perpendicular to the axis L2, the position of the driving portion 1550*b* relative to the drum shaft 153 is determined.

The taper angles α5 and α6 are set to the degree with which the force effective to move the coupling and the photosensitive drum in the thrust direction is produced. However, the forces thereof differ depending on the running torque of the photosensitive drum 107. However, if there is provided means which is effective to determine the position in the thrust direction, the taper angles α5 and α6 may be small.

As has been described hereinbefore, the taper for being drawn in the coupling in the direction of the axis L2 and the conic surface for determining the position at the axis L2 with respect to the orthogonality direction are provided. By this, a position with respect to the direction of the axis L1 of the coupling and a position with respect to the direction perpendicular to the axis L1, are determined simultaneously. In addition, the coupling can transmit the rotational force assuredly. Furthermore, as compared with the case where the rotational force receiving surface (rotational force receiving portion) or the rotational force transmission surface (the rotational force transmitting portion) of the coupling does not have the taper angle as described above, the contact between the rotational force applying portion of the drive shaft and the rotational force receiving portion of the coupling can be stabilized. In addition, the contact abutment between the rotational force receiving portion of the drum shaft and the rotational force transmitting portion of the coupling can be stabilized.

However, the tapered surface (the inclined plane) for pulling in the coupling in the direction of the axis L2 and the conic surface for determining the position of the axis L2 with respect to the orthogonal direction may be omitted. For example, in place of the taper for drawing in the direction of the axis L2, it is possible to add a part for urging the drum in the direction of the axis L2. Hereinafter, as long as there is no particular mentioning, the tapered surface and the conic surface are provided. In addition, the tapered surface and the conic surface are provided also in the coupling 150 described above.

Figure 31:
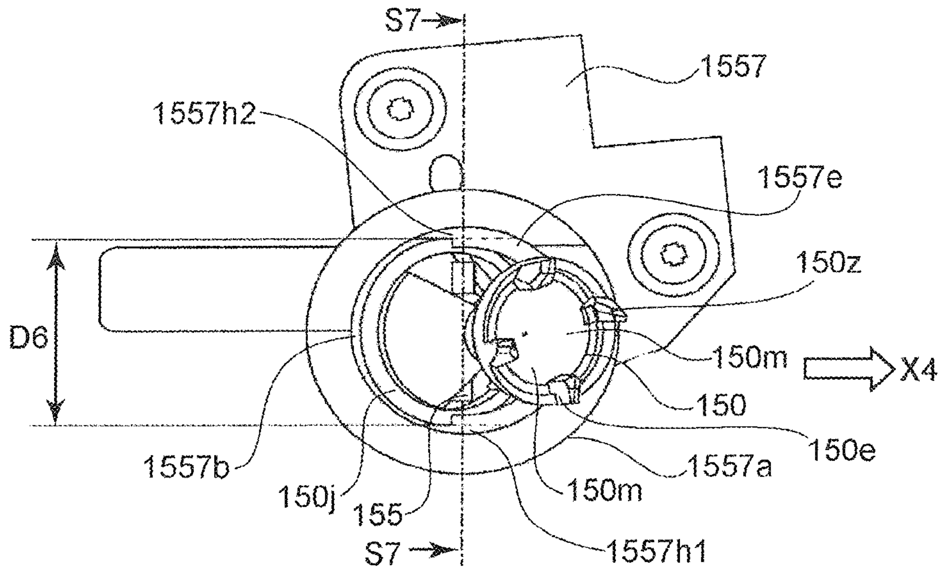
FIG. 31 shows a side view and a longitudinal section of the side surface of the cartridge according to the embodiment of the present invention.
Figure 31:
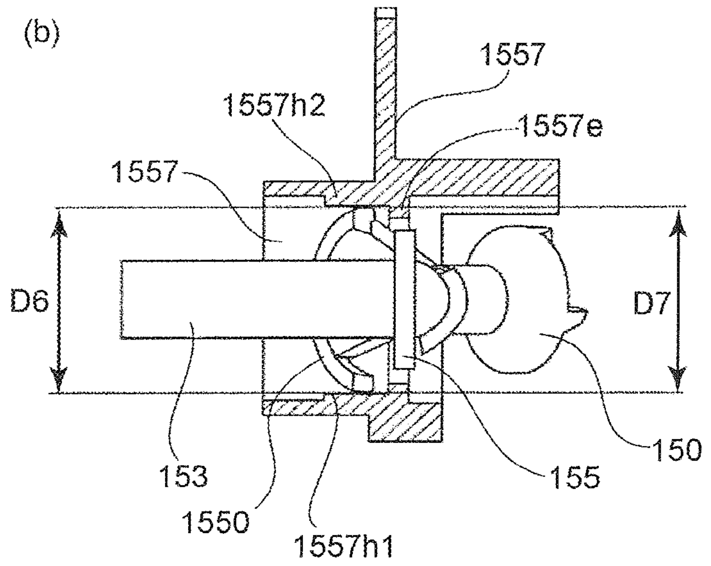

Referring to FIG. 31, the regulating means for regulating the inclining direction relative to the cartridge of the coupling will be described. FIG. 31 (*a*) is a side view which illustrates the major part of the driving side of the process cartridge, and FIG. 31(*b*) is a sectional view taken along S7-S7 of FIG. 31(*a*).

In this embodiment, the coupling 150 and the drive shaft 180 of the apparatus main assembly can be more assuredly engaged by providing the regulating means.

In this embodiment, as the regulating means, the regulating portions 1557*h* 1 or 1557*h*2 are provided on the drum bearing member 1557. The coupling 150 can be regulated in swinging directions relative to the cartridge (B) by this regulating means. The structure is such that by the time, immediately before the coupling 150 engages with the drive shaft 180, this regulating portion 1557*h* 1 or 1557*h*2 is parallel to the mounting direction X4 of the cartridge (B). In addition, the intervals D6 is slightly larger than the outer diameter D7 of the driving portion 150*b* of the coupling 150. By doing so, the coupling 150 is pivotable only to the mounting direction X4 of the cartridge (B). In addition, the coupling 150 can be inclined in any direction relative to the drum shaft 153. Therefore, irrespective of the phase of the drum shaft 153, the coupling 150 can be inclined in the regulated direction. Therefore, the opening 150*m* of the coupling 150 can receive the drive shaft 180 more assuredly. By this, the coupling 150 is more assuredly engageable with the drive shaft 180.

Figure 32:
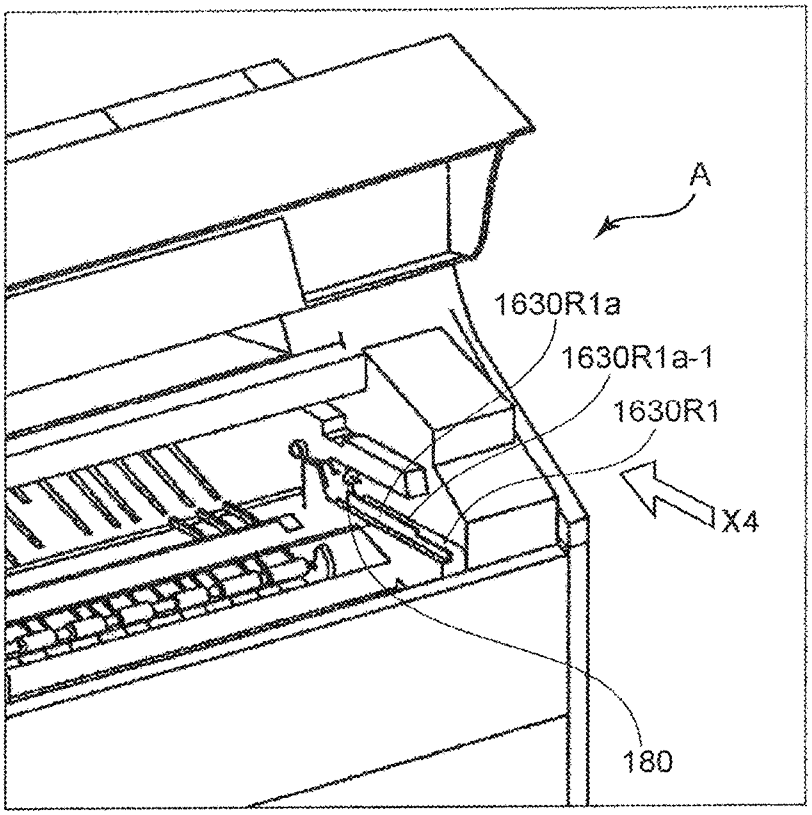
FIG. 32 is a perspective view and a view, as seen from the device of the cartridge set portion of the apparatus main assembly, according to the embodiment of the present invention.
Figure 32:
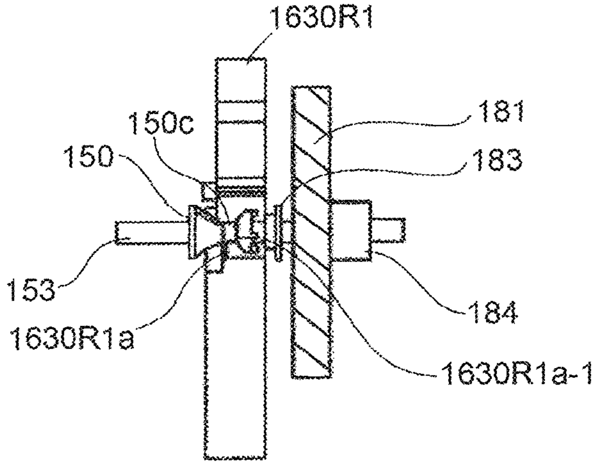

Referring to FIG. 32, another structure for regulating the inclining direction of the coupling will be described. FIG. 32(*a*) is a perspective view which illustrates the inside of the apparatus main assembly driving side, and FIG. 32(*b*) is a side view of a cartridge, as seen from the upstream with respect to the mounting direction X4.

The regulating portions 1557*h* 1 or 1557*h*2 are provided in the cartridge (B) in the above described description. In this embodiment, a part of mounting guide 1630R1 of the driving side of the apparatus main assembly (A) is a rib-like regulating portion 1630R1*a*. The regulating portion 1630R1*a* is the regulating means for regulating the swinging directions of the coupling 150. And, the structure is such that, when the user inserts the cartridge (B), the outer periphery of a connecting portion 150*c* of the coupling 150 contacts to the upper surface 1630R1*a*-1 of the regulating portion 1630R1*a*. By this, the coupling 150 is guided by the upper surface 1630R1*a*-1. For this reason, the inclining direction of the coupling 150 is regulated. In addition, similarly to the embodiment described above, irrespective of the phase of the drum shaft 153, the coupling 150 is inclined in the direction in which it regulated.

The regulating portion 1630R1*a* is provided below the coupling 150 in the example shown in FIG. 32(*a*). However, similarly to the regulating portion 1557*h*2 shown in FIG. 31, the more assured regulation can be accomplished when the regulating portion is added to the upper side.

As described above, it may be combined with the structure in which the regulating portion is provided in the cartridge (B). In this case, more assured regulation can be accomplished.

However, in this embodiment, by which the means for regulating the inclining direction of the coupling may be omitted for example, the coupling 150 is beforehand inclined downstream with respect to the mounting direction of the cartridge (B). And, the driving shaft receiving surface 150*f* of the coupling is enlarged. By this, the engagement between the drive shaft 180 and the coupling 150 can be established.

In addition, in the foregoing description, the angle in the pre-engagement angular position of the coupling 150 relative to the drum axis L1 is larger than the angle in the disengaging angular position (FIGS. 22 and 25). However, the present invention is not limited to such an example.

Figure 33:
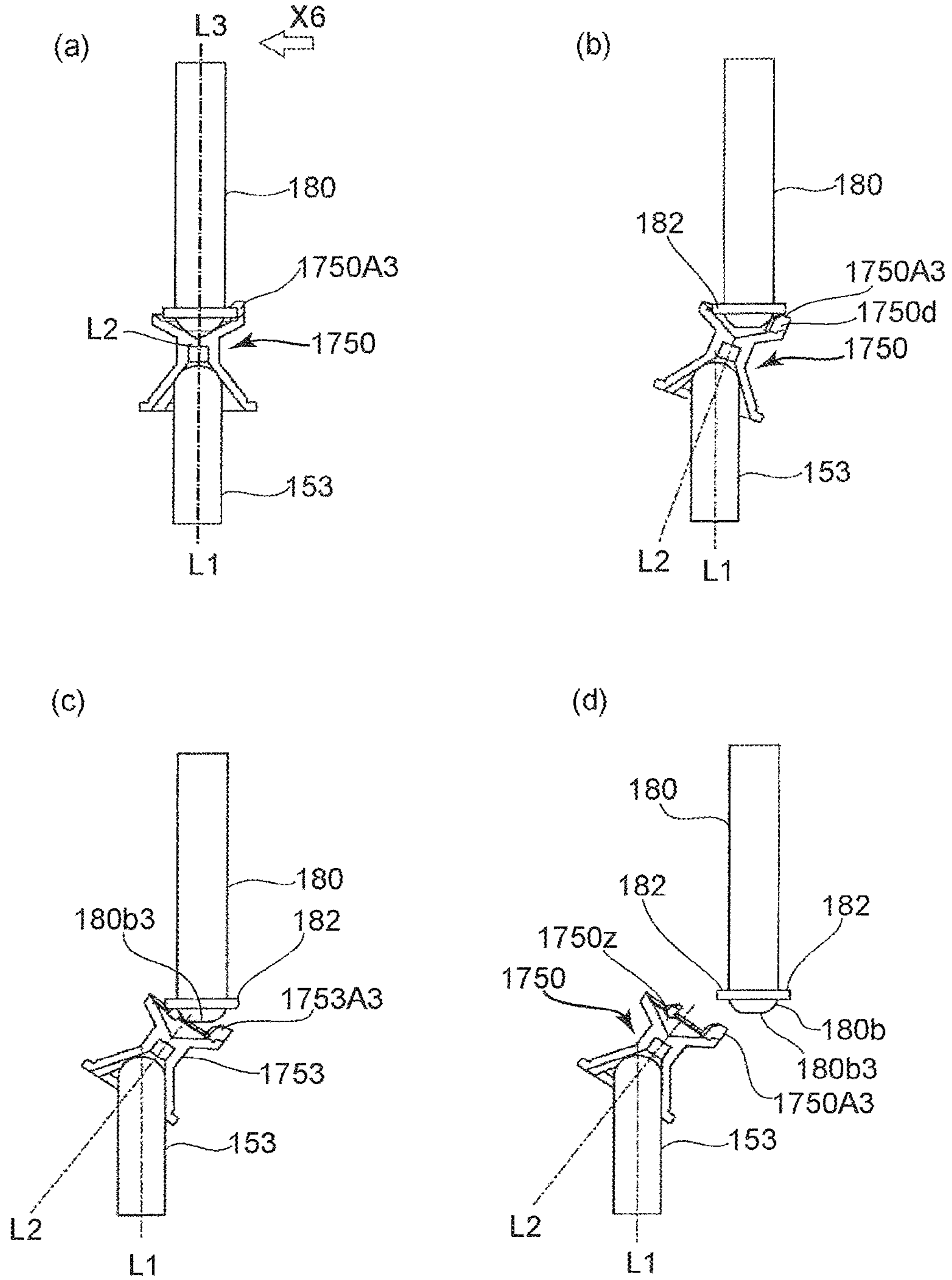
FIG. 33 is longitudinal sectional views which illustrate a dismounting process from the apparatus main assembly of the cartridge according to the embodiment of the present invention.

Referring to FIG. 33, the description will be made. FIG. 33 is a longitudinal sectional view which illustrates the process for taking out the cartridge (B) from the apparatus main assembly (A).

In the process for taking out the cartridge (B) from the apparatus main assembly (A), the angle in the disengaging angular position (in the state FIG. 33*c*) of the coupling 1750 relative to the axis L1 may be equivalent to the angle in the pre-engagement angular position of the coupling 1750 relative to the axis L1 at the time of the coupling 1750 engaging. Here, the process in which the coupling 1750 disengages is shown by (a)-(b)-(c)-(d) in FIG. 33.

More particularly, the setting is such that, when the upstream free end portion 1750 A3 with respect to the dismounting direction X6 of the coupling 1750 passes by the free end portion 180*b*3 of the drive shaft 180, the distance between the free end portion 1750 A3 and the free end portion 180*b*3 is comparable as the distance at the time of the pre-engagement angular position. With such a setting, the coupling 1750 can be disengaged from the drive shaft 180.

The other operations at the time of demounting the cartridge (B) are the same as the above described operations, and therefore, the description is omitted.

In addition, in the foregoing description, at the time of mounting the cartridge (B) to the apparatus main assembly (A), the downstream free end with respect to the mounting direction of the coupling is closer to the drum shaft than the free end of the drive shaft 180. However, the present invention is not limited to such an example.

Figure 34:
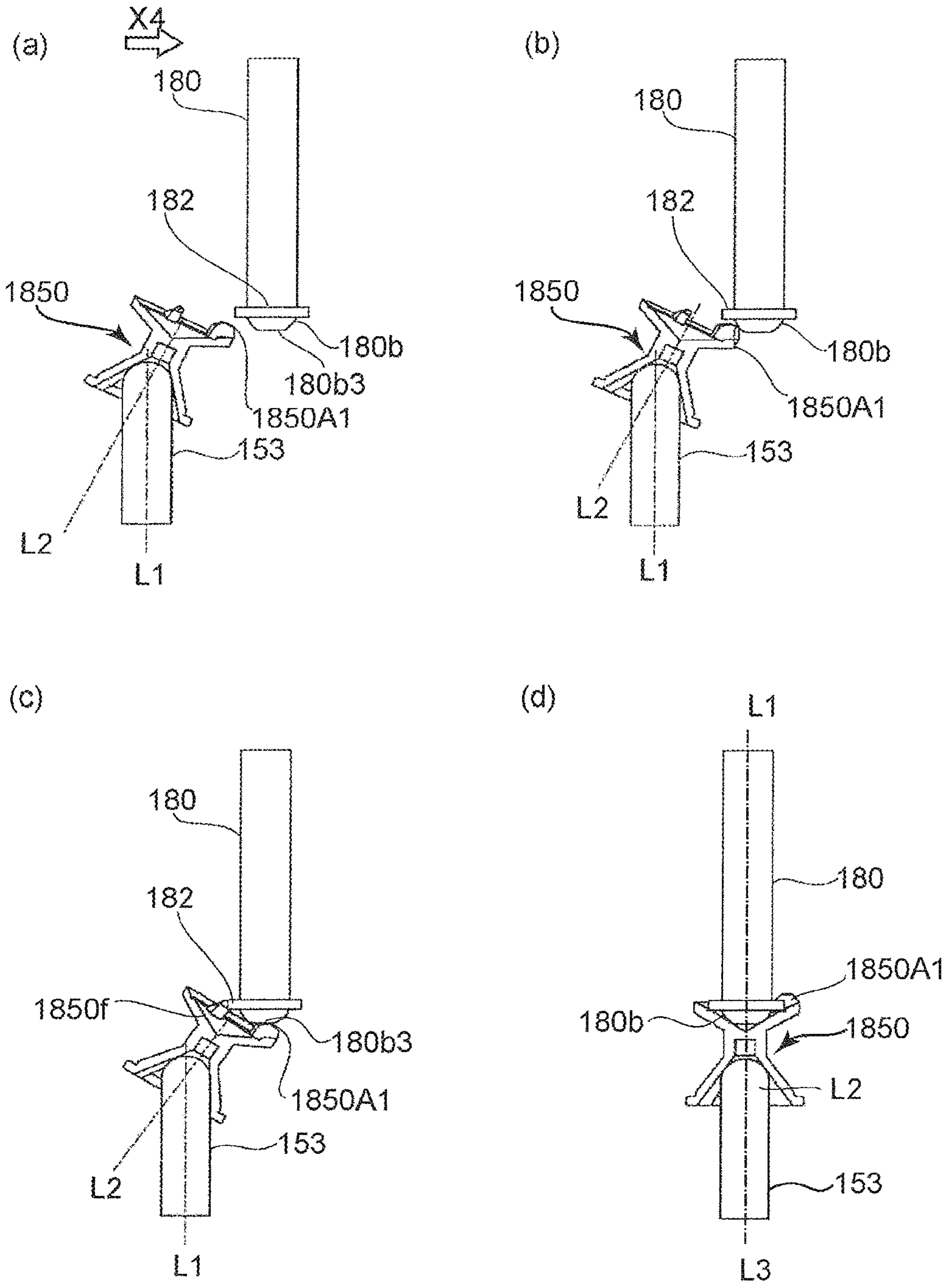
FIG. 34 is longitudinal sectional views which illustrate a mounting process to the apparatus main assembly of the cartridge according to the embodiment of the present invention.

Referring to FIG. 34, the description will be made. FIG. 34 is a longitudinal sectional view for illustrating the mounting process of the cartridge (B). As shown in FIG. 34, in the state of (a) the mounting process of the cartridge (B), in the direction of the axis L1, the downstream free end position 1850A1 with respect to the mounting direction X4 is closer to the direction of the pin 182 (the rotational force applying portion) than the drive shaft free end 180*b*3. In the state of (b), the free end position 1850A1 is contacted to the free end portion 180*b*. At this time, the free end position 1850A1 moves toward the drum shaft 153 along the free end portion 180*b*. And, the free end position 1850A1 passes by the free end portion 180*b*3 of the drive shaft 180 at this position, the coupling 150 takes the pre-engagement angular position (FIG. 34(*c*)). And, finally the engagement between the coupling 1850 and the drive shaft 180 is established ((rotational force transmitting angular position) FIG. 34(*d*)).

An example of this embodiment will be described.

First, the shaft diameter of the drum shaft 153 is ΦZ1, the shaft diameter of the pin 155 is ΦZ2, and the length is Z3 (FIG. 7(*a*)). The maximum outer diameter of the driven portion 150*a* of the coupling 150 is ΦZ4 the diameter of a phantom circle C1 which passes the inner ends of the projections 150*d* 1 or 150*d* 2 or 150*d*3, 150*d*4 is ΦZ5, and the maximum outer diameter of the driving portion 150*b* is ΦZ6 (FIG. 8(*d*), (*f*)). The angle formed between the coupling 150 and the receiving surface 150*f* is α2, and the angle formed between the coupling 150 and the receiving surface 150*i* is α1. A shaft diameter of the drive shaft 180 is ΦZ7, the shaft diameter of the pin 182 is ΦZ8, and the length is Z9 (FIG. 17(*b*)). In addition, the angle relative to the axis L1 in the rotational force transmitting angular position is β1, the angle in the pre-engagement angular position is β2, and the angle in the disengaging angular position is β3. In this example, Z1=8 mm; Z2=2 mm; Z3=12 mm; Z4=15 mm; Z5=10 mm; Z6=19 mm; Z7=8 mm; Z8=2 mm; Z9=14 mm; α1=70 degrees; ×2=120 degrees; β1=0 degree; β2=35 degrees; β3=30 degrees.

It has been confirmed with these settings, the engagement between the coupling 150 and the drive shaft 180 is possible. However, these settings do not limit the present invention. In addition, the coupling 150 can transmit the rotational force to the drum 107 with high precision. The values given above are the examples, and the present invention is not limited to these values.

In addition, in this embodiment, the pin (the rotational force applying portion) 182 is disposed in the range of 5 mm from the free end of the drive shaft 180. In addition, the rotational force receiving surface (rotational force receiving surface) 150*e* provided in the projection 150*d* is disposed at the range of 4 mm from the free end of the coupling 150. In this manner, the pin 182 is disposed at the free end side of the drive shaft 180 in addition, the rotational force receiving surface 150*e* is disposed at the free end side of the coupling 150.

By this, at the time of mounting the cartridge (B) to the apparatus main assembly (A), the drive shaft 180 and the coupling 150 can engage smoothly with each other. In more detail, the pin 182 and the rotational force receiving surface 150*e* can engage smoothly with each other.

In addition, at the time of demounting the cartridge (B) from the apparatus main assembly (A), the drive shaft 180 and the coupling 150 can disengage smoothly from each other. More particularly, the pin 182 and the rotational force receiving surface 150*e* can disengage smoothly from each other.

The values are the examples, and the present invention is not limited to these values. However, the effects described above are further enhance (d) by the pin (rotational force applying portion) 182 and the rotational force receiving surface 150*e* being disposed in these numerical value ranges.

As described in the foregoing, in the described embodiment, the coupling member 150 is capable of taking the rotational force transmitting angular position for transmitting the rotational force for rotating the electrophotographic photosensitive drum to the electrophotographic photosensitive drum and the disengaging angular position in which the coupling member 150 is inclined away from the axis of the electrophotographic photosensitive drum from the rotational force transmitting angular position. When the process cartridge is dismounted from the main assembly of the electrophotographic image forming apparatus in a direction substantially perpendicular to the axis of the electrophotographic photosensitive drum, the coupling member moves from the rotational force transmitting angular position to the disengaging angular position. When the process cartridge is mounted to the main assembly of the electrophotographic image forming apparatus in a direction substantially perpendicular to the axis of the electrophotographic photosensitive drum, the coupling member moves from the disengaging angular position to the rotational force transmitting angular position. This applies to the following embodiments, although the following embodiment 2 is related with the dismounting only.

Embodiment 2

Referring to FIG. 35-FIG. 40, the second embodiment to which applied the present invention will be described.

In the description of this embodiment, the same reference numerals as in Embodiment 1 are assigned to the elements having the corresponding functions in this embodiment, and the detailed description thereof is omitted for simplicity. This applies also about the other embodiment described in the below.

The this embodiment is effective not only for the case of the mounting and the dismounting of the cartridge (B)

relative to the apparatus main assembly (A) but also the case of the dismounting only of the cartridge (B) from the apparatus main assembly (A).

More particularly, when the drive shaft 180 stops, the drive shaft 180 is stopped with the predetermined phase by the control of the apparatus main assembly (A) in other words, it stops so that the pin 182 may become at a predetermined position. Moreover, the phase of the coupling 14150 (150) is set in alignment with the phase of the stopped drive shaft 180 for example, the position of standing-by portion 14150*k* (150*k*) is set so that it may align with the stop position of the pin 182 with such a setting, at the time of mounting the cartridge (B) to the apparatus main assembly (A), even if the coupling 14150 (150) is not pivoted, it will become in the state of being opposed to the drive shaft 180. And, the rotational force from the drive shaft 180 is transmitted to the coupling 14150 (150) by the drive shaft 180 rotating. By this, the coupling 14150 (150) can rotate with high precision.

However, this embodiment is effective at the time of demounting the cartridge (B) from the apparatus main assembly (A) by moving in the direction substantially perpendicular to the direction of the axis L3. This is because even if the drive shaft 180 stops with the predetermined phase, the pin 182 and rotational force receiving surface 14150*e*1, 14150*e*2 (150*e*) are in engagement relative to each other. For this reason, in order to disengage the coupling 14150 (150) from the drive shaft 180, the coupling 14150 (150) needs to pivot.

In addition, in the embodiment 1 described above, at the time of mounting the cartridge (B) to the apparatus main assembly (A) and at the time of demounting it, the coupling 14150 (150) pivots. Therefore, the control of the apparatus main assembly (A) described above is unnecessary, and, at the time of mounting the cartridge (B) to the apparatus main assembly (A), it is not necessary to set the phase of the coupling 14150 (150) in accordance with the phase of the stopped drive shaft 180 beforehand.

The description will be made referring to the drawing.

Figure 35:
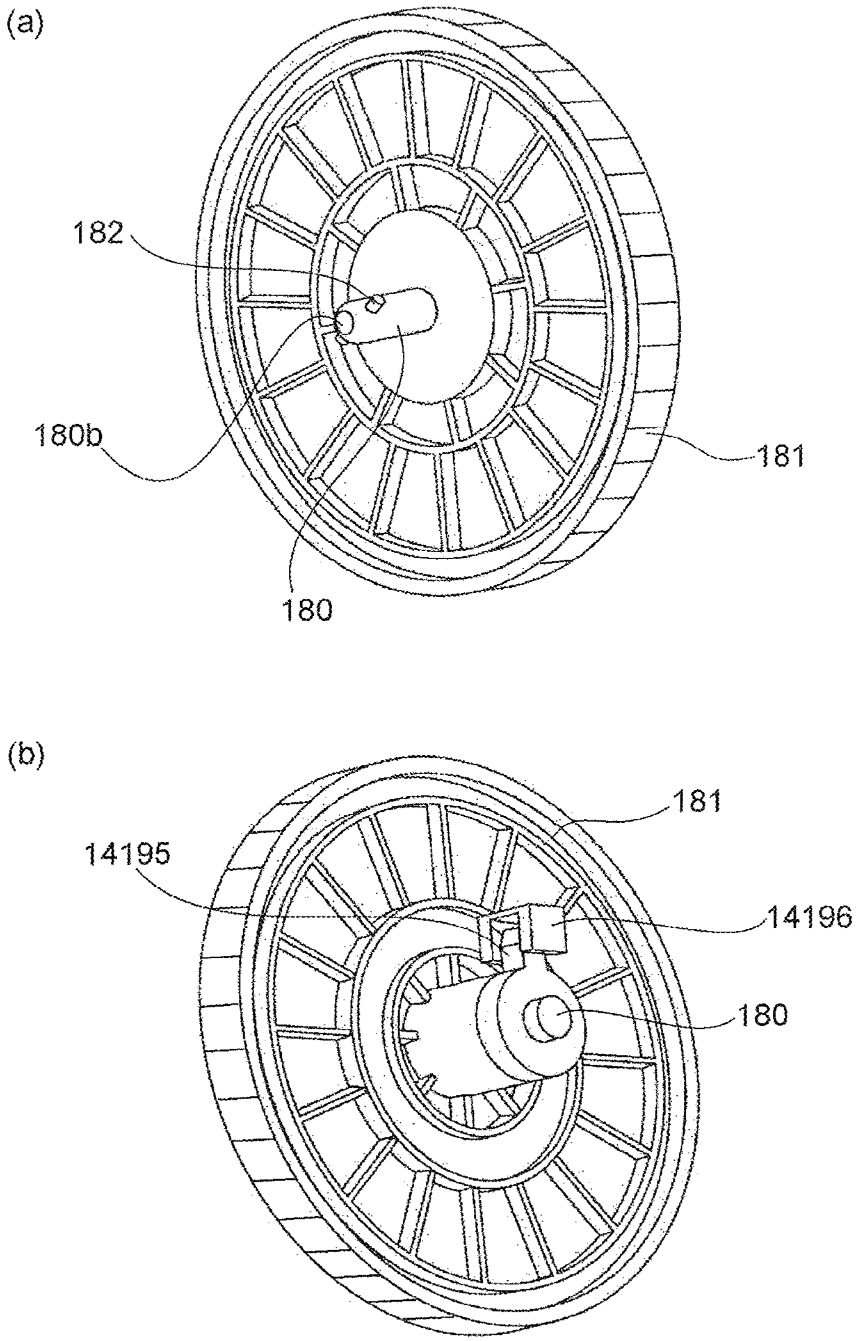
FIG. 35 is perspective views which illustrate phase control means for a drive shaft according to a second embodiment of the present invention.
Figure 36:
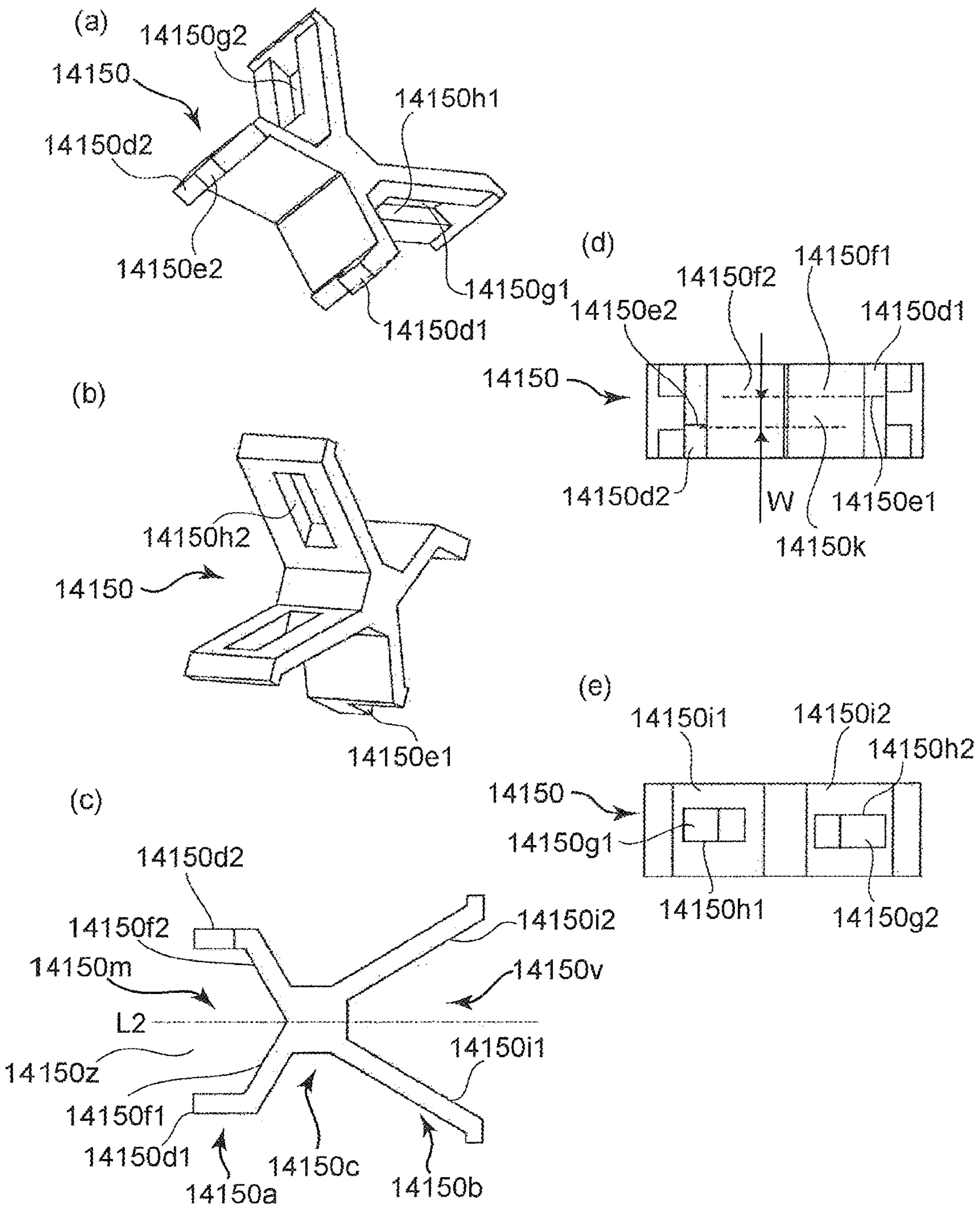
FIG. 36 is perspective views which illustrate a mounting operation of a cartridge according to the embodiment of the present invention.
Figure 37:
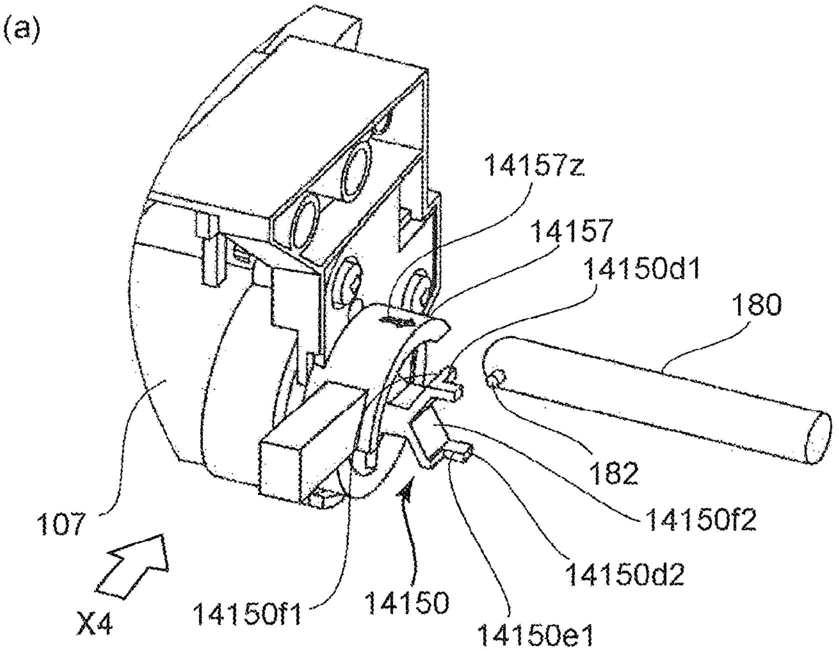
FIG. 37 is perspective views of a coupling according to the embodiment of the present invention.
Figure 37:
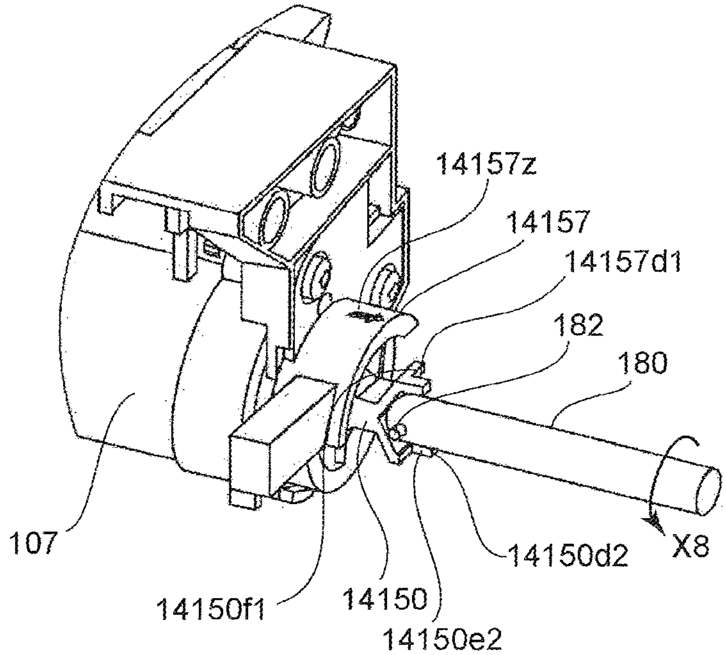
Figure 38:
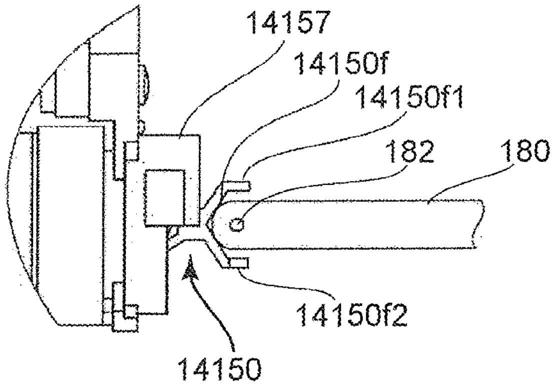
FIG. 38 is top plan views of a mounted state of the cartridge as seen in a mounting direction according to the embodiment of the present invention.
Figure 38:
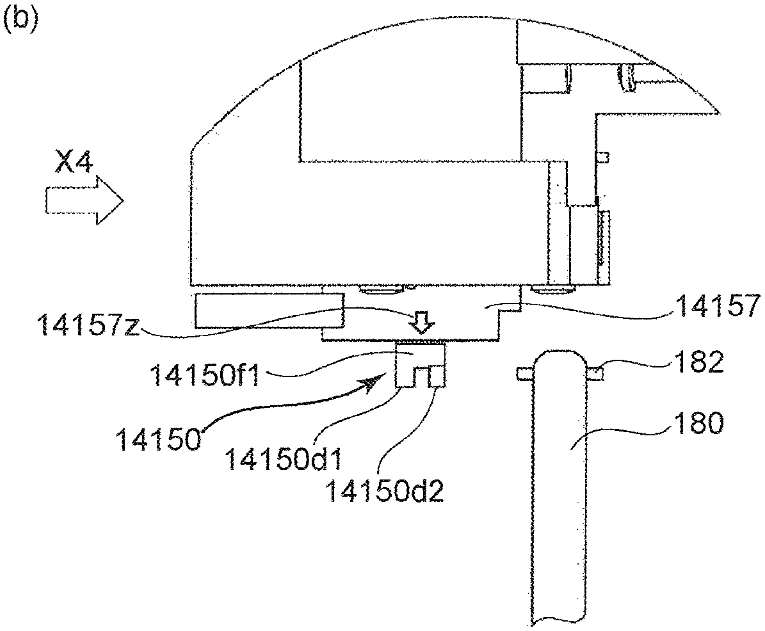
Figure 39:
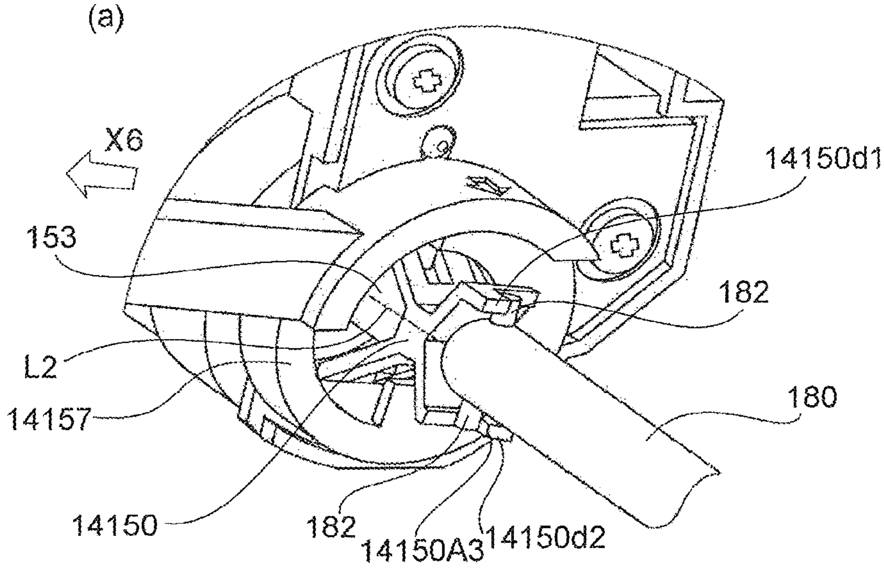
FIG. 39 is perspective views which illustrate a drive stop state of the process cartridge (photosensitive drum) according to the embodiment of the present invention.
Figure 39:
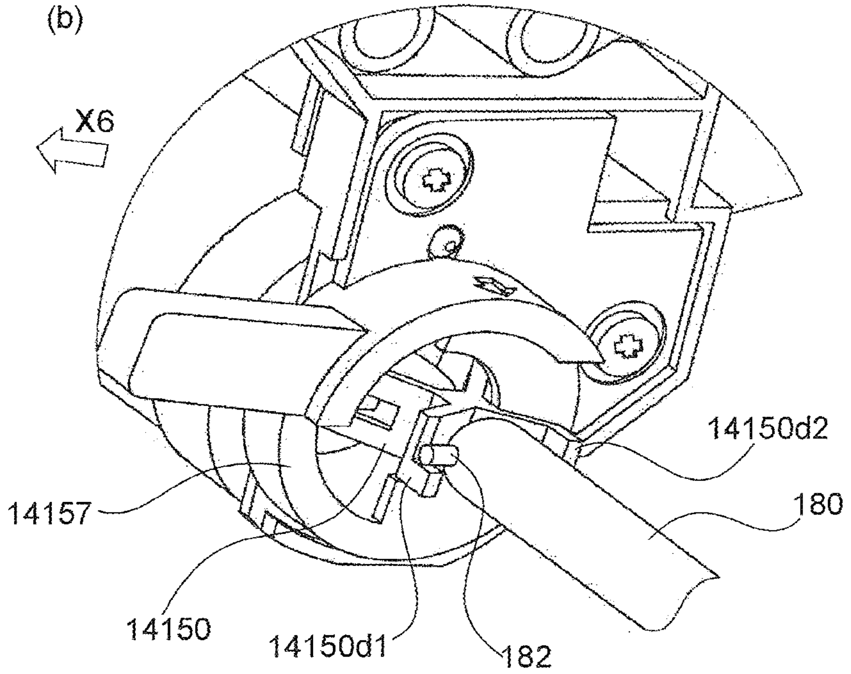
Figure 40:
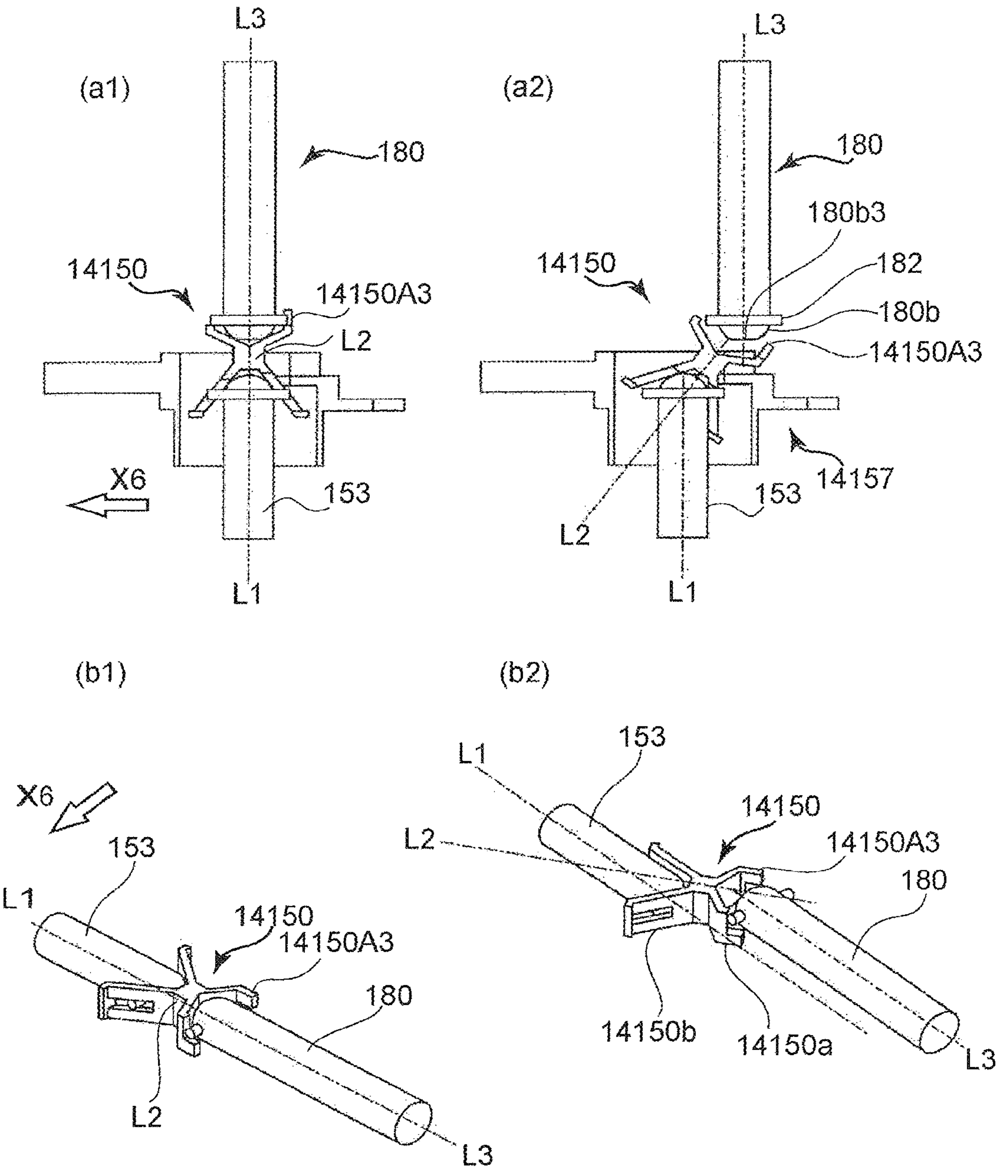
FIG. 40 is longitudinal sectional views and perspective views which illustrate a dismounting operation of the process cartridge according to the embodiment of the present invention.

FIG. 35 is a perspective view which illustrates the phase control means for the drive shaft, the driving gear, and the drive shaft of the apparatus main assembly. FIG. 36 is a perspective view and a top plan view of the coupling. FIG. 37 is a perspective view which illustrates the mounting operation of the cartridge. FIG. 38 is a top plan view, as seen from the direction of the mounting direction at the time of the cartridge mounting. FIG. 39 is a perspective view which illustrates in the state of the drive stop of the cartridge (the photosensitive drum). FIG. 40 is a longitudinal sectional view and a perspective view which illustrate the operation for taking out the cartridge.

In this embodiment, the description will be made about the cartridge detachably mountable to apparatus main assembly (A) provided with the control means (unshown) which can control the phase of the stop position of the pin 182. The one end side (an unshown photosensitive drum 107 side) of the drive shaft 180 is the same as that of the first embodiment, as shown in FIG. 35(*a*), and therefore, the description is omitted. On the other hand, as shown in FIG. 35(*b*), the other end side (the opposite side of the unshown photosensitive drum 107 side) is provided with a flag 14195 projected from the drive shaft 180 outer periphery of the drive shaft 180. And, the flag 14195 passes through the photo-interrupter 14196 fixed to the apparatus main assembly (A) by the rotation thereof. And, a control means (unshown) effects the control, so that after the rotation (for example, image forming rotation) of the drive shaft 180, when the flag 14195 interrupts the photo-interrupter 14196 first, a motor 186 stops. By this, the pin 182 stops at a predetermined position relative to the rotation axis of the drive shaft 180. As for the motor 186, in the case of this embodiment, it is desirably a stepping motor with which the positioning control is easy.

Referring to FIG. 36, the coupling used in this embodiment will be described.

The coupling 14150 mainly comprises three portions. As shown in FIG. 36(*c*), they are a driven portion 14150*a* for receiving the rotational force from the drive shaft 180, a driving portion 14150*b* for transmitting the rotational force to the drum shaft 153, and a connecting portion 14150*c* which connects the driven portion 14150*a* and the driving portion 14150*b* with each other.

The driven portion 14150*a* has a drive shaft inserting portion 14150*m* constituted by 2 surfaces which expand in a direction away from an axis L2. In addition, the driving portion 14150*b* has a drum shaft inserting portion 14150*v* constituted in the two surfaces which expand away from the axis L2.

The inserting portion 14150*m* has a tapered driving shaft receiving surfaces 14150*f* 1 or 14150*f*2. And, each end surface is provided with a projection 14150*d* 1 or 14150*d*2. The projections 14150*d* 1 or 14150*d*2 are disposed on a circumference about the axis L2 of the coupling 14150. The receiving surfaces 14150*f* 1, 14150*f*2 constitute a recess 14150*z*, as shown in the Figure. In addition, as shown in FIG. 36(*d*), the downstream of the projection 14150*d* 1, 14150*d*2 with respect to the clockwise direction is provided with a rotational force receiving surface (rotational force receiving portion) 14150*e* (14150*e*1, 14150*e*2). A pin (rotational force applying portion) 182 abuts to this receiving surface 14150*e*1, 14150*e*2. By this, the rotational force is transmitted to the coupling 14150. An interval (W) between the adjacent projections 14150*d*1-*d*2 is larger than the outer diameter of the pin 182, in order to permit the entrance of the pin 182. This interval is the standing-by portions 14150*k*.

In addition, the inserting portion 14150*v* is constituted by the two surfaces 1415011, 14150 i2. And, the standby openings 14150*g* 1 or 14150*g*2 are provided in these surfaces 1415011, 14150 i2 (the FIG. 36*a* FIG. 36*e*). In addition, in FIG. 36(*e*), at the upstream of the openings 14150*g* 1 or 14150*g*2 with respect to the clockwise direction, a rotational force transmission surface (rotational force transmitting portion) 14150*h* (14150*h* 1 or 14150*h*2) is provided. And, as described above, the pin (the rotational force receiving portion) 155*a* contacts with the rotational force transmission surfaces 14150*h* 1 or 14150*h*2. By this, the rotational force is transmitted to the photosensitive drum 107 from the coupling 14150.

With the shape of coupling 1415, the coupling is over the free end of the driving shaft in the state that the cartridge is mounted to the main assembly of the apparatus.

And, with the similar structure as the structure described by the first embodiment, the coupling 14150 can be inclined in any direction relative to the drum shaft 153.

Referring to FIG. 37 and FIG. 38, a mounting operation of the coupling will be described. FIG. 37(*a*) is a perspective view which illustrates the state before the coupling is mounted. FIG. 37 (*b*) is a perspective view which illustrates the state where the coupling engaged. FIG. 38(*a*) is a top plan view thereof, as seen from the mounting direction. FIG. 38(*b*) is a top plan view thereof, as seen from the top relative to the mounting direction.

An axis L3 of the pin (rotational force applying portion) 182 is parallel to the mounting direction X4 by the control means described above. In addition, as to the cartridge, the phase aligns so that the receiving surfaces 14150*f* 1 and 14150*f*2 are opposite from each other in the direction perpendicular to the mounting direction X4 (FIG. 37(*a*)). As a structure for aligning the phase, any one side of the receiving surfaces 14150*f* 1 or 14150*f*2 is aligned with a mark 14157*z* provided on the bearing member 14157, as shown in the Figure, for example. This is carried out before shipping the cartridge from the plant. However, the user may carry out, before mounting the cartridge (B) to the apparatus main assembly. In addition, other phase adjusting means may be used. By doing so, the coupling 14150 and the drive shaft 180 (the pin 182) are not interfered with each other with respect to the mounting direction, as shown in FIG. 38(*a*), in the positional relation. Therefore, the coupling 14150 and the drive shaft 180 are engageable without the problem (FIG. 37(*b*)). And, the drive shaft 180 rotates in the direction X8, so that the pin 182 contacts to the receiving surface 14150*e*1, 14150*e*2. By this, the rotational force is transmitted to the photosensitive drum 107.

Referring to FIG. 39 and FIG. 40, the description will be made as to the operation in which the coupling 14150 disengages from the drive shaft 180 in interrelation with the operation for taking out the cartridge (B) from the apparatus main assembly (A). The phase of the pin 182 relative to the drive shaft 180 stops at the predetermined position by the control means. As described above, when the easiness of the mounting of the cartridge (B) is considered, it is desirable for the pin 182 to stop with the phase parallel to the cartridge dismounting direction X6 (FIG. 39*b*). The operation at the time of taking out the cartridge (B) is illustrated in FIG. 40. In this state (FIG. 40(*a*1) and (*b*1)), the coupling 14150 takes the rotational force transmitting angular position and the axis L2 and the axis L1 are substantially co-axial with each other. At this time, similarly to the case of mounting the cartridge (B), the coupling 14150 can be inclined in any direction relative to the drum shaft 153 (FIG. 40 *a*1, FIG. 40 *b*1). Therefore, the axis L2 inclines in the direction opposite from the dismounting direction relative to the axis L1 in interrelation with the dismounting operation of the cartridge (B). More particularly, the cartridge (B) is demounted in the direction (the direction of the arrow X6) substantially perpendicular to the axis L3. And, in the dismounting process of the cartridge, the axis L2 is inclined until the free end 14150 A3 of the coupling 14150 becomes along the free end 180*b* of the drive shaft 180 (the disengaging angular position). Or, it is inclined until the axis L2 comes to the drum shaft 153 side with respect to the free end portion 180*b*3 (FIG. 40(*a*2), FIG. 40(*b*2)). In this state, the coupling 14150 is passed by near the free end portion 180*b*3. By doing so, the coupling 14150 is demounted from the drive shaft 180.

In addition, as shown in FIG. 39 (*a*), the axis of the pin 182 may stop in the state perpendicular to the cartridge dismounting direction X6. The pin 182 usually stops at the position shown in FIG. 39 (*b*) by the control of the control means. However, the voltage source of the device (the printer) may become OFF and the control means may not work. The pin 182 may stop at the position as shown in FIG. 39 (*a*) in such a case. However, even in such a case, the axis L2 is inclined relative to the axis L1 similarly to the above described case, and the removal operation is possible. When the device is in the state of the drive stop, the pin 182 is in the downstream beyond the projection 14150*d*2 with respect to the dismounting direction X6. Therefore, the free end 14150 A3 of the projection 14150*d*1 of the coupling passes the drum shaft 153 side beyond the pin 182 by the axis L2 inclining. By this, the coupling 14150 is demounted from the drive shaft 180.

As has been described hereinbefore, even if it is the case where the coupling 14150 is engaged relative to the drive shaft 180 by a certain method on the occasion of the mounting of the cartridge (B) the axis L2 inclines relative to the axis L1 in the case of the dismounting operation. By this, the coupling 14150 can be demounted from the drive shaft 180 only by such dismounting operation.

As has been described hereinbefore, according to this embodiment 2, this embodiment is effective even for the case of demounting the cartridge from the main assembly of the apparatus, in addition to the case of mounting and demounting the cartridge (B) relative to the apparatus main assembly (A).

Embodiment 3

Referring to FIG. 41-FIG. 45, a third embodiment will be described.

Figure 41:
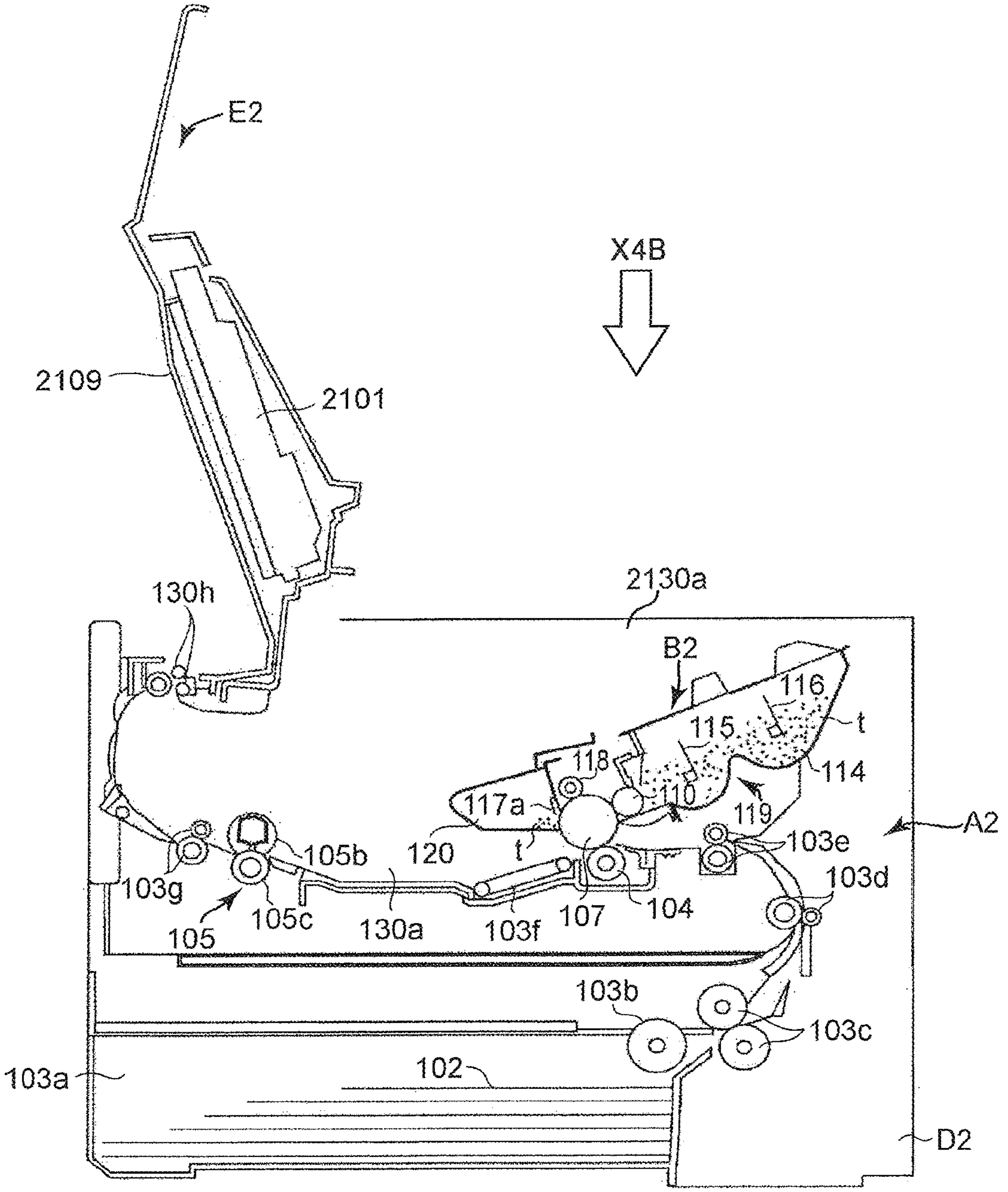
FIG. 41 is a sectional view which illustrates the state where a door provided in an apparatus main assembly is opened according to a third embodiment of the present invention.
Figure 42:
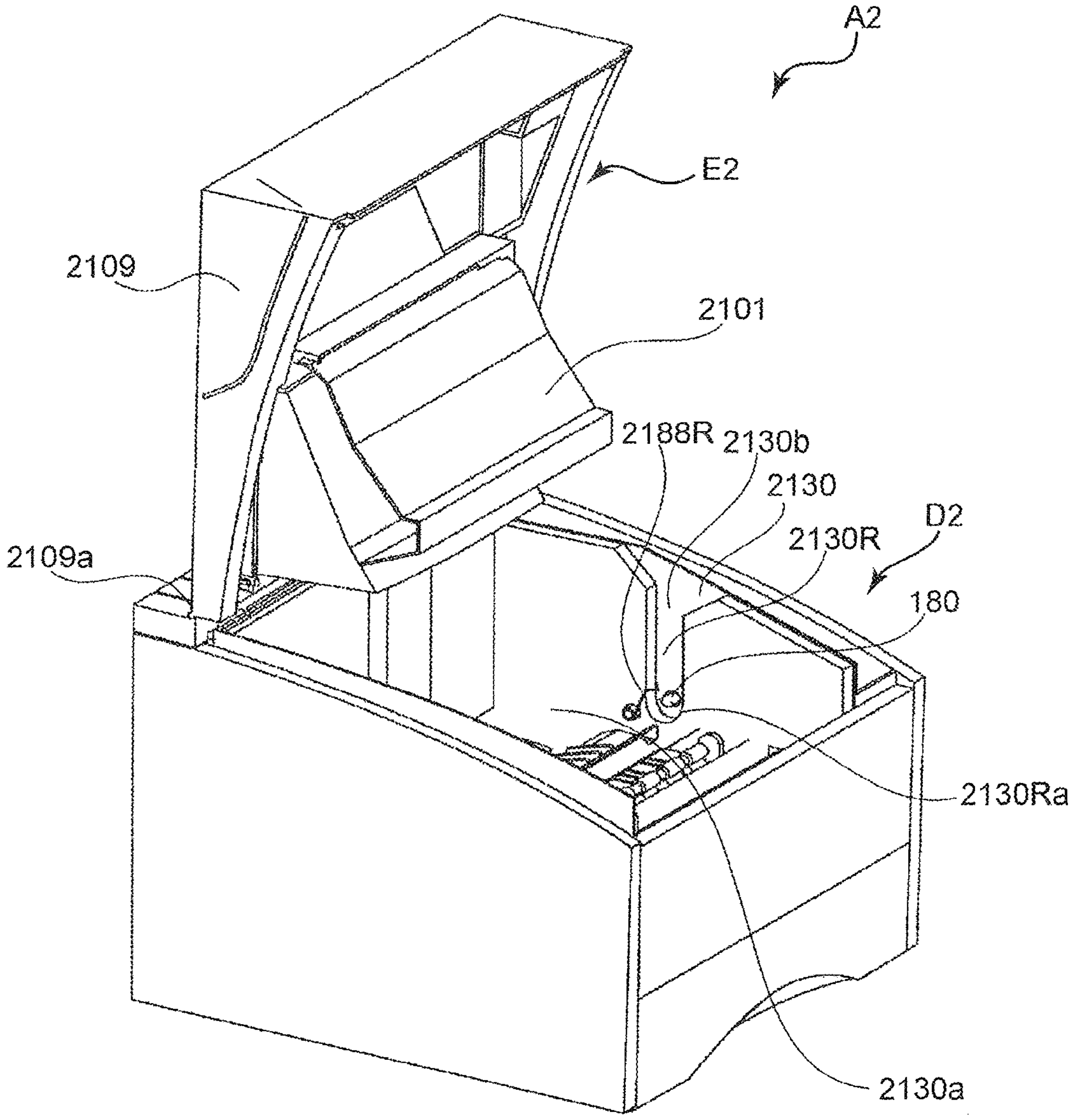
FIG. 42 is a perspective view which illustrates a mounting guide of a driving side of the apparatus main assembly according to the embodiment of the present invention.
Figure 43:
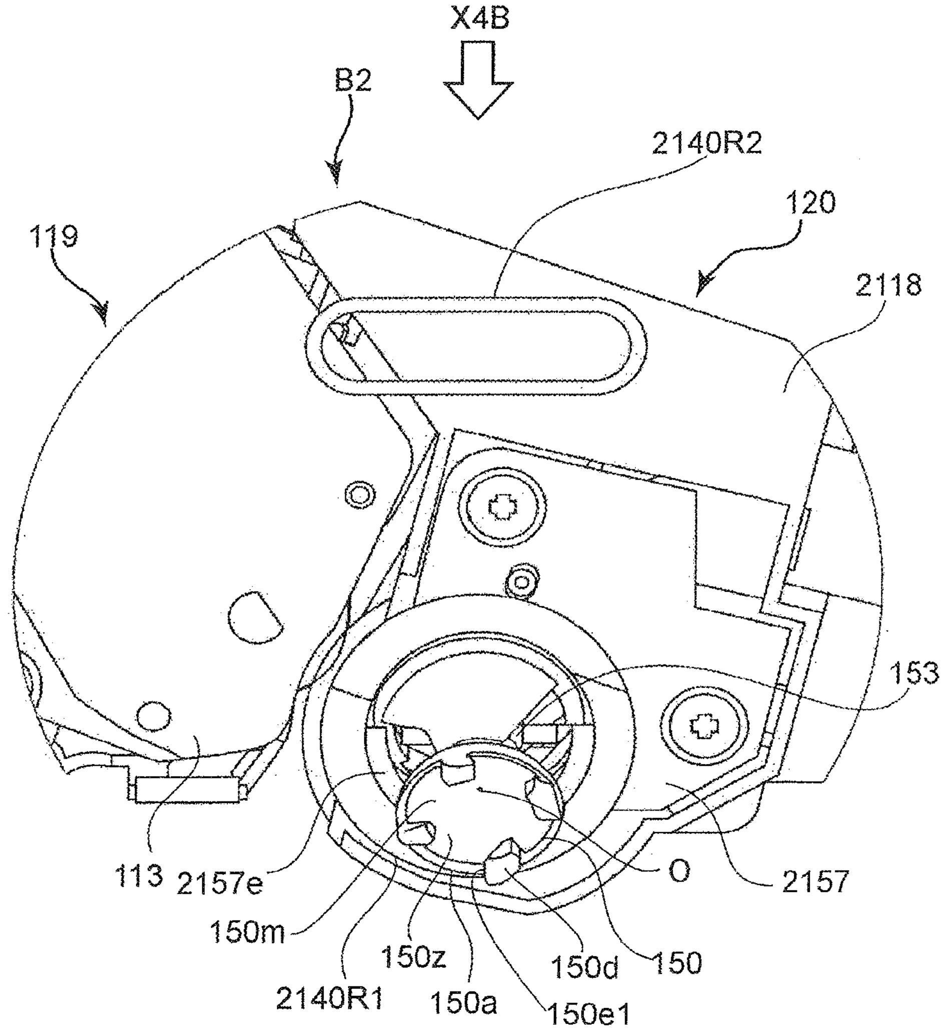
FIG. 43 is a side view of the driving side of the cartridge according to the embodiment of the present invention.
Figure 44:
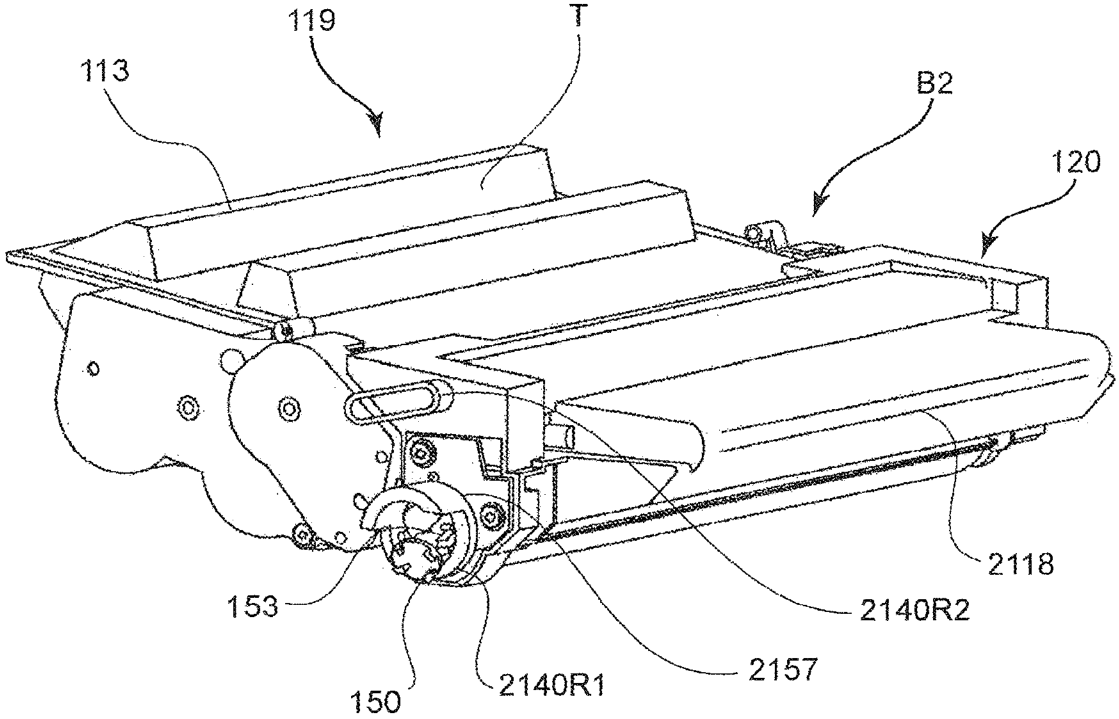
FIG. 44 is a perspective view as seen from the driving side of the cartridge according to the embodiment of the present invention.
Figure 45:
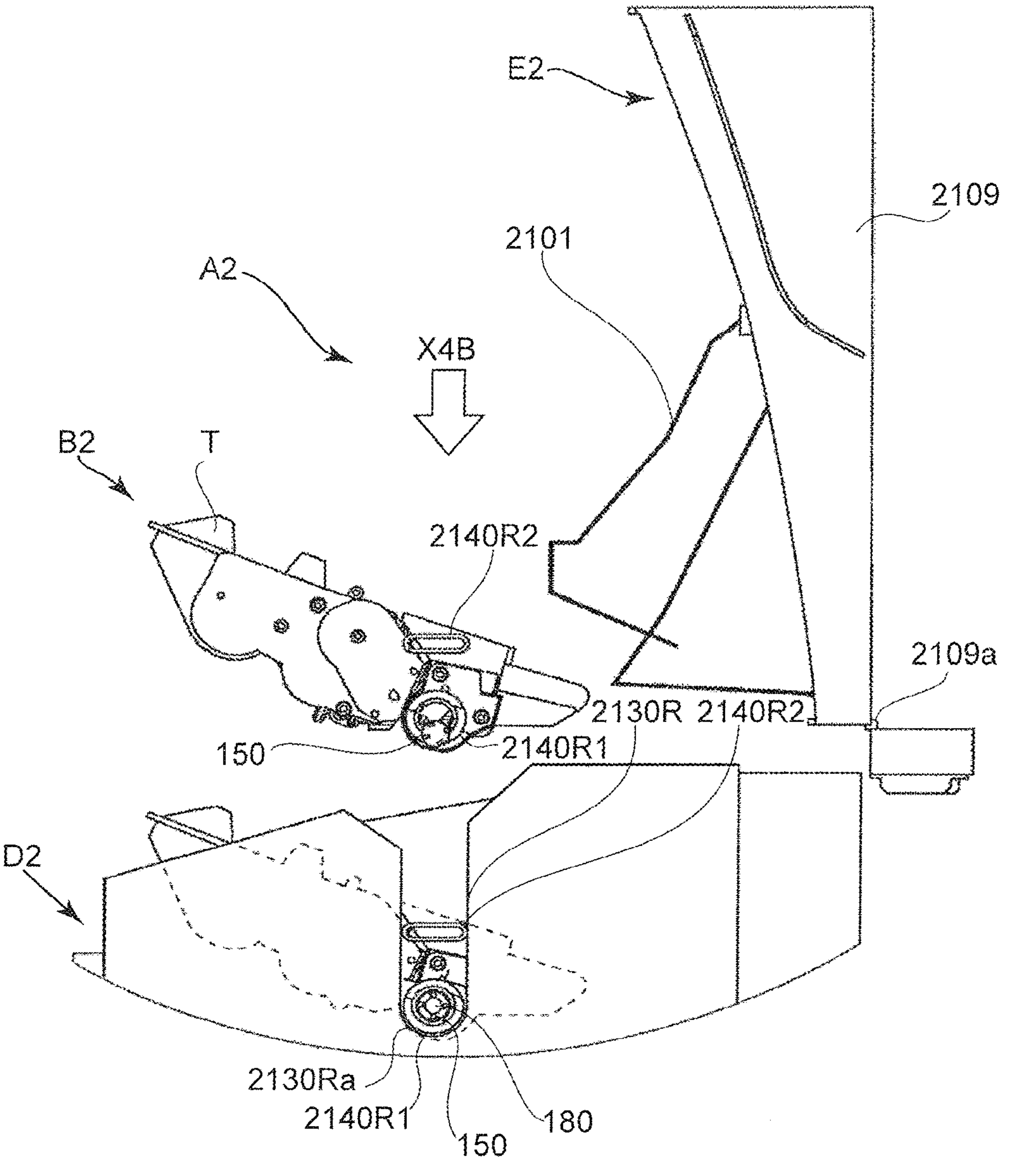
FIG. 45 is side view which illustrates an inserting state of the cartridge to the apparatus main assembly according to the embodiment of the present invention.

FIG. 41 is a sectional view which illustrates a state where a door of an apparatus main assembly A is open. FIG. 42 is a perspective view which illustrates a mounting guide. FIG. 43 is the enlarged view of a driving side surface of the cartridge. FIG. 44 is a perspective view, as seen from a driving side, of the cartridge. FIG. 45 shows a view which illustrates a state of inserting the cartridge into an apparatus main assembly.

In this embodiment, for example, as in the case of the clamshell type image forming device, the cartridge is mounted downwardly. A typical clamshell type image forming apparatus is shown in FIG. 41. The apparatus main assembly A2 comprises a lower casing D2 and an upper casing E2. And, the upper casing E2 is provided with a door 2109 and an inside exposure device 2101 of the door 2109. Therefore, when the upper casing E2 is opened upward, the exposure device 2101 retracts. And, an upper portion of the cartridge set portion 2130*a* is opened. When the user mounts the cartridge B-2 to a set portion 2130*a*, the user drops the cartridge B-2 on X4B downward. The mounting completes with this, and therefore, the mounting of the cartridge is easy. In addition, the jam clearance operation of the adjacent a fixing device 105 can effect from the device upper portion. Therefore, it excels in the easiness of the jam clearance. Here, the jam clearance is the operation for a removing a recording material 102 jammed in the course of the feeding.

More specifically, the set portion for the cartridge B-2 will be described. As shown in FIG. 42, the image forming device A2 is provided with a mounting guide 2130R in a driving side, and is provided with a mounting guide unshown in a non-driving side opposed to it As mounting means 2130. The set portion 2130*a* is formed as the space surrounded by the guides to oppose. The rotational force is transmitted to the coupling 150 of the cartridge B-2 provided at this set portion 2130*a* from the apparatus main assembly A.

The mounting guide 2130R is provided with a groove 2130*b* which extends in the perpendicular direction substantially. In addition, an abutting portion 2130Ra for determining the cartridge B-2 at the predetermined position is provided in the lowermost portion thereof. In addition, a drive shaft 180 projects from the groove 2130*b*. In the state where the cartridge B-2 is positioned in the predetermined position, the drive shaft 180 transmits the rotational force to the coupling 150 from the apparatus main assembly A. In addition, in order to position the cartridge B-2 in the predetermined position assuredly, an urging spring 2188R is provided in the lower part of the mounting guide 2130R. By the structure described above, the cartridge B-2 is positioned in the set portion 2130*a*.

As shown in FIG. 43 and FIG. 44, the cartridge B-2 is provided with the cartridge side mounting guides 2140R1 and 2140R2. The orientation of the cartridge B-2 is stabilized by this guide at the time of the mounting. And, the mounting guide 2140R1 is integrally formed on the drum bearing member 2157. In addition, the mounting guide 2140R2 is provided substantially above the mounting guide 2140R1. And, the guide 2140R2 is provided in the second frame 2118, and it is in the form of a rib.

The mounting guides 2140R1, 2140R2 of the cartridge B-2 and the mounting guide 2130R of the apparatus main assembly A2 have the structures described above. More particularly, it is the same as that of the structure of the guide which has been described in conjunction with FIGS. 2 and 3. In addition, the structure of the guide of the other end is also the same. Therefore, the cartridge B-2 is mounted while being moved to the apparatus main assembly A2 in the direction substantially perpendicular to the direction of the axis L3 of the drive shaft 180, and, in addition, it is similarly demounted from the apparatus main assembly A2.

As shown in FIG. 45, at the time of mounting the cartridge B-2, the upper casing E2 is clockwisely rotated about a shaft 2109*a* and, the user brings the cartridge B-2 to the upper portion of the lower casing D2. At this time, the coupling 150 is inclined downwardly by the weight FIG. 43. In other words, the axis L2 of the coupling inclines relative to the drum axis L1 so that the driven portion 150*a* of the coupling 150 may face down the pre-engagement angular position.

In addition, as has been described with respect to Embodiment 1, FIGS. 9 and 12, it is desirable to provide the semi-circular retention rib 2157*e* FIG. 43. In this embodiment, the mounting direction of the cartridge B-2 is downward. Therefore, the rib 2157*e* is disposed in the lower part. By this, as has been described with respect to Embodiment 1, the axis L1 and the axis L2 are pivotable relative to each other, and the retention of the coupling 150 is accomplished. The retention rib prevents the coupling 150 from separating from the cartridge B-2. When the coupling 150 is mounted to the photosensitive drum 107, it is preventing separation from the photosensitive drum 107*k*.

In this state, as shown in FIG. 45, the user lowers the cartridge B-2 downwardly, aligning the mounting guides 2140R1, 2140R2 of the cartridge B-2 with the mounting guides 2130R of the apparatus main assembly A2. The cartridge B-2 can be mounted to the set portion 2130*a* of the apparatus main assembly A2 only by this operation. In this mounting process, similarly to Embodiment 1, FIG. 22, the coupling 150 can be engaged with the drive shaft 180 of the apparatus main assembly (the coupling takes the rotational force transmitting angular position in this state). More particularly, by moving in cartridge B-2 in the direction substantially perpendicular to the direction of the axis L3 of the drive shaft 180, the coupling 150 is engaged with the drive shaft 180. In addition, at the time of demounting the cartridge, similarly to Embodiment 1, the coupling 150 can be disengaged from the drive shaft 180 only by the operation which demounts the cartridge (the coupling moves to the disengaging angular position from the rotational force transmitting angular position, FIG. 25). More particularly, by moving the cartridge B-2 in the direction substantially perpendicular to the direction of the axis L3 of the drive shaft 180, the coupling 150 is disengaged from the drive shaft 180.

As has been described hereinbefore, since the coupling inclines downwardly by the weight when downwardly mounting the cartridge to the apparatus main assembly, it can engage with the drive shaft of the apparatus main assembly assuredly.

In this embodiment, the clamshell type image forming device has been described. However, the present invention is not limited to such an example. For example, the present embodiment can be applied if the mounting direction of the cartridge is downward. In addition, the mounting path thereof is not limited to straight downward. For example, it may be inclined downward in initial mounting stage of the cartridge, and it may become downward finally. The present embodiment is effective if the mounting path immediately before reaching the predetermined position (the cartridge set portion) is downward.

Embodiment 4

Referring to FIG. 46-FIG. 49, the fourth embodiment of the present invention will be described.

In this embodiment, means to maintain the axis L2 at the inclined state relative to the axis L1 will be described.

Only the member relating to the description of this portion of the present embodiment is shown in the drawing, and the other members are omitted. It is similar also in the other embodiments as will be described hereinafter.

Figure 46:
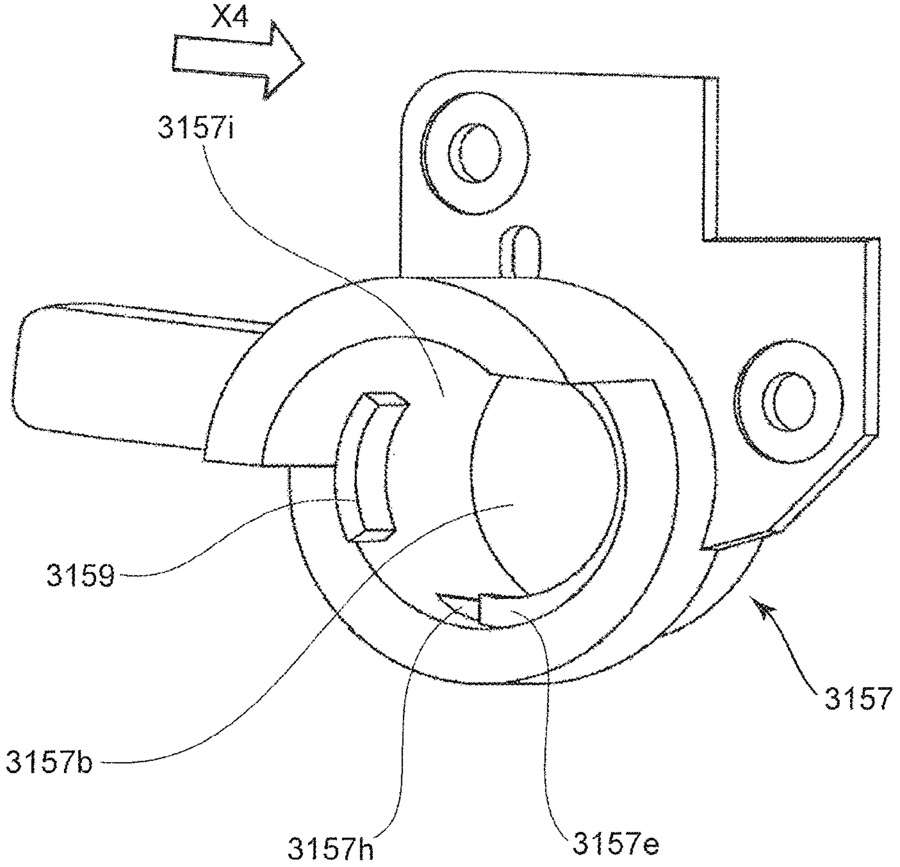
FIG. 46 is a perspective view which illustrates an attaching state of a locking member to a drum bearing member according to a fourth embodiment of the present invention.
Figure 47:
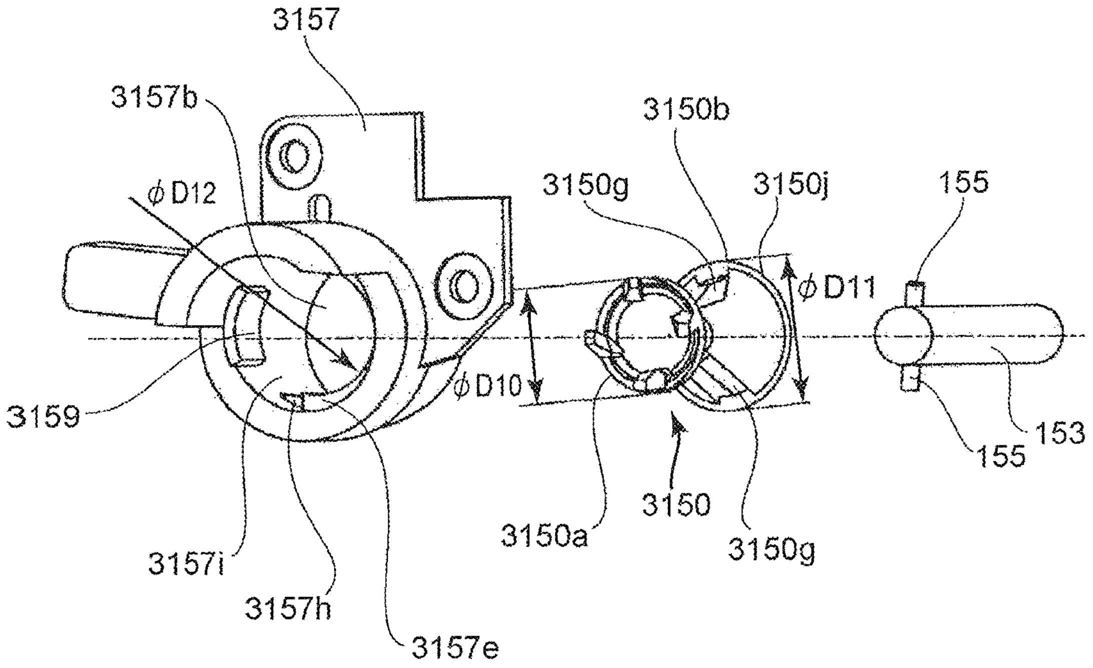
FIG. 47 is an exploded perspective view which illustrates the drum bearing member, a coupling, and a drum shaft according to the embodiment of the present invention.
Figure 48:
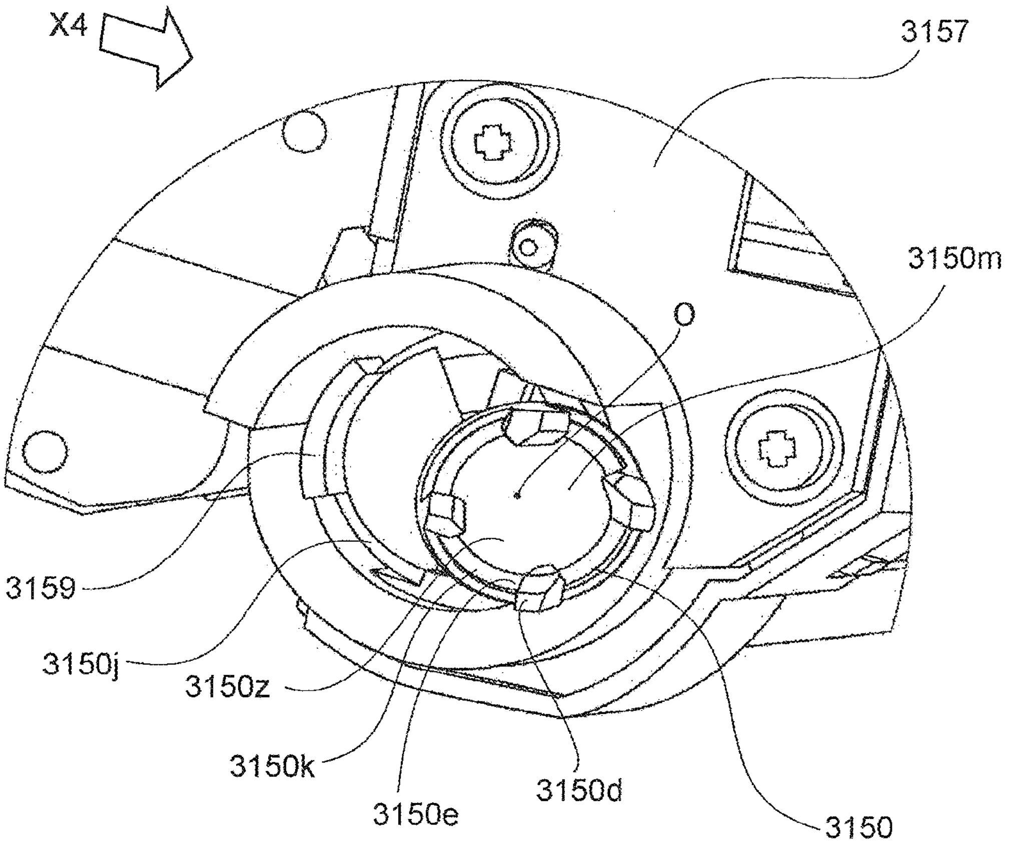
FIG. 48 is a perspective view which illustrates a driving side of the cartridge according to the embodiment of the present invention.
Figure 49:
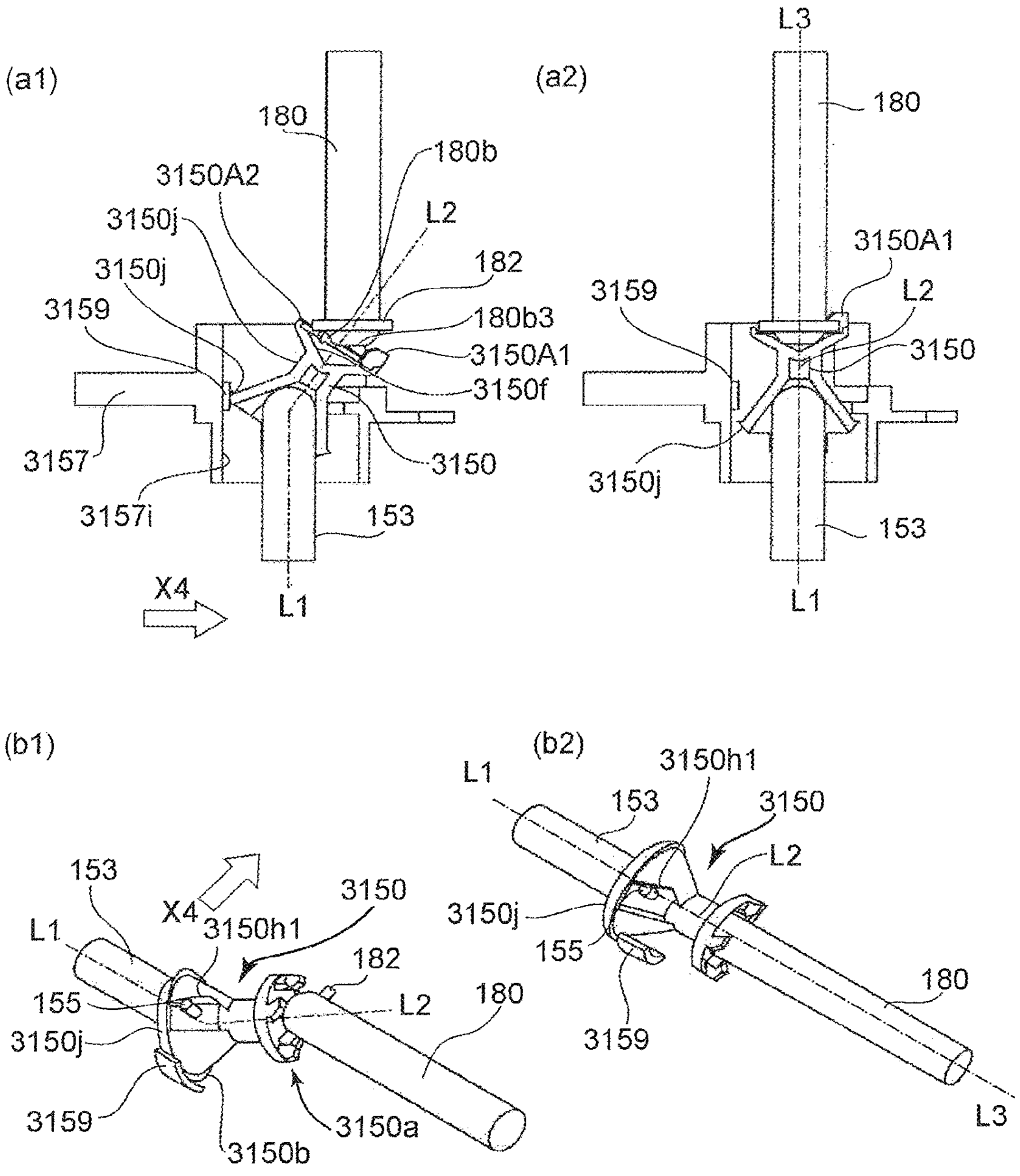
FIG. 49 is perspective views and longitudinal sectional views which illustrate an engaged state between a drive shaft and a coupling according to the embodiment of the present invention.

FIG. 46 is a perspective view which illustrates a coupling locking member (this is peculiar to the present embodiment) pasted on the drum bearing member. FIG. 47 is an exploded perspective view which illustrates the drum bearing member, the coupling, and the drum shaft. FIG. 48 is an enlarged perspective view of a major part of the driving side of the cartridge. FIG. 49 is a perspective view and a longitudinal sectional view which illustrate an engaged state between the drive shaft and the coupling.

As shown in FIG. 46, the drum bearing member 3157 has a space 3157*b* which surrounds a part of coupling. A coupling locking member 3159 as a maintaining member for maintaining the inclination of the coupling 3150 is pasted on a cylinder surface 3157*i* which constitutes the space thereof. As will be described hereinafter, this locking member 3159 is a member for maintaining temporarily the state where the axis L2 inclines relative to the axis L1. In other words, as shown in FIG. 48, the flange portion 3150*j* of the coupling 3150 contacts to this locking member 3159. By this, the axis L2 maintains the state of inclining toward the downstream with respect to the mounting direction (X4) of the cartridge relative to the axis L1 (FIG. 49(*a*1)). Therefore, as shown in FIG. 46, the locking member 3159 is disposed on the upstream cylinder surface 3157*i* of the bearing member 3157 with respect to the mounting direction X4. As the material of the locking member 3159, the material which has a relatively high coefficient of friction, such as the rubber and the elastomer, or the elastic materials, such as the sponge and the flat spring, are suitable. This is because, the inclination of the axis L2 can be maintained by the frictional force, the elastic force, and so on. In addition, similarly to Embodiment 1 (it illustrates in FIG. 31), the bearing member 3157 is provided with the inclining direction regulation rib 3157*h*. The inclining direction of the coupling 3150 can be assuredly determined by this rib 3157*h*. In addition, the flange portion 3150*j* and the locking member 3159 can contact relative to each other more assuredly. Referring to FIG. 47, the assembly method of the coupling 3150 will be described. As shown in FIG. 47, the pin (rotational force receiving portion) 155 enters the standing-by space 3150*g* of the coupling 3150. In addition, a part of coupling 3150 is inserted into the space portion 3157*b* which the drum bearing member 3157 has. At this time, preferably, a distance D12 between an inner surface end of the rib 3157*e* and the locking member 3159 is set, so that it is larger than maximum outer diameter of the driven portion 3150*a* ΦD10. In addition, the distance D12 is set so that it is smaller than the maximum outer diameter of the driving portion 3150*b* ΦD11. By this, the bearing member 3157 can be assembled straight. Therefore, the assembling property is improved. However, the present embodiment is not limited to this relation.

Referring to FIG. 49, the engaging operation (a part of mounting operation of the cartridge) for engaging the coupling 3150 with the drive shaft 180 will be described. FIGS. 49(*a*1) and (*b*1) illustrate the state immediately before the engagement, and FIGS. 49(*a*2) and (*b*2) illustrate the state of the completion of the engagement.

As shown in FIG. 49(*a*1) and FIG. 49(*b*1), the axis L2 of the coupling 3150 inclines toward the downstream with respect to the mounting direction X4 relative to the axis L1 beforehand by the force of the locking member 3159 (pre-engagement angular position). By this inclination of the coupling 3150, by, in the direction of the axis L1, the downstream (with respect to the mounting direction) free end portion 3150A1 is closer to the photosensitive drum 107 direction side than the drive shaft free end 180*b*3. And, the upstream (with respect to the mounting direction) free end portion 3150A2 is closer to the pin 182 than the free end 180*b*3 of the drive shaft 180 in addition, at this time, as has been described in the foregoing, the flange portion 3150*j* is contacted to the locking member 3159. And, the inclined state of the axis L2 is maintained by the frictional force thereof.

Thereafter, the cartridge B moves to the mounting direction X4. By this, the free end surface 180*b* or the free end of the pin 182 contacts to the driving shaft receiving surface 3150*f* of the coupling 3150. And, the axis L2 approaches to the direction in parallel with the axis L1 by the contact force (mounting force of the cartridge) thereof. At this time, the flange portion 3150*j* is departed from the locking member 3159, and becomes into the non-contact state. And, finally, the axis L1 and the axis L2 are substantially co-axial with each other. And, the coupling 3150 is in the waiting (stand-by) state for transmitting the rotational force (FIG. 49(*a*2), (*b*2)). (rotational force transmitting angular position).

Similarly to Embodiment 1, from the motor 186, the rotational force is transmitted through the drive shaft 180 to the coupling 3150, the pin (rotational force receiving portion) 155, the drum shaft 153, and the photosensitive drum 107. The axis L2 is substantially co-axial with the axis L1 at the time of the rotation. Therefore, the locking member 3159 is not in contact with the coupling 3150. Therefore, the locking member 3159 does not affect the rotation of the coupling 3150.

In addition, the operations follow the step similar to Embodiment 1 in the process in which the cartridge B is taken out from the apparatus main assembly A (FIG. 25). In other words, the free end portion 180*b* of the drive shaft 180 pushes the driving shaft receiving surface 3150*f* of the coupling 3150. By this, the axis L2 inclines relative to the axis L1, and the flange portion 3150*j* is brought into contact to the locking member 3159. By this, the inclined state of the coupling 3150 is maintained again. In other words, the coupling 3150 moves to the pre-engagement angular position from the rotational force transmitting angular position.

As has been described hereinbefore, the inclined state of the axis L2 is maintained by the locking member 3159 (maintaining member). By this, the coupling 3150 can be more assuredly engaged with the drive shaft 180.

In this embodiment, the locking member 3159 is pasted on the upstreammost portion, with respect to cartridge mounting direction X4, of the inner surface 3157*i* of the bearing member 3157. However, the present invention is not limited to this example. For example, when the axis L2 inclines, any position which can maintain the inclined state thereof is usable.

In addition, in this embodiment, the locking member 3159 is contacted to the flange portion 3150*j* provided in the driving portion 3150*b* (FIG. 49(*b*1)) side. However, the contact position may be the driven portion 3150*a*.

In addition, the locking member 3159 used in this embodiment is a separate member in the bearing member 3157. However, the present embodiment is not limited to this example. For example, the locking member 3159 may be integrally molded with the bearing member 3157 (for example, two-color molding). Or, the bearing member 3157 may be directly contacted to the coupling 3150 in place of the locking member 3159. Or the surface thereof may be roughened for the purpose of raising the coefficient of friction.

In addition, in this embodiment, the locking member 3159 is pasted on the bearing member 3157. However, if the locking member 3159 is the member fixed to the cartridge B, it may be pasted on any position.

Embodiment 5

Referring to FIG. 50-FIG. 53, the fifth embodiment of the present invention will be described.

In the present embodiment, another means for maintaining in the state of inclining the axis L2 relative to the axis L1 will be described.

Figure 50:
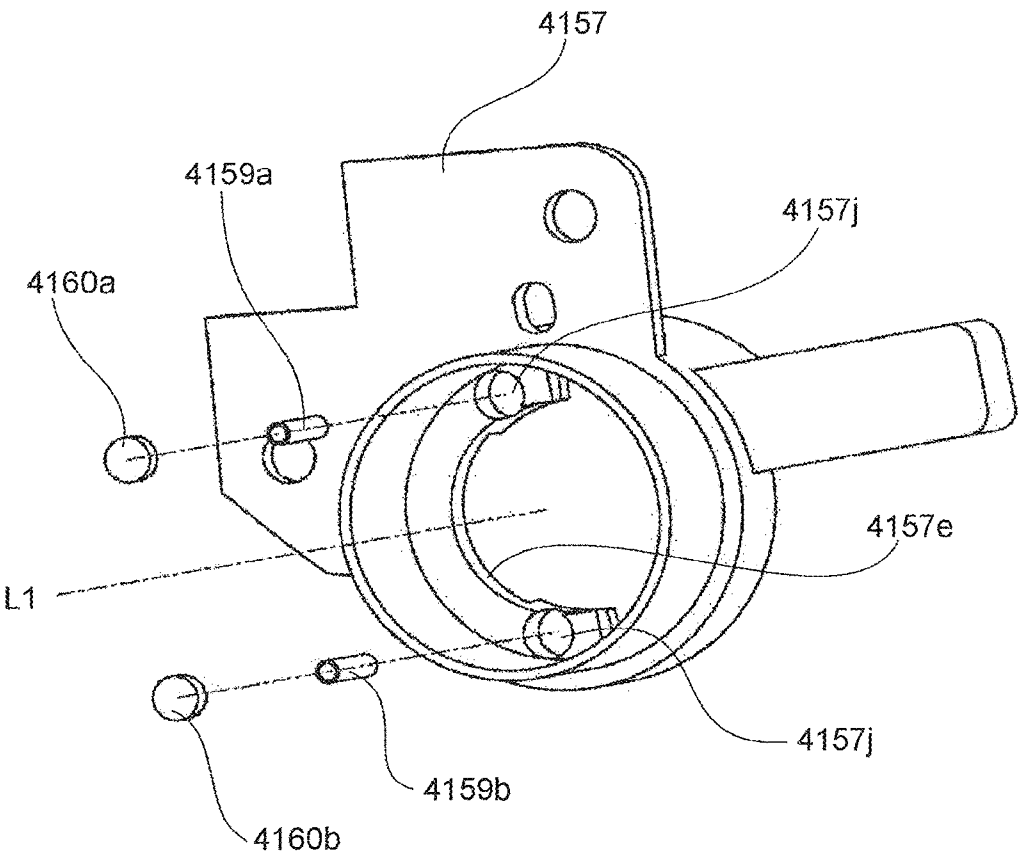
FIG. 50 is an exploded perspective view which illustrates a state where a pressing member was mounted to a drum bearing member according to a fifth embodiment of the present invention.
Figure 51:
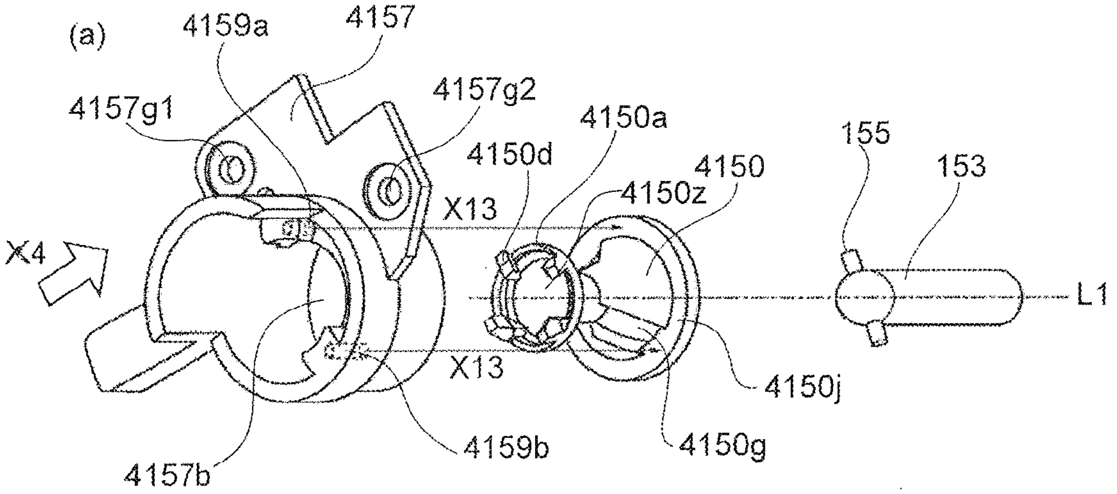
FIG. 51 is exploded perspective views which illustrate the drum bearing member, a coupling, and a drum shaft according to the embodiment of the present invention.
Figure 51:
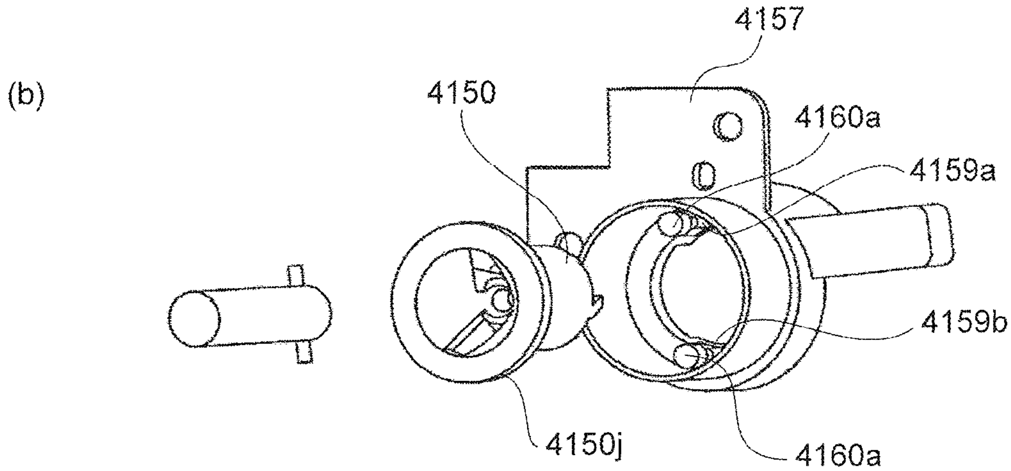
Figure 52:
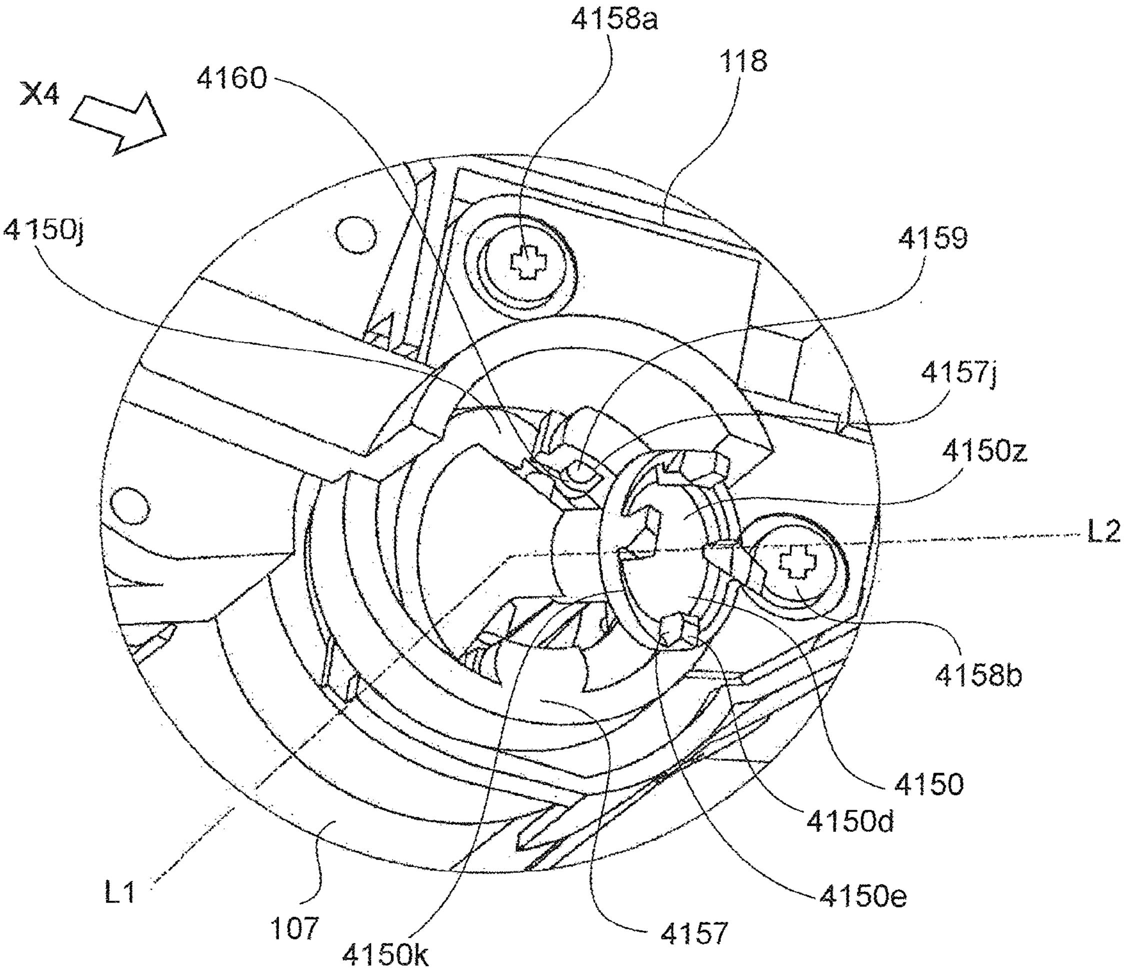
FIG. 52 is a perspective view which illustrates the driving side of a cartridge according to the embodiment of the present invention.
Figure 53:
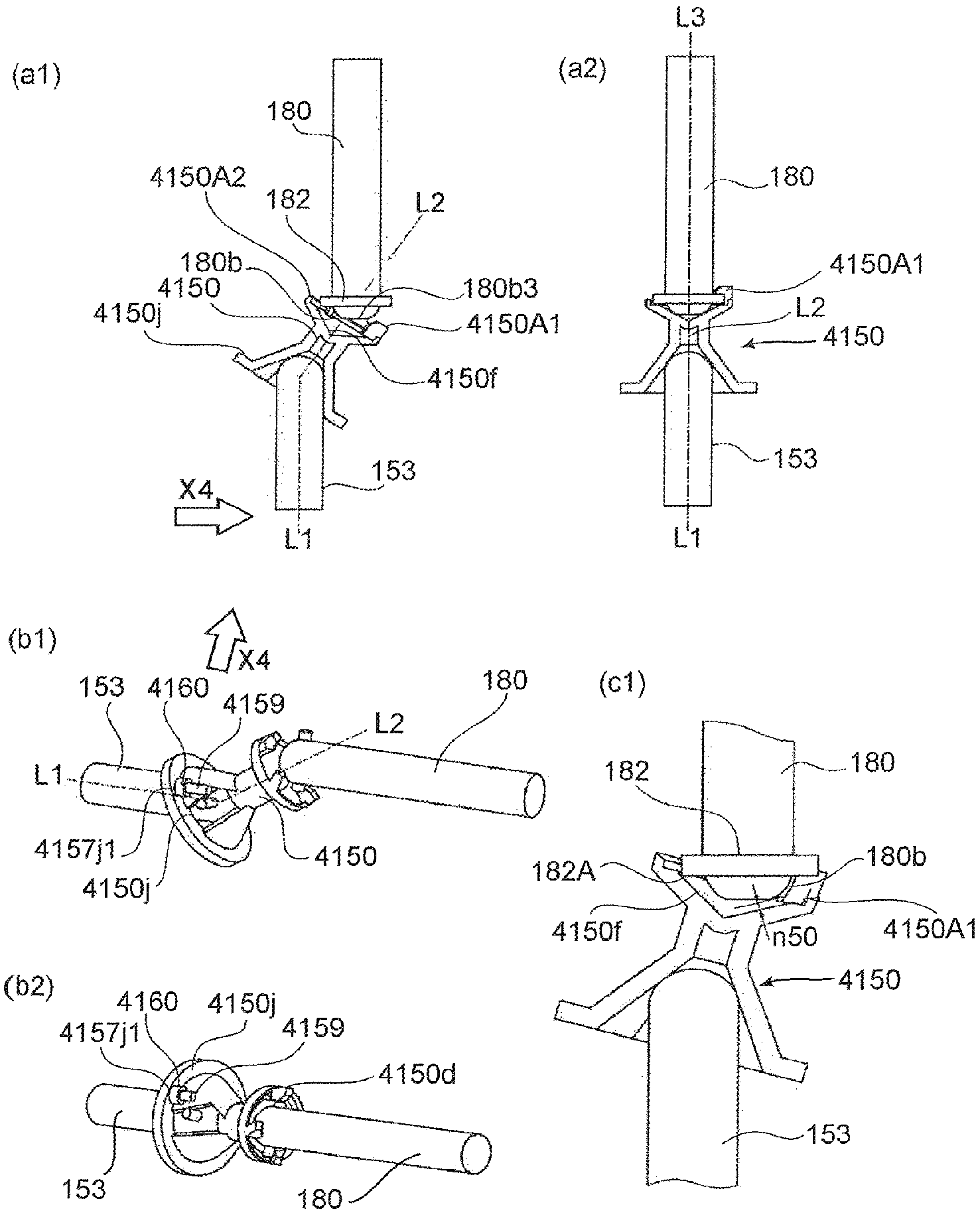
FIG. 53 is perspective views and longitudinal sectional views which illustrate an engaged state between a drive shaft and the coupling according to the embodiment of the present invention.

FIG. 50 is an exploded perspective view of the coupling urging member (it is peculiar to the present embodiment) mounted to the drum bearing member. FIG. 51 is an exploded perspective view which illustrates the drum bearing member, the coupling, and the drum shaft. FIG. 52 is an enlarged perspective view of a major part of the driving side of the cartridge. FIG. 53 is a perspective view and a longitudinal sectional view which illustrate the drive shaft and the engaged state between the coupling.

As shown in FIG. 50, a retaining hole 4157*j* is provided in the retention rib 4157*e* of the drum bearing member 4157. A coupling urging members 4159*a*, 4159*b* as a maintaining member for maintaining the inclination of the coupling 4150 in the retaining hole 4157*j* thereof are mounted. The urging members 4159*a*, 4159*b* urge the coupling 4150, so that the axis L2 inclines toward the downstream with respect to the mounting direction of the cartridge B-2 relative to the axis L1. Each urging member 4159*a*, 4159*b* is a coiled compression spring (elastic material). As shown in FIG. 51, the urging members 4159*a*, 4159*b* urge the flange portion 4150*j* of the coupling 4150 toward the axis L1 (arrow of FIG. 51 an X13). The contact position where the urging members contact with the flange portion 4150*j* is the downstream of the center of the drum shaft 153 with respect to the cartridge mounting direction X4. Therefore, as for the axis L2, the driven portion 4150*a* side inclines toward the downstream with respect to the mounting direction (X4) of the cartridge relative to the axis L1 by the elastic force by the urging member 4159*a*, 4159*b* (FIG. 52).

In addition, as shown in FIG. 50, the coupling side free end of each urging member 4159*a*, 4159*b* which is the coil spring is provided with a contact member 4160*a*, 4160*b*. The contact member 4160*a*, 4160*b* contacts the flange portion 4150*j*. Therefore, the material of the contact member 4160*a*, 4160*b* is preferably material of the high slidability. In addition, by using such the material, as will be described hereinafter, at the time of the rotational force transmission, the influence to the rotation of the coupling 4150 of an urging force by the urging member 4159*a*, 4159*b* is lessened. However, if the load relative to the rotation is sufficiently small, and the coupling 4150 satisfactorily rotates, the contact members 4160*a*, 4160*b* is not be inevitable).

In the present embodiment, two urging members are provided. However, if the axis L2 can incline toward the downstream with respect to the mounting direction of the cartridge relative to the axis L1, the number of the urging members may be any. For example, in the case of the single urging member, as for the energizing position, it is desirably the downstreammost position with respect to the mounting direction X4 of the cartridge. By this, the coupling 4150 can be stably inclined toward the downstream with respect to the mounting direction.

In addition, the urging member is a compression coil spring in the present embodiment. However, as the urging member, if an elastic force can be produced as with the flat spring, the torsion spring, the rubber, the sponge, and so on, it may be any. However, in order to incline the axis L2, a certain amount of stroke is required. Therefore, as with the coil spring etc, it is desirable that the stroke can be provided.

Referring to FIG. 51, the description will be made about the mounting method of the coupling 4150.

As shown in FIG. 51, the pin 155 enters the standing-by space 4150*g* of the coupling 4150. And, a part of coupling 4150 is inserted into the space 4157*b* of the drum bearing member 4157. At this time, as has been described hereinbefore, the urging members 4159*a*, 4159*b* push the flange portion 4157*j* onto the predetermined position through the contact member 4160*a*, 4160*b*. The screw (4158*a* of FIG. 52, 4158*b*) is threaded into the hole 4157*g* 1 or 4157*g*2 provided in the bearing member 4157, by which, the bearing member 4157 is fixed to the second frame 118. By this, the urging force to the coupling 4150 by the urging member 4159*a*, 4159*b* can be assured. And, the axis L2 is inclined relative to the axis L1 (FIG. 52).

Referring to FIG. 53, the operation (a part of mounting operation of the cartridge) of engaging the coupling 4150 with the drive shaft 180 will be described. FIGS. 53(*a*1) and (*b*1) illustrate the state immediately before the engagement, FIGS. 53 (*a*2) and (*b*2) illustrate the state of the engagement completion, and FIG. 53(*c*1) illustrates the state therebetween.

In FIGS. 53(*a*1) and (*b*1), the axis L2 of the coupling 4150 inclines toward the mounting direction X4 relative to the axis L1 beforehand (pre-engagement angular position). By the coupling 4150 inclining, the downstream free end position 4150A1 with respect to the direction of the axis L1 is closer to the photosensitive drum 107 than the free end 180*b*3. In addition, the free end position 4150A2 is closer to the pin 182 than the free end 180*b*3. In other words, as has been described hereinbefore, the flange portion 4150*j* of the coupling 4150 is pressed by the urging member 4159. Therefore, the axis L2 is inclined relative to the axis L1 by the urging force thereof.

Thereafter, by the cartridge B moving to the mounting direction X4, the free end surface 180*b* or the free end (the main assembly side engaging portion) of the pin (rotational force applying portion) 182 is brought into contact to the driving shaft receiving surface 4150*f* or the projection 4150*d* of the coupling 4150 (the cartridge side contact portion). FIG. 53 (*c*1) illustrates the state where the pin 182 is in contact with the receiving surface 4150*f*. And, the axis L2 approaches toward the direction in parallel with the axis L1 by the contact force (mounting force of the cartridge). Simultaneously, the pressing portion 4150*j*1 pressed by the elastic force of the spring 4159 provided in the flange portion 4150*j* moves in the compression direction of the spring 4159. And, finally, the axis L1 and the axis L2 becomes co-axial. And, the coupling 4150 takes the standby position for effecting the transmission of the rotational force (Figure (rotational force transmitting angular position) 53 (*a*2, *b*2)).

Similarly to Embodiment 1, the rotational force is transmitted to the coupling 4150, the pin 155, the drum shaft 153, and the photosensitive drum 107 through the drive shaft 180 from the motor 186. The urging force of the urging member 4159 act on the coupling 4150 at the time of the rotation. However, as has been described hereinbefore, the urging force of the urging member 4159 act to the coupling 4150 through the contact member 4160. Therefore, the coupling 4150 can be rotated without high load. In addition, the contact member 4160 may not be provided if the driving torque of the motor 186 is sufficiently large. In this case, even if the contact member 4160 is not provided, the coupling 4150 can transmit the rotational force with high precision.

In addition, in the process in which the cartridge B is demounted from the apparatus main assembly A, the step opposite from the step to mount is followed. In other words, the coupling 4150 is normally urged to the downstream with respect to the mounting direction X4 by the urging member 4159. Therefore, in the dismounting process of the cartridge B, the receiving surface 4150*f* is in contact with the free end portion 182A of the pin 182 in the upstream side with respect to the mounting direction X4 (FIG. 53(*c*1)). In addition, a gap n50 is necessarily provided between the free end 180*b* of the transmitting surface 4150*f* and the drive shaft 180 in the downstream with respect to the mounting direction X4. In the above-described embodiments, in the dismounting process of the cartridge, the receiving surface 150*f* or the projection 150*d* in the downstream with respect to the mounting direction X4 of the coupling has been described as contacting to the free end portion 180*b* of the drive shaft 180 at least (for example, FIG. 25). However, as in the present embodiment, the receiving surface 150*f* or the projection 4150*d* in the downstream with respect to the mounting direction X4 of the coupling does not contact to the free end portion 180*b* of the drive shaft 180, but corresponding to the dismounting operation of the cartridge B, the coupling 4150 can separate from the drive shaft 180. And, even after the coupling 4150 departs from the drive shaft 180, by the urging force of the urging member 4159, the axis L2 inclines toward the downstream with respect to the mounting direction X4 relative to the axis L1 (disengaging angular position). More particularly, in this embodiment, the angle of the pre-engagement angular position and the angle of the disengaging angular position relative to the axis L1 are equivalent relative to each other. This is because the coupling 4150 is urged by the elastic force of the spring.

In addition, the urging member 4159 has the function of inclining the axis L2, and it further has the function of regulating the inclining direction of the coupling 4150. More particularly, the urging member 4159 functions also as the regulating means for regulating the inclining direction of the coupling 4150.

As has been described hereinbefore, in this embodiment, the coupling 4150 is urged by the elastic force of the urging member 4159 provided in the bearing member 4157. By this, the axis L2 is inclined relative to the axis L1. Therefore, the inclined state of the coupling 4150 is maintained. Therefore, the coupling 4150 can be assuredly engaged with the drive shaft 180.

The urging member 4159 described in this embodiment is provided in the rib 4157*e* of the bearing member 4157. However, the present embodiment is not limited to such an example. For example, it may be another portion of the bearing member 4157 and may be any member fixed to the cartridge B (other than the bearing member).

In addition, in this embodiment, the urging direction of the urging member 4159 is the direction of the axis L1. However, the urging direction may be any direction if the axis L2 inclines toward the downstream with respect to the mounting direction X4 of the cartridge B.

In addition, in order to incline the coupling 4150 more assuredly toward the downstream with respect to the mounting direction of the cartridge B, a regulating portion for regulating the inclining direction of the coupling may be provided in the process cartridge (FIG. 31).

In addition, in this embodiment, the energizing position of the urging member 4159 is at the flange portion 4150*j*. However, the position of the coupling may be any if the axis L2 is inclined toward the downstream with respect to the mounting direction of the cartridge.

In addition, the present embodiment may be implemented in combination with Embodiment 4. In this case, the mounting and dismounting operation of the coupling can further be ensured.

Embodiment 6

Referring to FIG. 54-FIG. 58, the sixth embodiment of the present invention will be described. In this embodiment, another means to maintain the state where the axis L1 is inclined relative to the axis L1 will be described.

Figure 54:
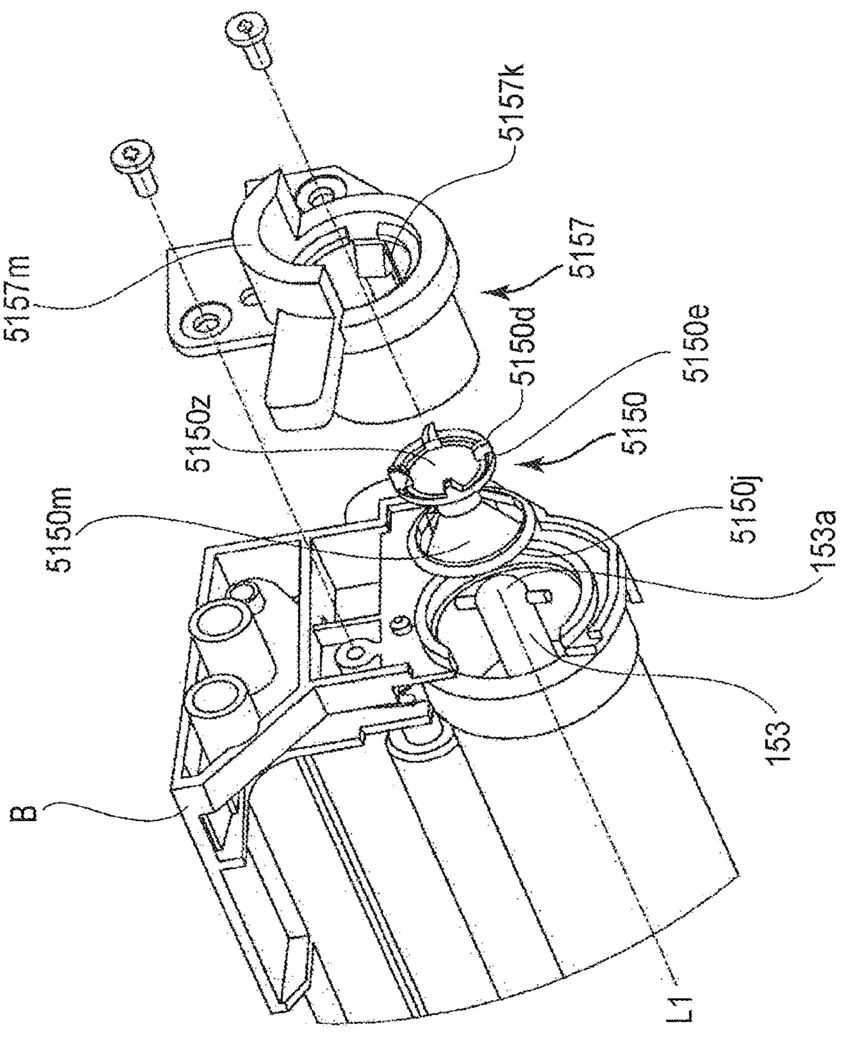
FIG. 54 is an exploded perspective view which illustrates a cartridge before assembling the major members according to a sixth embodiment of the present invention.
Figure 55:
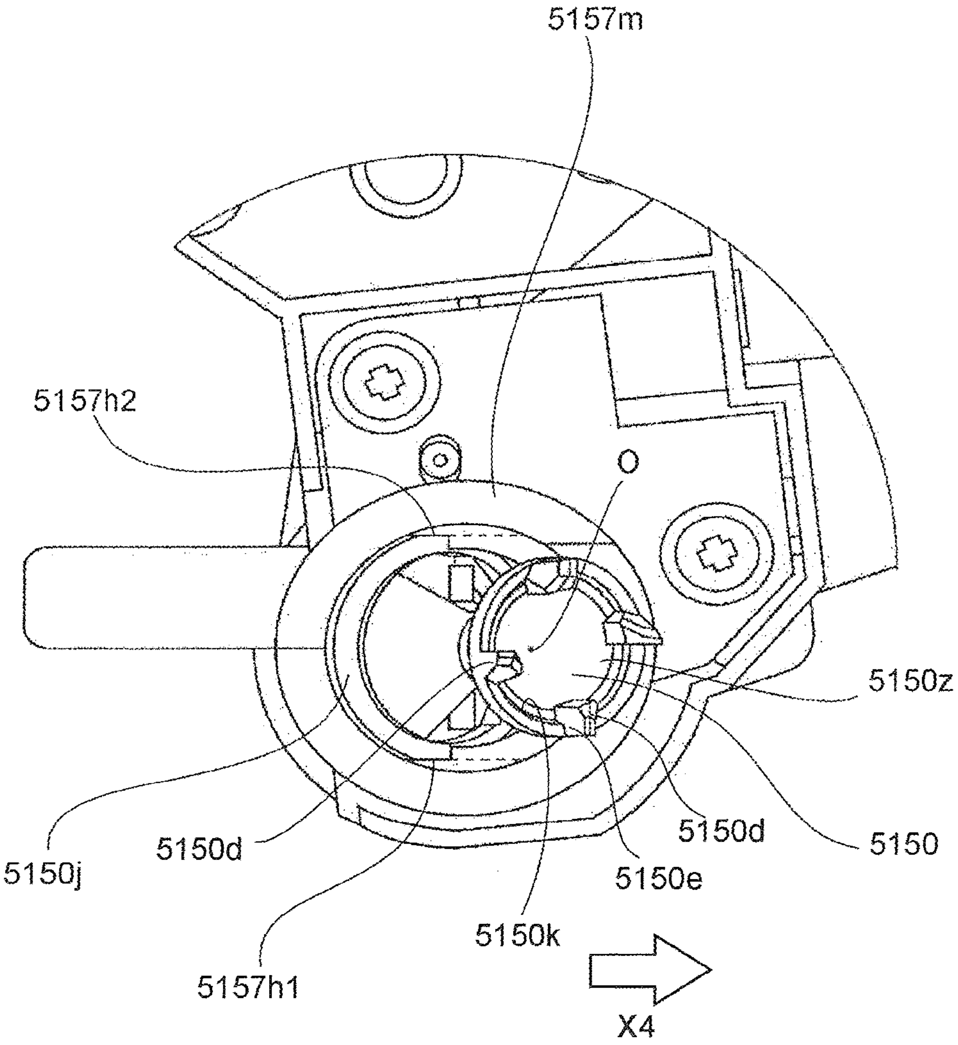
FIG. 55 is a side view which illustrates a driving side according to the embodiment of the present invention.
Figure 56:
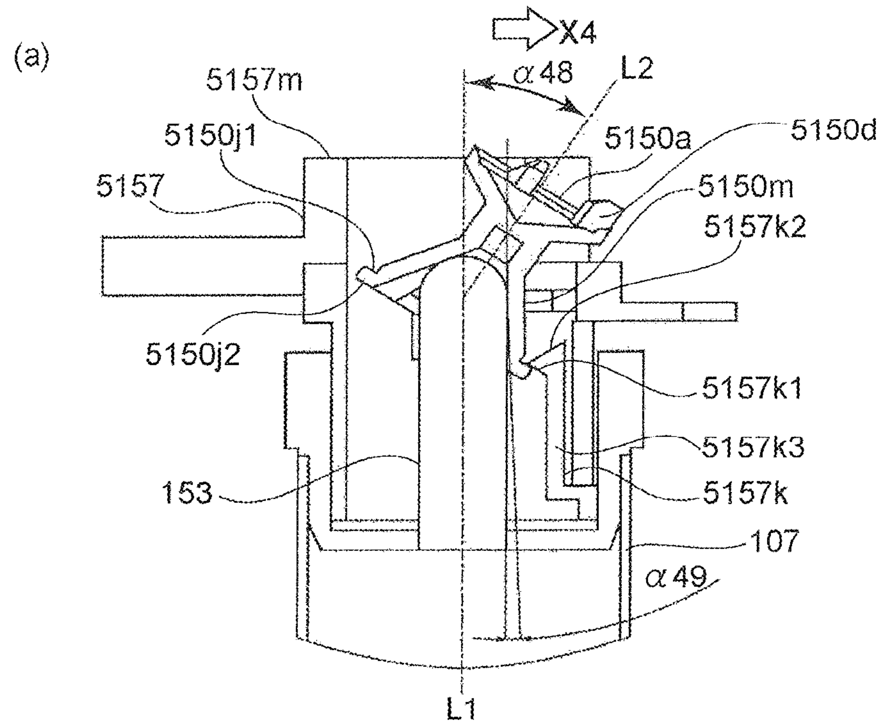
FIG. 56 is schematic longitudinal sectional views of a drum shaft and a coupling according to the embodiment of the present invention.
Figure 56:
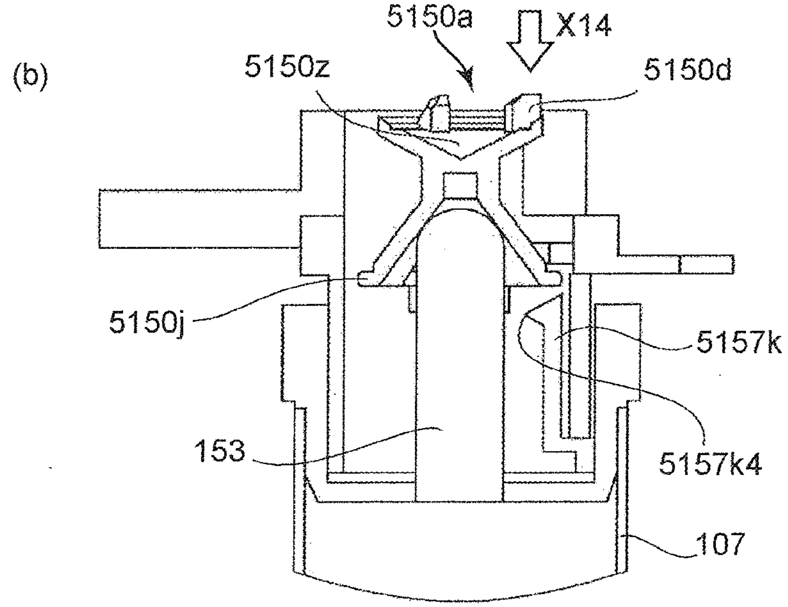
Figure 57:
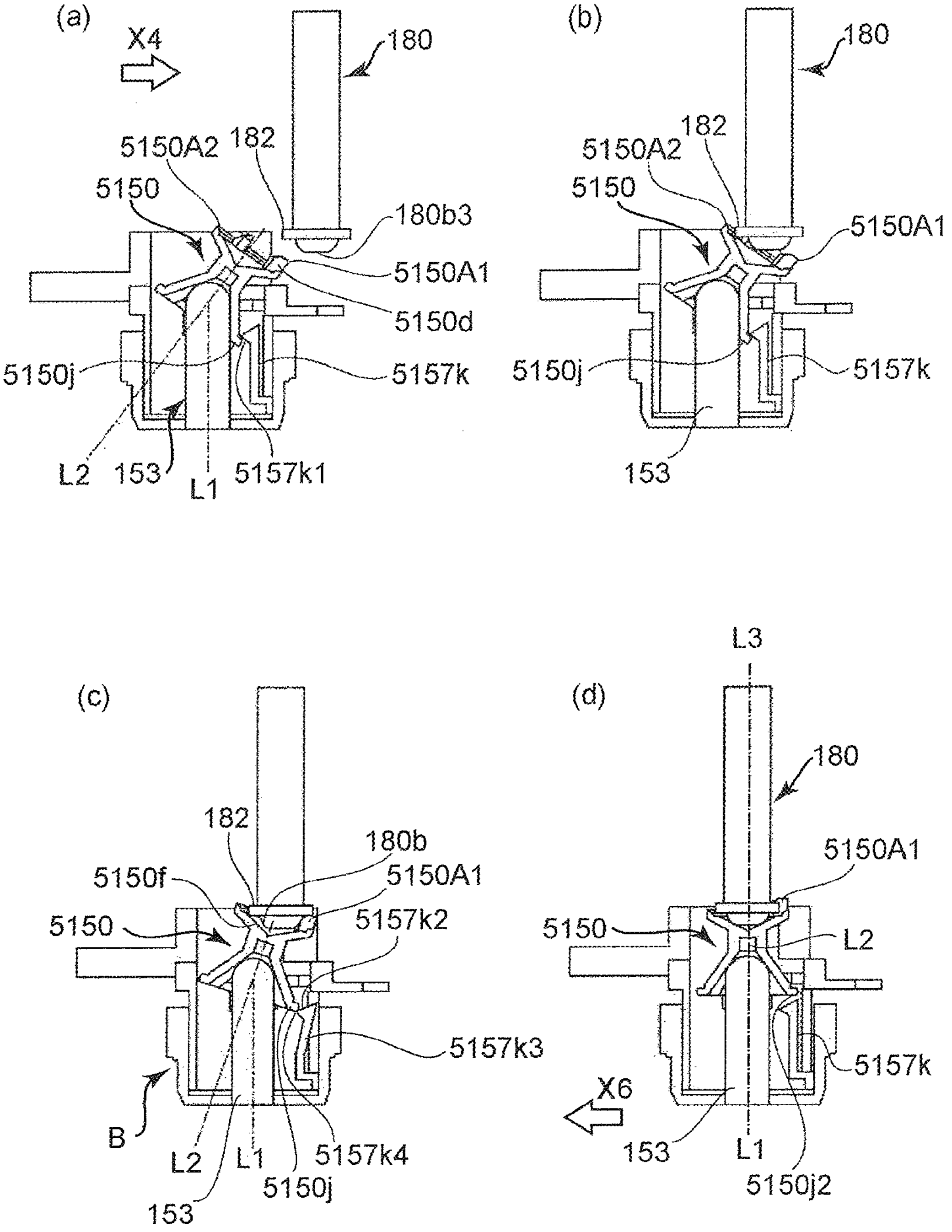
FIG. 57 is longitudinal sectional views which illustrate the engagement between a drive shaft and coupling according to the embodiment of the present invention.
Figure 58:
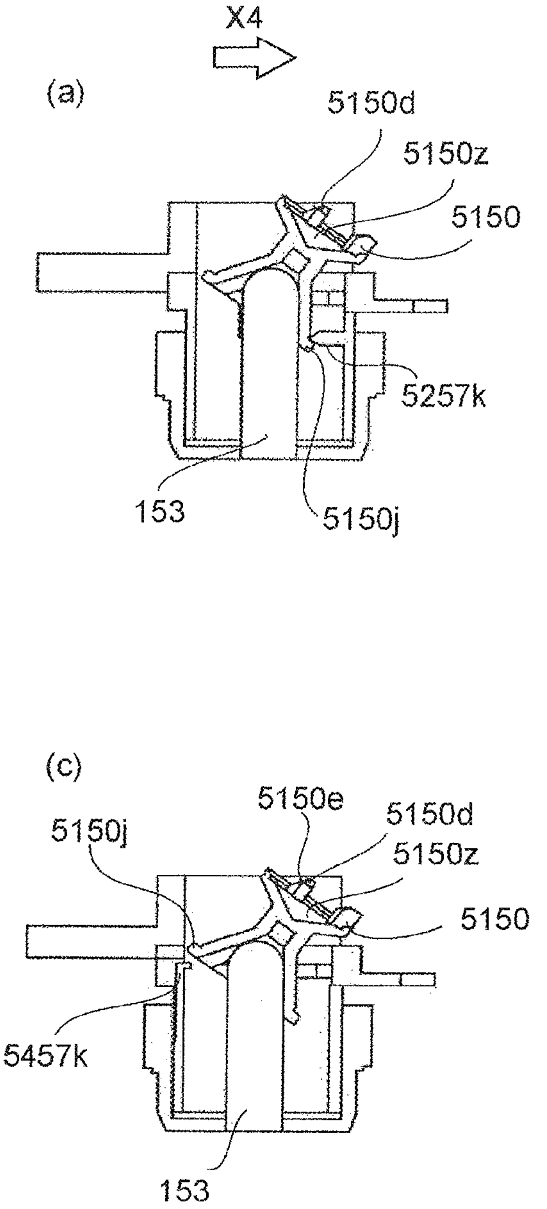
FIG. 58 is sectional views which illustrate a modified example of a coupling locking member according to the embodiment of the present invention.

FIG. 54 is an exploded perspective view of the process cartridge of this embodiment. FIG. 55 is an enlarged side view of the driving side of the cartridge. FIG. 56 is a schematic longitudinal sectional view of the drum shaft, the coupling, and the bearing member. FIG. 57 is a longitudinal sectional view which illustrates the operation which mounts the coupling relative to the drive shaft. FIG. 58 is a sectional view which illustrates a modified example of a coupling locking member.

As shown in FIG. 54 and FIG. 56, the drum bearing member 5157 is provided with a coupling locking member 5157*k*. At the time of assembling the bearing member 5157 in the direction of the axis L1, a part of a locking surface 5157*k*1 of the locking member 5157*k* engages with the upper surface 5150*j*1 of a flange portion 5150*j*, while contacting to the inclined surface 5150*m* of the coupling 5150. At this time, the flange portion 5150*j* is supported with the play (angle α 49), in the rotational direction, between locking surface 5157*k*1 of the locking portion 5157*k*, and circular column portion of the drum shaft 153 153*a*. The following effects are provided by providing this play (angle α49). More particularly, even if the dimensions of the coupling 5150, the bearing member 5157, and the drum shaft 153 vary within the limits of the tolerance thereof, an upper surface 5150*j*1 can be locked assuredly in a lock face 5157*k*1.

And, as shown in FIG. 56(*a*), as for the axis L2, the driven portion 5150*a* side relative to the axis L1 inclines toward the downstream with respect to the mounting direction (X4) of the cartridge. In addition, since the flange portion 5150*j* exists over the full-circumference, it can retain irrespective of the phase of the coupling 5150. Furthermore, as has been described with respect to Embodiment 1, the coupling 5150 can be inclined only in the mounting direction X4 by the regulating portion 5157*h* 1 or 5157*h*2 (FIG. 55) as the regulating means. In addition, in this embodiment, the coupling locking member 5157*k* is provided in the downstreammost side with respect to the mounting direction (X4) of the cartridge.

As will be described hereinafter, in the state where the coupling 5150 is in engagement the drive shaft 180, the flange portion 5150*j* is released from the locking member 5157*k* as shown in FIG. 56(*b*). And, the coupling 5150 is free from the locking member 5157*k*. When it is not able to retain the state of inclining the coupling 5150 in the case of the assembling of the bearing member 5157, the driven portion 5150*a* of the coupling is pushed by tool and so on (FIG. 56(*b*), arrow X14). By doing so, the coupling 5150 can be easily returned to the inclined holding state (FIG. 56(*a*)).

In addition, the rib 5157*m* is provided in order to protect from the user touching on the coupling easily. The rib 5157*m* is set to the substantially same height as the free end position in the inclined state of the coupling (FIG. 56(*a*)). Referring to FIG. 57, the operation (a part of mounting operation of the cartridge) for engaging the coupling 5150 with the drive shaft 180 will be described. In FIG. 57, (a) illustrates the state of the coupling immediately before engaging, (b) illustrates the state after a part of coupling 5150 passes the drive shaft 180, (c) illustrates the state where the inclination of the coupling 5150 is released by the drive shaft 180, and (d) illustrates the engaged state.

In the states of (a) and (b), the axis L2 of the coupling 5150 inclines toward the mounting direction X4 relative to the axis L1 beforehand (pre-engagement angular position). By the coupling 5150 inclining, the free end position 5150A1 is closer to the photosensitive drum than the free end 180*b*3 in the direction of the axis L1. In addition, the free end position 5150A2 is closer to the pin 182 than the free end 180*b*3. In addition, as has been described hereinbefore, at this time, the flange portion 5150*j* is in contact with the locking surface 5157*k*1, and the inclined state of the coupling 5150 is maintained.

Thereafter, as shown in (c), the receiving surface 5150*f* or the projection 5150*d* contacts to the free end portion 180*b* or the pin 182 by the cartridge B moving to the mounting direction X4. The flange portion 5150*j* separates from the locking surface 5157*kl* by the contact force thereof. And, the lock relative to the bearing member 5157 of the coupling 5150 is released. And, in response to the cartridge mounting operation, the coupling is inclined so that the axis L2 thereof becomes substantially co-axial with the axis L1. After the flange portion 5150*j* passes, the locking member 5157*k* returns to the previous position by restoring force. At this time, the coupling 5150 is free from the locking member 5157*k*. And, finally, as shown in (d), the axis L1 and the axis L2 become substantially co-axial, and the rotation stand-by state is established (rotational force transmitting angular position).

In addition, the step similar to Embodiment 1 is followed in the process in which the cartridge B is demounted from the apparatus main assembly A (FIG. 25). More particularly, the coupling 5150 is changed in the order of (d), (c), (b), and (a) by the movement in the dismounting direction X6 of the cartridge. First, the free end portion 180*b* pushes the receiving surface 5150*f* (the cartridge side contact portion). By this, the axis L2 inclines relative to the axis L1, and the lower surface 5150*j*2 of the flange portion begins to contact to the inclined surface 5157*k*2 of the locking member 5157*k*. And, an elastic portion 5157*k*3 of the locking member 5157*k* bends, and a locking surface free end 5157*k*4 departs from the inclining locus of the flange portion 5150*j* (FIG. 57 (*c*)). Furthermore, the flange portion 5150*j* and the locking surface 5157*kl* contact relative to each other as the cartridge advances in the dismounting direction (X6). By this, the inclination angle of the coupling 5150 is maintained (FIG. 57(*b*)). More particularly, the coupling 5150 is swung (pivoted) from the rotational force transmitting angular position to the disengaging angular position.

As has been described hereinbefore, the angular position of the coupling 5150 is maintained by the locking member 5157*k*. By this, the inclination angle of the coupling is maintained. Therefore, the coupling 5150 can be assuredly engaged with the drive shaft 180. Furthermore, at the time of the rotation, the locking member 5157*k* is not in contact with the coupling 5150. Therefore, the stabilized rotation can be accomplished by the coupling 5150.

The motion of the coupling shown in FIGS. 56, 57 and 58 may include whirling motion.

In this embodiment, the locking member 5157*k* is provided with an elastic portion. However, it may be the rib which does not have the elastic portion. More particularly, an amount of engagement between the locking member 5157*k* and the flange portion 5150*j* is decreased. By this, the similar effect can be provided by making the flange portion 5150*j* deform to a slight degree (FIG. 58(*a*)).

In addition, the locking member 5157*k* is provided in the downstreammost side with respect to the mounting direction X4. However, if the inclination toward the predetermined direction of the axis L2 can be maintained, the position of the locking member 5157*k* may be any.

FIGS. 58(*b*) and (*c*) illustrate the example in which the coupling locking portion 5357*k* (FIGS. (58*b*)) and 5457*k* (FIG. 58*c*) are provided in the upstream with respect to the mounting direction X4.

In addition, the locking member 5157*k* has been constituted by a part of bearing member 5157 in the above-described embodiment. However, if it is fixed to the cartridge B, the locking member 5157*k* may be constituted as a part of a member other than the bearing member. In addition, the locking member may be a separate member.

In addition, the present embodiment may be implemented with Embodiment 4 or Embodiment 5. In this case, the mounting and dismounting operation with the more assured coupling is accomplished.

Embodiment 7

Referring to FIG. 59-FIG. 62, the seventh embodiment of the present invention will be described.

In this embodiment, another means for maintaining the axis of the coupling at the inclined state relative to the axis of the photosensitive drum will be described.

Figure 59:
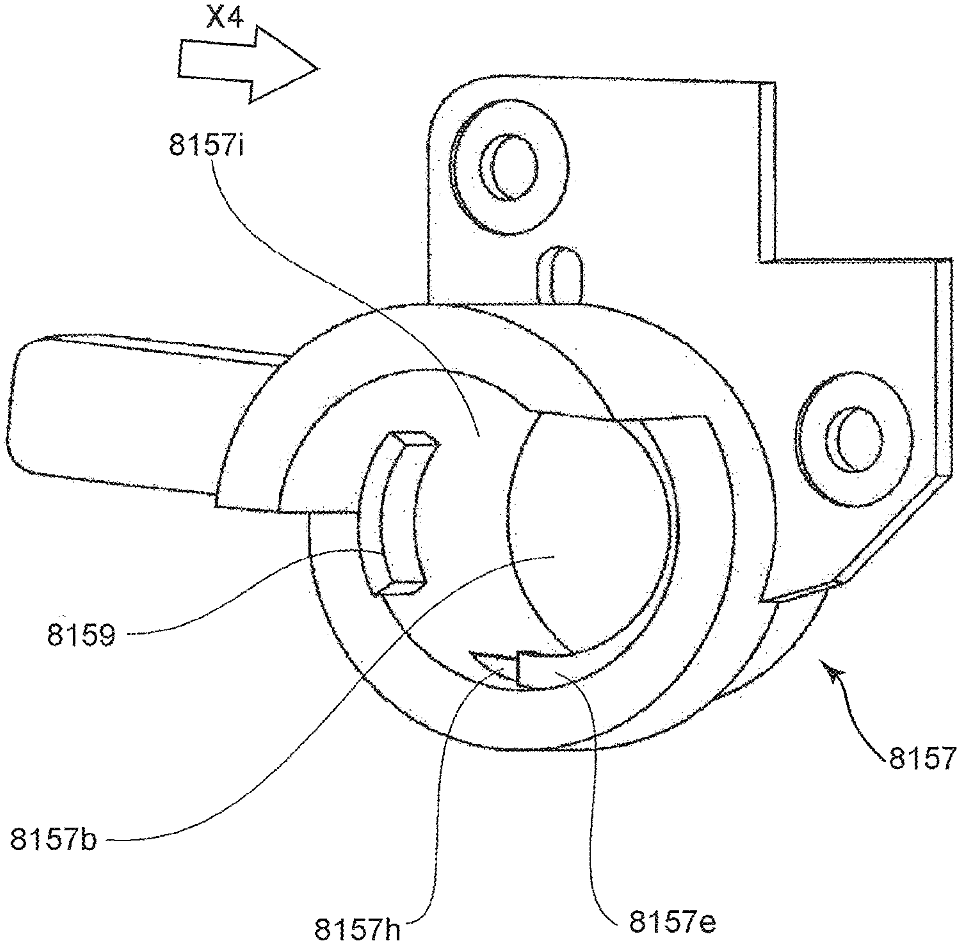
FIG. 59 is a perspective view which illustrates an attaching state of a magnet member to a drum bearing member according to a seventh embodiment of the present invention.
Figure 60:
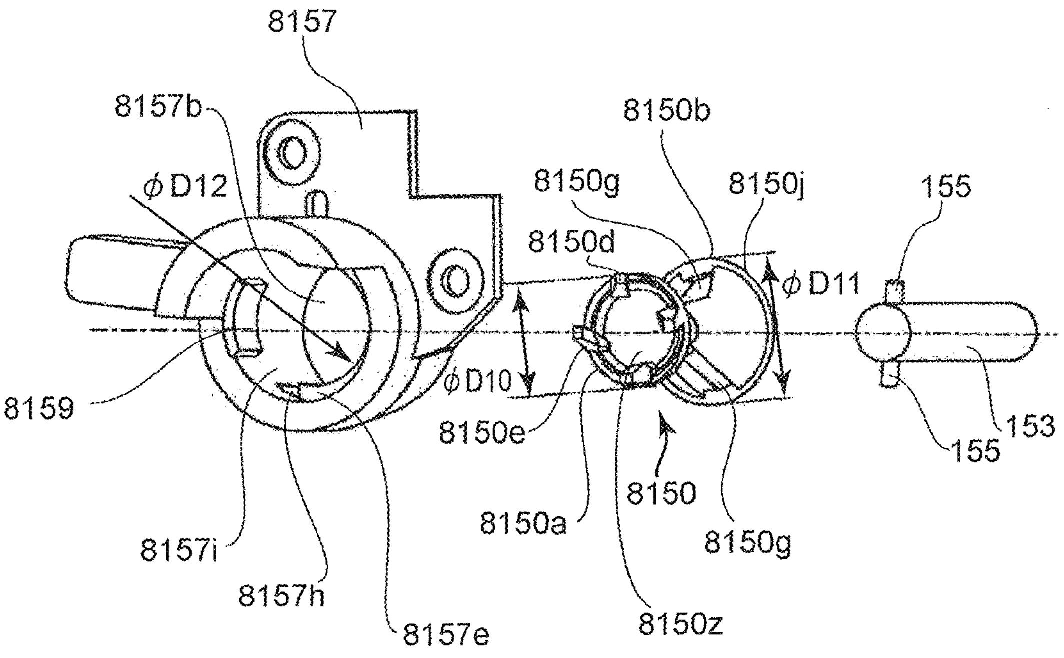
FIG. 60 is an exploded perspective view which illustrates the drum bearing member, a coupling, and a drum shaft according to the embodiment of the present invention.
Figure 61:
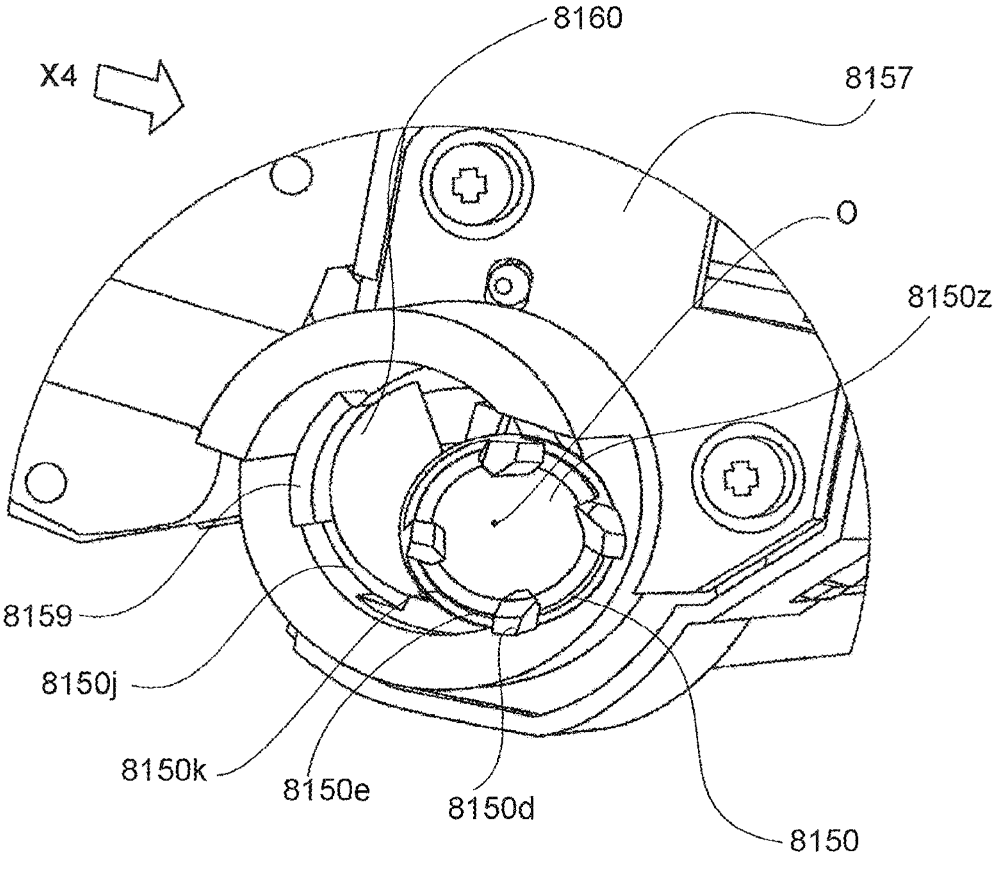
FIG. 61 is a perspective view which illustrates a driving side of the cartridge according to the embodiment of the present invention.
Figure 62:
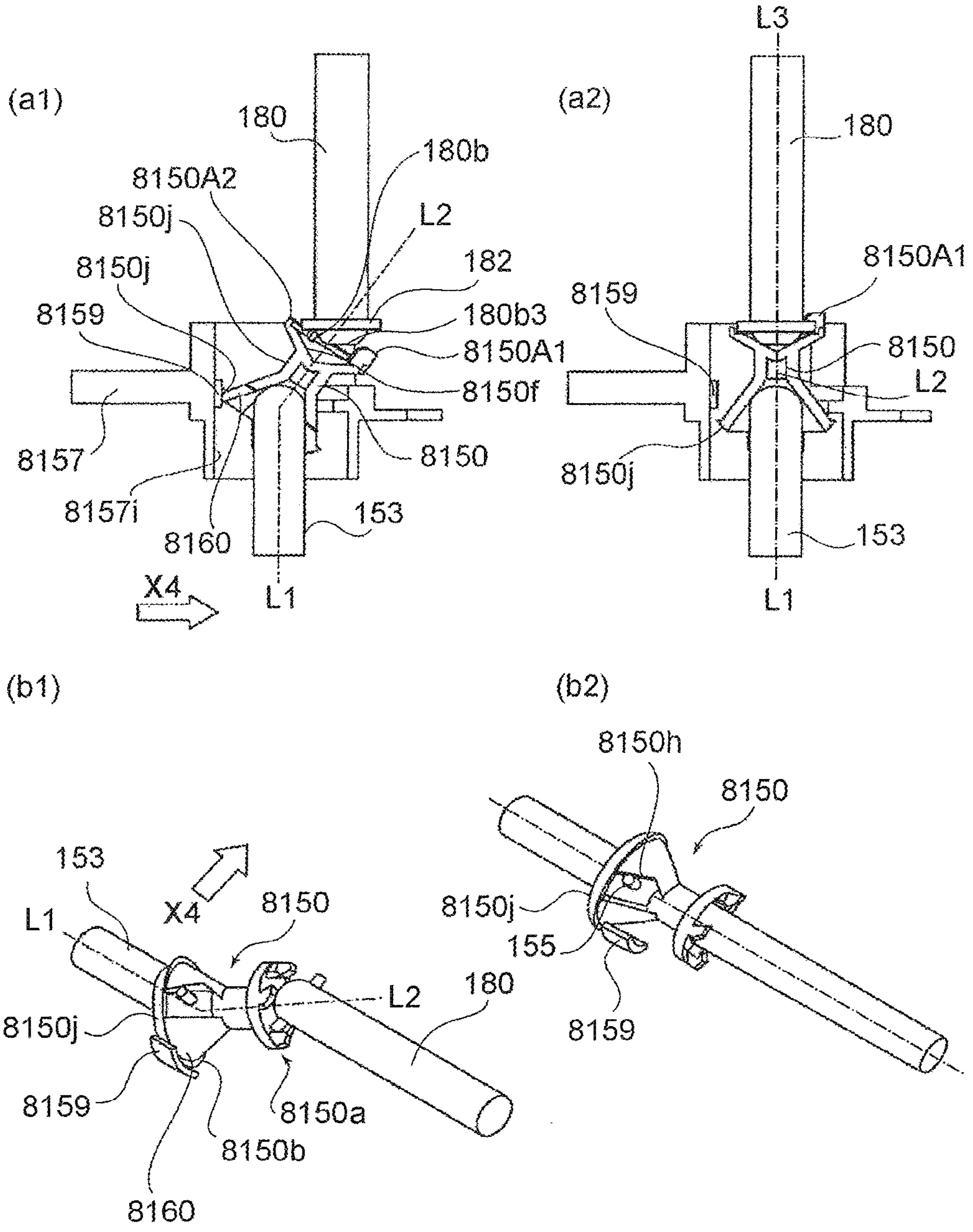
FIG. 62 is perspective views and longitudinal sectional views which illustrate an engaged state between a drive shaft and coupling according to the embodiment of the present invention.

FIG. 59 is a perspective view which illustrates the state of pasting a magnet member (peculiar to the present embodiment) on the drum bearing member. FIG. 60 is an exploded perspective view. FIG. 61 is an enlarged perspective view of a major part of the driving side of the cartridge. FIG. 62 is a perspective view and a longitudinal sectional view which illustrate the drive shaft and an engaged state between the coupling.

As shown in FIG. 59, a drum bearing member 8157 constitutes a space 8157*b* which surrounds a part of coupling. A magnet member 8159 as a maintaining member for maintaining the inclination of the coupling 8150 is pasted on a cylinder surface 8157*i* which constitutes the space thereof. In addition, as shown in FIG. 59, the magnet member 8159 is provided in the upstream (with respect to the mounting direction X4) of the cylinder surface 81571. As will be described hereinafter, this magnet member 8159 is a member for maintaining temporarily the state where the axis L2 inclines relative to the axis L1. Here, a part of coupling 8150 is made of magnetic material. And, the magnetic portion is attracted to the magnet member 8159 by a magnetic force of a magnet member 8159. In this embodiment, the substantially full-circumference of the flange portion 8150*j* is made of the metal magnetic material 8160. In other words, as shown in FIG. 61, the flange portion 8150*j* contacts to this magnet member 8159 by the magnetic force. By this, the axis L2 maintains the state of inclining toward the downstream with respect to the mounting direction (X4) of the cartridge relative to the axis L1 (FIG. 62 (*a*1)). Similarly to Embodiment 1 (FIG. 31), an inclining direction regulation rib 8157*h* is preferably provided in the bearing member 8157. The inclining direction of the coupling 8150 is more assuredly determined by provision of the rib 8157*h*. And, the flange portion 8150*j* of magnetic material and the magnet member 8159 can contact to each other more assuredly. Referring to FIG. 60, the description will be made about the assembly method of the coupling 8150.

As shown in FIG. 60, the pin 155 enters a standing-by space 8150*g* of the coupling 8150, and a part of coupling 8150 is inserted into a space portion 8157*b* of the drum bearing member 8157. At this time, preferably, a distance D12 between an inner surface end of a retention rib 8157*e* of the bearing member 8157 and the magnet member 8159 is larger than the maximum outer diameter of a driven portion 8150*a* ΦD10. In addition, the distance D12 is smaller than the maximum outer diameter of a driving portion 8150*b* ΦD11. By this, the bearing member 8157 can be assembled straight. Therefore, the assembling property improves. However, the present embodiment is not limited to this relation.

Referring to FIG. 62, the engaging operation (a part of mounting operation of the cartridge) for engaging the coupling 8150 with the drive shaft 180 will be described. FIGS. 62(*a*1) and (*b*1) illustrates the state immediately before the engagement, and FIGS. 62(*a*2) and (*b*2) illustrate the state of the engagement completion.

As shown in FIGS. 62(*a*1) and (*b*1), the axis L2 of the coupling 8150 inclines toward the downstream with respect to the mounting direction X4 relative to the axis L1 beforehand by the force of the magnet member (maintaining member) 8159 (pre-engagement angular position).

Thereafter, the free end surface 180*b* or the pin 182 free end contacts to the driving shaft receiving surface 8150*f* of the coupling 8150 by the cartridge B moving to the mounting direction X4. And, the axis L2 approaches so that it may become substantially co-axial with the axis L1 by the contact force (mounting force of the cartridge) thereof. At this time, the flange portion 8150*j* separates from the magnet member 8159, and is in the non-contact state. And, finally, the axis L1 and the axis L2 become substantially co-axial.

And, the coupling 8150 is in the rotation latency state (FIG. 62(*a*2), Figure (*b*2)) (rotational force transmitting angular position).

The motion shown in FIG. 62 may include whirling motion.

As has been described hereinbefore, in this embodiment, the inclined state of the axis L2 is maintained by the magnetic force of the magnet member 8159 (maintaining member) pasted on the bearing member 8157. By this, the coupling can be more assuredly engaged with the drive shaft.

Embodiment 8

Referring to FIG. 63-FIG. 68, the eighth embodiment of the present invention will be described.

In this embodiment, another means to maintain the state where the axis L2 is inclined relative to the axis L1 will be described.

Figure 63:
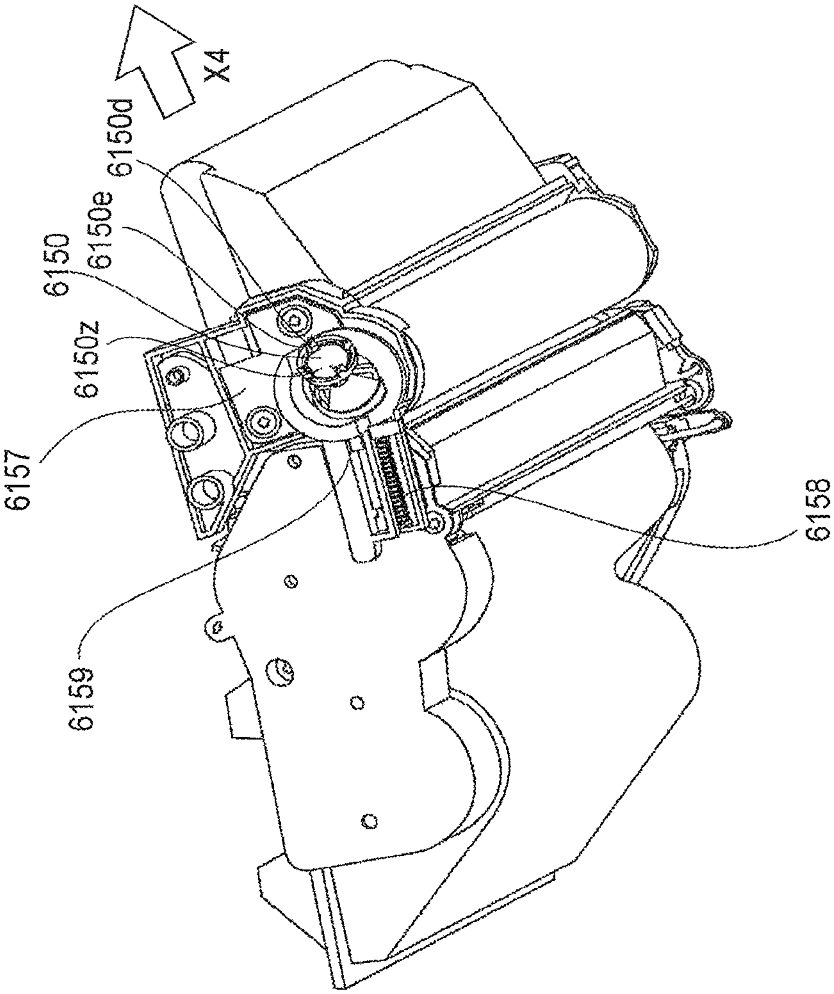
FIG. 63 is a perspective view which illustrates the driving side of a cartridge according to an eighth embodiment of the present invention.
Figure 64:
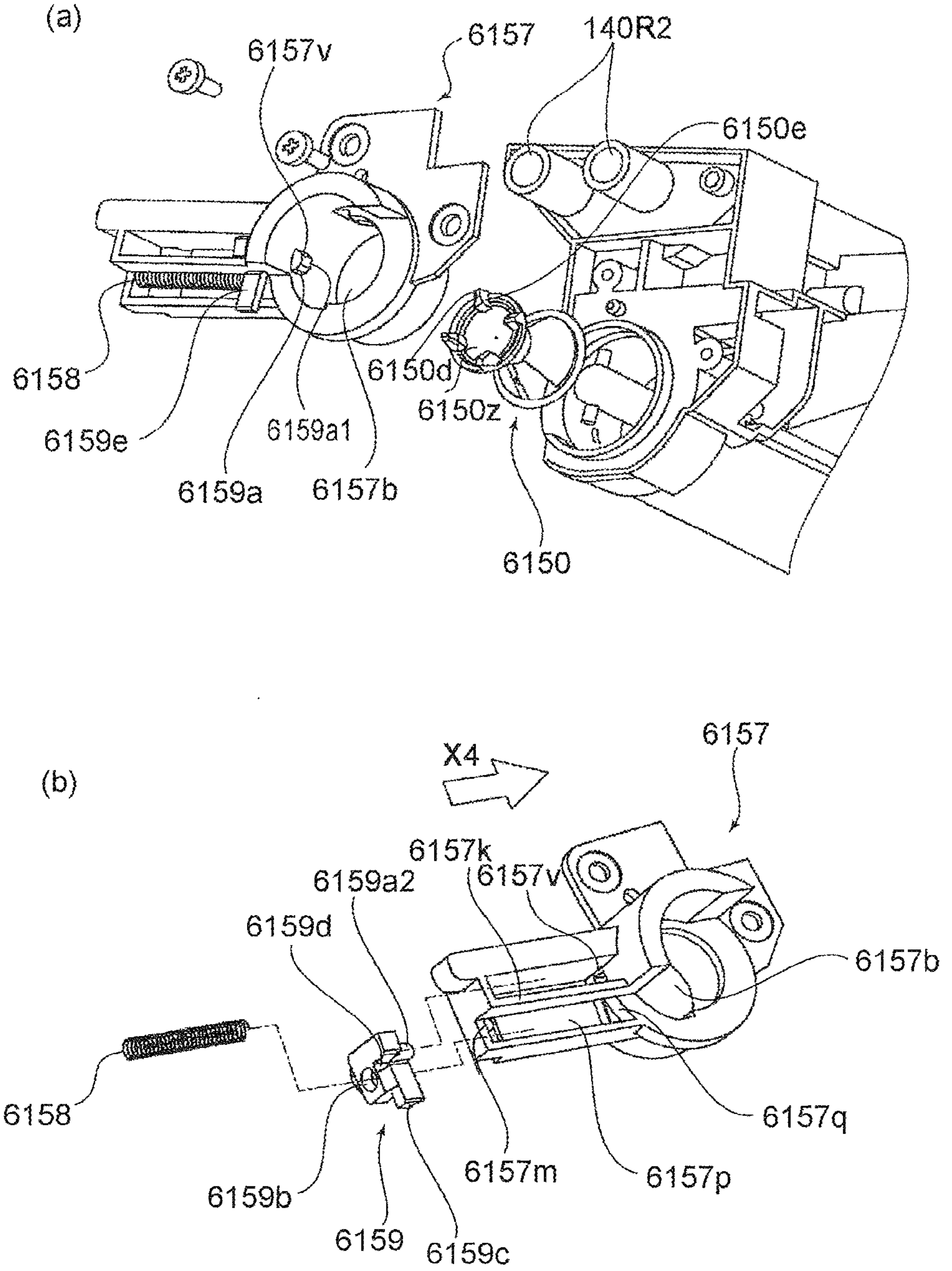
FIG. 64 is n exploded perspective views which illustrate a state before the assembly of a bearing member according to the embodiment of the present invention.
Figure 65:
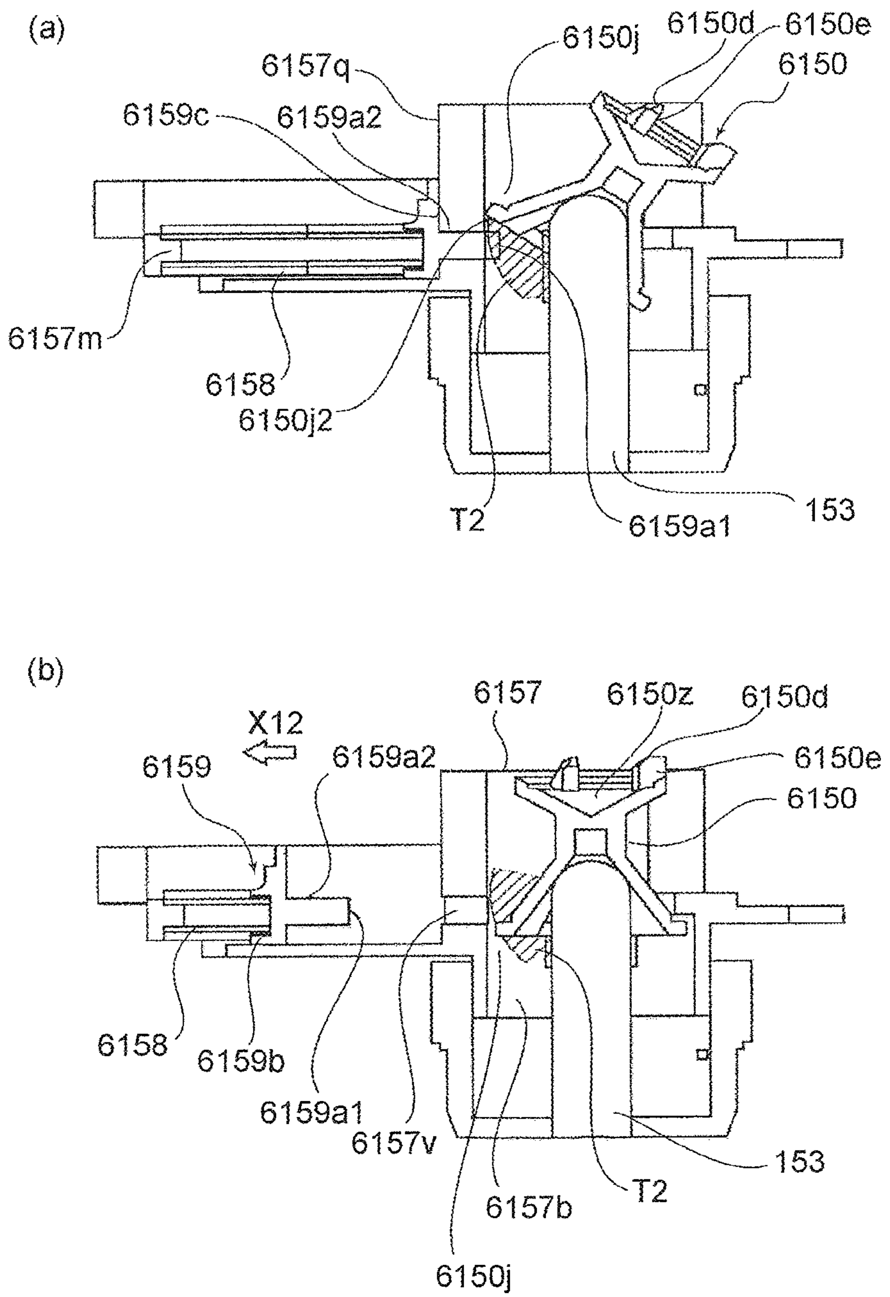
FIG. 65 is longitudinal sectional views which illustrate the structures of a drum shaft, a coupling, and a bearing member according to the embodiment of the present invention.
Figure 66:
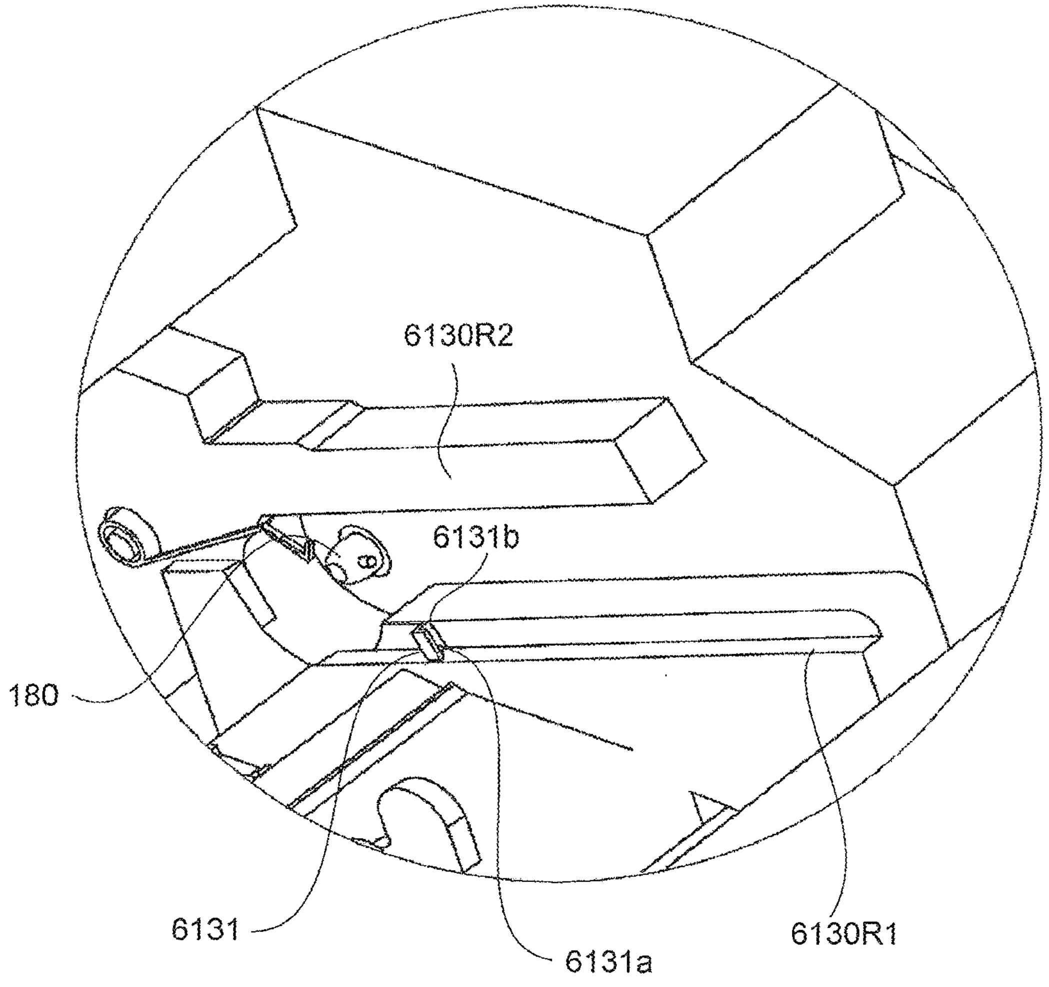
FIG. 66 is a perspective view which illustrates a driving side of an apparatus main assembly guide according to the embodiment of the present invention.
Figure 67:
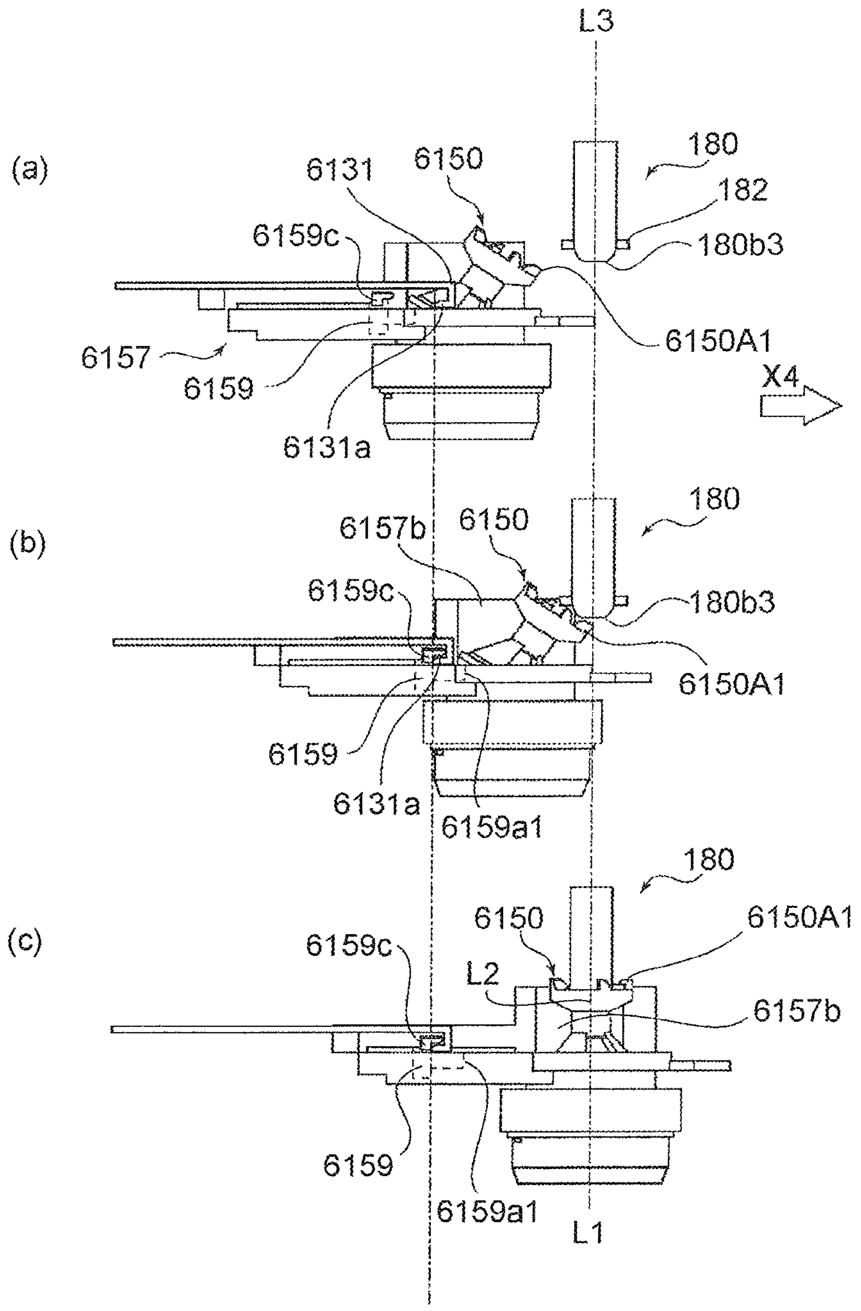
FIG. 67 is longitudinal sectional views which illustrate a disengagement state of a locking member according to the embodiment of the present invention.
Figure 68:
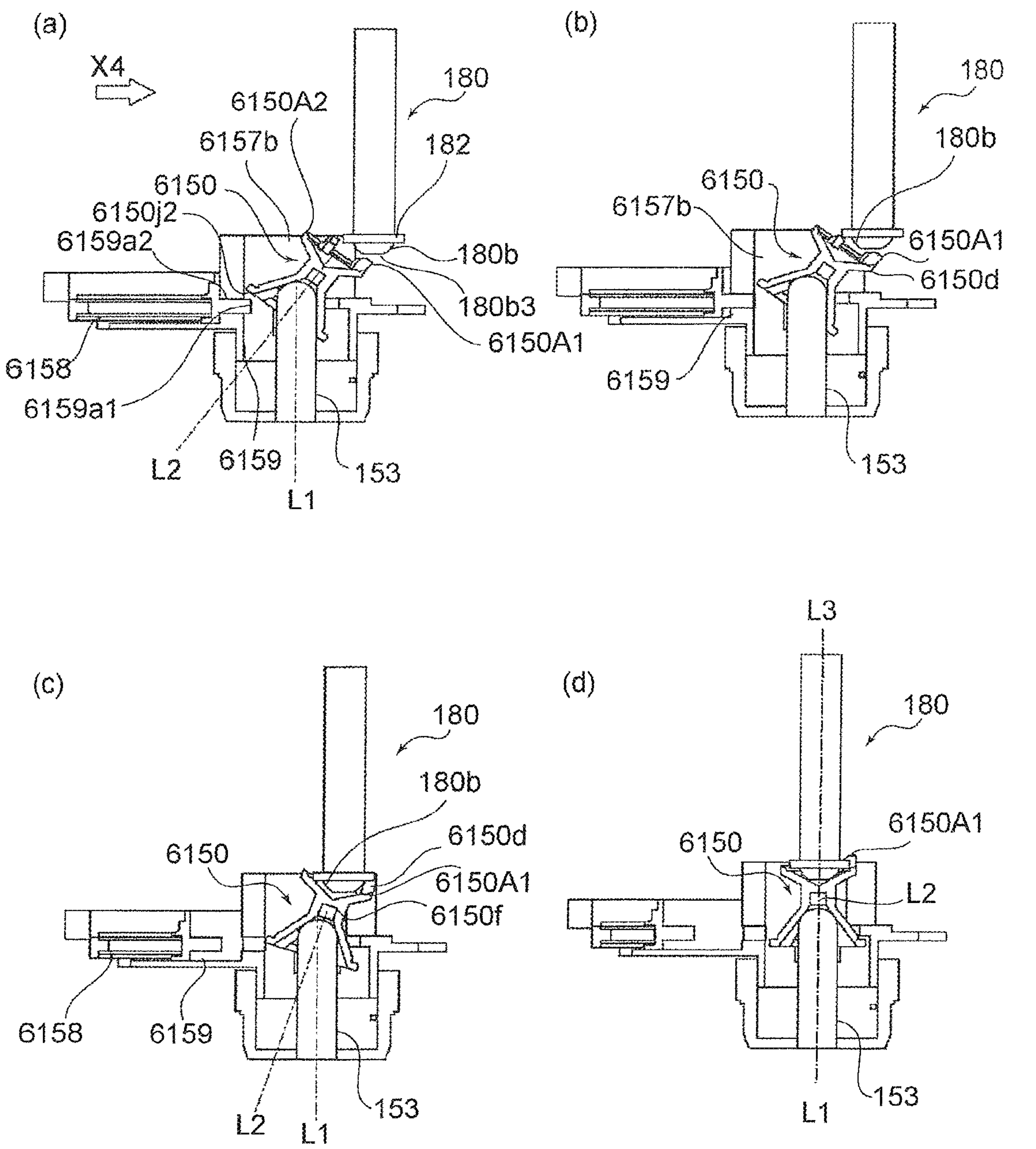
FIG. 68 is longitudinal sectional views which illustrate the engagement between a drive shaft and a coupling according to the embodiment of the present invention.

FIG. 63 is a perspective view which illustrates a driving side of a cartridge. FIG. 64 is an exploded perspective view which illustrates a state before assembling a drum bearing member. FIG. 65 is a schematic longitudinal sectional view of a drum shaft, a coupling, and a drum bearing member. FIG. 66 is a perspective view which illustrates a driving side of an apparatus main assembly guide. FIG. 67 is a longitudinal sectional view which illustrates disengagement of a lock member. FIG. 68 is a longitudinal sectional view which illustrates the engaging operation of the coupling to the drive shaft.

As shown in FIG. 63, the coupling 6150 is inclined toward the downstream with respect to the mounting direction (X4) by the locking member 6159 and the spring member 6158.

First, referring to FIG. 64, the description will be made about a drum bearing member 6157, a locking member 6159, and a spring member 6158. The bearing member 6157 is provided with an opening 6157*v*. And, the opening 6157*v* and the locking portion (locking member) 6159*a* engage with each other. By this, a free end 6159*a*1 of the locking portion 6159*a* projects into a space portion 6157*b* of the bearing member 6157. As will be described hereinafter, the state of inclining the coupling 6150 by this locking portion 6159*a* is maintained. The locking member 6159 is mounted to the space 6157*p* of the bearing member 6157. The spring member 6158 is mounted by the boss 6157*m* of the hole 6159*b* and the bearing member 6157. The spring member 6158 in the present embodiment employs a compression coil spring which has a spring force (elastic force) of about 50 g-300 g. However, if it is a spring which produces the predetermined spring force, any may be used. In addition, the locking member 6159 is the movable in the mounting direction X4 by the engagement with the slot 6159*d* and the rib 6157*k*.

When the cartridge B is outside the apparatus main assembly A (state where the cartridge B is not mounted to the apparatus main assembly A), the coupling 6150 is in the state of inclining. In this state, a locking portion free end 6159*a*1 of the locking member 6159 is in the movable range T2 (hatching) of the flange portion 6150*j*. FIG. 64(*a*) shows an orientation of the coupling 6150. By this, the inclination orientation of the coupling can be maintained. Furthermore, the locking member 6159 is abutted to an outer surface 6157*q* (FIG. 64(*b*)) of the bearing member 6157 by the spring force of the spring member 6158. By this, the coupling 6150 can maintain the stabilized orientation. In order to engage the coupling 6150 with the drive shaft 180, this lock is released to permit the inclination of the axis L2.

In other words, as shown in FIG. 65(*b*), the locking portion free end 6159*a*1 moves in the direction of X12 to retract from the movable range T2 of the flange portion 6150*j*.

The description will further be made about the releasing of the locking member 6159.

As shown in FIG. 66, the main assembly guide 6130R1 is provided with the lock releasing member 6131. At the time of mounting the cartridge B to the apparatus main assembly A, the releasing member 6131 and the locking member 6159 engage with each other. By this, the position of the locking member 6159 in the cartridge B changes. Therefore, the coupling 6150 becomes pivotable.

Referring to FIG. 67, the releasing of the locking member 6159 will be described. When the free end position 6150A1 of the coupling 6150 comes to the neighborhood of the shaft free-end 180*b*3 by the movement, in the mounting direction X4, of the cartridge B, the releasing member 6131 and the locking member 6159 engage with each other. At this time, a rib 6131*a* of the releasing member 6131 (contact portion) and a hook portion 6159*c* of the locking member 6159 (force receiving portion) contact to each other. By this, the position of the locking member 6159 in the inside of the apparatus main assembly A is fixed (b). Thereafter, the locking portion free end 6159*a*1 is located in the space portion 6157*b* by the cartridge moving through 1-3 mm in the mounting direction. Therefore, the drive shaft 180 and the coupling 6150 are engageable with each other, and the coupling 6150 is in the swingable (pivotable) state (c).

Referring to FIG. 68, the engaging operation of the coupling relative to the drive shaft and the position of the locking member will be described.

In the state of FIGS. 68(*a*) and (*b*), the axis L2 of the coupling 6150 inclines toward the mounting direction X4 relative to the axis L1 beforehand (pre-engagement angular position). At this time, with respect to the direction of the axis L1, the free end position 6150A1 is closer to the photosensitive drum 107 than the shaft free-end 180*b*3 and, the free end position 6150A2 is closer to the pin 182 than the shaft free-end 180*b*3. In the state of (a), the locking member (force receiving portion) 6159 is engaged in the state for receiving the force from the lock releasing member (contact portion) 6131. And, in the state of (b), the locking portion free end 6159*a*1 retracts from the space portion 6157*b*. By this, the coupling 6150 is released from the orientation maintenance state. More particularly, the coupling 6150 becomes swingable (pivotable).

Thereafter, as shown in (c), by the movement of the cartridge toward the mounting direction X4, driving shaft receiving surface 6150*f* of the coupling 6150 (the cartridge side contact portion) or projection 6150*d* contacts to the free end portion 180*b* or the pin 182. And, in response to the movement of the cartridge, the axis L2 approaches so that it may become substantially co-axial with the axis L1. And, finally, as shown in (d), the axis L1 and the axis L2 become substantially co-axial. By this, the coupling 6150 is in the rotation latency state (rotational force transmitting angular position).

The timing at which the locking member 6159 retracts is as follows. More particularly, after the free end position 6150A1 passes by the shaft free-end 180*b*3, and before the receiving surface 6150*f* or the projection 6150*d* contacts to the free end portion 180*b* or the pin 182, the locking member 6159 retracts. By doing so, the coupling 6150 does not receive an excessive load, and the assured mounting operation is accomplished. The receiving surface 6150*f* has a tapered shape.

In addition, in the dismounting process from the apparatus main assembly A of the cartridge B, the step opposite from the step to mount is followed. More particularly, by moving the cartridge B in the dismounting direction, the free end portion 180*b* of the drive shaft (the main assembly side engaging portion) 180 pushes the receiving surface 6150*f* (the cartridge side contact portion). By this, the axis L2 begins (FIG. 68(*c*)) to incline relative to the axis L1. And, the coupling 6150 passes by the shaft free-end 180*b*3 completely (FIG. 68(*b*)). The hook portion 6159*c* spaces from the rib 6131*a* immediately after that. And, the locking portion free end 6159*a*1 contacts to the lower surface 6150*j*2 of the flange portion. Therefore, the inclined state of the coupling 6150 is maintained (FIG. 68(*a*)). More particularly, the coupling 6150 is pivoted to the disengaging angular position from the rotational force transmitting angular position (swinging).

The motion shown in FIGS. 67 and 68 may include whirling motion.

As has been described hereinbefore, the inclination angle position of the coupling 6150 is maintained by the locking member 6159. By this, the inclined state of the coupling is maintained. Therefore, the coupling 6150 is more assuredly mounted relative to the drive shaft 180. Furthermore, at the time of the rotation, the locking member 6159 does not contact to the coupling 6150. Therefore, the coupling 6150 can effect more stabilized rotation.

In the embodiment described above, the locking member is provided in the upstream with respect to the mounting direction. However, the position of the locking member may be any if the inclination in the predetermined direction of the axis of the coupling is maintained.

In addition, the present embodiment may be implemented with Embodiments 4-7. In this case, mounting and dismounting operations of the coupling can be ensured.

Embodiment 9

Referring to FIG. 69-FIG. 73, the ninth embodiment of the present invention will be described.

In this embodiment, another means for inclining the axis L2 relative to the axis L1 will be described.

Figure 69:
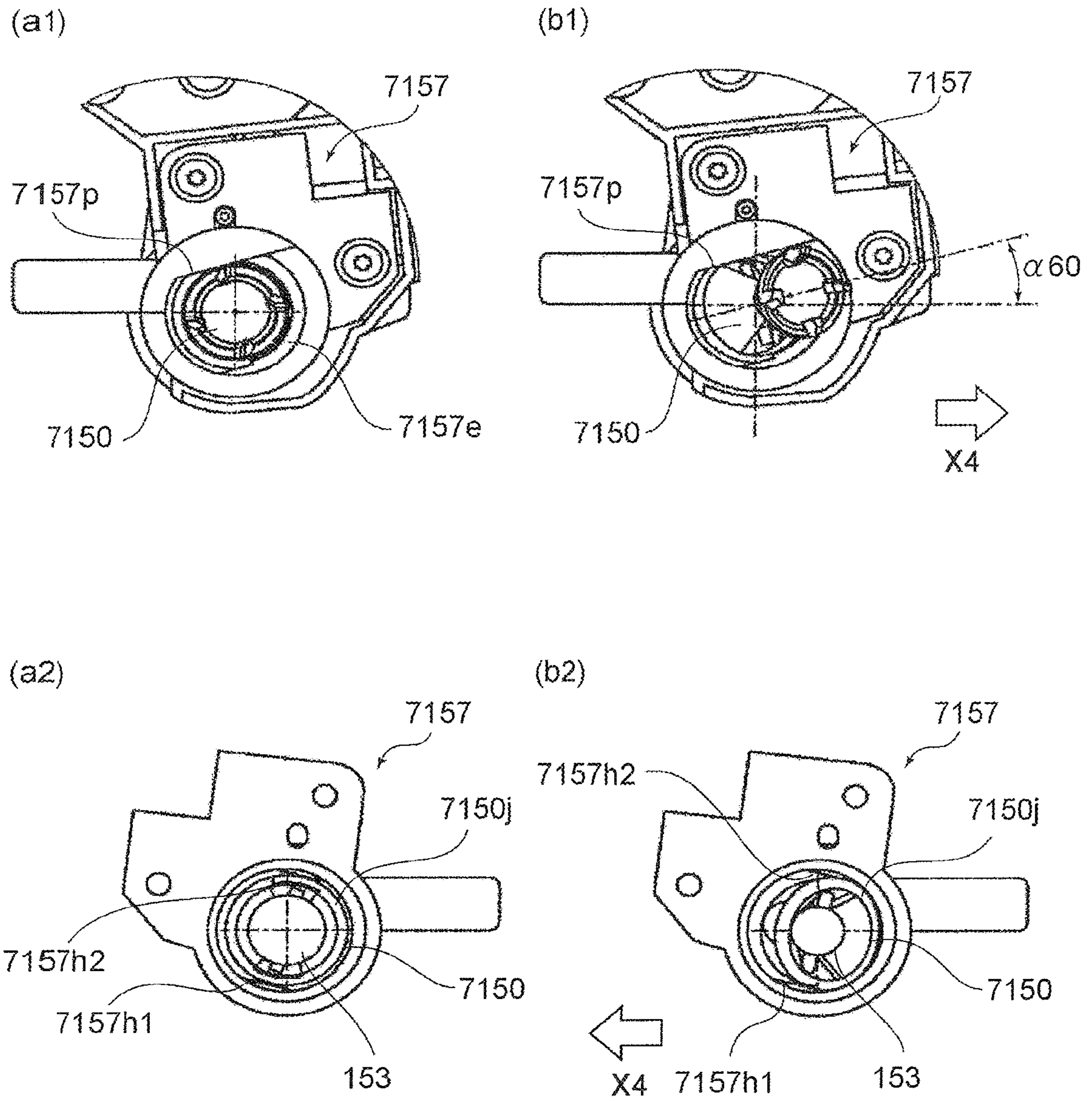
FIG. 69 is side views which illustrate a driving side of a cartridge according to a ninth embodiment of the present invention.
Figure 70:
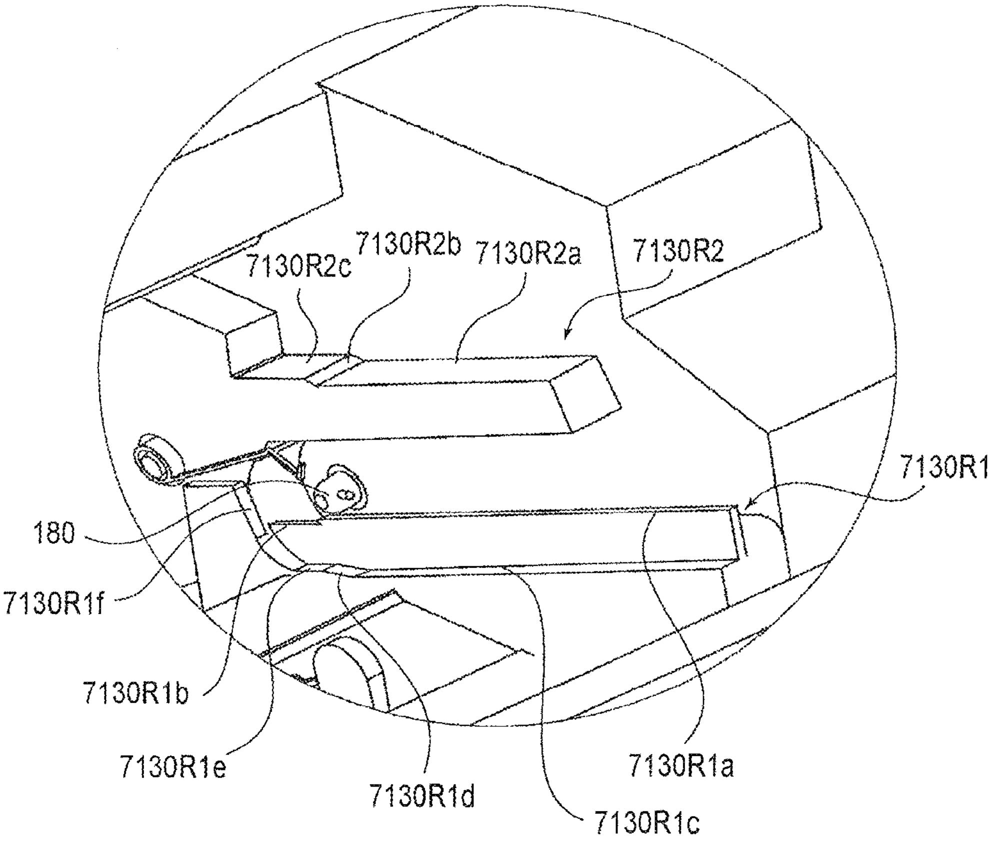
FIG. 70 is a perspective view which illustrates a driving side of an apparatus main assembly guide according to the embodiment of the present invention.
Figure 71:
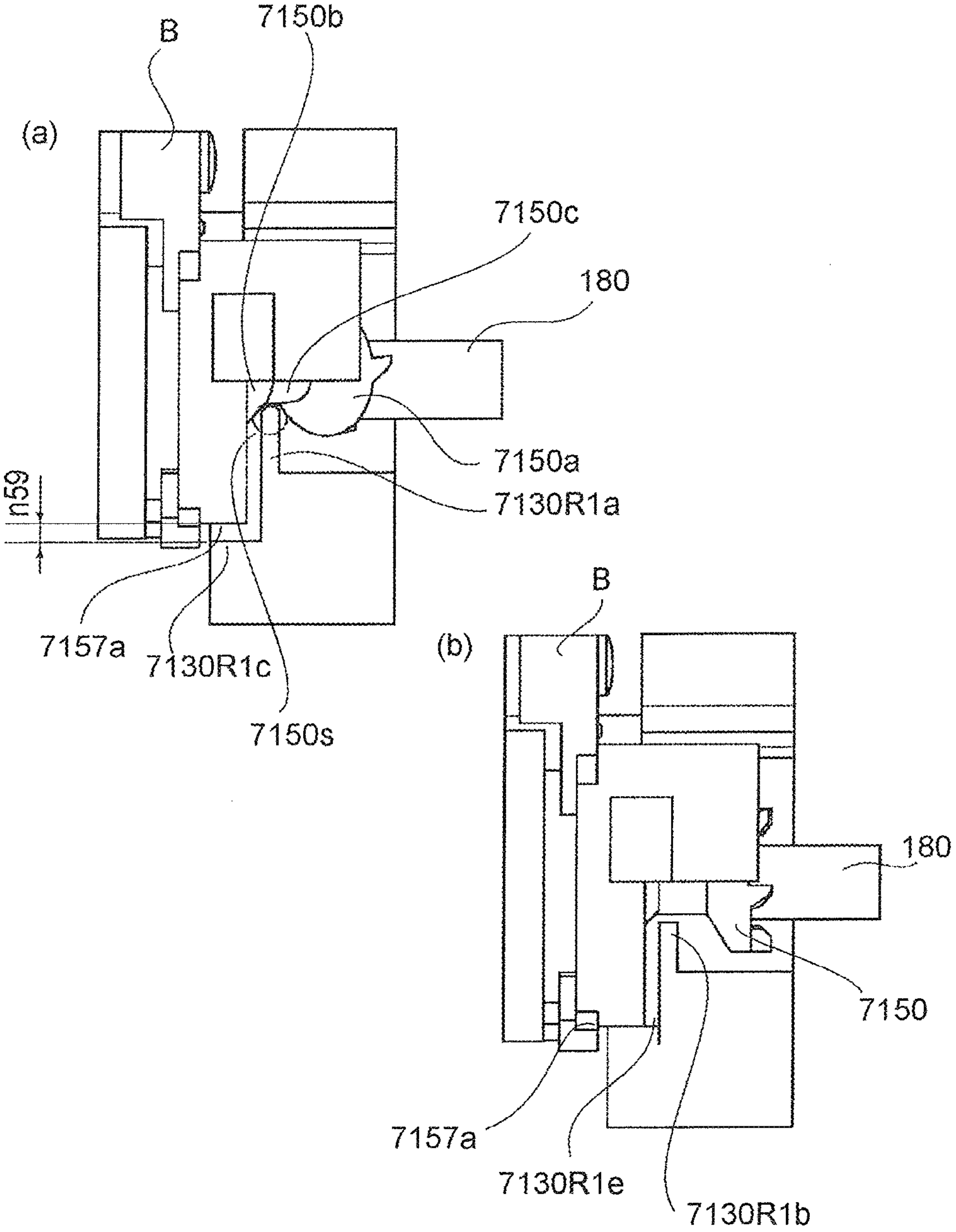
FIG. 71 is side views which illustrate a relation between the cartridge and the main assembly guide according to the embodiment of the present invention.
Figure 72:
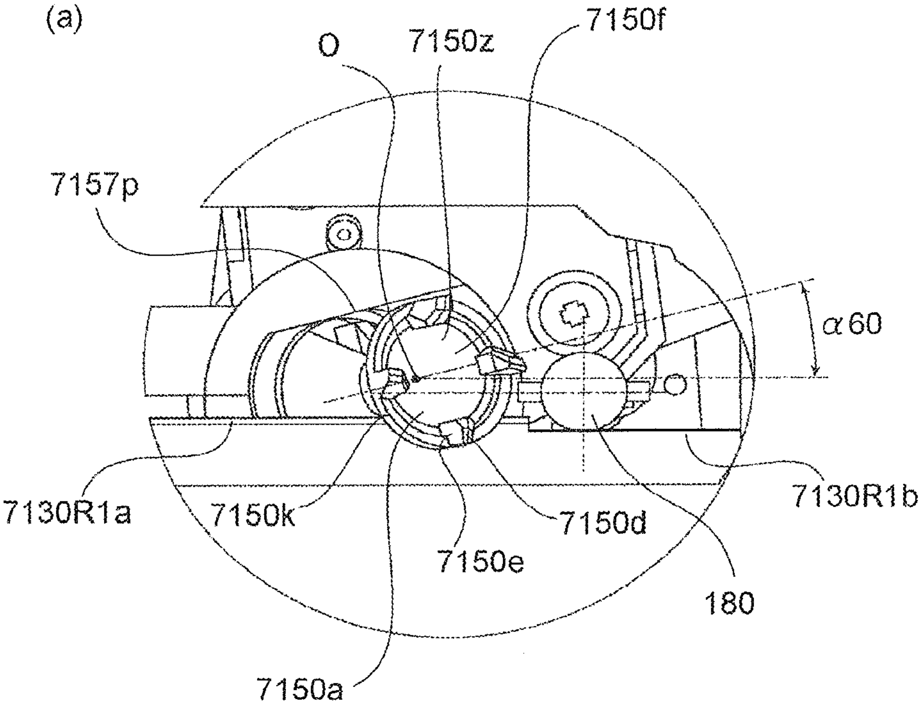
FIG. 72 is perspective views which illustrate a relation between the main assembly guide and the coupling according to the embodiment of the present invention.
Figure 72:
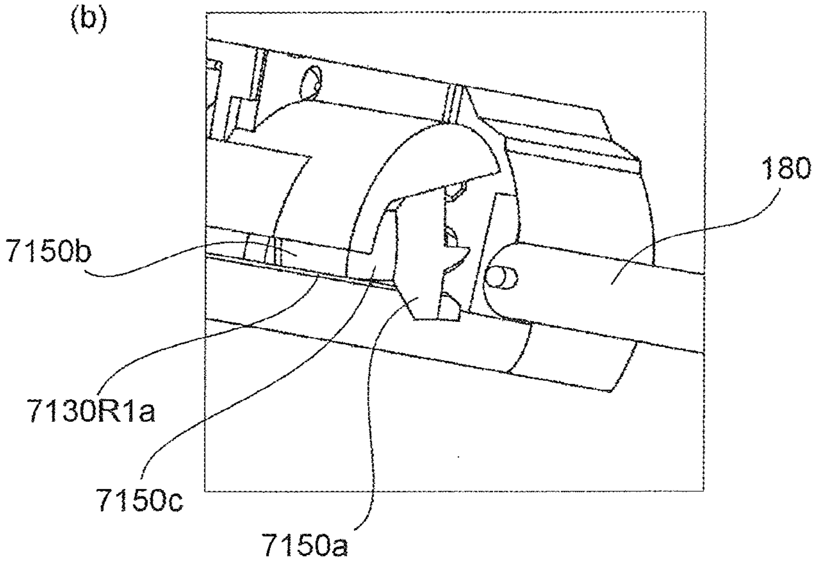
Figure 73:
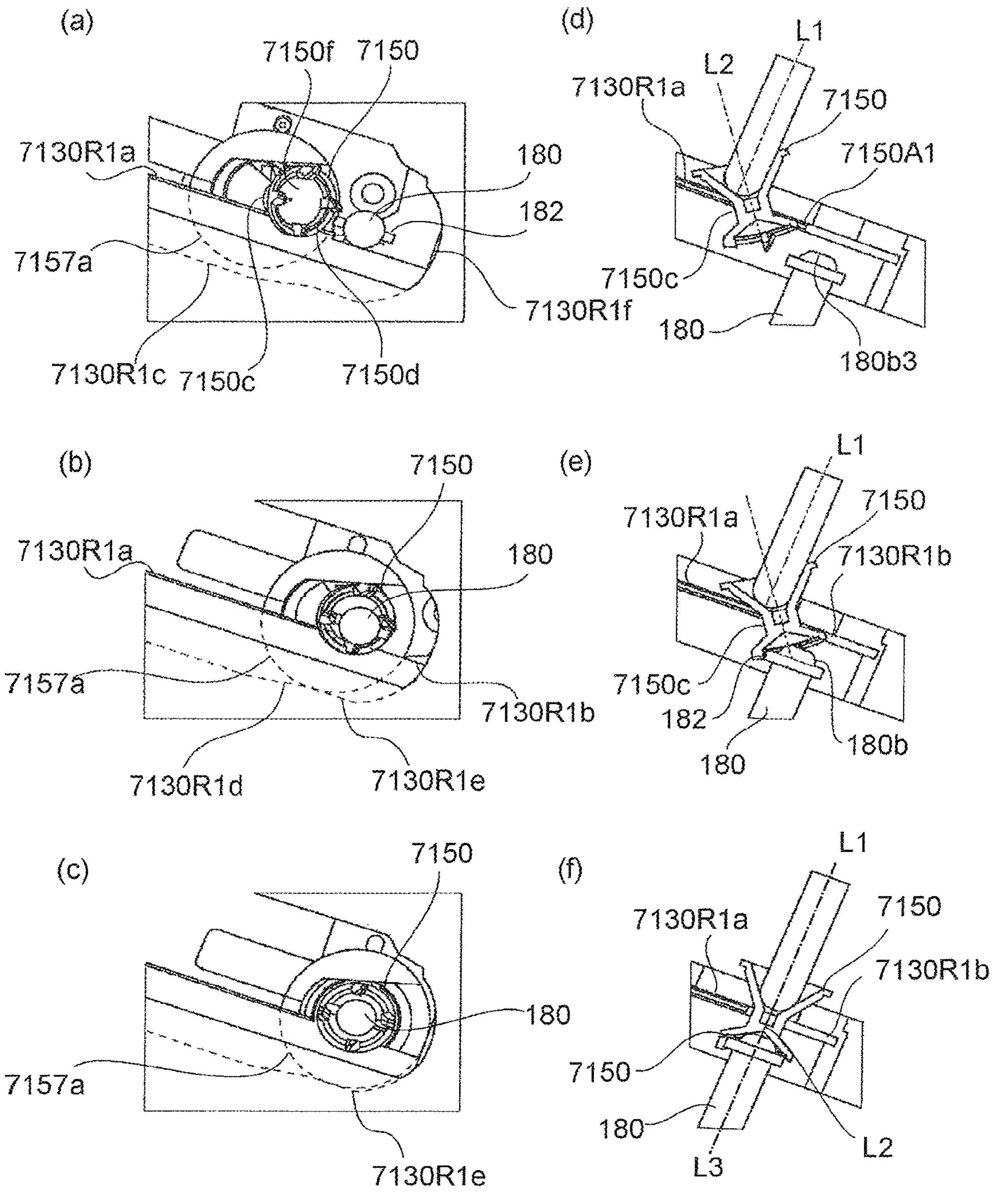
FIG. 73 is side views, as seen from the driving side, which illustrate a process of the mounting to the main assembly of the cartridge, according to the embodiment of the present invention.

FIG. 69 is an enlarged side view of a driving side of a cartridge. FIG. 70 is a perspective view which illustrates a driving side of an apparatus main assembly guide. FIG. 71 is a side view which illustrates a relation between the cartridge and the main assembly guide. FIG. 72 is a side view and a perspective view which illustrate a relation between the main assembly guide and the coupling. FIG. 73 is a side view which illustrates a mounting process.

FIG. 69(*a*1) and FIG. 69(*b*1) are a side views of the cartridge (as seen from the drive shaft side), and FIG. 69(*a*2) and FIG. 69(*b*2) are a side views of the drive shaft (as seen from the opposite side) of the cartridge. As shown in FIG. 69, in the pivotable state toward the downstream with respect to the mounting direction (X4), the coupling 7150 is mounted to the drum bearing member 7157. In addition, as for the inclining direction, as has been described with respect to Embodiment 1, it is pivotable only to the downstream with respect to the mounting direction X4 by the retention rib (regulating means) 7157*e*. In addition, in FIG. 69(*b*1), the axis L2 of the coupling 7150 inclines with the angle α60 relative to the horizontal line. The reason why the coupling 7150 inclines with the angle α60 is as follows. In the flange portion 7150*j* of the coupling 7150, a regulating portion 7157*h* 1 or 7157*h*2 as the regulating means regulate. Therefore, the downstream side (mounting direction) of the coupling 7150 is pivotable toward the direction upwardly inclined by the angle α60.

Referring to FIG. 70, the description will be made about the main assembly guide 7130R. The main assembly guide 7130R1 includes a guide rib 7130R1*a* for guiding the cartridge B through the coupling 7150, and cartridge positioning portions 7130R1*e*, 7130R1*f*. The rib 7130R1*a* is on the mounting locus of the cartridge B. And, the rib 7130R1*a* is extended to just before the drive shaft 180 with respect to the cartridge mounting direction. And, the rib 7130R1*b* adjacent to the drive shaft 180 has the height to avoid interference When the coupling 7150 engages with the drive shaft 180. The main assembly guide 7130R2 mainly includes a guide portion 7130R2*a* and the cartridge positioning portion 7130R2*c* for determining the orientation at the time of the mounting of the cartridge by guiding a part cartridge frames B1.

The relation between the main assembly guide 7130R and the cartridge at the time of mounting the cartridge will be described.

As shown in FIG. 71(*a*), in the driving side, while a connecting portion (force receiving portion) 7150*c* of the coupling 7150 contacts to the guide rib (contact portion) 7130R1*a*, a cartridge B moves. At this time, the cartridge guide 7157*a* of the bearing member 7157 is separated from the guide surface 7130R1*c* by n59. Therefore, the weight of the cartridge B is applied to the coupling 7150. In addition, on the other hand, as has been described hereinbefore, the coupling 7150 is set, so that it is pivotable toward the direction to which the downstream side with respect to the mounting direction upwardly inclines by the angle α60 relative to the mounting direction (X4). Therefore, the driven portion 7150*a* of the coupling 7150 inclines toward the downstream (direction inclined by the angle α60 from the mounting direction) with respect to the mounting direction X4 (FIG. 72).

The reason for the inclination of the coupling 7150 is as follows. The connecting portion 7150*c* receives the reaction force corresponding to the weight of the cartridge B from the guide rib 7130R1*a*. And, the reaction force applies to the regulating portion 7157*h* 1 or 7157*h*2 for regulating the inclining direction. By this, the coupling is inclined to the predetermined direction.

Here, when the connecting portion 7150*c* moves on the guide rib 7130R1*a*, a frictional force is between the connecting portion 7150*c* and the guide rib 7130R1*a*. Therefore, the coupling 7150 receives a force in the direction opposite from the mounting direction X4 by this frictional force. However, the frictional force produced by the coefficient of friction between the connecting portion 7150*c* and the guide rib 7130R1*a* is smaller than the force for pivoting the coupling 7150 to the downstream with respect to the mounting direction X4 by the reaction force. Therefore, the coupling 7150 overcomes the frictional force is pivoted to the downstream with respect to the mounting direction X4.

The regulating portion 7157*p* (FIG. 69) of the bearing member 7157 may be used as the regulating means for regulating the inclination. By this, the regulation of the inclining direction of the coupling is carried out at the different positions with respect to the direction of the axis L2 by the regulating portions 7157*h* 1, 7157*h*2 (FIG. 69) and the regulating portion 7157*p*. By this, the direction which the coupling 7150 inclines can be regulated more assuredly. In addition, it can always be inclined toward the angle of approximately α 60. However, the regulation of the inclining direction of the coupling 7150 may be made by another means.

In addition, the guide rib 7130R1*a* is in the space 7150*s* constituted by the driven portion 7150*a*, the driving portion 7150*b*, and the connecting portion 7150*c*. Therefore, in the mounting process, the longitudinal position (the direction of the axis L2) in the inside of the apparatus main assembly A of the coupling 7150 is regulated (FIG. 71). By the longitudinal position of the coupling 7150 being regulated, the coupling 7150 can be more assuredly engaged relative to the drive shaft 180.

The engaging operation for engaging the coupling 7150 with the drive shaft 180 will be described. The engaging operation is the same as that of Embodiment 1 substantially (FIG. 22). Here, referring to FIG. 73, the description will be made about the relation among the main assembly guide main assembly guide 7130R2, the bearing member 7157, and the coupling 7150 to the process which the coupling engages with the drive shaft 180. As long as the connecting portion 7150*c* contacts to the rib 7130R1*a*, the cartridge guide 7157*a* is separate from the guide surface 7130R1*c*. By this, the coupling 7150 is inclined (FIG. 73(*a*), FIG. 73(*d*)) (pre-engagement angular position). At the time of the free end 7150A1 of the inclined coupling 7150 passing by the shaft free-end 180*b*3, the connecting portion 7150*c* is departed from the guide rib 7130R1*a* (FIG. 73(*b*), FIG. 73(*e*)). At this time, the cartridge guide 7157*a* passes the guide surface 7130R1*c*, and begins to contact to the positioning surface 7130R1*e* through the inclined surface 7130R1*d* (FIG. 73(*b*), FIG. 73 (*e*)). After that, the receiving surface 7150*f* or the projection 7150*d* contacts to the free end portion 180*b* or the pin 182. And, in response to the cartridge mounting operation, the axis L2 becomes substantially co-axial with the axis L1, and the center of the drum shaft and the center of the coupling align with each other. And, finally, as shown in FIG. 73(*c*) and FIG. 73(*f*), the axis L1 and the axis L2 are co-axial relative to each other. And, the coupling 7150 is in the rotation latency state (rotational force transmitting angular position).

In addition, the step substantially opposite from the engaging operation is followed in the process which takes out the cartridge B from the apparatus main assembly A. In other words, the cartridge B moves in the dismounting direction. By this, the free end portion 180*b* pushes the receiving surface 7150*f*. By this, the axis L2 begins to incline relative to the axis L1. The upstream free end portion 7150A1 with respect to the dismounting direction moves on the shaft free-end 180*b* by dismounting operation of the cartridge, and, the axis L2 inclines until the upper free end portion A1 reaches the drive shaft free-end 180*b*3. And, the coupling 7150 passes by the shaft free-end 180*b*3 completely in this state (FIG. 73 (*b*)). After that, the connecting portion 7150*c* contacts the coupling 7150 to the rib 7130R1*a*. By this, the coupling 7150 is taken out in the state inclined toward the downstream with respect to the mounting direction. In other words, the coupling 5150 is pivoted to the disengaging angular position from the rotational force transmitting angular position (swinging).

As has been described hereinbefore, the coupling swings by the user mounting the cartridge to the main assembly, and it engages with the main assembly driving shaft. In addition, a special means for maintaining the orientation of the coupling is unnecessary. However, the orientation maintenance structure as in the embodiment 4-embodiment 8 may be used with the present embodiment.

In this embodiment, the coupling is inclined toward the mounting direction by applying the weight to the guide rib. However, not only the weight, the spring force and so on may be utilized further.

In this embodiment, the coupling is inclined by the connecting portion of the coupling receiving the force. However, the present embodiment is not limited to this example. For example, if the coupling is inclined by receiving the force from a contact portion of the main assembly, the portion other than the connecting portion may be contacted to the contact portion.

In addition, the present embodiment may be implemented with any of the embodiment 4-embodiment 8. In this case, the engagement and disengagement relative to the drive shaft of the coupling can be ensured.

Embodiment 10

Referring to FIG. 74-FIG. 81, the tenth embodiment of the present invention will be described.

In this embodiment, another means for inclining the axis L2 relative to the axis L1 will be described.

Figure 74:
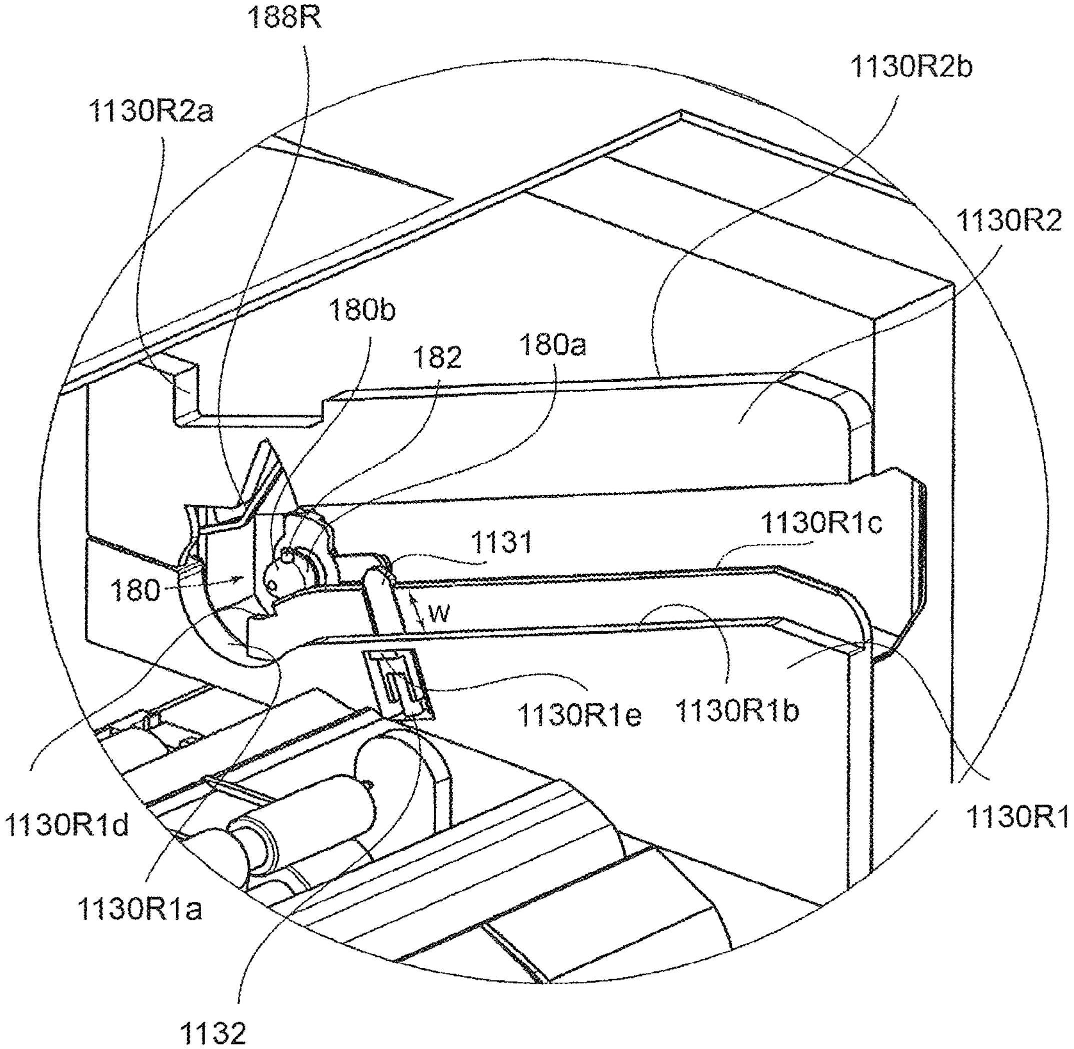
FIG. 74 is a perspective view which illustrates a driving side of a main assembly guide according to a tenth embodiment of the present invention.

FIG. 74 is a perspective view which illustrates a driving side of an apparatus main assembly.

Referring to FIG. 74, a main assembly guide and a coupling urging means will be described.

The present embodiment is effectively applied, in the case that the frictional force described in Embodiment 9 would be larger than the force of pivoting the coupling 7150 toward the downstream (mounting direction X4) by the reaction force. More particularly, for example, even if the frictional force increases by rubbing action to the connecting portion or the main assembly guide, the coupling can be assuredly pivoted to the pre-engagement angular position, according to this embodiment. The main assembly guide 1130R1 includes. A guide surface 1130R1*b* for guiding the cartridge B through the cartridge guide 140R1 (FIG. 2), A guide rib 1130R1*c* which guides the coupling 150, and cartridge positioning portion 1130R1*a*. The guide rib 1130R1*c* is on the mounting locus of the cartridge B. And, the guide rib 1130R1*c* is extended to just before the drive shaft 180 with respect to the cartridge mounting direction. In addition, a rib 1130R1*d* provided adjacent to the drive shaft 180 has a height not causing interference when the coupling 150 engages.

A part of a rib 1130R1*c* is cut away. And, the main assembly guide slider 1131 is mounted to the rib 1130R1*c* slidably in the direction of an arrow W. The slider 1131 is pressed by an elastic force of an urging spring 1132. And, the position is determined by the slider 1131 abutting to the abutment surface 1130R1*e* of the main assembly guide 1130R1. In this state, the slider 1131 projects from the guide rib 1130R1*c*.

The main assembly guide 1130R2 has a guide portion 1130R2*b* for determining the orientation at the time of the mounting of the cartridge B by guiding a part of cartridge frames B1, and a cartridge positioning portion 1130R2*a*.

Figure 75:
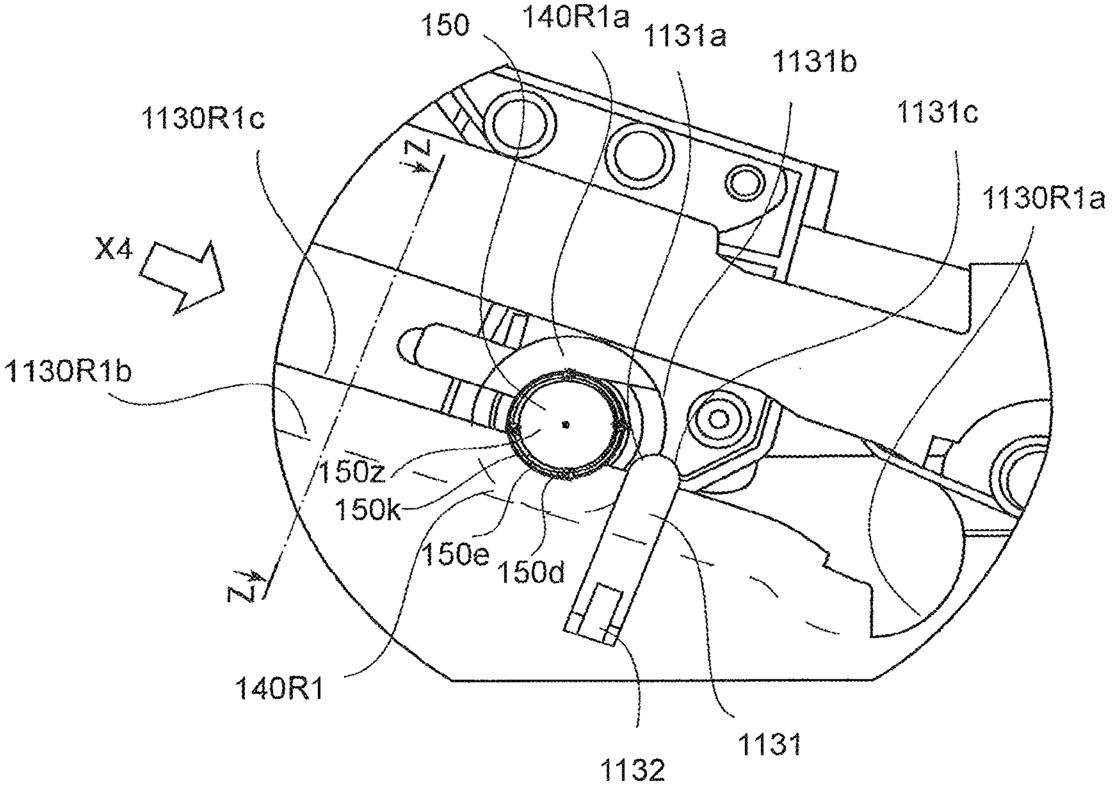
FIG. 75 is a side view which illustrates a relation between the main assembly guide and a coupling according to the embodiment of the present invention.
Figure 76:
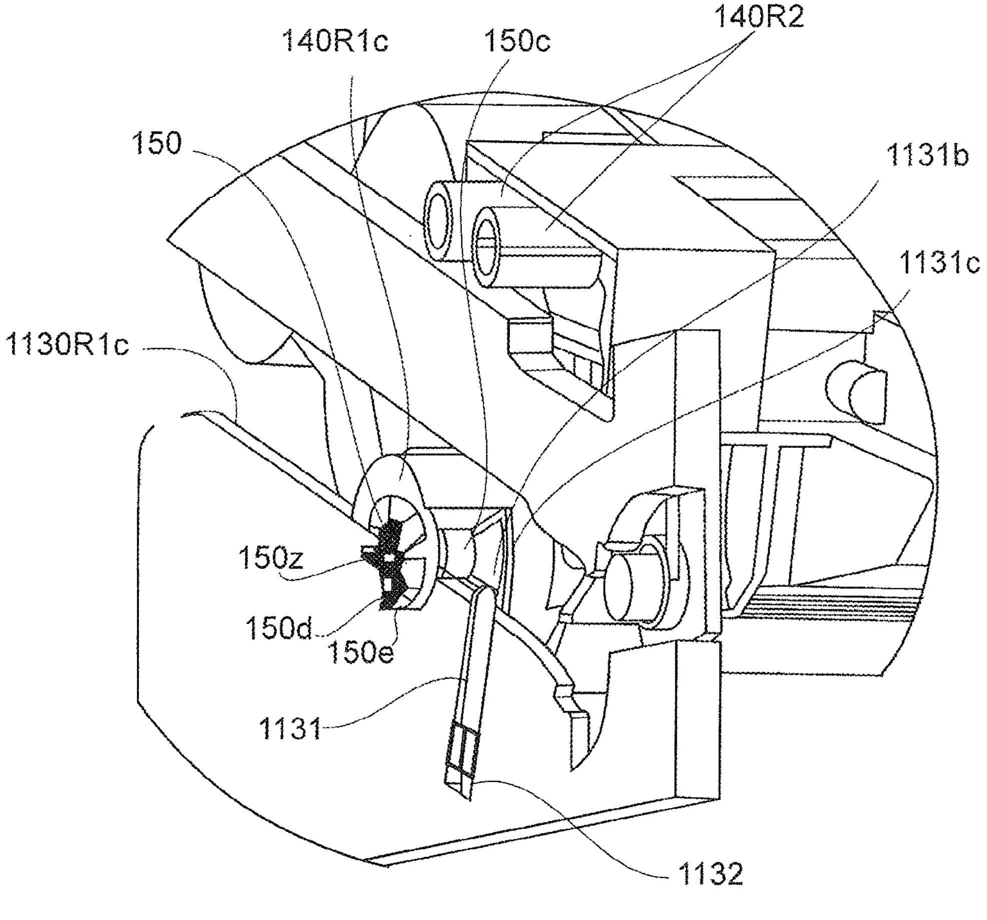
FIG. 76 is a perspective view which illustrates a relation between the main assembly guide and the coupling according to the embodiment of the present invention.
Figure 77:
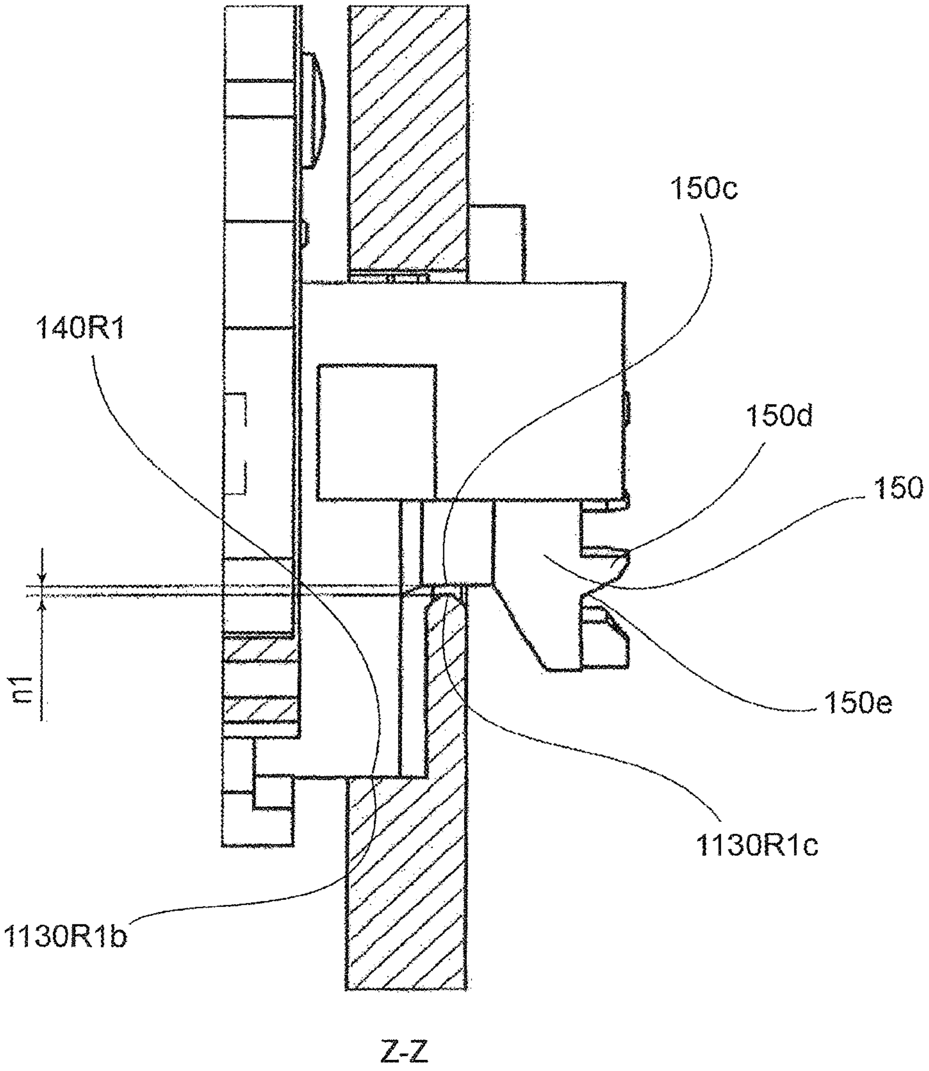
FIG. 77 is a side view which illustrates a relation between the cartridge and the main assembly guide according to the embodiment of the present invention.

Referring to FIG. 75-FIG. 77, the among relation of the main assembly guide 1130R1, 1130R2, the slider 1131, and the cartridge B, at the time of mounting the cartridge B, will be described. FIG. 75 is a side view, as seen from the main assembly driving shaft 180 (FIGS. 1 and 2) side, and FIG. 76 is a perspective view thereof. FIG. 77 is a sectional view taken along Z-Z of FIG. 75.

As shown in FIG. 75, in the driving side, while the cartridge guide 140R1 of the cartridge contacts to the guide surface 1130R1*b*, the cartridge moves. At this time, as shown in FIG. 77, the connecting portion 150*c* is separated from the guide rib 1130R1*c* by n1. Therefore, the force is not applied to the coupling 150. In addition, as shown in FIG. 75, the coupling 150 is regulated by the regulating portion 140R1*a* at the upper surface and the left side. Therefore, the coupling 150 is freely pivotable only in the mounting direction (X4).

Figure 78:
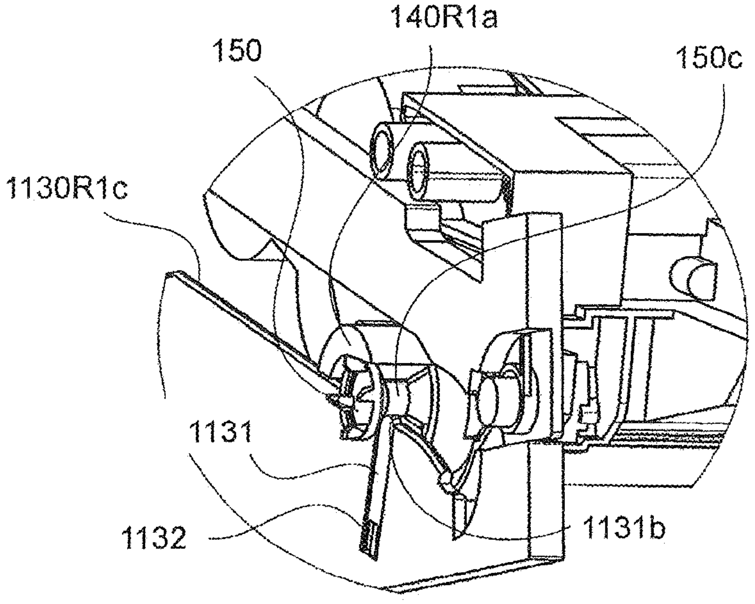
FIG. 78 is perspective views which illustrate a relation between the main assembly guide and the coupling according to the embodiment of the present invention.
Figure 79:
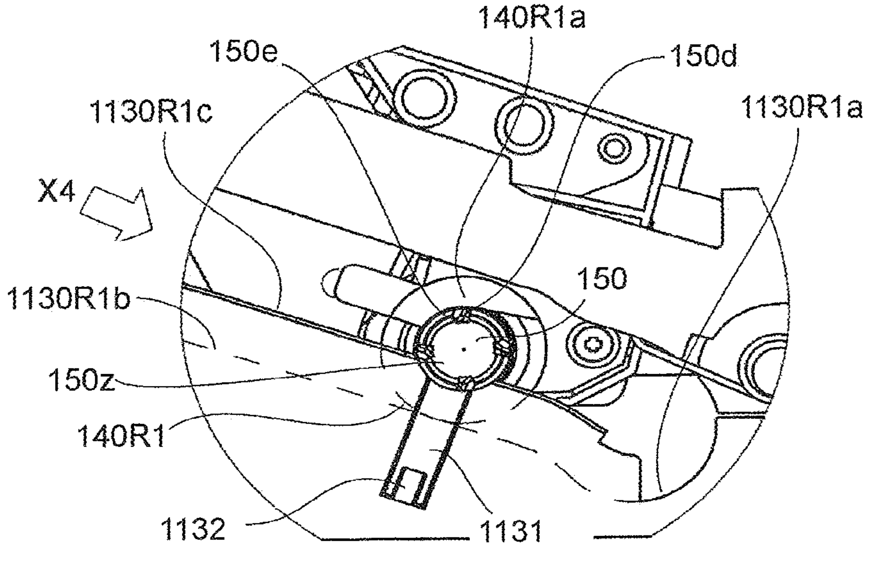
FIG. 79 is a side view which illustrates a relation between the main assembly guide and the coupling according to the embodiment of the present invention.

Referring to FIG. 78-FIG. 81, the operation of moving the slider 1131 to the retreating position from the energizing position while the coupling 150 contacts to the slider 1131, will be described. In FIG. 78-FIG. 79, the coupling 150 contacts in the apex 1131*b* of the slider 1131, more particularly, the slider 1131 is in the retreating position. The connecting portion 150*c* and the inclined surface of the projection of the slider 1131 1131*a* contact with each other by the entrance of the coupling 150 pivotable only in the mounting direction (X4). By this, the slider 1131 is depressed and it moves to the retreating position.

Figure 80:
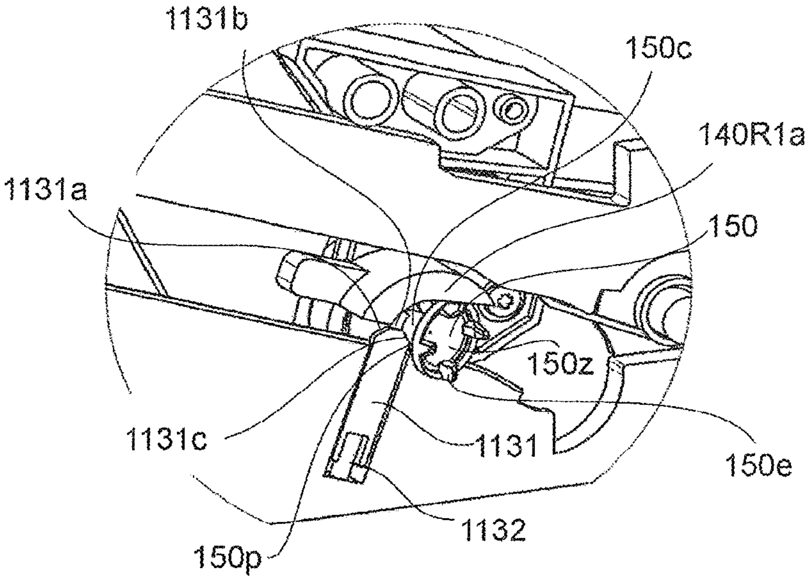
FIG. 80 is a perspective view which illustrates a relation between the main assembly guide and the coupling according to the embodiment of the present invention.
Figure 81:
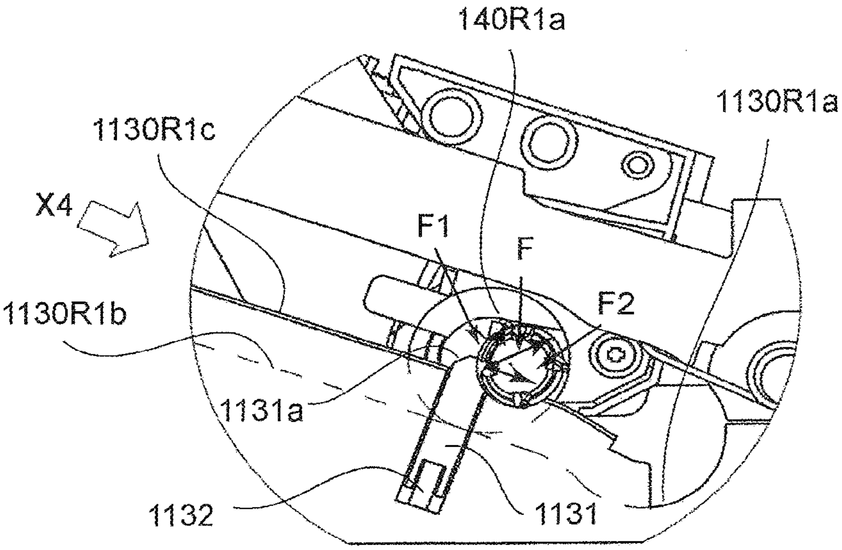
FIG. 81 is a side view which illustrates a relation between the main assembly guide and the coupling according to the embodiment of the present invention.

Referring to FIG. 80-FIG. 81, the operation after the coupling 150 rides over an apex 1131*b* of the slider 1131 will be described. FIG. 80-FIG. 81 illustrate the state after the coupling 150 ride over the apex 1131*b* of the slider 131.

When the coupling 150 rides over the apex 1131*b*, the slider 1131 tends to return from the retreating position to the energizing position by the elastic force of the urging spring 132. In that case, a part of connecting portion 150*c* of the coupling 150 receives the force F from the inclined surface 1131*c* of the slider 1131. More particularly, the inclined surface 1131*c* functions as the force applying portion and it functions as the force receiving portion for a part of connecting portion 150*c* to receive this force. As shown in FIG. 80, the force receiving portion is provided in the upstream of the connecting portion 150*c* with respect to the cartridge mounting direction. Therefore, the coupling 150 can be inclined smoothly. As shown in FIG. 81, in addition, the force F is divided into a component force F1 and a component force F2. At this time, the upper surface of the coupling 150 is regulated by the regulating portion 140R1*a*. Therefore, the coupling 150 is inclined toward the mounting direction (X4) by the component force F2. More particularly, the coupling 150 is inclined toward the pre-engagement angular position. By this, the coupling 150 becomes engageable with the drive shaft 180.

In the embodiment described above, the connecting portion receives the force and the coupling is inclined. However, the present embodiment is not limited to this example. For example, if the coupling is pivotable by receiving the force from the contact portion of the main assembly, the portion other than the connecting portion may contact with the contact portion.

In addition, the present embodiment may be implemented with any of the embodiment 4-embodiment 9. In this case, the engagement and disengagement of the coupling relative to the drive shaft can be ensured.

Embodiment 11

Figure 82:
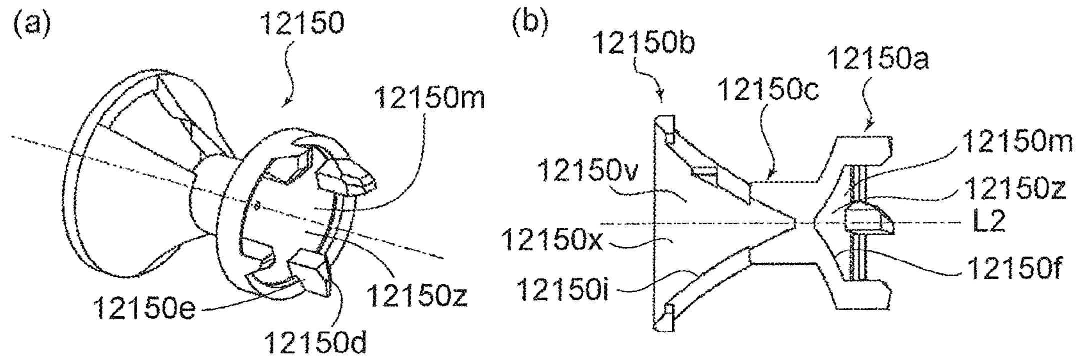
FIG. 82 is a perspective view and a sectional view of a coupling according to an eleventh embodiment of the present invention.
Figure 83:
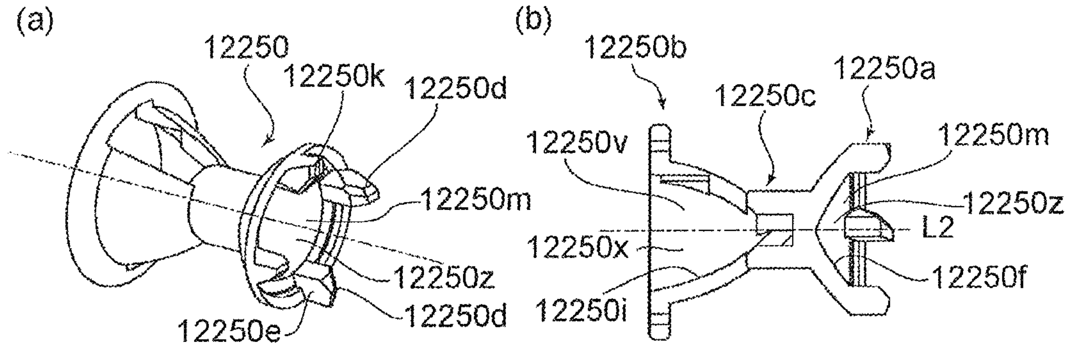
FIG. 83 is a perspective view and a sectional view of the coupling according to the embodiment of the present invention.
Figure 84:
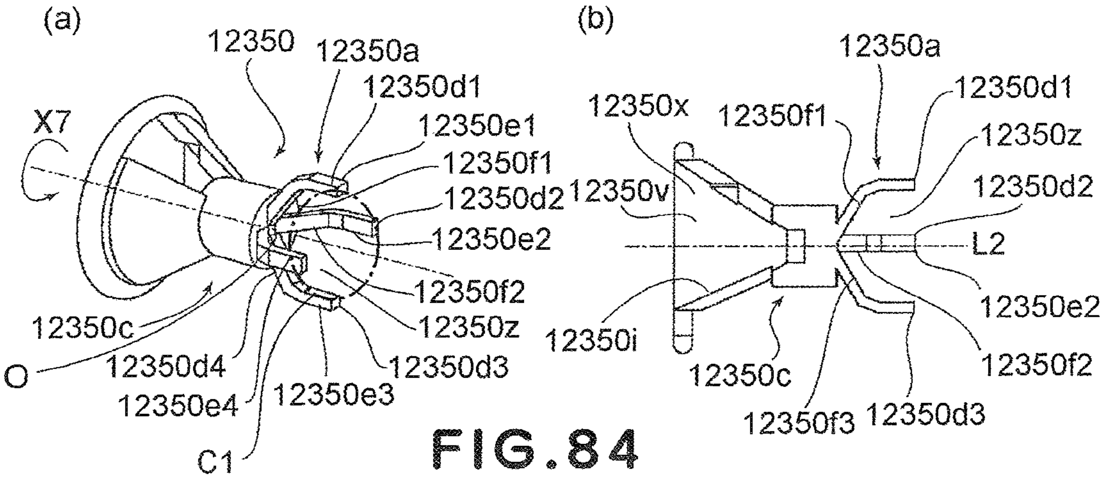
FIG. 84 is a perspective view and a sectional view of the coupling according to the embodiment of the present invention.

Referring to FIG. 82-FIG. 84, the eleventh embodiment of the present invention will be described.

In the present embodiment, the configuration of the coupling will be described. FIG. 82-FIG. 84(*a*) are perspective views of couplings, FIG. 82-FIG. 84(*b*) are sectional views of the couplings.

In the previous embodiments, the driving shaft receiving surface and the drum bearing surface of the coupling have conical shapes, respectively. However, in this embodiment, the different configuration will be described.

A coupling 12150 shown in FIG. 82 mainly comprises three portions similarly to the coupling shown in FIG. 8. More particularly, as shown in FIG. 82(*b*), the coupling 12150 comprises an a driven portion 12150*a* for receiving the drive from the drive shaft, a driving portion 12150*b* for transmitting the drive to a drum shaft, and a connecting portion 12150*c* which connects the driven portion 12150*a* and the driving portion 12150*b* with each other.

As shown in FIG. 82(*b*), the driven portion 12150*a* has a drive shaft insertion opening portion 12150*m* as an expanded part which expands toward the drive shaft 180 relative to the axis L2 the driving portion 12150*b* has a drum shaft insertion opening portion 12150*v* as an expanded part which expands toward the drum shaft 153. An opening 12150*m* and an opening 12150*v* are constituted by the driving shaft receiving surface 12150*f* of a divergent shape, and the drum bearing surface 12150*i* of a divergent shape, respectively. The receiving surface 12150*f* and the receiving surface 12150*i* have the recesses 12150*x*, 12150*z* as shown in the Figure. At the time of the rotational force transmission, the recess 12150*z* opposes to the free end of the drive shaft 180. More particularly, the recess 12150*z* covers the free end of the drive shaft 180.

Referring to FIG. 83, a coupling 12250 will be described. As shown in FIG. 83(*b*), a driven portion 12250*a* has a drive shaft insertion opening portion 12250*m* as an expanded part which expands toward the drive shaft 180 relative to the axis L2 a driving portion 12250*b* has a drum shaft insertion opening portion 12250*v* as the expanded part which expands toward the drum shaft 153 relative to the axis L2.

An opening 12250*m* and an opening 12250*v* are constituted by the driving shaft receiving surface 12250*f* of a bell-like shape, and the drum bearing surface 12250*i* of a bell-like shape, respectively. A receiving surface 12250*f* and a receiving surface 12250*i* constitute the recesses 12250*x*, 12250*z* as shown in the Figure. At the time of the rotational force transmission, the recess 12250*z* engages with the free end portion of the drive shaft 180. Referring to FIG. 84, a coupling 12350 will be described. As shown in FIG. 84(*a*), a driven portion 12350*a* includes drive receiving projections 12350*d* 1 or 12350*d* 2 or 12350*d*3 and 12350*d*4 which are directly extended from a connecting portion 12350*c* and which expand radially toward the drive shaft 180 relative to the axis L2. In addition, the portion between the adjacent projections 12350*d*1-121350*d*4 constitutes the standing-by portion. Furthermore, the rotational force receiving surfaces (rotational force receiving portion) 12350*e* (12350*e*1-*e*4) are provided in the upstream with respect to the rotational direction X7. At the time of the rotation, a rotational force is transmitted to the rotational force receiving surfaces 12350*e*1-*e*4 from the pin (rotational force applying portion) 182. At the time of the rotational force transmission, the recess 12250*z* opposes to the free end portion of the drive shaft which is the projection of the apparatus main assembly. More particularly, the recess 12250*z* covers the free end of the drive shaft 180.

In addition, if the effect similar to Embodiment 1 is provided, the configuration of the opening 12350*v* may be any.

In addition, the mounting method to the cartridge of the coupling is the same as that of Embodiment 1, and therefore, the description is omitted. In addition, the operation of mounting the cartridge to the apparatus main assembly, and the operation of extracting from the apparatus main assembly are the same as those of Embodiment 1 (FIGS. 22 and 25), and therefore, the description is omitted.

As has been described hereinbefore, the drum bearing surface of the coupling has the expanding configuration, and the coupling can be mounted relative to the axis of the drum shaft for inclination. In addition, the driving shaft receiving surface of the coupling has the expanding configuration and can incline the coupling, without interfering with the drive shaft in response to the mounting operation or the dismounting operation of the cartridge B. By this, also in this embodiment, the effects similar to the first embodiment or the second embodiment can be provided.

In addition, as for the configurations of the opening 12150*m*, 12250*m* and the opening 12150*v*, 12250*v*, they may be a combination of the divergent, bell-like shapes.

Embodiment 12

Figure 85:
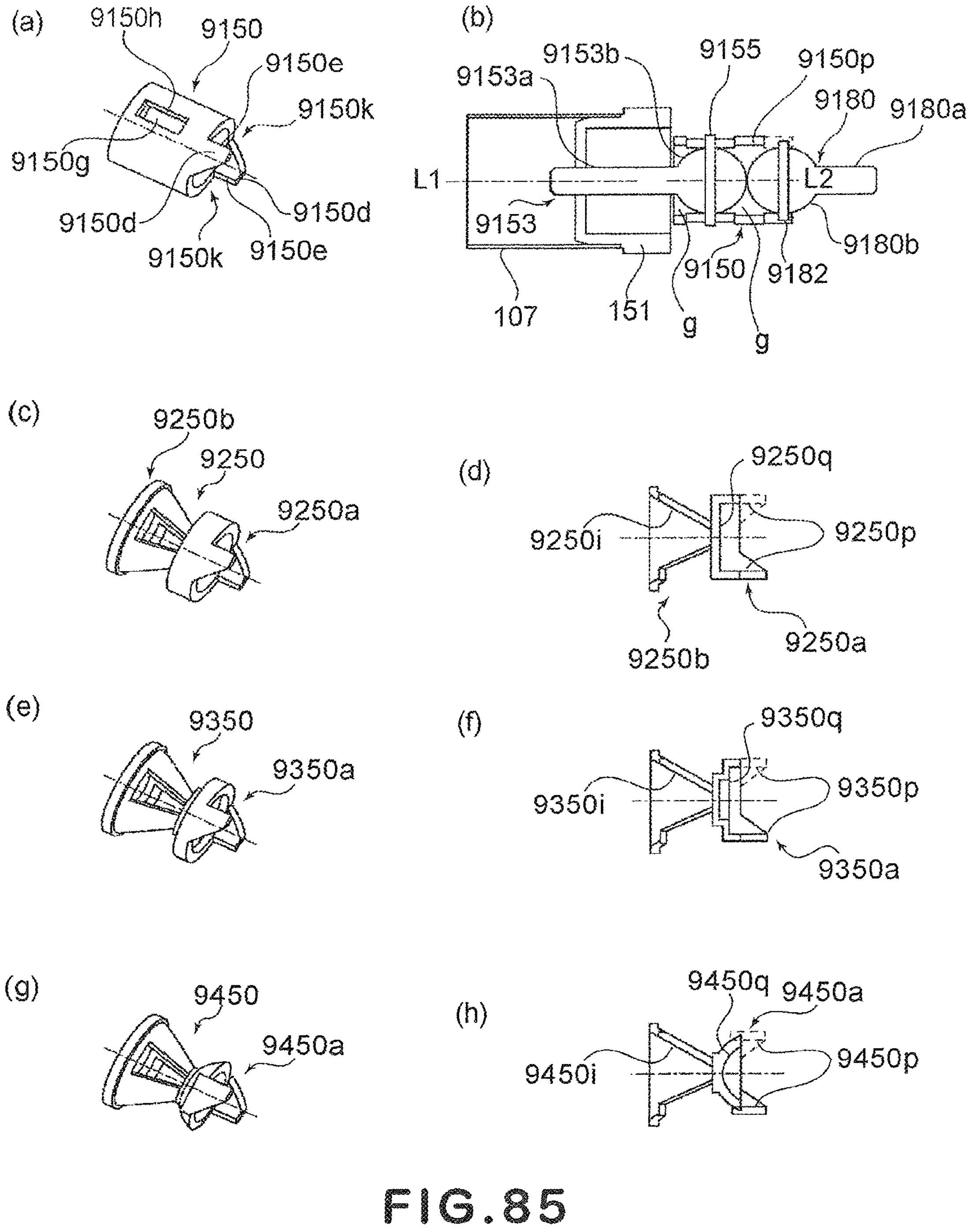
FIG. 85 is perspective views and sectional views of a coupling according to a twelfth embodiment of the present invention.

Referring to FIG. 85, the twelfth embodiment of the present invention will be described.

The present embodiment is different from Embodiment 1 in the configuration of the coupling FIG. 85(*a*) is a perspective view of a coupling which has a substantially cylindrical shape, and FIG. 85(*b*) is a sectional view when the coupling mounted to the cartridge engages with a drive shaft.

A drive side edge of the coupling 9150 is provided with a plurality of driven projections 9150*d*. In addition, a drive receiving stand-by portion 9150*k* is provided between the drive receiving projections 9150*d*. The projection 9150*d* is provided with a rotational force receiving surface (rotational force receiving portion) 9150*e*. A rotational force transmitting pin (rotational force applying portion) 9182 of the drive shaft 9180 as will be described hereinafter contacts to the rotational force receiving surface 9150*e*. By this, a rotational force is transmitted to the coupling 9150.

In order to stabilize the running torque transmitted to the coupling, a plurality of rotational force receiving surfaces 150*e* are desirably disposed on the same circumference (on the phantom circle C1 of FIG. 8 (*d*)). By the disposition in this manner, the rotational force transmission radius is constant and the torque transmitted is stabilized. In addition, from the viewpoint of the stabilization of the drive transmission, the receiving surfaces 9150*e* are desirably provided on the opposed positions (180 degrees) diametrically. In addition, the number of the receiving surfaces 9150*e* may be any if the pin 9182 of the drive shaft 9180 can be received by the standing-by portion 9150*k*. In the present embodiment, the number is two. The rotational force receiving surfaces 9150*e* may not be on the same circumference, or they may not be disposed diametrically opposed positions.

In addition, the cylinder surface of the coupling 9150 is provided with the standby opening 9150*g*. In addition, the opening 9150*g* is provided with the rotational force transmission surface (rotational force transmitting portion) 9150*h*. The drive transmission pin (rotational force receiving member) 9155 (FIG. 85(*b*)) of the drum shaft as will be described hereinafter contacts to this rotational force transmission surface 9150*h*. By this, the rotational force is transmitted to the photosensitive drum 107.

Similarly to the projection 9150*d*, the rotational force transmission surface 9150*h* is desirably disposed diametrically opposed on the same circumference.

The structures of the drum shaft 9153 and the drive shaft 9180 will be described. In Embodiment 1, the cylindrical end is a spherical surface. In this embodiment, however, a diameter of a spherical free end portion 9153*b* of the drum shaft 9153 is larger than a diameter of a main part 9153*a*. With this structure, even if the coupling 9150 has the cylindrical shape as illustrated, it is pivotable relative to the axis L1. In other words, a gap g as illustrated is provided between the drum shaft 9153 and the coupling 9150 by this, the coupling 9150 is pivotable (swingable) relative to the drum shaft 9153. The configuration of the drive shaft 9180 is the same as that of the drum shaft 9150 substantially. In other words, the configuration of the free end portion 9180*b* is the spherical surface, and the diameter thereof is larger than the diameter of the main part 9180*a* of the cylindrical shape portion. In addition, the pin 9182 which pierces through the substantial center of the free end portion 9180*b* which is the spherical surface is provided the pin 9182 transmits the rotational force to the rotational force receiving surface 9150*e* of the coupling 9150.

The drum shaft 9150 and the spherical surface of the drive shaft 9180 are in engagement with the inner surface 9150*p* of the coupling 9150. By this, the relative position between the drum shaft 9150 and the coupling 9150 of the drive shaft 9180 is determined. The operation with respect to the mounting and demounting of the coupling 9150 is the same as Embodiment 1, and therefore, the description thereof is omitted.

As has been described hereinbefore, the coupling has the cylindrical shape, and therefore, the position with respect to the direction perpendicular to the direction of the axis L2 of the coupling 9150 can be determined relative to the drum shaft or the drive shaft. A modified example of the coupling will be described further. In the configuration of the coupling 9250 shown in FIG. 85(*c*), a cylindrical shape and a conical shape are put together. FIG. 85 (*d*) is a sectional view of the coupling of this modified example. A driven portion 9250*a* of the coupling 9250 has a cylindrical shape, and an inner surface 9250*p* thereof engages with the spherical surface of the drive shaft. Furthermore, it has the abutment surface 9250*q* and can effect the positioning with respect to the axial direction between the coupling 9250 and the drive shaft 180. The driving portion 9250*b* has a conical shape, and, similarly to Embodiment 1, the position relative to the drum shaft 153 is determined by the drum bearing surface 9250*i*.

The configuration of the coupling 9350 shown in FIG. 85(*e*) is a combination of a cylindrical shape and a conical shape. FIG. 85(*f*) is a sectional view of this modified example the driven portion 9350*a* of the coupling 9350 has a cylindrical shape, and the inner surface 9350*p* thereof engages with the spherical surface of the drive shaft 180. The positioning in the axial direction is effected by abutting the spherical surface of the drive shaft to the edge portion 9350*q* formed between the cylindrical portions having different diameters.

The configuration of the coupling 9450 shown in FIG. 85(*g*) is a combination of a spherical surface, a cylindrical shape, and a conical shape. FIG. 85(*h*) is a sectional view of this modified example a driven portion 9450*a* of the coupling 9450 has a cylindrical shape, and the inner surface 9450*p* thereof engages with the spherical surface of the drive shaft 180. A spherical surface of the drive shaft 180 is contacted to a spherical surface 9450*q* which is a part of the spherical surface. By this, the position can be determined with respect to the direction of the axis L2.

In addition, in this embodiment, the coupling has the substantially cylindrical shape and the free end portions of the drum shaft or the drive shaft have the spherical configurations in addition, it has been described that the diameter thereof is larger than the diameter of the main part of the drum shaft or the drive shaft. However, the present embodiment is not limited to such an example. The coupling has a cylindrical shape and the drum shaft or the drive shaft has a cylindrical shape and, a diameter of the drum shaft or the drive shaft is small relative to an inner diameter of an inner surface of the coupling within limits in which the pin does not disengage from the coupling. By this, the coupling is pivotable relative to the axis L1 the coupling can be inclined without interfering with the drive shaft in response to the mounting operation or the dismounting operation of the cartridge B. In view of this, also in this embodiment, the effects similar to Embodiment 1 or Embodiment 2 can be provided.

In addition, in this embodiment, although an example of the combination of the cylindrical shape and conical shape has been described as the configuration of the coupling, it may be opposite to the example. In other words, the drive shaft side may be formed into a conical shape, and the drum shaft side may be formed into a cylindrical shape.

Embodiment 13

Figure 86:
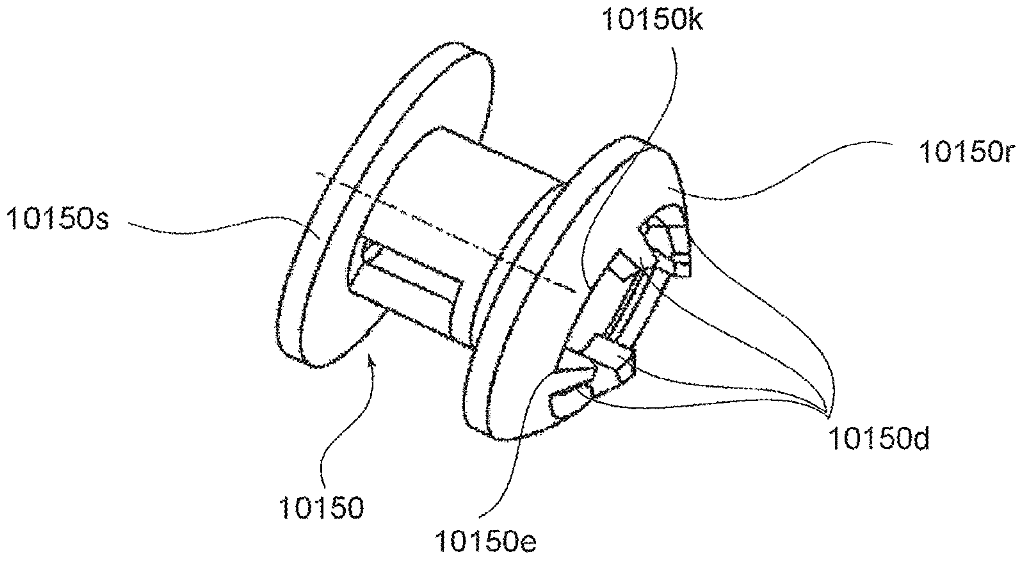
FIG. 86 is perspective views which illustrate a coupling according to a thirteenth embodiment of the present invention.
Figure 87:
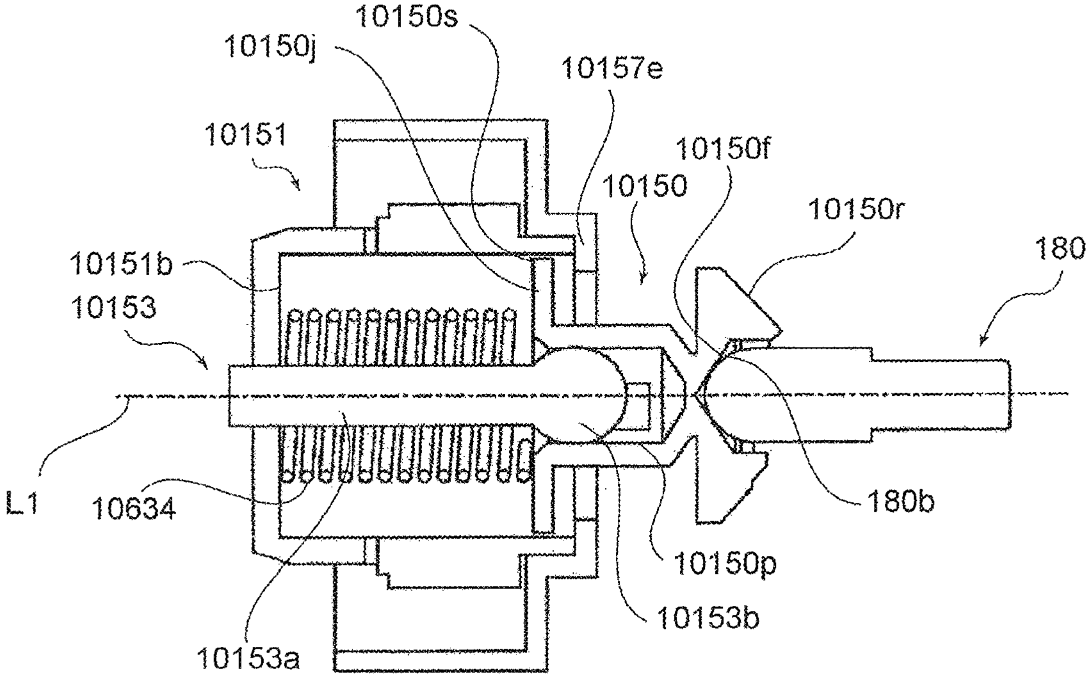
FIG. 87 is a sectional view which illustrates a drum shaft, a drive shaft, the coupling, and an urging member according to the embodiment of the present invention.
Figure 88:
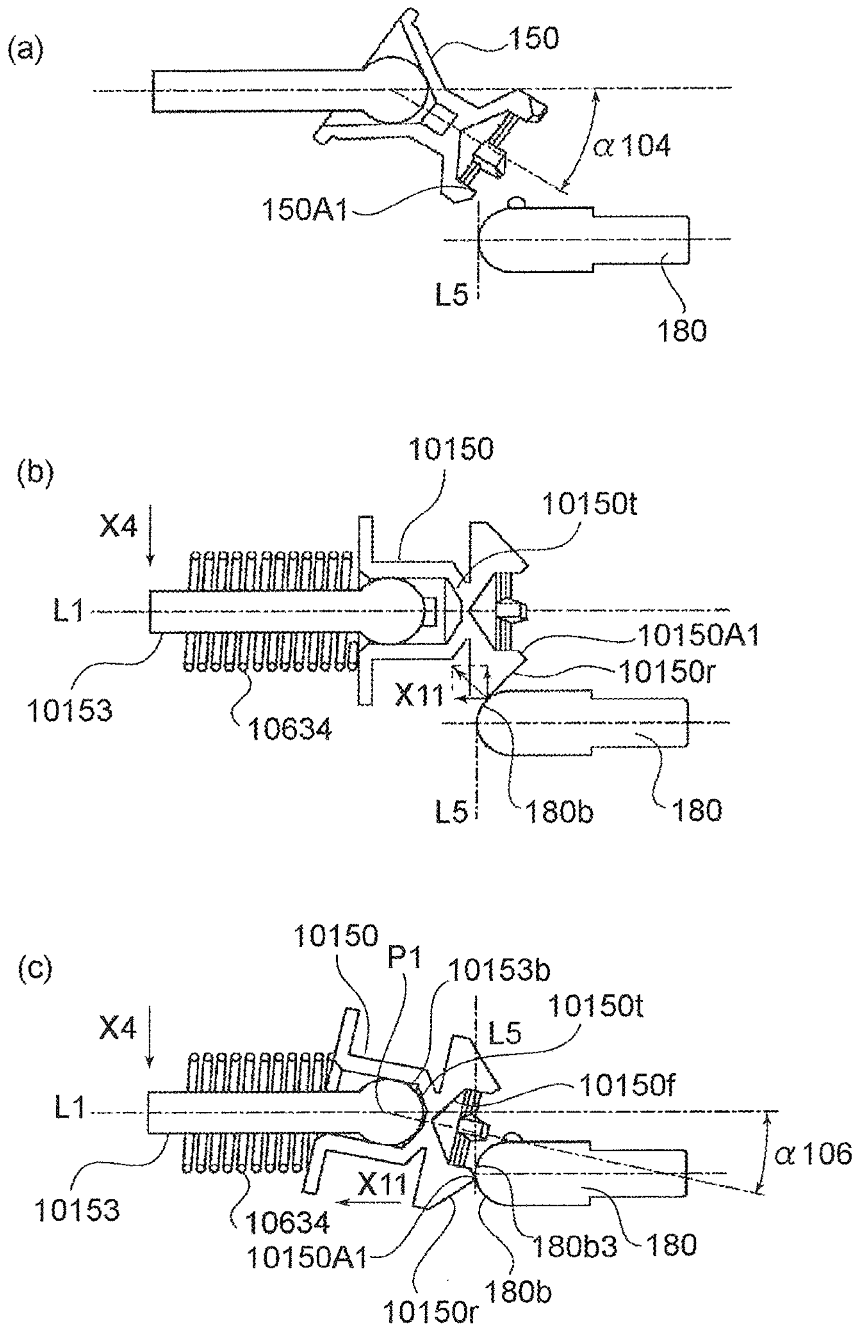
FIG. 88 is sectional views which illustrate the drum shaft, the coupling, a bearing member, and the drive shaft according to the embodiment of the present invention.

Referring to FIG. 86-FIG. 88, the thirteenth embodiment of the present invention will be described.

The present embodiment is different from Embodiment 1 in the mounting operation relative to the drive shaft of the coupling, and the structure with respect to it. FIG. 86 is a perspective view which illustrates a configuration of a coupling 10150 of the present embodiment. The configuration of the coupling 10150 is a combination of the cylindrical shape and conical shape which have been described in Embodiment 10. In addition, a tapered surface 10150*r* is provided on the free end side of a coupling 10150. In addition, the surface of an opposite side of the drive receiving projection 10150*d* with respect to the direction of the axis L1 is provided with an urging force receiving surface 10150*s*.

Referring to FIG. 87, the structure of the coupling will be described.

An inner surface 10150*p* and a spherical surface 10153*b* of a drum shaft 10153 of the coupling 10150 are in engagement with each other. An urging member 10634 is interposed between a receiving surface 10150*s* described in the foregoing and a bottom surface 10151*b* of a drum flange 10151. By this, the coupling 10150 is urged toward the drive shaft 180. In addition, similarly to the foregoing embodiments, a retention rib 10157*e* is provided in the drive shaft 180 side of the flange portion 10150*j* with respect to the direction of the axis L1. By this, the disengagement of the coupling 10150 from the cartridge is prevented the inner surface 10150*p* of the coupling 10150 is cylindrical. Therefore, it is the movable in the direction of the axis L2.

FIG. 88 is for illustrating the orientation of the coupling in the case that the coupling engages with the drive shaft. FIG. 88(*a*) is a sectional view of the coupling 150 of Embodiment 1, and FIG. 88(*c*) is a sectional view of a coupling 10150 of the present embodiment. And, FIG. 88(*b*) is a sectional view before reaching the state of FIG. 88(*c*) the mounting direction is shown by X4 and the chain line L5 is a line drawn in parallel with the mounting direction from the free end of the drive shaft 180.

In order for the coupling to engage with the drive shaft 180, the downstream free end position 10150A1 with respect to the mounting direction needs to pass the free end portion 180*b*3 of the drive shaft 180. In the case of Embodiment 1, the axis L2 inclines by more than angle α104. By this, the coupling moves to the position where the free end position 150A1 does not interfere with the free end portion 180*b*3 (FIG. 88(*a*)).

On the other hand, in the coupling 10150 of the present embodiment, it in the state where it does not be in engagement with the drive shaft 180, the coupling 10150 takes the position nearest to the drive shaft 180 by the restoring force of the urging member 10634. In this state, when it moves in the mounting direction X4, a part of drive shafts 180 contact the cartridge B at the tapered surface 10150*r* of the coupling 10150 (FIG. 88(*b*)). At this time, the force is applied to the tapered surface 10150*r* in the direction opposite the X4 direction therefore, the coupling 10150 is retracted in the longitudinal direction X11 by a component force thereof. And, the free end portion 10153*b* of the drum shaft 10153 abuts to an abutting portion 10150*t* of the coupling 10150 in addition, the coupling 10150 rotates clockwisely about the center P1 of the free end portion 10153*b* (pre-engagement angular position). By this, the free end position 10150A1 of the coupling passes by the free end 180*b* of the drive shaft 180 (FIG. 88(*c*)). When the drive shaft 180 and the drum shaft 10153 becomes substantially co-axial, a driving shaft receiving surface 10150*f* of the coupling 10150 contacts to the free end portion 180*b* by the restoring force of the urging spring 10634. By this, the coupling becomes in the rotation latency state (FIG. 87). (rotational force transmitting angular position). With such a structure, the movement in the direction of the axis L2 and the pivoting motion (swinging operation) are combined, and the coupling is swung from the pre-engagement angular position to the rotational force transmitting angular position.

By this structure, even if the angle α106 (inclination amount of the axis L2) is small, the cartridge can be mounted to the apparatus main assembly A. Therefore, the space required by the pivoting motion of the coupling 10150 is small. Therefore, latitude in the design of the apparatus main assembly A is improved.

The rotation according to the drive shaft 180 of the coupling 10150 is the same as Embodiment 1, and therefore, the description thereof is omitted. At the time of taking out the cartridge B from the apparatus main assembly A, the free end portion 180*b* is forced on the conical shape driving shaft receiving surface 10150*f* of the coupling 10150 by removing force. The coupling 10150 is pivoted by this force, while retracting toward the direction of the axis L2 by this, the coupling is demounted from the drive shaft 180. In other words, the moving operation in the direction of the axis L2 and the pivoting motion are combined (whirling motion may be includes), the coupling can be pivoted to the disengaging angular position from the rotational force transmitting angular position.

Embodiment 14

Figure 89:
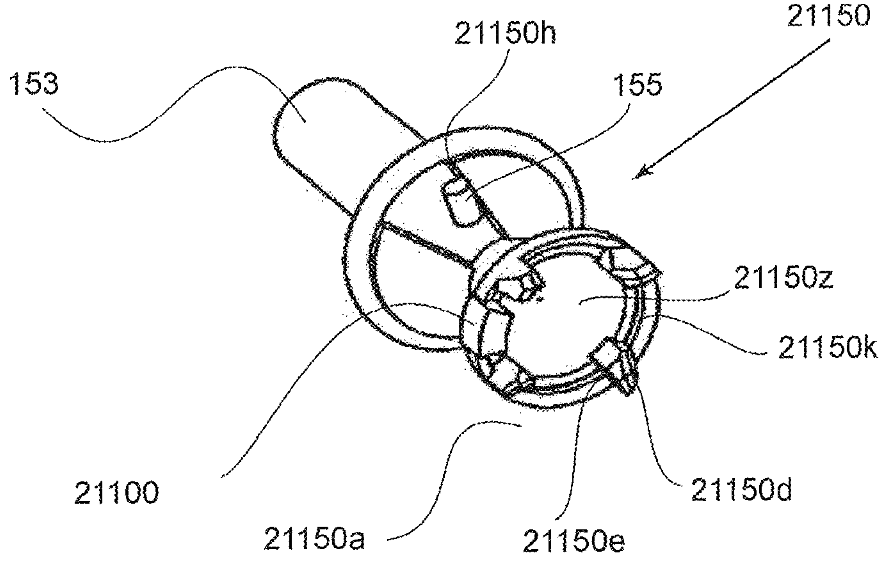
FIG. 89 is a perspective view which illustrates a drum shaft and a coupling according to a 14th embodiment of the present invention.
Figure 90:
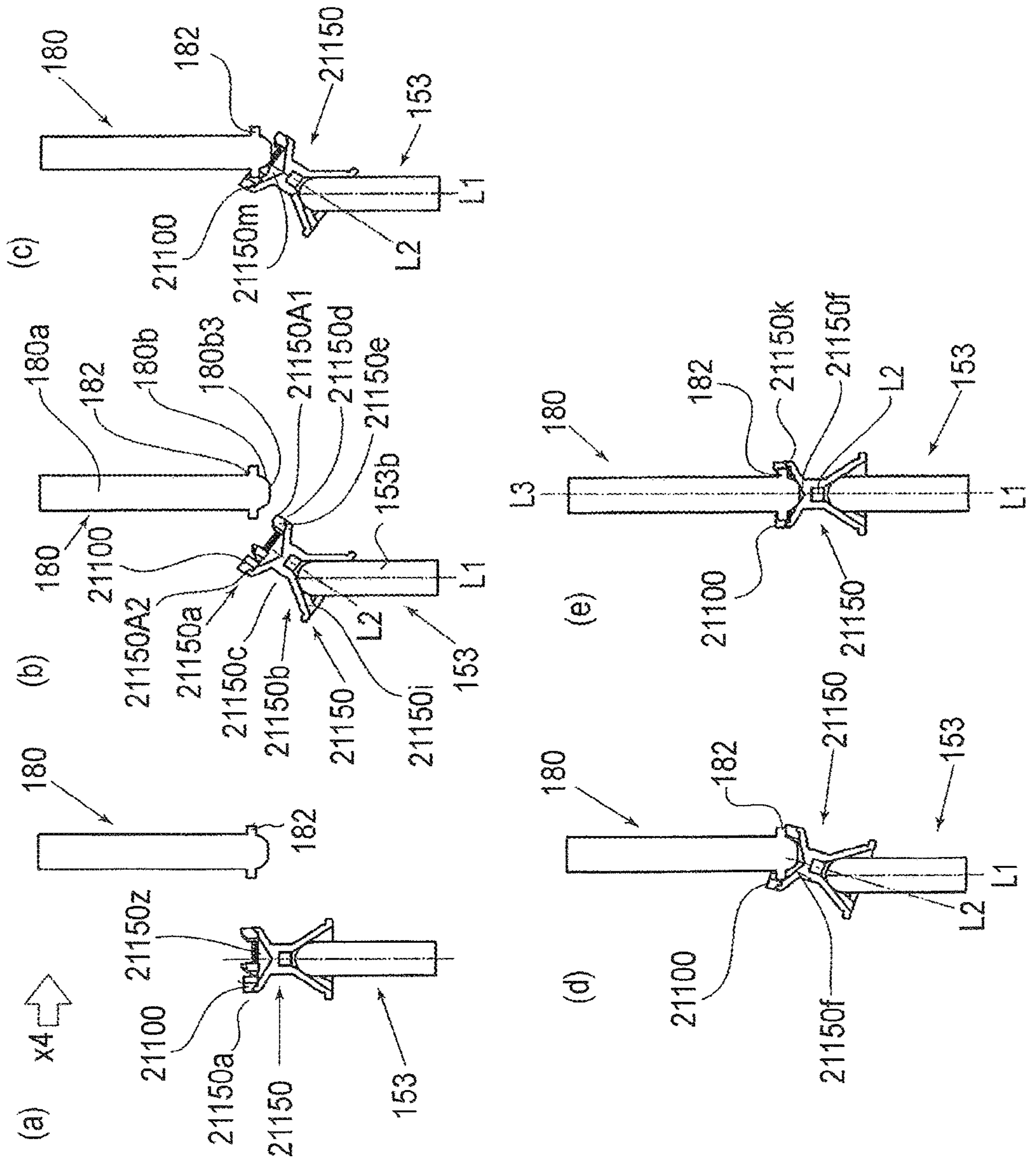
FIG. 90 is perspective views which illustrate a process of the engagement between a drive shaft and coupling according to the embodiment of the present invention.

Referring to FIG. 89-FIG. 90, the 14th embodiment of the present invention will be described.

The point in which the present embodiment is different from Embodiment 1 is in the engaging operation and the structure with respect to it relative to the drive shaft of the coupling.

FIG. 89 is a perspective view which illustrates only the coupling 21150 and the drum shaft 153 FIG. 90 is a longitudinal sectional view, as seen from the lower of the apparatus main assembly As shown in FIG. 89, the magnet member 21100 is mounted to the end of the driving portion 21150*a* of the coupling 21150 The drive shaft 180 shown in FIG. 90 comprises magnetic material Therefore, in this embodiment, the magnet member 21100 is inclined in the coupling 21150 by the magnetic force between the drive shaft 180 of it and magnetic material.

First, as shown in FIG. 90(*a*), the coupling 21150 is not particularly inclined relative to the drum shaft 153 at this time, the magnet member 21100 is positioned in the driving portion 21150*a* in the upstream with respect to the mounting direction X4.

When it is inserted to the position shown in FIG. 90(*b*), the magnet member 21100 is attracted toward the drive shaft 180. And, as illustrated, the coupling 21150 begins the swinging motion by the magnetic force thereof.

Thereafter, the leading end position 21150A1 of the coupling 21150 with respect to the mounting direction (X4) passes by the drive shaft free-end 180*b*3 which has the spherical surface And, the driving shaft receiving surface 21150*f* of a conical shape or the driven projection 21150*d* (the cartridge side contact portion) which constitutes the recess 21150*z* of the coupling 21150 contacts the free end portion 180*b* or 182 after the passage (FIG. 90(*c*)).

And, it inclines so that the axis L2 becomes substantially co-axial with the axis L1 in response to the mounting operation of the cartridge B (FIG. 90 (*d*)).

Finally, the axis L1 and the axis L2 become substantially co-axial with each other In this state, the recess 21150*z* covers the free end portion 180*b* The axis L2 pivots the coupling 21150 to the rotational force transmitting angular position from the pre-engagement angular position so that it is substantially co-axial with the axis L1 The coupling 21150 and the drive shaft 180 are engaged with each other (FIG. 90(*e*)).

Motion of the coupling shown in FIG. 90 may also include the revolution.

It is necessary to position the magnet member 21100 in the upstream of the driving portion 21150*a* with respect to the mounting direction X4.

Therefore, at the time of mounting the cartridge B to the apparatus main assembly A, it is necessary to align the phase of the coupling 21150 The method described with respect to Embodiment 2 is usable for the method of doubling the phase of the coupling.

The state of receiving rotation driving force and rotating after the mounting completion is the same as Embodiment 1 and therefore, the description is omitted.

Embodiment 15

Figure 91:
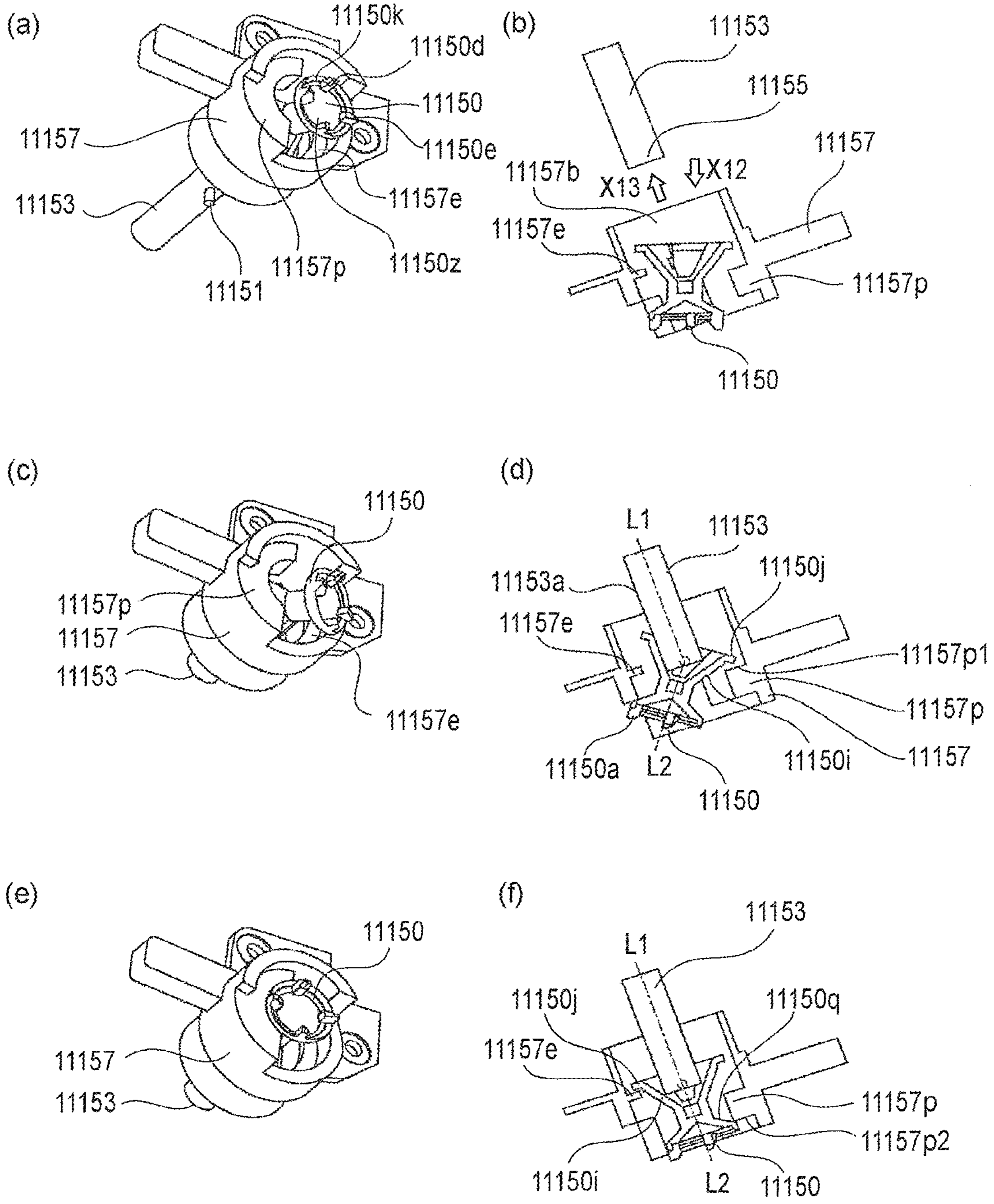
FIG. 91 is perspective views and sectional views which illustrate a drum shaft, a coupling, and a bearing member according to a 15th embodiment of the present invention.

Referring to FIG. 91, the 15th embodiment of the present invention will be described.

The point in which the present embodiment is different from Embodiment 1 is the manner of support of the coupling. In embodiment 1, the axis L2 of the coupling thereof is pivotable, while being interposed between the free end portion of the drum shaft and the retention rib. On the other hand, in the present embodiment, the axis L2 of the coupling is pivotable only by the drum bearing member this will be described in more detail.

FIG. 91(*a*) is a perspective view which illustrates the state in the course of mounting the coupling. FIG. 91(*b*) is a longitudinal sectional view thereof. FIG. 91(*c*) is a perspective view which illustrates the state where the axis L2 inclines relative to the axis L1. FIG. 91(*d*) is a longitudinal sectional view thereof. FIG. 91(*e*) is a perspective view which illustrates the state where the coupling rotates. FIG. 91(*f*) is a longitudinal sectional view thereof.

In this embodiment, the drum shaft 153 is place (d) in a space defend by an inner surface of a space portion 11157*b* of a drum bearing member 11157 in addition, the rib 11157*e* and the rib 11157*p* are provided on the inner surface opposite from the drum shaft 153 (at the different positions with respect to the direction of the axis L1).

With this structure, a flange portion 11150*j* and a drum bearing surface 11150*i* are regulated by an inner end surface 11157*p*1 and circular column portion 11153*a* of the rib in the state in which the axis L2 is inclined (FIG. 91(*d*)). Here, the end surface 11157*p*1 is provided in the bearing member 11157. In addition, the circular column portion 11153*a* is a part of drum shaft 11153. And, when the axis L2 becomes substantially co-axial with the axis L1 (FIG. 91 (*f*)), the flange portion 11150*j* and the taper outer surface 11150*q* are regulated by the outer end 11157*p*2 of the rib 11157*e* and the rib of the bearing member 11157.

Therefore, the coupling 11150 is retained in the bearing member 11157 by selecting the configuration of the bearing member 11157 to the appropriate in addition, the coupling 11150 can be pivotably mounted relative to the axis L1.

In addition, the drum shaft 11153 has only the drive transmitting portion in the free end thereof and, the spherical surface portion for regulating the movement of the coupling 11150 and so on is unnecessary therefore, the processing of the drum shaft 11153 is easy.

In addition, the rib 11157*e* and the rib 11157*p* are disposed offset. By this, as shown in FIG. 91 (*a*) and FIG. 91(*b*), the coupling 11150 is assembled into the bearing member 11157 in a slightly oblique direction (in the Figure X12) more particularly, the special method of assembling is unnecessary thereafter, the bearing member 11157 to which the coupling 11150 was mounted temporarily is assembled into the drum shaft 11153 (in the Figure the X13 direction).

Embodiment 16

Figure 92:
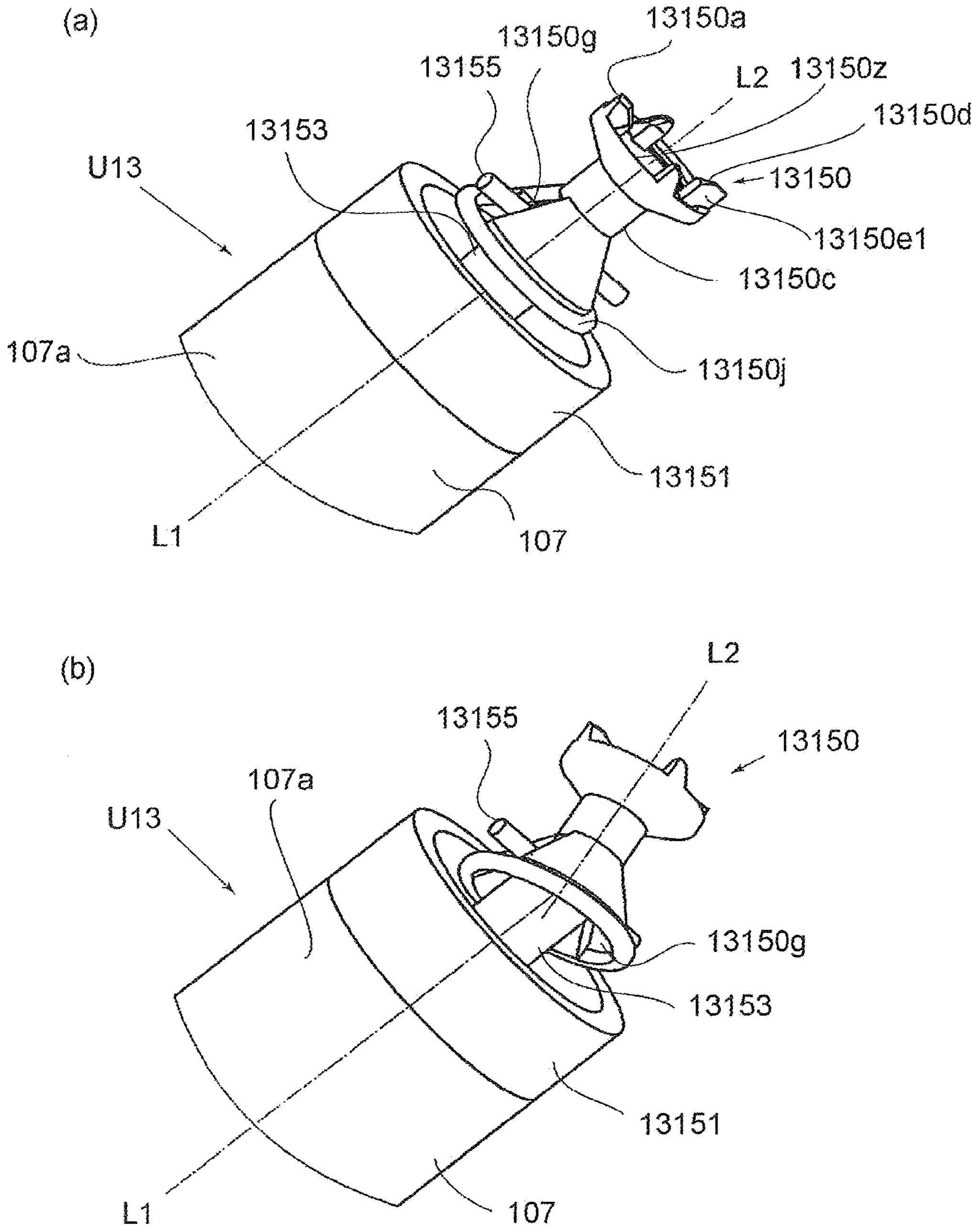
FIG. 92 is perspective views which illustrate a supporting method for a coupling (mounting method) according to a 16th embodiment of the present invention.

Referring to FIG. 92, the 16th embodiment of the present invention will be described.

The point of difference of the present embodiment from Embodiment 1 is in the mounting method of the coupling. In Embodiment 1, the coupling is interposed between the free end portion and the retention rib of the drum shaft. On the contrary, in this embodiment, the retention of the coupling is effected by a rotational force transmitting pin (rotational force receiving member) 13155 of a drum shaft 13153. More particularly, in this embodiment, a coupling 13150 is held by a pin 13155.

This will be described in more detail.

FIG. 92 illustrates the coupling held at the end of the photosensitive drum 107 (cylindrical drum 107*a*) a part of driving side of the photosensitive drum 107 is shown, and the others are omitted for simplicity.

In FIG. 92(*a*), the axis L2 is substantially co-axial relative to the axis L1 in this state, a coupling 13150 receives a rotational force from a drive shaft 180 at a driven portion 13150*a*. And, the coupling 13150 transmits the rotational force to the photosensitive drum 107.

And, as shown in FIG. 92(*b*), the coupling 13150 is mounted to a drum shaft 13153 so that it is pivotable in any direction relative to the axis L1. The configuration of the driven portion 13150*a* may be the same as the configuration of the driven portion described with respect to FIG. 82-FIG. 85 and, this photosensitive drum unit U13 is assembled into the second frame in the manner described with respect to Embodiment 1. And, at the time of mounting and demounting the cartridge B relative to the apparatus main assembly A, the coupling is engageable and detachable relative to the drive shaft.

The mounting method according to the present embodiment will be described. The free end (unshown) of the drum shaft 13153 is covered by the coupling 13150 thereafter, the pin (rotational force receiving member) 13155 is inserted into a hole (unshown) of the drum shaft 13153 in the direction perpendicular to the axis L1. In addition, the opposite ends of the pin 13155 outwardly project beyond an internal surface of a flange portion 13150*j*. The pin 13155 is prevented from separating from the standby opening 13150*g* by these settings. By this, it is not necessary to add a part for preventing the disengagement of the coupling 13150.

As mentioned above, according to the embodiment described above, the drum unit U13 is constituted by the cylindrical drum 107*a*, the coupling 13150, the photosensitive drum 107, the drum flange 13151, the drum shaft 13153, the drive transmission pin 13155, and so on. However, the structure of the drum unit U13 is not limited to this example.

As means for inclining the axis L2 to the pre-engagement angular position, immediately before the coupling engages with the drive shaft, the embodiment 3-embodiment 10 described until now can be employed.

In addition, with respect to engagement and disengagement between the coupling and the drive shaft operated interrelatedly with the mounting and the dismounting of the cartridge, it is the same as that of Embodiment 1, and therefore, the description is omitted.

In addition, as has been described with respect to Embodiment 1 (FIG. 31), the inclining direction of the coupling is regulated by the bearing member. By this, the coupling can be more assuredly engaged with the drive shaft.

With the above-described structures, the coupling 13150 is a part of the photosensitive drum unit integral with the photosensitive drum. Therefore, at the time of the assembling, handling is easy, and therefore, the assembling property can be improved.

Embodiment 17

Figure 93:
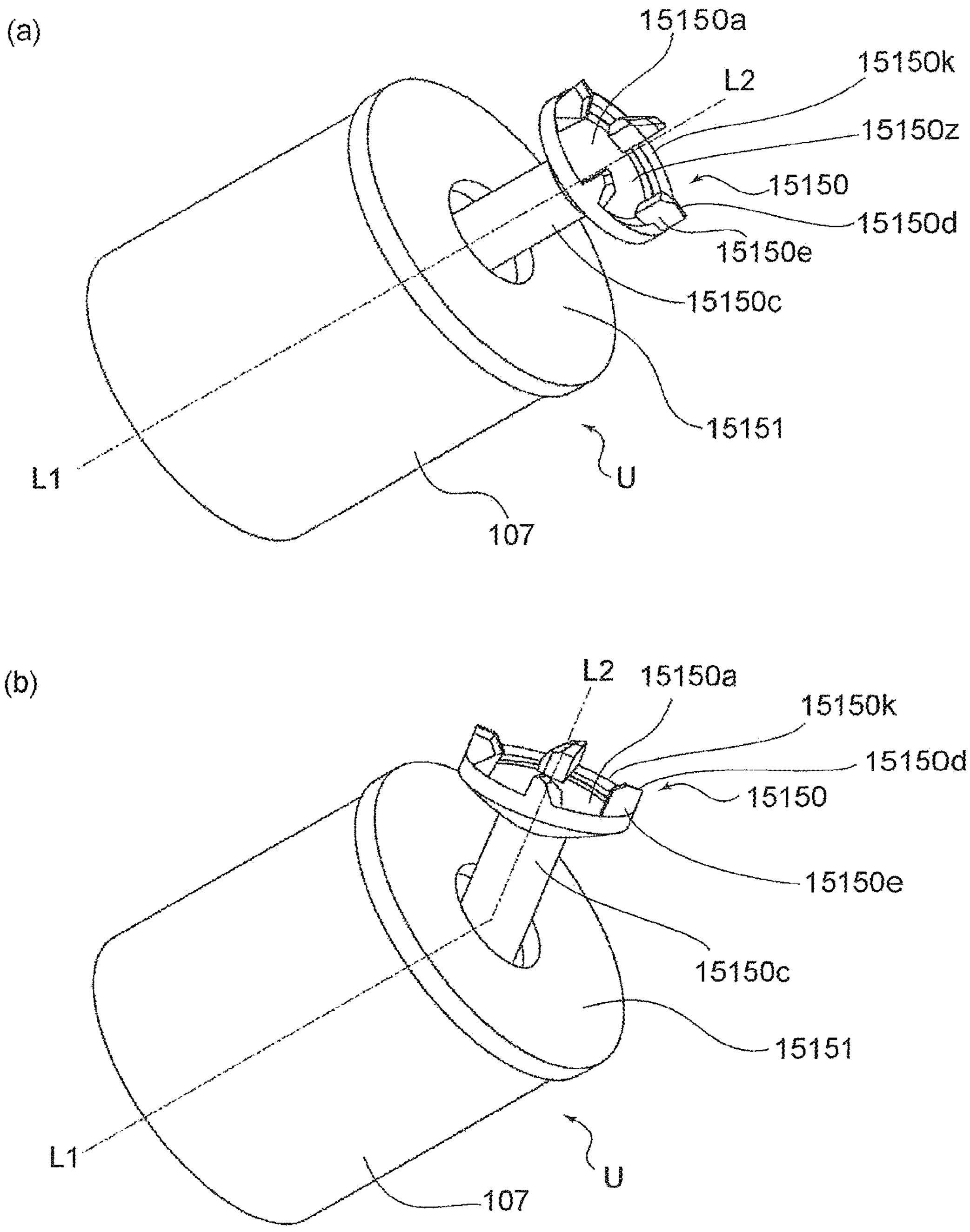
FIG. 93 is perspective views which illustrate a supporting method for a coupling (mounting method) according to a 17th embodiment of the present invention.

Referring to FIG. 93, the 17th embodiment of the present invention will be described.

The point that the present embodiment is different from Embodiment 1 is in the mounting method of the coupling. With respect to Embodiment 1, the coupling is mounted to the free end side of the drum shaft, so that, the axis L2 is slantable in any direction relative to axis L1. On the contrary, in this embodiment, the coupling 15150 is directly mounted to the end of the cylindrical drum 107*a* of the photosensitive drum 107, so that it is slantable in any direction.

This will be described in more detail.

FIG. 93 shows an electrophotographic photosensitive member drum unit ("drum unit") U. A coupling 15150 is mounted to an end part of the photosensitive drum 107 (cylindrical drum 107*a*) in this Figure. As for the photosensitive drum 107, a part of driving side is shown and the others are omitted for the simplification.

The axis L2 is substantially co-axial relative to the axis L1 in FIG. 93(*a*). In this state, the coupling 15150 receives a rotational force from the drive shaft 180 at a driven portion 15150*a*. And, the coupling 15150 transmits the received rotational force to the photosensitive drum 107.

And, an example is shown in FIG. 93(*b*), wherein the coupling 15150 is mounted to the end part of the cylindrical drum 107*a* of the photosensitive drum 107, so that it is slantable in any direction. In this embodiment, one end of the coupling is mounted not to the drum shaft (projection) but into the recess (rotational force receiving member) provided at the end part of the cylinder 107*a*. And, the coupling 15150 is pivotable also in any direction relative to the axis L1. As for the driven portion 15150*a*, the configuration described with respect to Embodiment 1 is shown, but it may be a configuration of the driven portion of the coupling described in Embodiment 10 or Embodiment 11. And, as has been described with respect to Embodiment 1, this drum unit U is assembled into the second frame 118 (drum frame), and it is constituted as the detachably mountable cartridge to the apparatus main assembly.

Thus, the drum unit U is constituted by the coupling 15150, the photosensitive drum 107 (cylindrical drum 107*a*), the drum flange 15151, and so on.

As for a structure for inclining the axis L2 toward the pre-engagement angular position, immediately before the coupling 15150 engages with the drive shaft 180, any of embodiment 3-embodiment 9 is usable.

In addition, the engagement and disengagement between the coupling and the drive shaft which are operated interrelatedly with the mounting and the dismounting of the cartridge are the same as those of Embodiment 1. Therefore, the description is omitted.

In addition, as has been described with respect to Embodiment 1 (FIG. 31), the drum bearing member is provided with regulating means for regulating inclining direction of the coupling relative to axis L1. By this, the coupling can be more assuredly engaged with the drive shaft.

With this structure, the coupling can be slantably mounted without the drum shaft which was described heretofore in any direction relative to the photosensitive drum. Therefore, the cost reduction can be accomplished.

In addition, according to the above structure, the coupling 15150 is a part of the drum units comprising the photosensitive drum as a unit. Therefore, in the cartridge, handling is easy at the time of the assembling, and the assembling property is improved.

Referring to FIG. 94-FIG. 105, the present embodiment will further be described.

Figure 94:
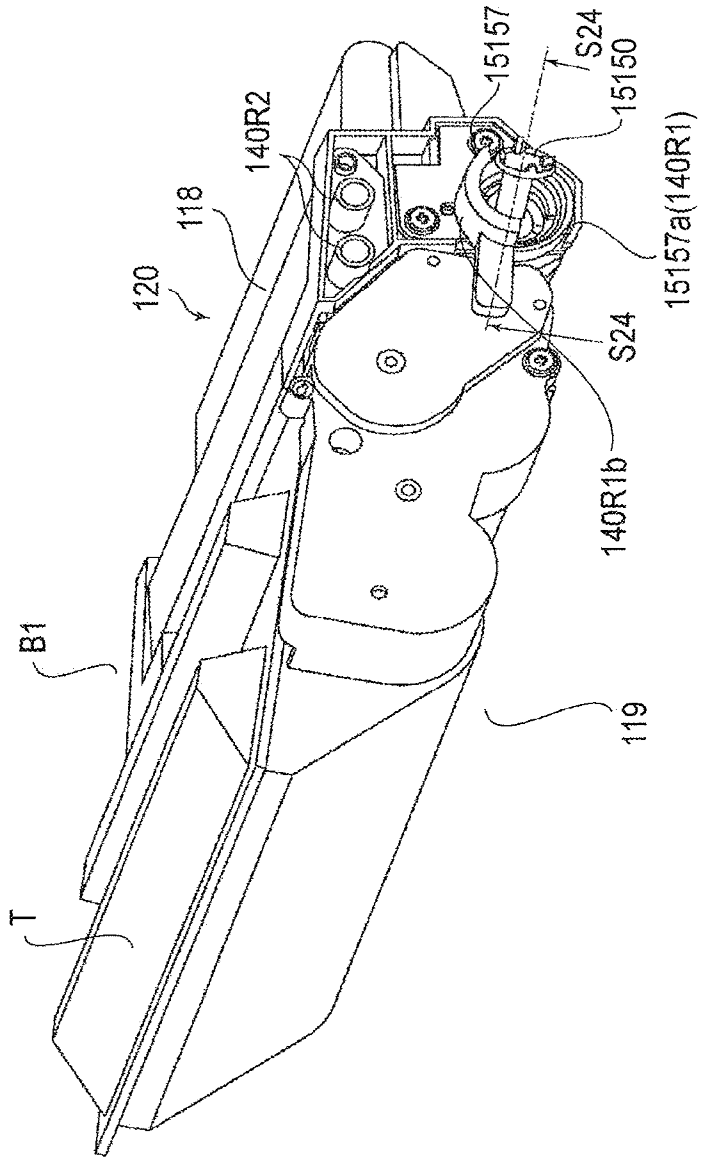
FIG. 94 is a perspective view of a cartridge according to an embodiment of the present invention.

FIG. 94 is a perspective view of the process cartridge B-2 which uses the coupling 15150 of the present embodiment. The outer periphery 15157*a* of an outside end of a drum bearing member 15157 provided at the driving side functions as a cartridge guide 140R1.

In addition, in the one longitudinal end (driving side) of the second frame unit 120, a cartridge guide 140R2 which outwardly projects is provided substantially above a cartridge guide 140R1 which outwardly projects.

The process cartridge is supported detachably in the apparatus main assembly by these cartridge guides 140R1, 1402 and a cartridge guide (unshown) provided at the non-driving side. More particularly, the cartridge B is moved to the apparatus main assembly A in the direction substantially perpendicular to the direction of the axis L3 of the drive shaft 180, when it is mounted to the apparatus main assembly A2 or is demounted from it.

Figure 95:
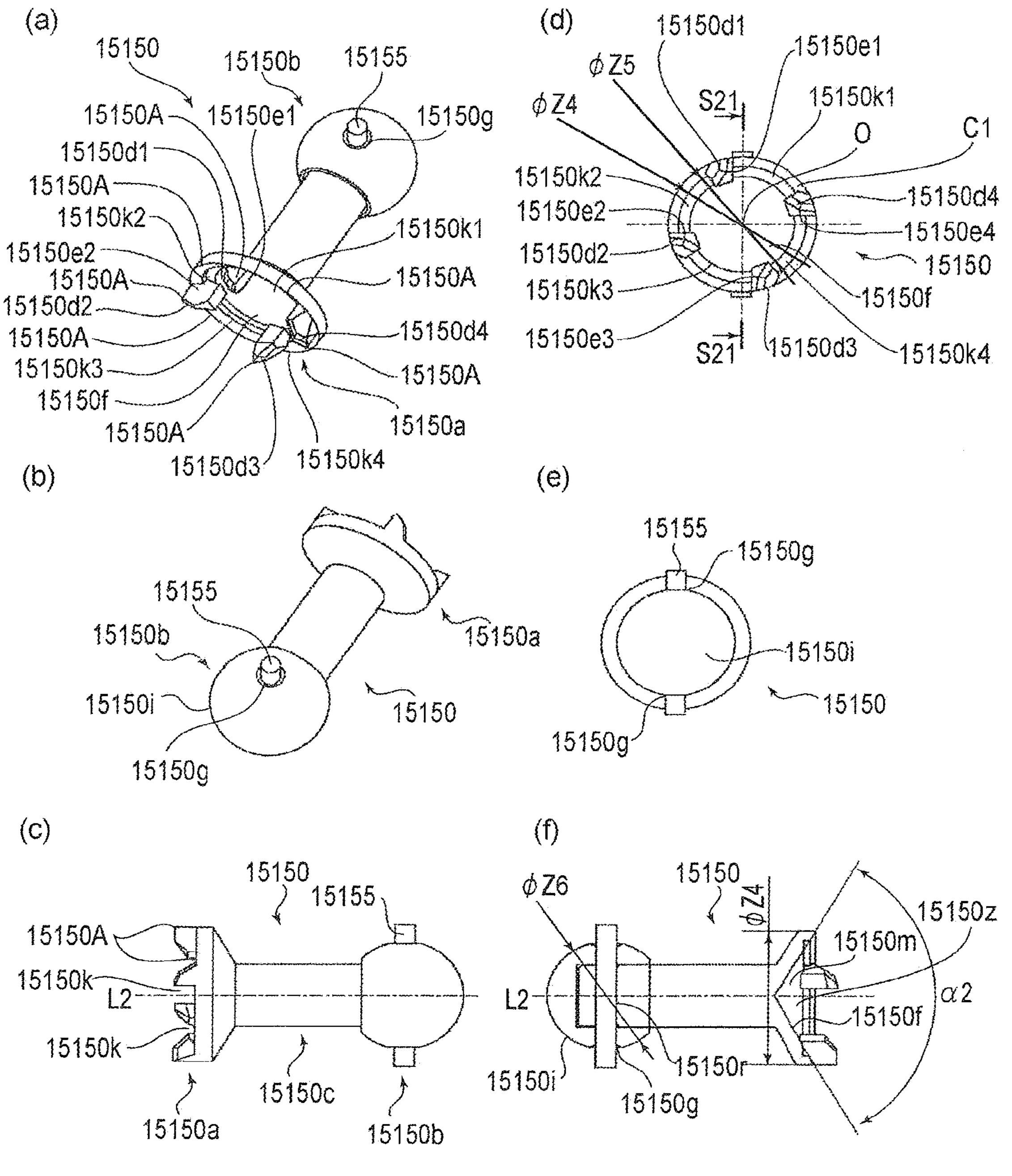
FIG. 95 illustrates only a coupling according to the embodiment of the present invention.

FIG. 95(*a*) is a perspective view of the coupling, as seen from the driving side, FIG. 95(*b*) is a perspective view of the coupling, as seen from the photosensitive drum side, and FIG. 95(*c*) shows a view of the coupling, as seen from the direction perpendicular to the axis L2. FIG. 95(*d*) is a side view of the coupling, as seen from the driving side, FIG. 95(*e*) shows a view, as seen from the photosensitive drum side, and FIG. 95(*f*) is a sectional view taken along S21-S21 of FIG. 95(*d*).

The coupling 15150 is engaged with the drive shaft 180 in the state where the cartridge B is mounted to the set portion 130*a* provided in the apparatus main assembly A. And, by removing the cartridge B from the set portion 103*a*, it is disengaged from the drive shaft 180. And, in the state where it engaged with the drive shaft 180, the coupling

15150 receives the rotational force from the motor 186, and transmits a rotational force to the photosensitive drum 107.

The coupling 15150 mainly comprises three portions (FIG. 95(*c*)). A first portion is a driven portion (a portion to be driven) 15150*a* which has a rotational force reception surface (rotational force receiving portion) 15150*e* (15150*e*1-15150*e*4) for engaging with a drive shaft 180 and receiving a rotational force from a pin 182. A second portion is a driving portion 15150*b* which engages with a drum flange 15151 (pin 15155 (rotational force receiving member)), and transmits a rotational force. A third portion is a connecting portion 15150*c* which connects the driven portion 15150*a* and the driving portion 15150*b*. The materials of these portions are resin materials, such as polyacetal, the polycarbonate, and PPS. However, in order to enhance rigidity of the member, the glass fiber, the carbon fiber, and so on may be mixed in the resin material depending on the required load torque. In addition, the rigidity may further be enhance (d) by inserting metal in the above described resin material, and the whole coupling may be made with the metal and so on. The driven portion 15150*a* is provided with a drive shaft insertion opening portion 15150*m* in the form of an expanded part which expands into a conical shape relative to the axis L2 as shown in FIG. 95(*f*). The opening 15150*m* constitutes a recess 15150*z* as shown in the Figure.

The driving portion 15150*b* has a spherical driving shaft receiving surface 15150*i*. The coupling 15150 can pivot between the rotational force transmitting angular position and the pre-engagement angular position (disengaging angular position) relative to the axis L1 by the receiving surface 15150*i*. By this, the coupling 15150 is engaged with the drive shaft 180 without being prevented by the free end portion 180*b* of the drive shaft 180 irrespective of the rotation phase of the photosensitive drum 107. The driving portion 15150*b* has the convex configuration as shown in the Figure.

And, a plurality of drive receiving projections 15150*d*1-*d*4 are provided on a circumference (phantom circle in FIG. 8 (*d*) C1) of an end surface of the driven portion 15150*a*. In addition, the spaces between the adjacent projections 15150*d* 1 or 15150*d* 2 or 15150*d*3 and 15150*d*4 function as drive receiving stand-by portions 15150*k*1, 15150*k*2, 15150*k*3, 15150*k*4. Each interval between the adjacent projections 15150*d*1-*d*4 are larger than the outer diameter of the pin 182, so that the pin (rotational force applying portion) 182 is received these intervals are standing-by portions 15150*k*1-*k*4. In addition, in FIG. 95(*d*), in the clockwise downstream of the projection 15150*d*, the rotational force receiving surfaces (rotational force receiving portion) 15150*e*1-15150*e*4 facing faced in the direction crossing with the direction of the rotational movement of the coupling 15150 is provided. When the drive shaft 180 rotates, the pin 182 abuts or contacts to one of the drive force receiving surfaces 15150*e*1-15150*e*4. And, the drive force receiving facing 15150 is pushed by the side surface of the pin 182, and rotates the coupling 15150 about the axis L2.

In addition, the driving portion 15150*b* has a spherical surface. The coupling 15150 can be pivoted between the rotational force transmitting angular position and the pre-engagement angular position (or disengaging angular position) by the provision of the spherical surface irrespective of the rotation phase of the photosensitive drum 107 in the cartridge B (swinging). In the illustrated example, spherical surface is a spherical drum bearing surface 15150*i* which has its axis aligned with the axis L2. And, a hole 15150*g* for penetration anchoring for the pin (rotational force transmitting portion) 15155 is formed through the center thereof.

Figure 96:
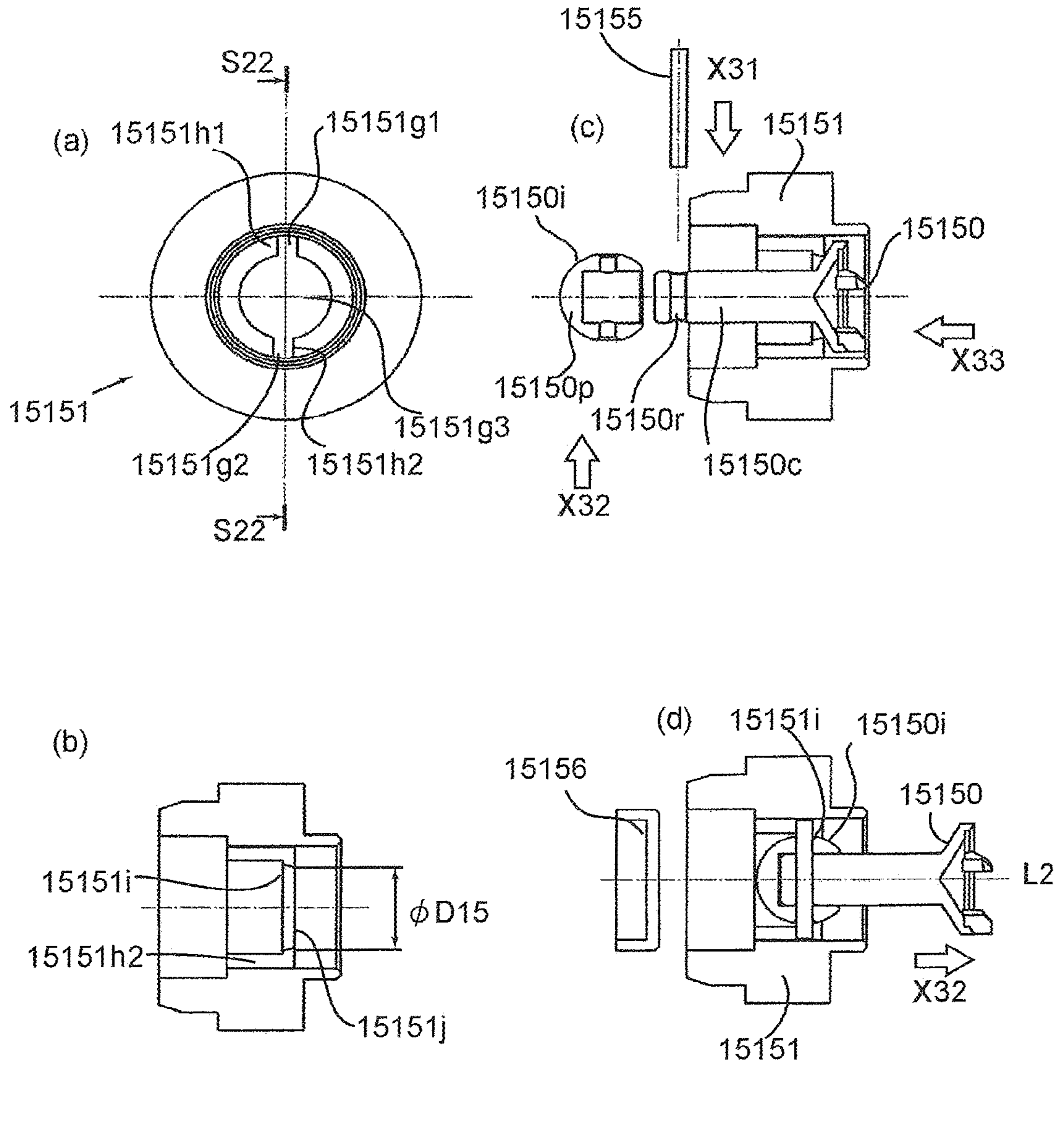
FIG. 96 illustrates a drum flange having a coupling according to an embodiment of the present invention.

Referring to FIG. 96, the description will be made as to an example of a drum flange 15151 which mounts the coupling 15150. FIG. 96(*a*) shows a view as seen from the drive shaft side, and FIG. 96(*b*) is a sectional view taken along S22-S22 of FIG. 96 (*a*).

The openings 15151*g* 1, 15151*g*2 shown in FIG. 96(*a*) are in the form of grooves extended in the circumferential direction of the flange 15151. An opening 15151*g*3 is provided between the opening 15151*g*1 and the opening 15151*g*2. At the time of mounting the coupling 15150 to the flange 15151, the pin 15155 is accommodated in these openings 15151*g* 1, 15151*g*2. In addition, the drum bearing surface 15150*i* is accommodated in the opening 15151*g*3.

With the above-described structures, irrespective of the rotation phase of the photosensitive drum 107 (irrespective of the stop position of the pin 15155) in the cartridge B-2, the coupling 15150 is pivotable (swingable) between the rotational force transmitting angular position and the pre-engagement angular positions (or disengaging angular position).

In addition, in FIG. 96(*a*), the rotational force transmission surfaces (rotational force receiving members) 15151*h* 1, 15151*h*2 are provided in the clockwise upstream of the openings 15151*g* 1 or 15151*g*2. And, the side surfaces of the rotational force transmitting pin (rotational force transmitting portion) 15155 of the coupling 15150 contact to the rotational force transmission surfaces 15151*h* 1, 15151*h*2. By this, a rotational force is transmitted from the coupling 15150 to the photosensitive drum 107. Here, the transmitting surfaces 15151*h* 1-15151*h*2 are faced in the circumferential direction of the rotational movement of the flange 15151. By this, the transmitting surfaces 15151*h* 1-15151*h*2 are pushed to the side surfaces of the pin 15155. And, in the state of the axis L1 and the axis L2 being substantially co-axial, the coupling 15150 rotates about the axis L2.

Here, the flange 15151 has a transmission receiving portion 15151*h* 1, 15151*h*2, and therefore, it functions as a rotational force receiving member.

The retaining portion 15151*i* shown in FIG. 96(*b*) has the function of retaining the coupling 15150 to the flange 15151, so that the coupling can pivot between the rotational force transmitting angular position and the pre-engagement angular positions (or disengaging angular position) in addition, it has the function of regulating the movement of the coupling 15150 in the direction of the axis L2. Therefore, the opening 15151*j* has diameter ΦD15 smaller than the diameter of the bearing surface 15150*i*. Thus, the motion of the coupling is limited by the flange 15151. Because of this, the coupling 15150 des not disengage from the photosensitive drum (cartridge).

As has been shown in FIG. 96, the driving portion 15150*b* of the coupling 15150 is in engagement with the recess provided in the flange 15151.

FIG. 96(*c*) is a sectional view which illustrates the process in which the coupling 15150 is assembled to the flange 15151.

The driven portion 15150*a* and the connecting portion 15150*c* are inserted in the direction X33 into the flange 15151. In addition, the positioning member 15150*p* (driving portion 15150*b*) which has the bearing surface 15150*i* is put in the direction of an arrow X32. The pin 15155 penetrates a fixing hole 15150*g* of the positioning member 15150*p*, and the fixing hole 15150*r* of the connecting portion 15150*c*. By this, the positioning member 15150*p* is fixed to the connecting portion 15150*c*.

FIG. 96(*d*) shows a sectional view which illustrates the process in which the coupling 15150 is fixed to the flange 15151.

The coupling 15150 is moved in the X32 direction, so that the bearing surface 15150*i* is brought into contact or proximity with the retaining portion 15151*i*. The retaining portion material 15156 is inserted in the direction of the arrow X32, and it is fixed to the flange 15151. The coupling 15150 is mounted to the flange 15151 with a play (gap) to the positioning member 15150*p* in this mounting method. By this, the coupling 15150 can change the direction thereof.

Similarly to the projection 15150*d*, the rotational force transmission surfaces 15150*h* 1, 15150*h*2 are desirably disposed diametrically opposed (180 degrees) on the same circumference.

Figure 97:
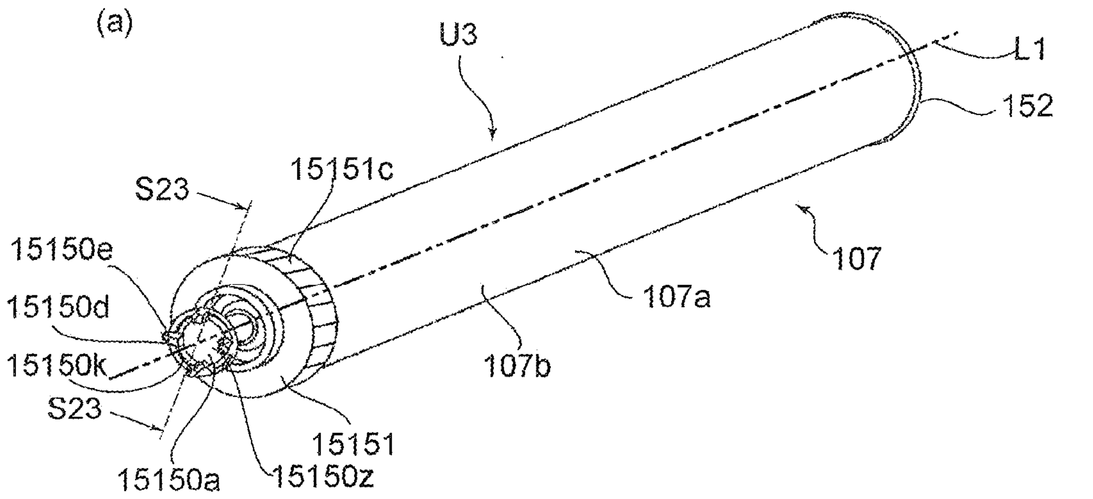
FIG. 97 is sectional views taken along S22-S22 of FIG. 84.
Figure 97:
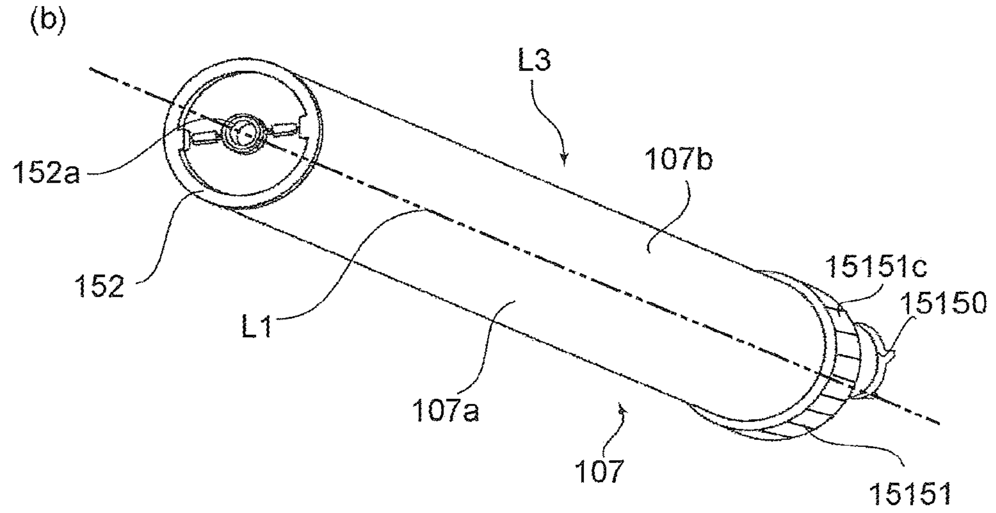
Figure 98:
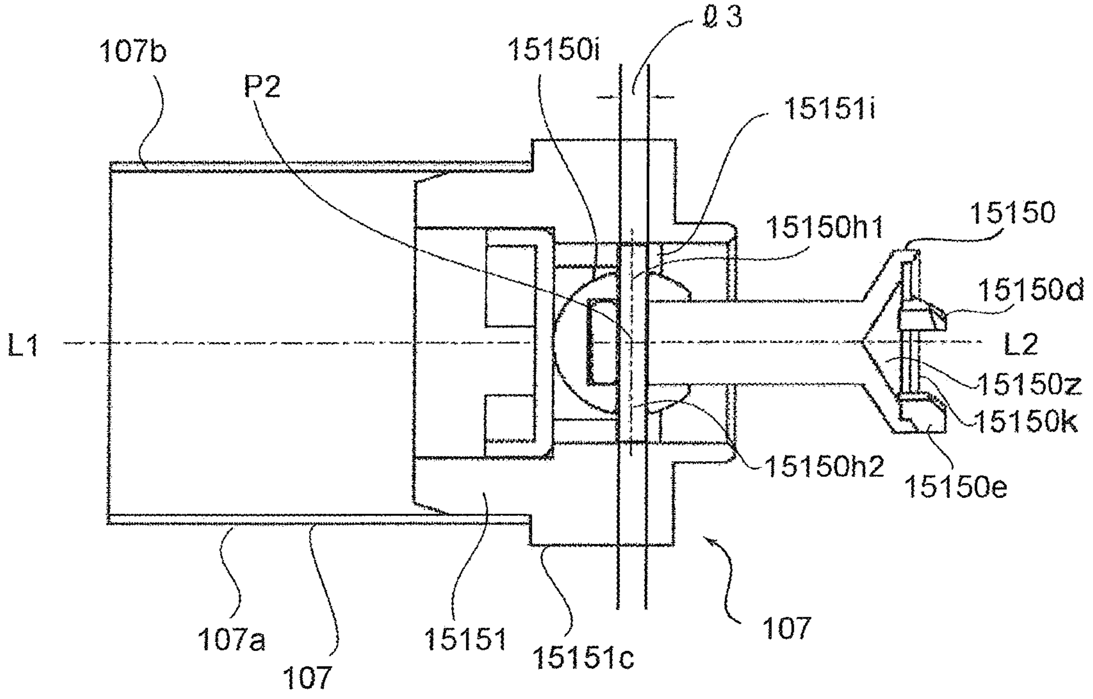
FIG. 98 is a sectional view of a photosensitive drum unit according to an embodiment of the present invention.

Referring to FIG. 97 and FIG. 98, the structure of a photosensitive drum unit U3 will be described. FIG. 97(*a*) is a perspective view of the drum unit, as seen from the driving side, and FIG. 97(*b*) is a perspective view, as seen from the non-driving side. In addition, FIG. 98 is a sectional view taken along S23-S23 of FIG. 97(*a*).

A drum flange 15151 mounted to the coupling 15150 is fixed to one end side of the photosensitive drum 107 (cylindrical drum 107*a*), so that a transmission part 15150*a* is exposed. In addition, the drum flange 152 of the non-driving side is fixed to the other end side of the photosensitive drum 107 (cylindrical drum 107*a*). This fixing method is crimping, bonding, welding, or the like.

And, in the state where the driving side is supported by the bearing member 15157 and the non-driving side is supported by the drum supporting pin (unshown), the drum unit U3 is rotatably supported by the second frame 118. And, it is unified into the process cartridge by mounting the first frame unit 119 to the second frame unit 120 (FIG. 94).

Designated by 15151*c* is a gear, and has a function of transmitting a rotational force received by the coupling 15150 from the drive shaft 180 to the developing roller 110. The gear 15151*c* is integrally molded with the flange 15151.

The drum unit U3 described in this embodiment comprises the coupling 15150, the photosensitive drum 107 (cylindrical drum 107*a*), and the drum flange 15151. The peripheral surface of the cylindrical drum 107*a* is coated with a photosensitive layer 107*b*. In addition, the drum unit comprises the photosensitive drum coated with the photosensitive layer 107*b*, and the coupling mounted to one end thereof. The structure of the coupling is not limited to the structure described in this embodiment. For example, it may have the structure described hereinbefore as the embodiments of the coupling. In addition, it may be another structure if it has the structure in which the effects of the present invention are provided.

Figure 100:
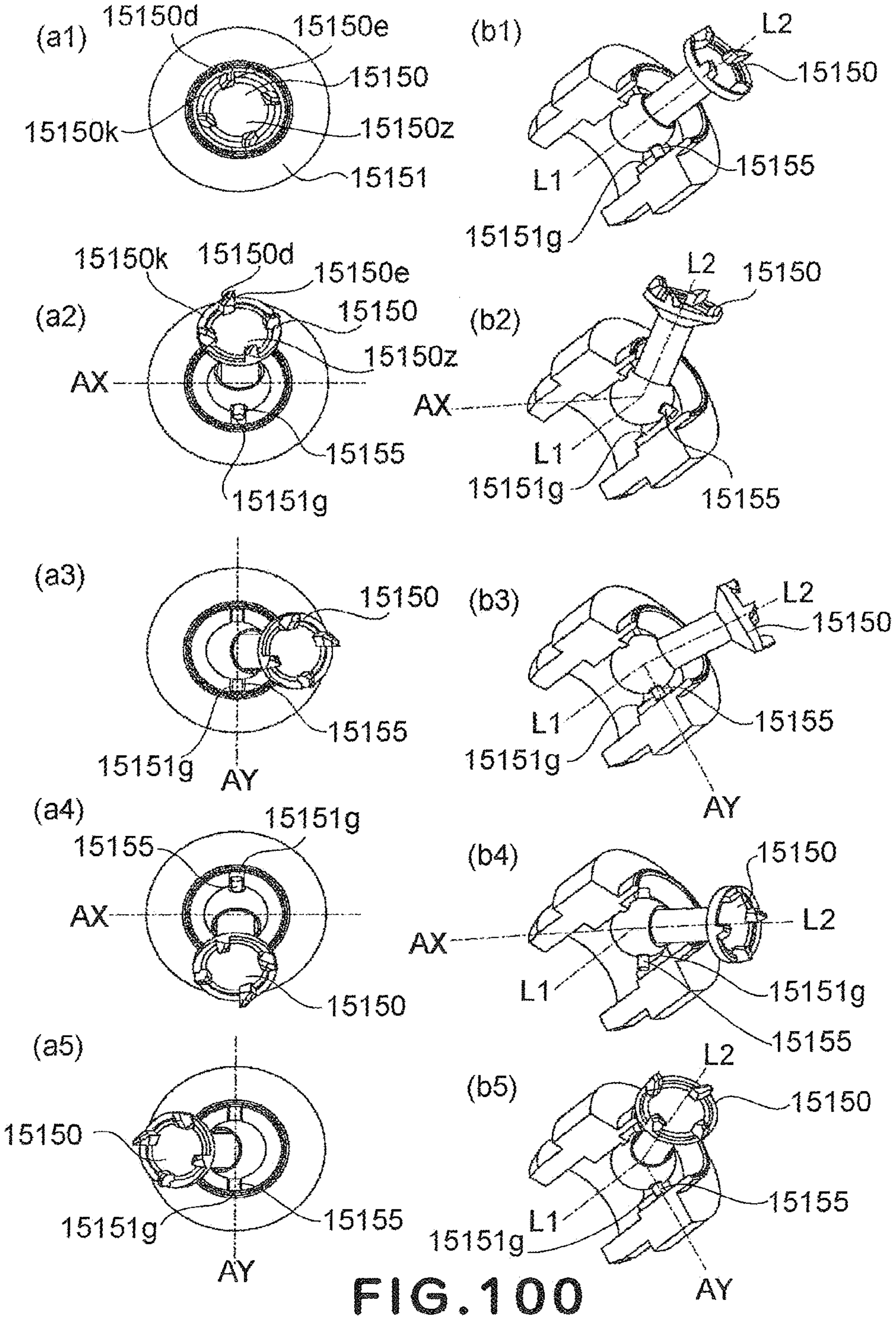
FIG. 100 is perspective views which illustrate a combined state of a drum shaft and a coupling according to an embodiment of the present invention.

Here, as shown in FIG. 100, the coupling 15150 is mounted so that it can incline in any direction relative to the axis L1 of the axis L2 thereof. FIGS. 100(*a*1)-(*a*5) are views as seen from the drive shaft 180, and FIGS. 100(*b*1)-(*b*5) are perspective views thereof. FIGS. 100(*b*1)-(*b*5) is partly broken views of substantially the entirety of the coupling 15150, wherein a part of a flange 15151 is cut away for better illustration.

In FIGS. 100(*a*1) (*b*1), the axis L2 is co-axially positioned relative to the axis L1. When the coupling 15150 is inclined upward from this state It is in the state shown in FIGS. 100(*a*2) (*b*2). As shown in this Figure, when the coupling 15150 inclines toward an opening 15151g A pin 15155 is moved along the opening 15151*g*. As a result, the coupling 15150 is inclined about the axis AX perpendicular to the opening 15151*g*.

The coupling 15150 is inclined rightward in FIG. 100(*a*3) (*b*3). As shown in this Figure, when the coupling 15150 inclines in the orthogonal direction of the opening 15151*g*, it rotates in the opening 15151*g*. The pin 15155 rotates about the axis line AY of the pin 15155.

The state where the coupling 15150 is inclined leftward and the state where it is inclined downward are shown in FIGS. 100(*a*4) (*b*4) and 100 (*a*5) (*b*5). Since the description of the rotation axis AX, AY has been made in the foregoing, the description therefor is omitted for simplicity.

the rotation in the direction different from these inclining directions, for example, 45-degree rotation shown in FIG. 100(*a*1), is provided by a combination of the rotations around the rotation axes AX, AY. In this manner, the axis L2 can be inclined in any directions relative to the axis L1.

The opening 15151*g* is extended in the direction crossing with the projection direction of the pin 15155.

In addition, between the flange (rotational force receiving member) 15151 and the coupling 15150, a gap is provided as shown in the Figure. With this structure, as has been described hereinbefore, the coupling 15150 is pivotable in all the directions.

More particularly, the transmitting surfaces (rotational force transmitting portions) 15151*h* (15151*h*1, 15151*h*2) are in the operative positions relative to the pins 15155 (the rotational force transmitting portion). The pin 15155 is movable relative to the transmitting surface 15151*h*. The transmitting surface 15151*h* and the pin 15155 are engaged or abutted to each other. To accomplish this motion, a gap is provided between the pin 15155 and the transmitting surface 15155*h*. By this, the coupling 15150 is pivotable relative to the axis L1 in all directions. In this manner, the coupling 15150 is mounted to the end of the photosensitive drum 107.

The axis L2 has been mentioned as being pivotable in any direction relative to the axis L1. However, the coupling 15150 does not necessarily need to be linearly pivotable to the predetermined angle over the 360-degree range. This is applied to all the couplings described as the embodiments in the foregoing.

In this embodiment, the opening 15151*g* is formed slightly overwidely in the circumferential direction. With this structure, when the axis L2 inclines relative to the axis L1, even if it is the case where it cannot incline to the predetermined angle linearly, the coupling 15150 can incline to the predetermined angle by rotating to a slight degree about the axis L2 in other words, the play of the opening 15151*g* in the rotational direction is selected properly in view of this, if necessary.

In this manner, the coupling 15150 is pivotable in all the directions substantially. Therefore, the coupling 15150 is revolvable (pivotable) over the full-circumference substantially relative to the flange 15151.

As has been described hereinbefore, (FIG. 98), the spherical surface 15150*i* of the coupling 15150 contacts to the retaining portion (a part of recess) 15151*i*. Therefore, the center P2 of the spherical surface 15150*i* aligns with the rotation axis, and the coupling 15150 is mounted. More particularly, the axis L2 of the coupling 15150 is pivotable irrespective of the phase of the flange 15151.

Figure 101:
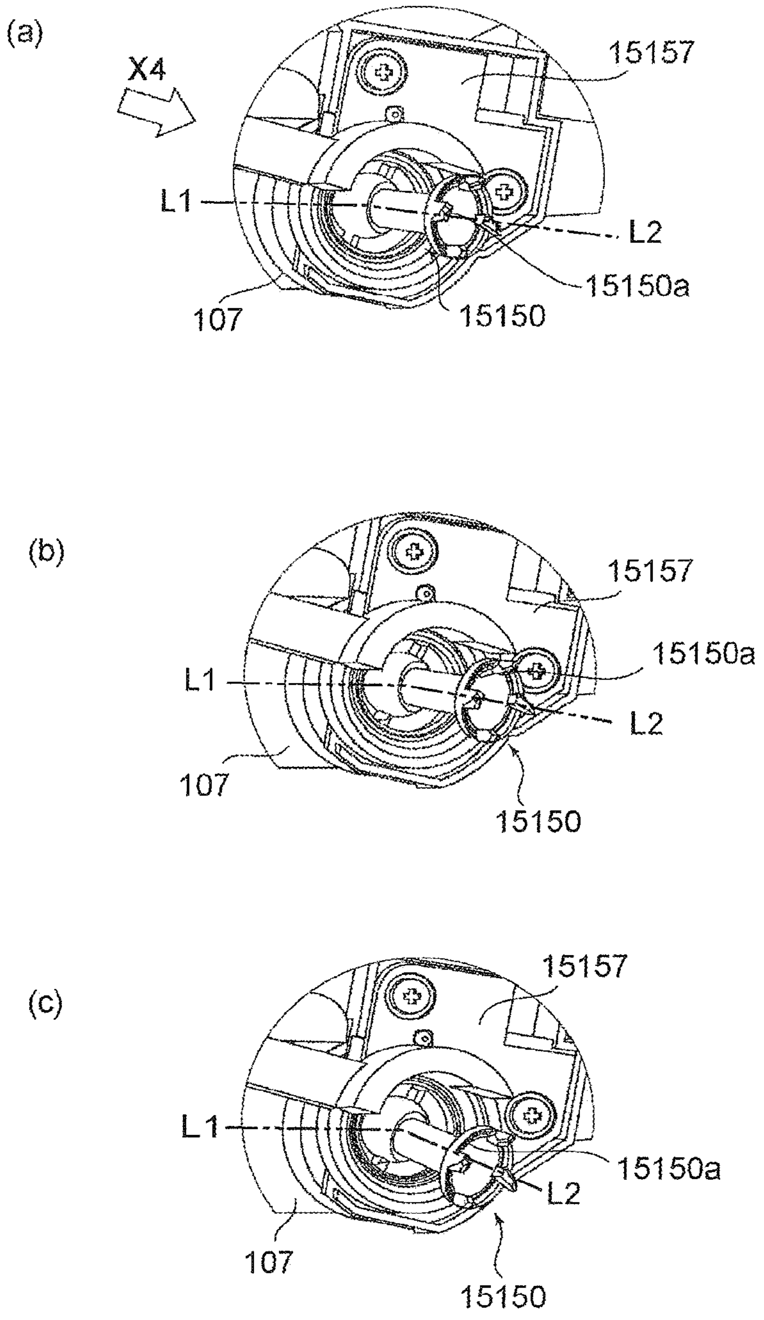
FIG. 101 is perspective views which illustrate an inclined state of a coupling according to an embodiment of the present invention.

In addition, in order for the coupling 15150 to engage with the drive shaft 180, the axis L2 is inclined toward the downstream with respect to the mounting direction of the cartridge B-2 relative to the axis L1 just before the engagement. More particularly, as shown in FIG. 101, the axis L2 is inclined relative to the axis L1, so that the driven portion 15150*a* is the downstream with respect to the mounting direction X4. In FIGS. 101(*a*)-(*c*), the position of the driven portion 15150*a* is downstream with respect to the mounting direction X4, in any case.

Figure 99:
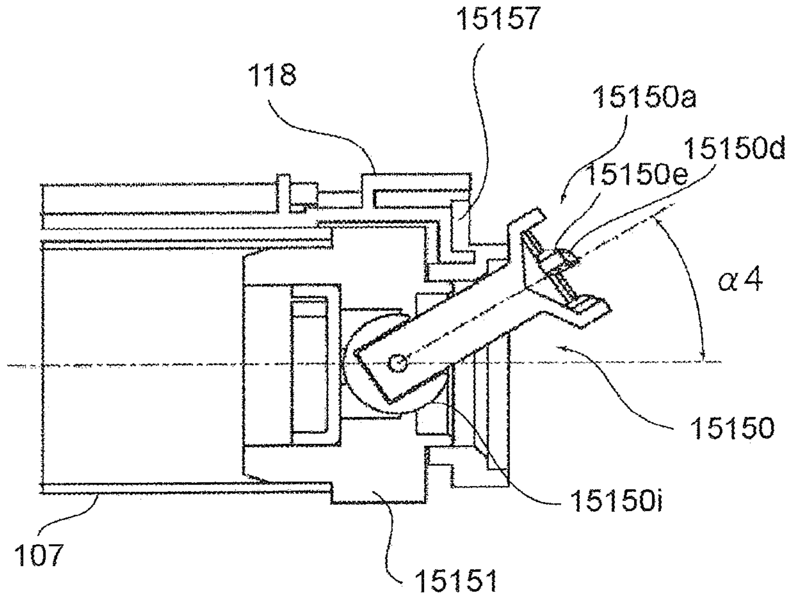
FIG. 99 is a sectional view taken along S23-S23 of FIG. 85.

FIG. 94 illustrates the state where the axis L2 is inclined relative to the axis L1. In addition, FIG. 98 is a sectional view taken along S24-S24 of FIG. 94. As shown in FIG. 99, by the structure described heretofore, from the state of the axis L2 being inclined, it can change to the state of being substantially parallel to the axis L1. In addition, the maximum possible inclination angle α4 (FIG. 99) between the axis L1 and the axis L2 is the angle at the time of inclining until the driven portion 15150*a* or the connecting portion 15150*c* contacts with the flange 15151 or the bearing member 15157. This inclination angle is the value required for engagement and disengagement relative to the drive shaft of the coupling at the time of mounting and demounting the cartridge relative to the apparatus main assembly.

Figure 102:
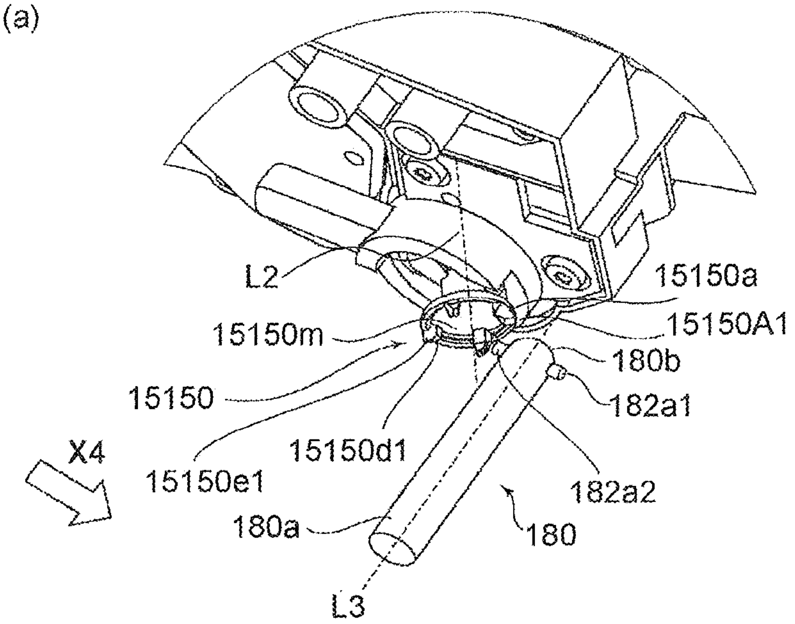
FIG. 102 is perspective views which illustrate a process of the engagement between a drive shaft and a coupling according to an embodiment of the present invention.
Figure 102:
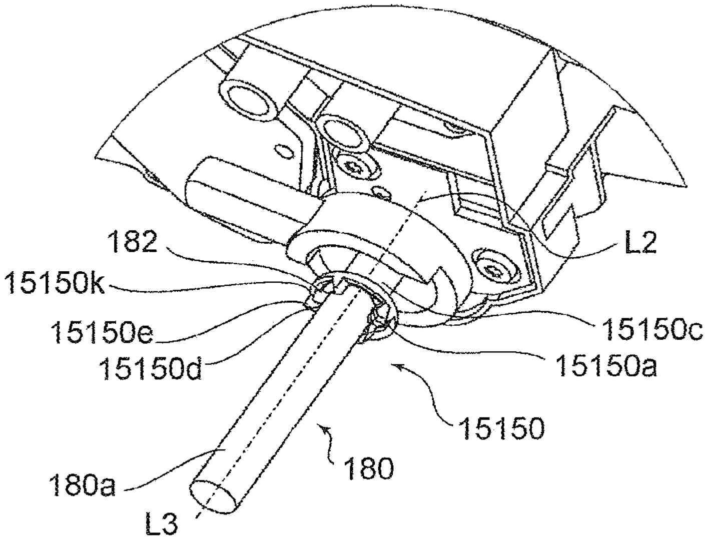
Figure 103:
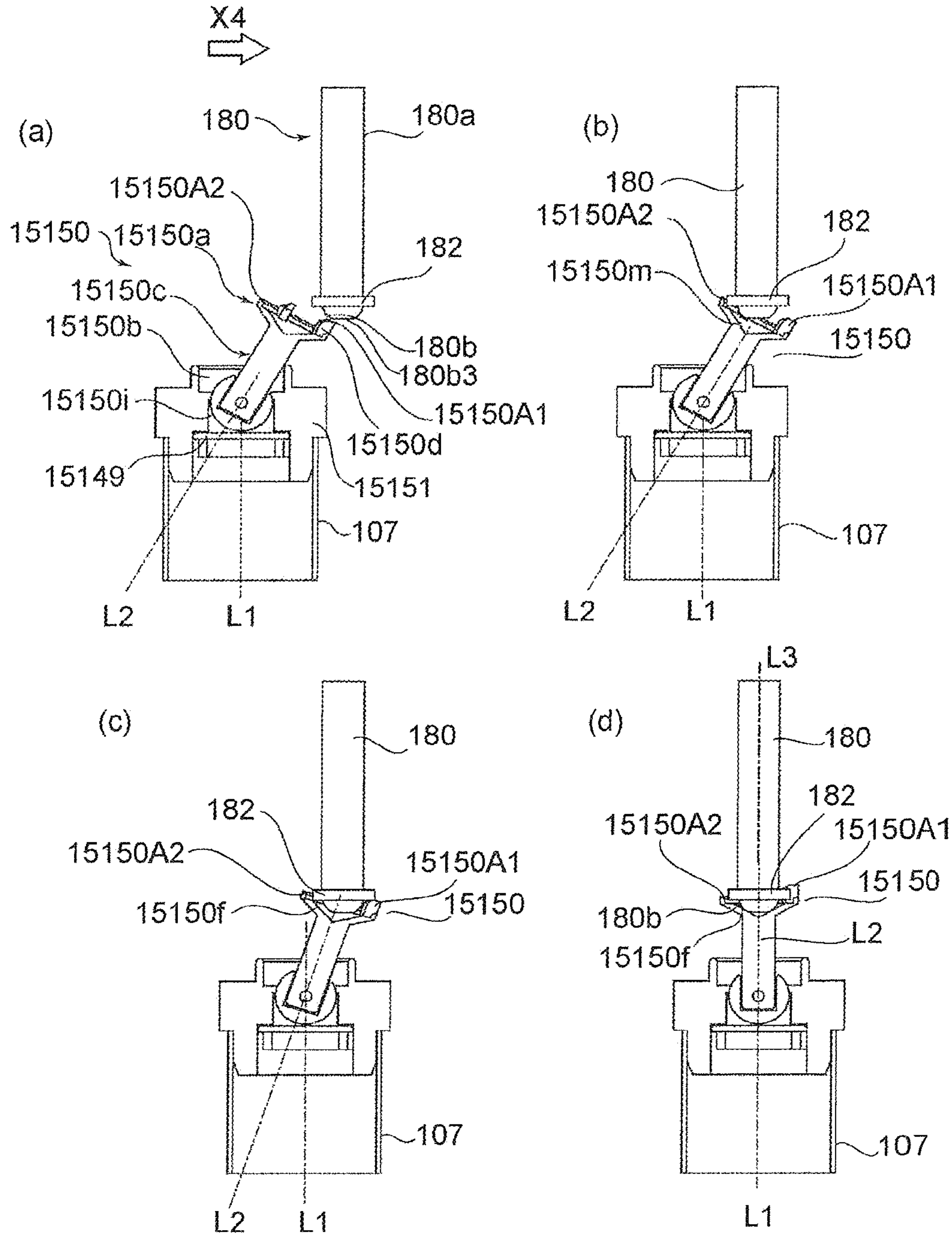
FIG. 103 is perspective views which illustrate a process of the engagement between a drive shaft and a coupling according to an embodiment of the present invention.

Immediately before or simultaneously with the cartridge B being set at the predetermined position of the apparatus main assembly A, the coupling 15150 and the drive shaft 180 engage with each other. Referring to FIG. 102 and FIG. 103, the description will be made with respect to the engaging operation of this coupling 15150. FIG. 102 is a perspective view which illustrates the major parts of the drive shaft and driving side of the cartridge. FIG. 103 is a longitudinal sectional view, as seen from the lower part of the apparatus main assembly.

In the mounting process of the cartridge B, as shown in FIG. 102, the cartridge B is mounted into the apparatus main assembly A in the direction (the direction of the arrow X4) substantially perpendicular to the axis L3. The axis L2 of the coupling 15150 inclines to the downstream with respect to the mounting direction X4 relative to the axis L1 beforehand (pre-engagement angular position) (FIG. 102(*a*), FIG. 103 (*a*)). By this inclination of the coupling 15150, with respect to the direction of the axis L1, the free end position 15150A1 is closer to the photosensitive drum 107 than the shaft free-end 180*b*3 with respect to the direction of the axis L1. In addition, the free end position 15150A2 is closer to the pin 182 than the shaft free-end 180*b*3 with respect to the direction of the axis L1 (FIG. 103(*a*)).

First, the free end position 15150A1 passes by the drive shaft free-end 180*b*3. Thereafter, the driving shaft receiving surface 150*f* of conical shape or the driven projection 150*d* contacts to the free end portion 180*b* of the drive shaft 180, or the rotational force drive transmission pin 182. Here, the receiving surface 150*f* and/or the projection 150*d* are the contact portions of the cartridge side. In addition, the free end portion 180*b* and/or the pin 182 are the engaging portions of the main assembly side. And, in response to the movement of the cartridge B, the coupling 15150 is inclined so that the axis L2 becomes substantially co-axial with the axis L1 (FIG. 103 (*c*)). And, when the position of the cartridge B is finally determined relative to the apparatus main assembly A, the drive shaft 180 and the photosensitive drum 107 are substantially co-axial. More particularly, in the state of the contact portion of the cartridge side contacting with the engaging portion of the main assembly side, in response to the insertion toward the back side of the apparatus main assembly A of the cartridge B, the coupling 15150 is pivoted to the rotational force transmitting angular position from the pre-engagement angular position, so that the axis L2 becomes substantially co-axial with the axis L1. And, the coupling 15150 and the drive shaft 180 are engaged with each other (FIG. 102(*b*), FIG. 103(*d*)).

As has been described hereinbefore, the coupling 15150 is mounted for inclining motion relative to the axis L1. And, it can be engaged with the drive shaft 180 by the pivoting of the coupling 15150 corresponding to the mounting operation of the cartridge B.

In addition, similarly to Embodiment 1, the engaging operation of the coupling 15150 described above can be carried out regardless of the phase of the drive shaft 180 and the coupling 15150.

In this manner, according to he present embodiment, the coupling 15150 is mounted for revolving or whirling motion (swinging) around the axis L1 substantially. The motion illustrated in FIG. 103 may include the whirling motion.

Figure 104:
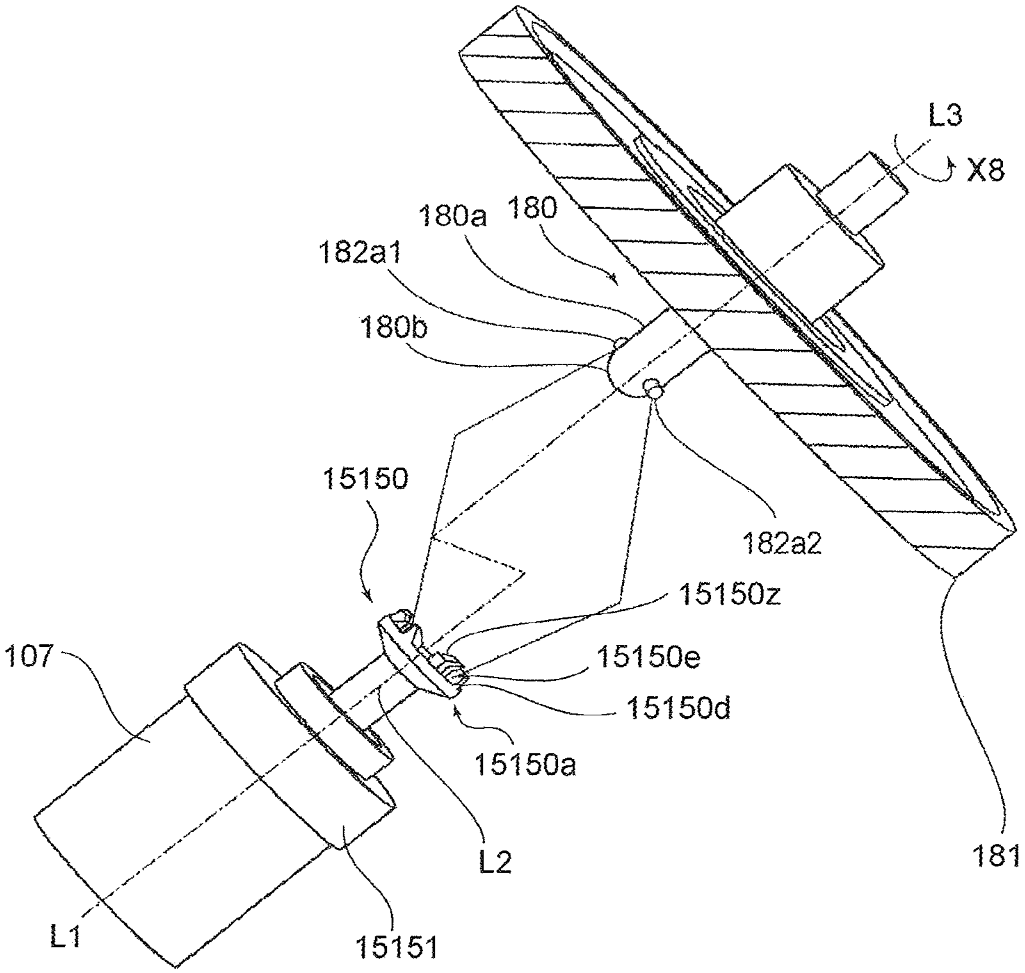
FIG. 104 is an exploded perspective view which illustrates a drive shaft, a driving gear, a coupling, and a drum shaft according to an embodiment of the present invention.

Referring to FIG. 104, the description will be made about the rotational force transmitting operation at the time of rotating the photosensitive drum 107. The drive shaft 180 rotates with the drum driving gear 181 in the direction of X8 in the Figure by the rotational force received from the motor 186. The gear 181 is a helical gear and the diameter thereof is the approx. 80 mm. And, the pin 182 integral with the drive shaft 180 contacts to any two of receiving surfaces 150*e* (four places) (rotational force receiving portions) of the coupling 15150. And, the coupling 15150 rotates by the pin 182 pushing the receiving surface 150*e*. In addition, in the coupling 15150, the rotational force transmitting pin 15155 (coupling side engaging portion, rotational force transmitting portion) contacts to the rotational force transmission surface (rotational force receiving member) 15151*h* 1, 15151*h*2. By this, the coupling 15150 is coupled, for transmission of driving force, with the photosensitive drum 107. Therefore, the photosensitive drum 107 rotates through the flange 15151 by the rotation of the coupling 15150.

In addition, when the axis L1 and the axis L2 are deviated to a slight degree, the coupling 15150 inclines a little. By this, the coupling 15150 can rotate without applying large load to the photosensitive drum 107 and the drive shaft 180. Therefore, at the time of assembling the drive shaft 180 and the photosensitive drum 107, no precise adjustment is necessary. Therefore, the manufacturing can be reduced.

Figure 105:
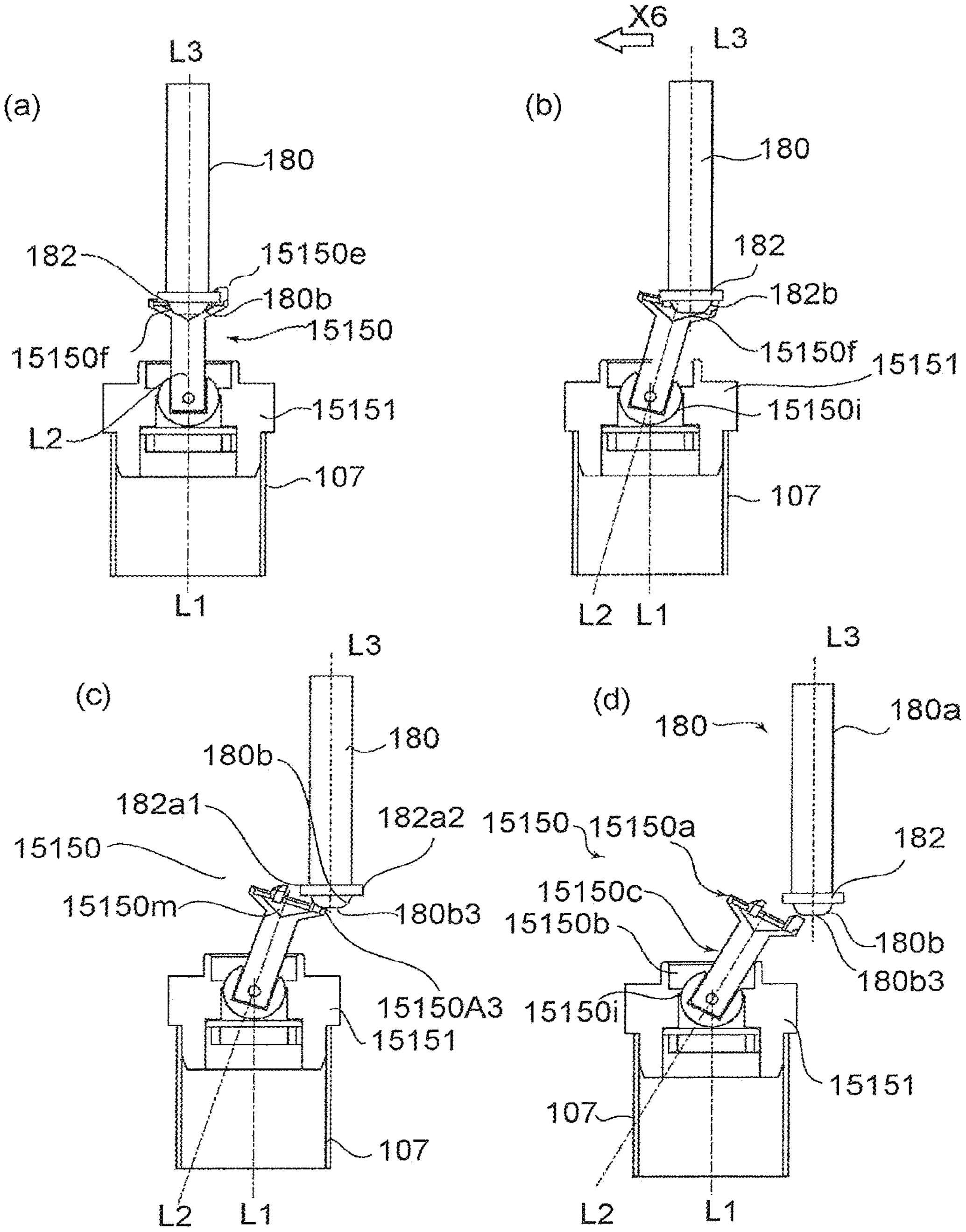
FIG. 105 is perspective views which illustrate a process of the disengagement of a coupling from a drive shaft according to an embodiment of the present invention.

Referring to FIG. 105, the description will be made as to the dismounting operation of the coupling 15150 at the time of taking out the process cartridge B-2 from the apparatus main assembly A. FIG. 105 is a longitudinal sectional view, as seen from the lower part of the apparatus main assembly. When the cartridge B is demounted from the apparatus main assembly A as shown in FIG. 105, it is moved in the direction (the direction of the arrow X6) substantially perpendicular to the axis L3. First, similarly to embodiment 1, at the time of demounting the cartridge B-2, the drive transmission pin 182 of the drive shaft 180 is positioned in any two of standing-by portions 15150*k*1-15150*k*4 (Figure).

After the drive of the photosensitive drum 107 stops, the coupling 15150 takes the rotational force transmitting angular position, wherein the axis L2 is substantially co-axial with the axis L1. And, when the cartridge B moves toward the front side of the apparatus main assembly A (the dismounting direction X6), the photosensitive drum 107 is moved toward the front side. In response to this movement, shaft receiving surface 15150*f* or the projection 15150*d* in the upstream with respect to the dismounting direction of the coupling 15150 contacts at least to the free end portion 180*b* of the drive shaft 180 (FIG. 105*a*). And, the axis L2 begins (FIG. 105(*b*)) to incline upstream with respect to the dismounting direction X6. This inclining direction is the same as the inclination of the coupling 15150 at the time of the mounting of the cartridge B. By the dismounting operation of this cartridge B, the cartridge B is moved while the upstream free end portion 15150 A3 with respect to the dismounting direction X6 contacts to the free end portion

180*b*. And, the coupling 15150 is inclined until the upstream free end portion 15150 A3 reaches to the drive shaft free-end 180*b*3 (FIG. 105(*c*)). The angular position of the coupling 15150 in this case is the disengaging angular position. And, in this state, the coupling 15150 is passed by the drive shaft free-end 180*b*3, contacting with the drive shaft free-end 180*b*3 (FIG. 105(*d*)). Thereafter, the cartridge B-2 is taken out of the apparatus main assembly A.

As has been described hereinbefore, the coupling 15150 is mounted for pivoting motion relative to the axis L1. And, the coupling 15150 can be disengaged from the drive shaft 180 by the coupling 15150 pivoting correspondingly to the dismounting operation of the cartridge B-2.

The motion illustrated in FIG. 105 may include the whirling motion.

With the structure as described above, the coupling 15150 is integral part of the photosensitive drum as the photosensitive drum unit. Therefore, at the time of the assembling, handling is easy and the assembling property is improved.

In order to incline the axis L2 to the pre-engagement angular position immediately before the coupling 15150 engages with the drive shaft 180, any one of structures of the embodiment 3-embodiment 9 is usable.

In addition, in this embodiment, it has been described that the drum flange of the driving side is a separate member from the photosensitive drum. However, the present invention is not limited to such an example. In other words, the rotational force receiving portion may be directly provided on the cylindrical drum, not on the drum flange.

Embodiment 18

Figure 106:
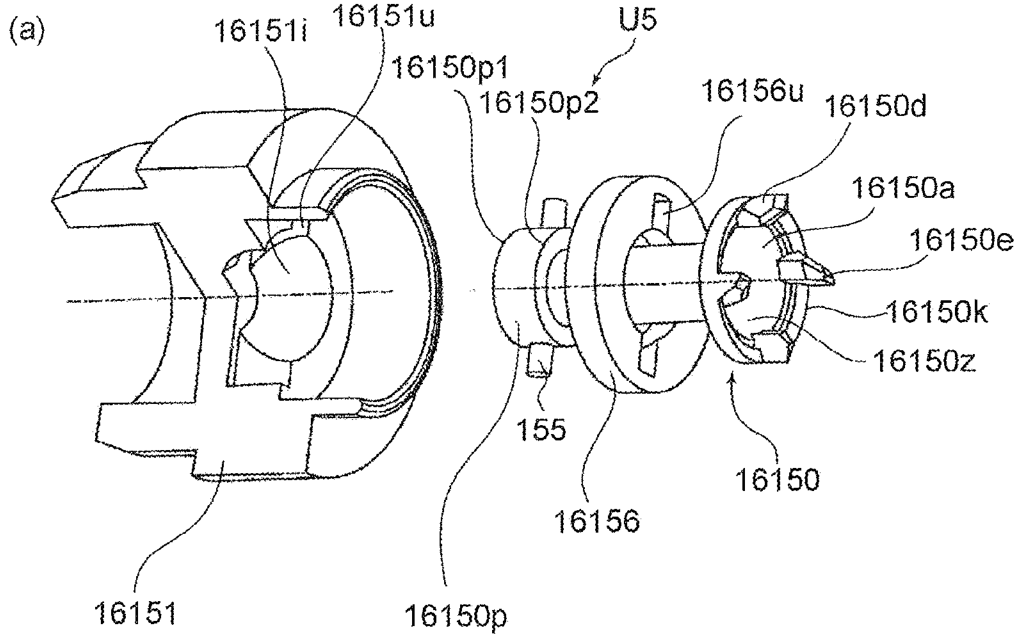
FIG. 106 is perspective views which illustrate a combined state between a drum shaft and a coupling according to an embodiment of the present invention.
Figure 106:
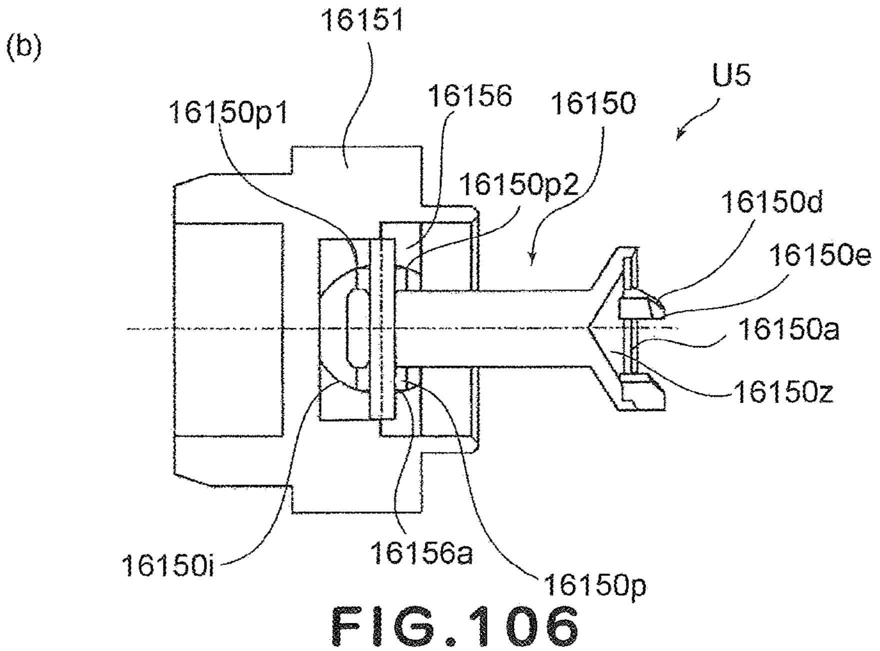
Figure 107:
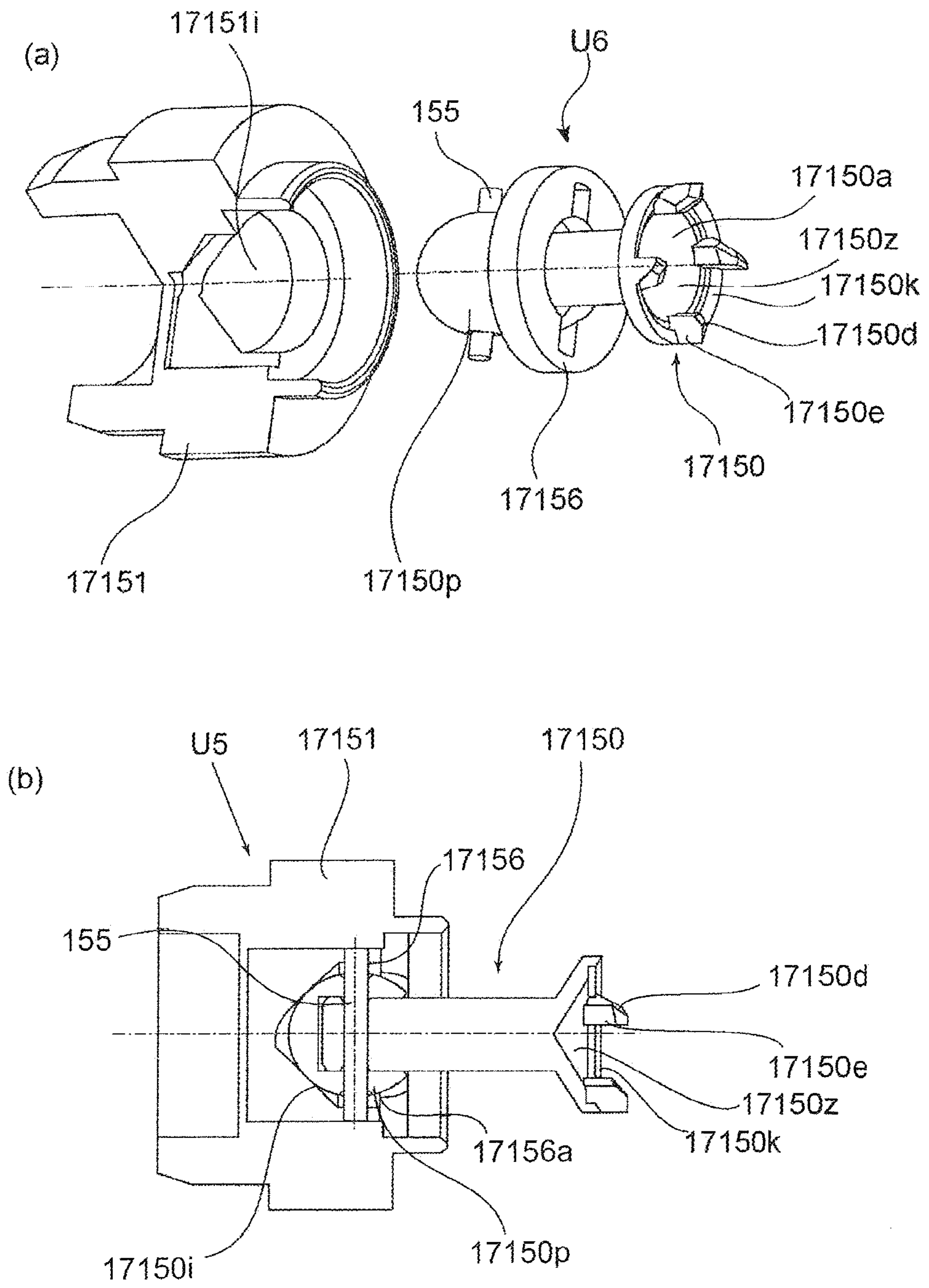
FIG. 107 is perspective views which illustrate a combined state between a drum shaft and a coupling according to an embodiment of the present invention.
Figure 108:
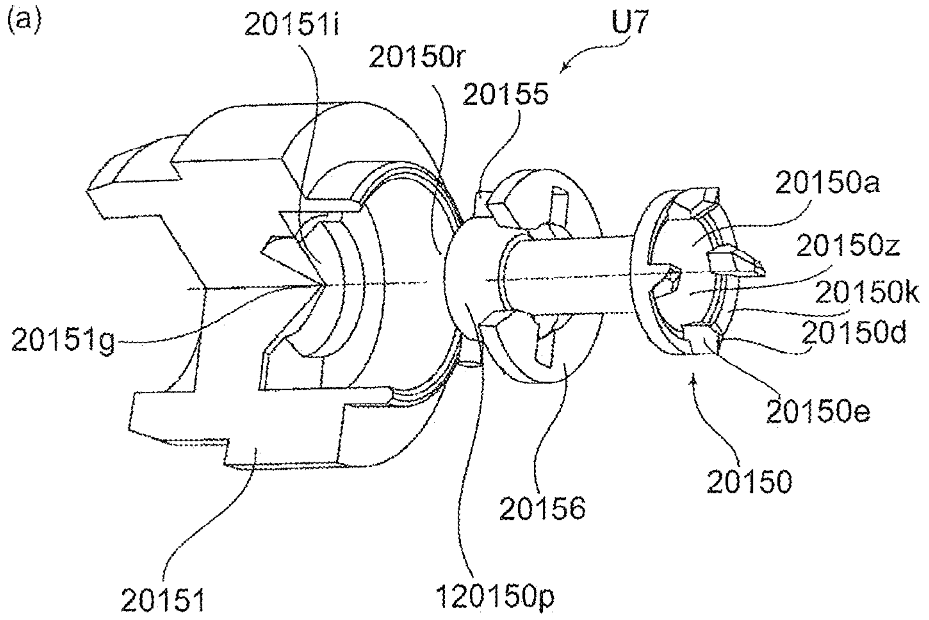
FIG. 108 is perspective views showing a combined state between a drum shaft and a coupling according to an embodiment of the present invention.
Figure 108:
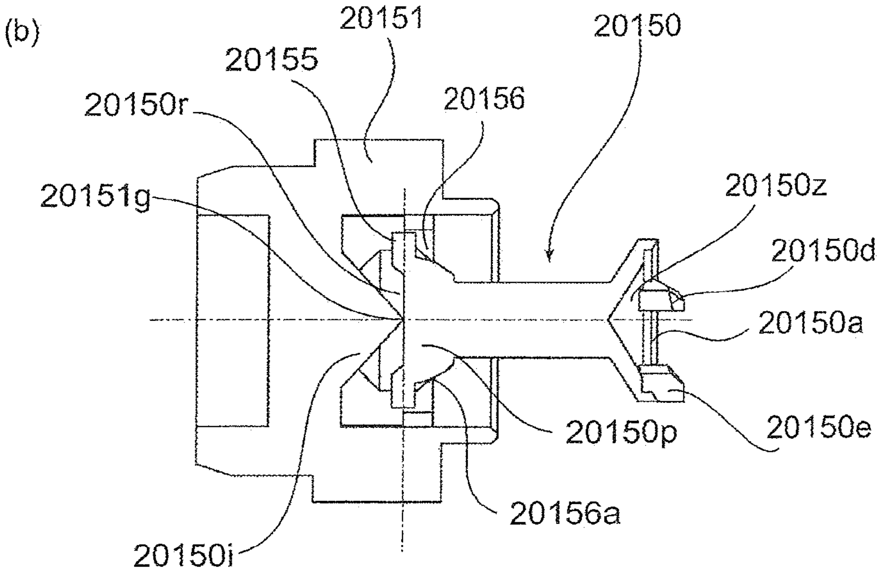

Referring to FIG. 106, FIG. 107, and FIG. 108, the 18th embodiment of the present invention will be described.

The present embodiment is a modified example of the coupling described in Embodiment 17. The configurations of the drum flange and retaining member of the driving side differ in Embodiment 17. In any case, the coupling is pivotable in the given direction irrespective of the phase of the photosensitive drum. In addition, the structure for mounting of the photosensitive drum unit to the second frame as will be described below is the same as that of the foregoing embodiment, and therefore, the description is omitted.

FIGS. 106(*a*) and (*b*) illustrate a first modified example of the photosensitive drum unit. In FIGS. 106(*a*) and (*b*), since the photosensitive drum and the non-driving side drum flange are the same as those of Embodiment 16, these are not illustrated.

More particularly, the coupling 16150 is provided with a supporting portion 16150*p* of a ring shape which is pierced by the pin 155. The edge lines 16150*p*1, 16150*p*2 of the peripheral part of the supporting portion 16150*p* are equidistant from the axis of the pin 155.

And, an inner periphery of the drum flange (rotational force receiving member) 16151 constitutes a spherical surface portion 16151*i* (recess). A center of the spherical surface portion 16151*i* is disposed on the axis of the pin 155. In addition, a slot 16151*u* is provided and this is the hole which extends in the direction of the axis L1. By the provision of this hole, the pin 155 is not interfered when the axis L2 inclines.

In addition, a retaining member 16156 is provided between the driven portion 16150*a* and the supporting portion 16150*p*. And, the portion opposed to the supporting portion 16150*p* is provided with the spherical surface portion 16156*a*. Here, the spherical surface portion 16156*a* is concentric with the spherical surface portion 16151*i*. In addition, a slot 16156*u* is disposed so that it is continuous with the slot 16151*u* in the direction of the axis L1. Therefore, when the axis L1 pivots, the pin 155 can move the inside of the slots 16151*u*, 16156*u*.

And, the drum flange, the coupling, and the retaining member for these driving side structures are mounted to the photosensitive drum. By this, the photosensitive drum unit is constituted.

With the structure as described above, when the axis L2 is inclined, the edge lines 16150*p*1, 16150*p*2 of the supporting portion 16150*p* move along the spherical surface portion 161511 and the spherical surface portion 16156*a*. By this, similarly to the foregoing embodiment, the coupling 16150 can be inclined assuredly.

In this manner, the supporting portion 16150*p* is pivotable relative to the spherical surface portion 16151*i* that is, the suitable gap is provided between the flange 16151 and the coupling 16150, so that the coupling 16150 is swingable.

Therefore, the effects similar to the effects described in Embodiment 17 are provided.

FIGS. 107(*a*) and (*b*) illustrate a second modified example of the photosensitive drum unit. In FIGS. 107(*a*) and (*b*), since the photosensitive drum and the non-driving side drum flange are the same as those of Embodiment 17, the illustration is omitted.

More particularly, similarly to Embodiment 17, a coupling 17150 is provided with a spherical supporting portion 17150*p* which has an intersection between axis of the pin 155, and axis L2 as the center substantially.

A drum flange 17151 is provided with a conical portion 17151*i* contacted on the surface of the supporting portion 17150*p* (recess).

In addition, a retaining member 17156 is provided between the driven portion 17150*a* and the supporting portion 17150*p*. In addition, an edge line portion 17156*a* contacts with the surface of the supporting portion 17150*p*.

And, the structure (the drum flange, coupling, and retaining member) of this driving side is mounted to the photosensitive drum. By this, the photosensitive drum unit is constituted.

With the structure as described above, when the axis L2 inclines, the supporting portion 17150*p* becomes movable along the conical portion 17151*i* and the edge line 17156*a* of retaining member. By this, the coupling 17150 can be inclined assuredly.

As described above, the supporting portion 17150*p* is pivotable (swingable) relative to the conical portion 17151*i*. Between the flange 17151 and the coupling 17150, a gap is provided in order to permit the pivoting of the coupling 17150. Therefore, the effects similar to the effects described in Embodiment 17 are provided.

FIGS. 108(*a*) and (*b*) illustrate a third modified example of the photosensitive drum unit U7. The photosensitive drum and the non-driving side drum flange are the same as that of Embodiment 17 in the modified example of FIGS. 108(*a*) and (*b*), and therefore, the illustration is omitted.

More particularly, they are disposed co-axially with the rotation axis of a pin 20155. In addition, a coupling 20150 has a flat surface portion 20150*r* perpendicular to the axis L2. In addition, it is provided with a semi-spherical supporting portion 20150*p* which has an intersection between axis of a pin 20155 and the axis L2 as the center substantially.

The flange 20151 is provided with the conical portion 20151*i* which has an apex 20151*g* on the axis thereof. The apex 20151*g* is contacted with the flat surface portion 20150*r* of the coupling.

In addition, a retaining member 20156 is provided between the driven portion 20150*a* and the supporting portion 20150*p*. In addition, an edge line portion 20156*a* contacts with a surface of the supporting portion 20150*p*.

And, the structure (the drum flange, coupling, and retaining member) of this driving side is mounted to the photosensitive drum. By this, the photosensitive drum unit is constituted.

With the structure as described above, even if the axis L2 inclines, the coupling 20150 and the flange 20151 are always in contact to each other substantially at the one point. Therefore, the coupling 20150 can be inclined assuredly.

As described above, the flat surface portion 20150*r* of the coupling is swingable relative to the conical portion 20151*i*. Between the flange 20151 and the coupling 20150, in order to permit the swinging of the coupling 17150, a gap is provided.

The effects described above can be provided by constituting the photosensitive drum unit in this manner.

As means for inclining the coupling to the pre-engagement angular position, any one of the structures of Embodiment 3 to the embodiment 9 is used.

Embodiment 19

Figure 109:
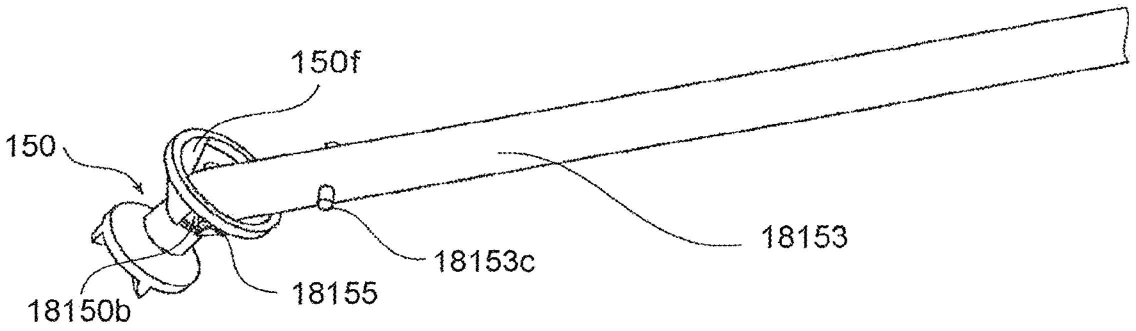
FIG. 109 is a perspective view of a first frame unit which has a photosensitive drum, as seen from the driving side, according to an embodiment of the present invention.
Figure 110:
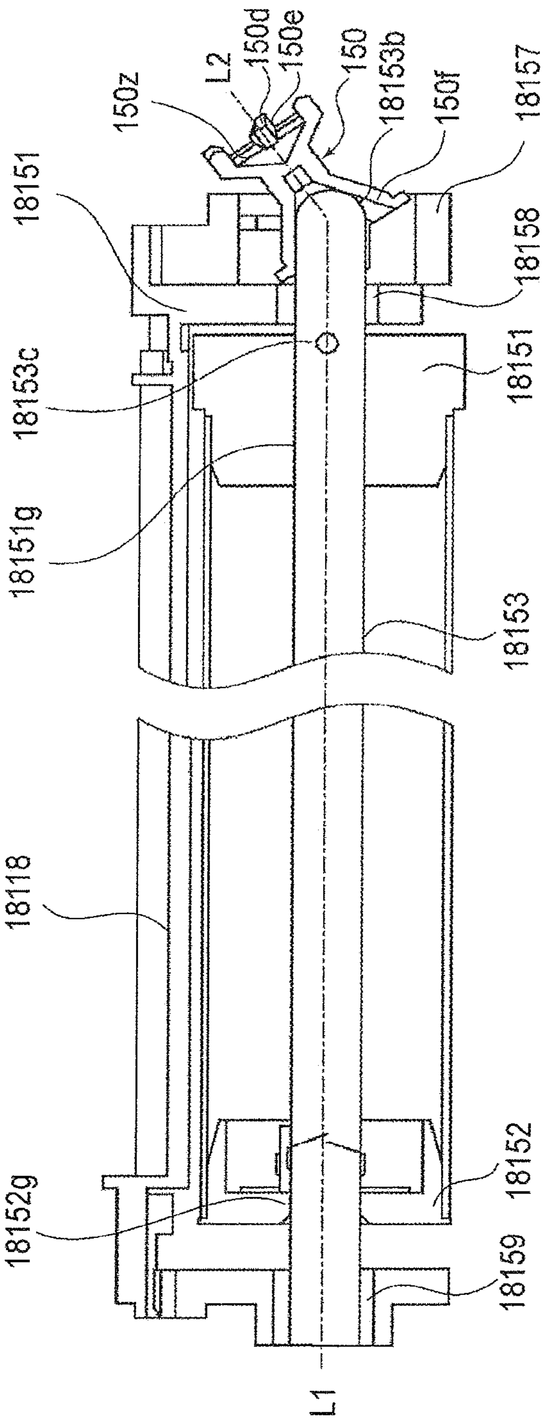
FIG. 110 is a perspective view which illustrates a drum shaft and a coupling according to an embodiment of the present invention.
Figure 111:
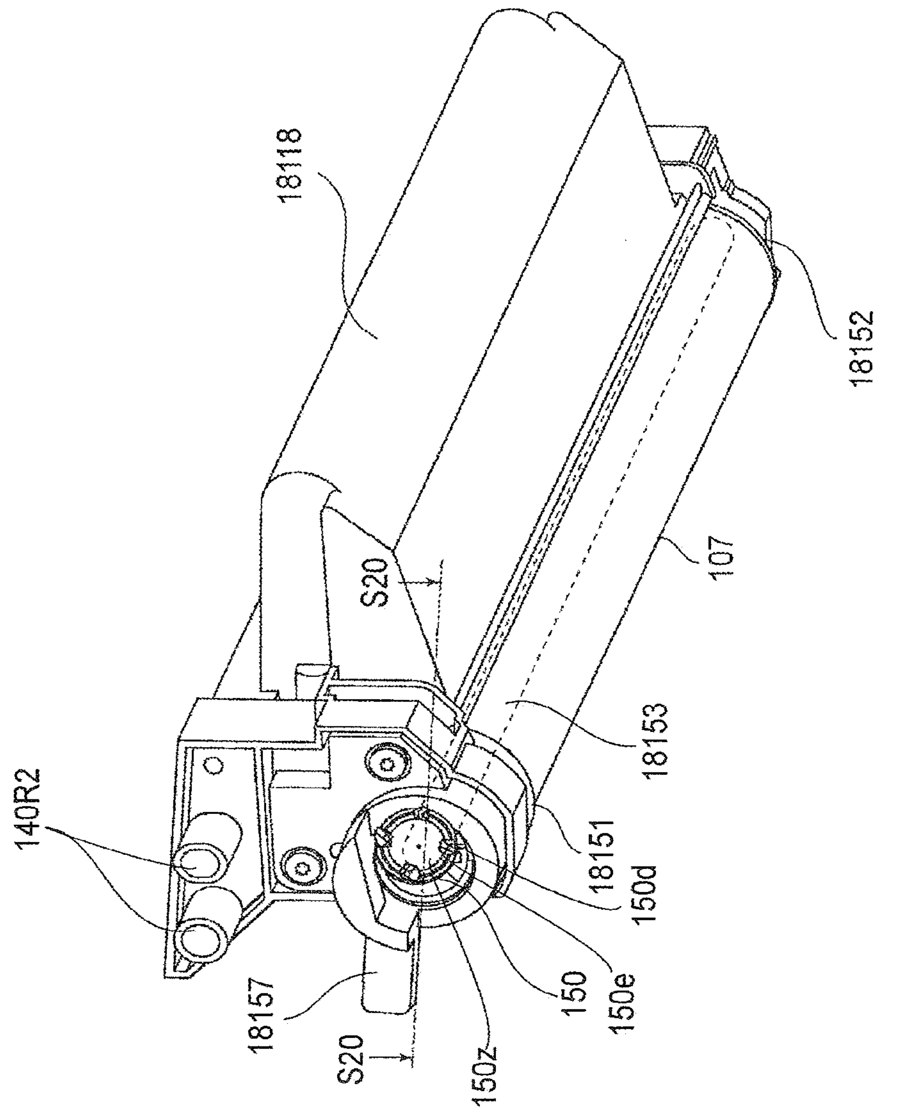
FIG. 111 is a sectional view taken along S20-S20 in FIG. 79.

Referring to FIG. 109, FIG. 110, and FIG. 111, the 19th embodiment of the present invention will be described.

The point in which the present embodiment is different from Embodiment 1 is the mounting structure of the photosensitive drum, and rotational force transmission structure from the coupling to the photosensitive drum.

FIG. 109 is a perspective view which illustrates a drum shaft and a coupling. FIG. 111 is a perspective view of a second frame unit, as seen from the driving side. FIG. 110 is a sectional view taken along S20-S20 of FIG. 111.

In this embodiment, the photosensitive drum 107 is supported by a drum shaft 18153 extended from a driving side of a second frame 18118 to a non-driving side thereof. By this, a position of the photosensitive drum 107 can further accurately be determined. This will be described more in the detail.

The drum shaft (rotational force receiving member) 18153 supports a positioning hole 18151*g*, 18152*g* of flanges 18151 and 18152 at the opposite ends of the photosensitive drum 107. In addition, the drum shaft 18153 rotates integrally with the photosensitive drum 107 by a drive transmitting portion 18153*c*. In addition, the drum shaft 18153 is rotatably supported by the second frame 18118 through bearing members 18158 and 18159 in the neighborhood of the opposite ends thereof.

A free end portion 18153*b* of the drum shaft 18153 has the same as configuration as the configuration described with respect to Embodiment 1. More particularly, the free end portion 18153*b* has a spherical surface and its drum bearing surface 150*f* of the coupling 150 is slidable along the spherical surface. By doing so, the axis L2 is pivotable in any direction relative to the axis L1. In addition, the disengagement of the coupling 150 is prevented by the drum bearing member 18157. And, they are unified as the process cartridge by connecting a first frame unit (unshown) with the second frame 18118.

And, the rotational force is transmitted from the coupling 150 through a pin (rotational force receiving member) 18155 to the photosensitive drum 107. The pin 18155 is through the center of the free end portion (spherical surface) 18153 of the drum shaft.

In addition, the coupling 150 is prevented by the drum bearing member 18157 from disengagement.

The engagement and disengagement between the coupling and the apparatus main assembly in interrelation with the mounting and dismounting operations of the cartridge are the same as that of Embodiment 1, and therefore, the description is omitted.

As for the structure for inclining the axis L2 toward the pre-engagement angular position, any one of the structures of the embodiment 3-embodiment 10 is usable.

In addition, the structure described with respect to Embodiment 1 as to the configuration at the free end of the drum shaft can be used.

In addition, as has been described with respect to Embodiment 1 (FIG. 31), the inclining direction of the coupling relative to the cartridge is regulated by the drum bearing member. By this, the coupling can be more assuredly engaged with the drive shaft.

The structure will not be limited, if the rotational force receiving portion is provided to the end part of the photosensitive drum, and it rotates integrally with the photosensitive drum. For example, it may be provided on the drum shaft provided at the end part of the photosensitive drum (cylindrical drum) as has been described with respect to Embodiment 1. Or, as has been described in this embodiment, it may be provided at the end part of the drum penetrating shaft which is through the photosensitive drum (cylindrical drum). Further alternatively, as has been described with respect to Embodiment 17, it may be provided on the drum flange provided at the end part of the photosensitive drum (cylindrical drum).

The engagement (coupling) between the drive shaft and the coupling means the state where the coupling is abutted to or contacted to the drive shaft and/or the rotational force applying portion in addition, in addition, it means that when the drive shaft in addition, starts the rotation to the meaning, the coupling abuts to or contacts to the rotational force applying portion and the rotational force can be received from the drive shaft.

In the embodiments described above, as for alphabetical suffixes of the referential signs in the coupling, the same alphabetical suffixes are assigned to the members which have the corresponding functions.

Figure 112:
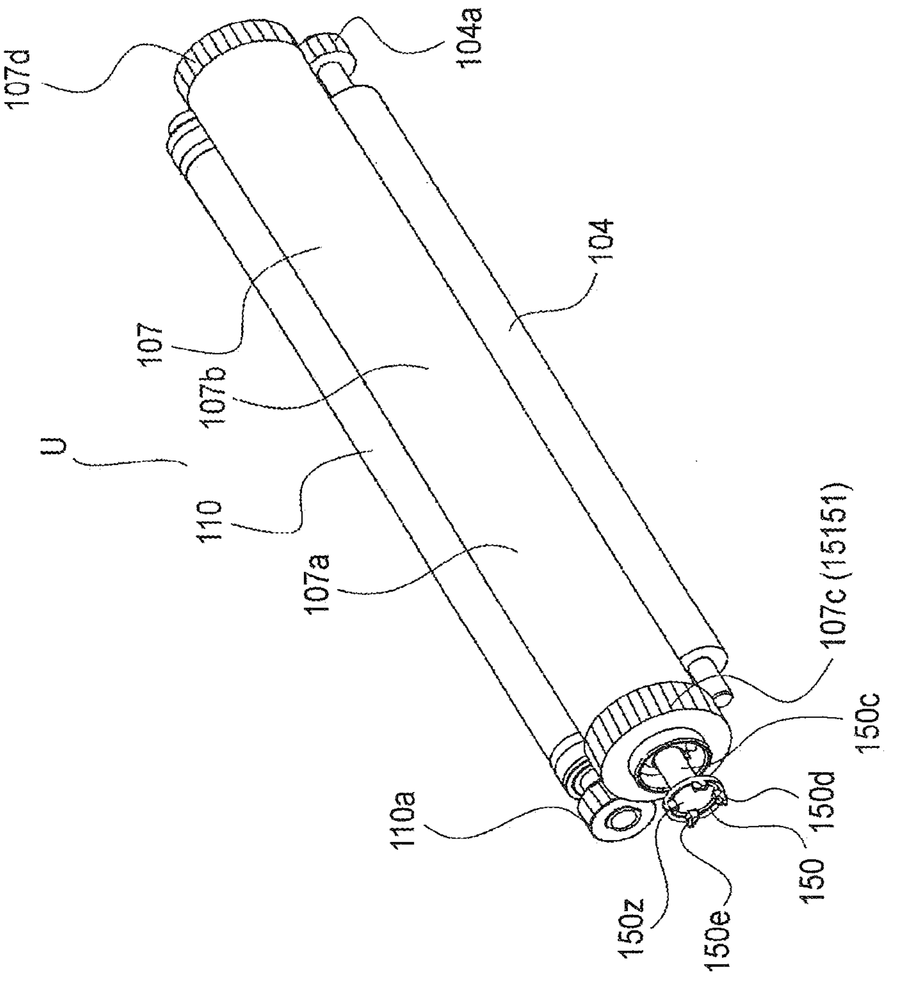
FIG. 112 is a perspective view of a photosensitive drum unit according to an embodiment of the present invention.

FIG. 112 is a perspective view of a photosensitive drum unit U according to an embodiment of the present invention.

In the Figure, the photosensitive drum 107 is provided with a helical gear 107*c* at the end which has the coupling 150. The helical gear 107*c* transmits the rotational force which the coupling 150 receives from the apparatus main assembly A to the developing roller (process means) 110. This structure is applied to the drum unit U3 shown in FIG. 97.

In addition, the photosensitive drum 107 is provided with a gear 107*d* at the end opposite from the end which has the helical gear 107*c*. In this embodiment, this gear 107*d* is a helical gear. The gear 107*d* transmits the rotational force which the coupling 150 receives from the apparatus main assembly A to the transfer roller 104 (FIG. 4) provided in the apparatus main assembly A.

In addition, the charging roller (process means) 108 contacts over the longitudinal range to the photosensitive drum 107. By this, the charging roller 108 rotates with the photosensitive drum 107. The transfer roller 104 may be contacted to the photosensitive drum 107 over the longitudinal range thereof. By this, the transfer roller 104 may be rotated by the photosensitive drum 107. In this case, the gear for the rotation of the transfer roller 104 is unnecessary.

In addition, as shown in FIG. 98, the photosensitive drum 107 is provided with a helical gear 15151*c* at the end which has the coupling 15150. The gear 15151*c* transmits the rotational force received by the coupling 15150 from the apparatus main assembly A to the developing roller 110 and, with respect to the direction of the axis L1 of the photosensitive drum 107, the position in which the gear 15151*c* is provided, and the position in which the rotational force transmitting pin (rotational force transmitting portion) 15150*h*1, *h*2 is provided overlap relative to each other (the overlapping position is shown by 3 in FIG. 98).

In this manner, the gear 15151*c* and the rotational force transmitting portion overlap relative to each other with respect to the direction of the axis L1. By this, the force tending to deform the cartridge frame B1 is reduced. In addition, the length of the photosensitive drum 107 can be reduced.

The couplings of the embodiments described above can apply to this drum unit.

Each coupling described above has the following structure.

The coupling (for example, the couplings 150, 1550, 1750, and 1850, 3150.4150, 5150, 6150, 7150, 8150, 1350, 1450, 11150, 12150 12250 12350, 13150, 14150, 15150, 16150, 17150, 20150, 21150, and so on) engages with the rotational force applying portion (for example, the pins 182, 1280, 1355, 1382, 9182 and so on) provided in the apparatus main assembly A. And, the coupling receives the rotational force for rotating the photosensitive drum 107. In addition, this each coupling is pivotable between the rotational force transmitting angular position for transmitting the rotational force for rotating the photosensitive drum 107 by engaging with the rotational force applying portion to the photosensitive drum 107, and the disengaging angular position inclined in the direction away from the axis L1 of the photosensitive drum 107 from the rotational force transmitting angular position. In addition, at the time of demounting the cartridge B from the apparatus main assembly A in the direction substantially perpendicular to the axis L1, the coupling is pivoted from the rotational force transmitting angular position to the disengaging angular position.

As described in the foregoing, the rotational force transmitting angular position and the disengaging angular portion may be the same or equivalent to each other.

In addition, at the time of mounting the cartridge B to the apparatus main assembly A, the operation is as follows. The coupling is pivoted from the pre-engagement angular position to the rotational force transmitting angular position in response to moving the cartridge B in the direction substantially perpendicular to the axis L1, so as to permit the part of the coupling (for example, the portion at the downstream free end position A1) positioned in the downstream with respect to the direction in which the cartridge B is mounted to the apparatus main assembly A to circumvent the drive shaft. And, the coupling is positioned at the rotational force transmitting angular position.

The substantial perpendicularity has been explained hereinbefore.

The coupling member has a recess (for example 150*z*, 12150*z*, 12250*z*, 14150*z* 15150*z*, 21150*z*) in which a rotational axis L2 the coupling member extends through a center of the shape defining the recess. The recess is over a free end of the driving shaft (for example, 180, 1180, 1280 1380, 9180) in the state in which the coupling member is positioned at the rotational force transmitting angular position. The rotating force receiving portion (for example rotating force receiving surface 150*e*, 9150*e*, 12350*e*, 14150*e*, 15150*e*) is projected from a portion adjacent the driving shaft in the direction perpendicular to the axis L3 and is engageable or abuttable to the rotating force applying portion in the rotational direction of the coupling. By doing so, the coupling receives the rotating force from the driving shaft thereby to rotate. When the process cartridge is dismounted from the main assembly of the electrophotographic image forming apparatus, the coupling member pivots from the rotational force transmitting angular position to the disengaging angular position so that part (upstream end portion 150A3, 1750A3, 14150A3, 15150A3 with respect to the dismounting direction) of the coupling member circumvents the driving shaft in response to movement of the process cartridge in the direction substantially perpendicular to the axis of the electrophotographic photosensitive drum. By doing so, the coupling is disengaged from the driving shaft.

A plurality of such rotational force receiving portions are provided on a phantom circle C1 (FIG. 8, (d), FIG. 95(*d*)) having a center 0 (FIGS. 8, (d), FIG. 95(*d*)) on the rotational axis of the coupling member at positions substantially diametrically opposite to each other.

The recess of the coupling has an expanding portion (for example, FIGS. 8, 29, 33, 34, 36, 47, 51, 54, 60, 63, 69, 72, 82, 83, 90, 91, 92, 93, 106, 107 108). A plurality of the rotational force receiving portions are provided at regular intervals along a rotational direction of the coupling member. The rotating force applying portion (for example, 182*a*, 182*b*) is projected at each of two positions and is extended in the direction perpendicular to the axis of the driving shaft. One of the rotating force receiving portions is engaged to one of the two rotating force applying portions. The other one of the rotating force receiving portions which is opposed to the one of the rotating force receiving portion is engaged to the other one of the two rotating force applying portions. By doing so, the coupling receives the rotating force from the driving shaft thereby to rotate. With such a structure, the rotating force can be transmitted to the photosensitive drum by the coupling.

The expanding portion has a conical shape. The conical shape has an apex on the rotational axis of the coupling member, and in the state in which coupling member is positioned at the rotational force transmitting angular position, the apex is opposed to the free end of the driving shaft. The coupling member is over the free end of the driving shaft when the rotational force is transmitted to the coupling member. With such a structure, the coupling can engage (connect) with the driving shaft projected in the main assembly of the apparatus with overlapping with respect to the direction of axis L2. Therefore, the coupling can engage with the driving shaft with stability.

The free end portion of the coupling covers the free end of the driving shaft. Therefore, the coupling may be easily disengaged from the driving shaft. The coupling can receive the rotating force with high accuracy from the driving shaft.

The coupling having the expanding portion and therefore the driving shaft can be cylindrical. Because of this, the machining of the driving shaft is easy.

The coupling has the expanding portion of a conical shape, so that above-described effects can be enhanced.

When the coupling is in the rotational force transmitting angular position, the axis L2 and the axis L1 are substantially coaxial. In the state in which coupling member is positioned at the disengaging angular position, the rotational axis of the coupling member is inclined relative to the axis of the electrophotographic photosensitive drum so as to permit an upstream portion of the coupling member passes by the free end of the driving shaft in a removing direction in which the process cartridge is dismounted from the main assembly of the electrophotographic image forming apparatus. The coupling member includes a rotating force transmitting portion (for example, 150*h*, 1550*h*, 9150*h*, 14150*h*, 15150*h*) for transmitting the rotating force to the electrophotographic photosensitive drum, and a connecting portion (for example, 7150*c* between the rotating force receiving portion and the rotating force transmitting portion, wherein the rotating force receiving portion, the connecting portion, the rotating force transmitting portion are arranged along the rotational axis direction. When the process cartridge is moved in the direction substantially perpendicular to the driving shaft, the pre-engagement angular position is provided by the connecting portion contacting a fixed portion (guide rib (contact portion) 7130R1*a*) provided in the main assembly of the electrophotographic image forming apparatus.

The cartridge B comprises a maintaining member (locking member 3159, urging member 4159*a*, 4159*b*, locking member 5157*k*, magnet member 8159) for maintaining the coupling member at the pre-engagement angular position, wherein the coupling member is maintained at the pre-engagement angular position by a force exerted by the maintaining member. The coupling is positioned at the pre-engagement angular position by the force of the maintaining member. The maintaining member may be an elastic member (urging member 4159*a*, 4159*b*). By the elastic force of the elastic member, the coupling is maintained at the engagement angle position. The maintaining member may be a friction member (locking member 3159). By the frictional force of the friction member, the coupling is maintained at the engagement angle position. The maintaining member may be a locking member (locking member 5157*k*). The maintaining member may be a magnetic member (portion 8159) provided on the coupling. By the magnetic force of the magnetic member, the coupling is maintained at the engagement angle position.

The rotating force receiving portion is engaged with the rotating force applying portion which is rotatable integrally with the driving shaft. The rotating force receiving portion is engageable to the rotating force applying portion integrally rotatable with the driving shaft, wherein when the rotating force receiving portion receives the driving force for rotating the coupling member, and the rotating force receiving portion is inclined in a direction to receive a force toward the driving shaft. By the attracting force, the coupling is assured to contact the free end of the driving shaft. Then, the position of the coupling with respect to the direction of axis L2 relative to the driving shaft. When the photosensitive drum 107 is also attracted, the position of the photosensitive drum 107 is determined relative to the main assembly of the apparatus with respect to the direction of the axis L1. The pulling force may be properly set by one skilled in the art.

The coupling member is provided to an end of the electrophotographic photosensitive drum and is capable of tilting relative to the axis of the electrophotographic photosensitive drum substantially in all directions. By doing so, the coupling can pivot smoothly between the pre-engagement angular position and the rotational force transmitting angular position and between the rotational force transmitting angular position and the disengaging angular position.

Substantially all directions is intended to mean that coupling can pivot to the rotational force transmitting angular position irrespective of the phase at which the rotating force applying portion stops.

In addition, the coupling can pivot to the disengaging angular position irrespective of the phase at which the rotating force applying portion stops.

A gap is provided between the rotating force transmitting portion (for example, 150*h*, 1550*h*, 9150*h*, 14150*h*, 15150*h*) and the rotating force receiving member for example, pin 155, 1355. 9155, 13155, 15155, 15151*h*) so that coupling member is capable of tilting relative to the axis of the electrophotographic photosensitive drum substantially in all directions, wherein the rotating force transmitting portion is provided at an end of the electrophotographic photosensitive drum and is movable relative to the rotating force receiving member, and the rotating force transmitting portion and the rotating force receiving member are engageable to each other in a rotational direction of the coupling member. The coupling is mounted to the end of the drum in this manner. The coupling is capable of inclination substantially in all directions relative to the axis L1.

The main assembly of the electrophotographic image forming apparatus includes an urging member (for example, slider 1131) movable between an urging position and a retracted position retracted from the urging position. When the process cartridge is mounted to the main assembly of the electrophotographic image forming apparatus, the coupling member moves to the pre-engagement angular position by being urged by an elastic force of the urging member restoring to the urging position after being temporarily retracted to the retracted position by being contacted by the process cartridge. With this structure, even if the connecting portion is retarded by friction, the coupling can be assuredly pivoted to the pre-engagement angular position.

The photosensitive drum unit comprises the following structures. The photosensitive drum unit (U, U1, U3, U7, U13) is mountable to and dismountable from the main assembly of the electrophotographic image forming apparatus in a direction substantial perpendicular with an axial direction of the driving shaft. The drum unit has an electrophotographic photosensitive drum having a photosensitive layer (107*b*) at a peripheral surface thereof, the electrophotographic photosensitive drum being rotatable about an axis thereof. It also includes a coupling for engagement with the rotating force applying portion and for receiving the rotating force for rotating the photosensitive drum 107. The coupling may have the structures described in the foregoing.

The drum unit is mounted into the cartridge. By the cartridge being mounted to the main assembly of the apparatus, the drum unit may be mounted to the main assembly of the apparatus.

The cartridge (B, B2) has the following structures.

The cartridge is mountable to and dismountable from the main assembly of the apparatus in the direction substantial perpendicular to the axial direction of the driving shaft. The cartridge comprises a drum having a photosensitive layer (107*b*) at a peripheral surface thereof, the electrophotographic photosensitive drum being rotatable about an axis thereof. It further comprises process means actable on the photosensitive drum 107 (for example, cleaning blade 117*a*, charging roller 108, and developing roller 100). It further comprises the coupling for receiving the rotating force for rotating the drum 107 through engagement with the rotating force applying portion. The coupling may have the structures described in the foregoing.

The electrophotographic image forming apparatus can be loaded by the drum unit.

The electrophotographic image forming apparatus can be loaded by the process cartridge.

The axis L1 is an axis of rotation of the photosensitive drum.

The axis L2 is an axis of rotation of the coupling.

The axis L3 is an axis of rotation of the driving shaft.

The whirling motion is not a motion with which the coupling itself rotates about the axis L2, but the inclined axis L2 rotates about the axis L1 of the photosensitive drum, although the whirling here does not preclude the rotation of the coupling per se about the axis L2 of the coupling 150.

OTHER EMBODIMENTS

The mounting-and-demounting path extends in slanted or non-slanted up-down direction relative to the drive shaft of the apparatus main assembly in the embodiment described above However, the present invention is not limited to such examples The embodiments can suitably be applied to the process cartridge which can be mount and demounted in the direction perpendicular to the drive shaft depending on the structure of the apparatus main assembly, for example.

In addition, in the embodiment described above, although the mounting path is rectilinear relative to the apparatus main assembly, the present invention is not limited to such an example For example, the mounting path may be a combination of the straight lines, or it may be a curvilinear path.

In addition, the cartridges of the embodiment described above form the monochrome image However, the embodiments described above can suitably be applied to the cartridges for forming the images (for example, two color images, three color images, or full-color and so on) of the plural colors by a plurality of developing devices.

In addition, the process cartridge described above includes an electrophotographic photosensitive member and the at least one process means, for example Therefore, the process cartridge may contain the photosensitive drum and the charging means as the process means integrally The process cartridge may contain the photosensitive drum and the developing means as the process means in unification The process cartridge may contain the photosensitive drum and the cleaning means as the process means integrally Further, the process cartridge may contain the photosensitive drum and the two process means or more integrally.

In addition, the process cartridge is mount and demounted by a user relative to the apparatus main assembly Therefore, the maintenance of the apparatus main assembly is in effect carried out by the user According to the embodiments described above, relative to the apparatus main assembly which is not provided with the mechanism for moving the main assembly side drum coupling member for transmitting the rotational force to the photosensitive drum in the axial direction thereof, the process cartridge is detachably mountable in the direction substantially perpendicular to the axis of the drive shaft And, the photosensitive drum can be rotated smoothly In addition, according to the embodiment described above, the process cartridge can be demounted from the main assembly of the electrophotographic image forming device provided with the drive shaft in the direction substantially perpendicular to the axis of the drive shaft.

In addition, according to the embodiment described above, the process cartridge can be mounted to the main assembly of the electrophotographic image forming device provided with the drive shaft in the direction substantially perpendicular to the axis of the drive shaft In addition, according to the embodiment described above, the process cartridge is mountable and demountable in the direction substantially perpendicular to the axis of the drive shaft relative to the main assembly of the electrophotographic image forming device provided with the drive shaft.

In addition, according to the coupling described above, even if it does not make the driving gear provided in the main assembly move in the axial direction thereof, they are mountable and demountable relative to the apparatus main assembly by the movement of the process cartridge in the direction substantially perpendicular to the axis of the drive shaft.

In addition, according to the embodiment described above, in the drive connecting portion between the main assembly and the cartridge, the photosensitive drum can rotate smoothly as compared with the case of the engagement between gears.

In addition, according to the embodiment described above, the process cartridge is detachably mountable in the direction substantially perpendicular to the axis of the drive shaft provided in the main assembly, and, simultaneously, the photosensitive drum can rotate smoothly In addition, according to the embodiment described above, the process cartridge is detachably mountable in the direction substantially perpendicular to the axis of the drive shaft provided in the main assembly, and, simultaneously, the smooth rotation of the photosensitive drum can be carried out.

As has been described hereinbefore, in the present invention, the axis of the drum coupling member can take the different angular positions relative to the axis of the photosensitive drum. The drum coupling member can be engaged with the drive shaft in the direction substantially perpendicular to the axis of the drive shaft provided in the main assembly by this structure In addition, the drum coupling member can be disengaged from the drive shaft in the direction substantially perpendicular to the axis of the drive shaft The present invention can be applied to the process cartridge, the electrophotographic photosensitive member drum unit, the rotational force transmitting portion (drum coupling member), and the electrophotographic image forming device.

While the invention has been described with reference to the structures disclosed herein, it is not confined to the details set forth, and this application is intended to cover such modification or changes as may come within the purposes of the improvements or the scope of the following claims.

This application claims priority from Japanese Patent Applications Nos. 346190/2006 filed Dec. 22, 2006, 042665/2007 filed Feb. 22, 2007, and 330303/2007 filed Dec. 21, 2007, which are hereby incorporated by reference.

What is claimed is:

1. A cartridge comprising:

a photosensitive drum having a rotational axis about which the photosensitive drum is rotatable;

a developing roller having a rotational axis about which the developing roller is rotatable;

a developing frame rotatably supporting the developing roller;

a drum flange connected to an end of the photosensitive drum, the drum flange including an inner surface facing the rotational axis of the photosensitive drum and a hollow portion inside of the drum flange; and a casing including a bearing member rotatably supporting the photosensitive drum, the bearing member being positioned at a first end portion of the casing in a direction of the rotational axis of the photosensitive drum, the bearing member including (i) a surface that faces outside of the cartridge and extends perpendicular to a rotational axis of the photosensitive drum, (ii) an opening to the hollow portion of the drum flange, with the rotational axis of the photosensitive drum being positioned within the opening, (iii) a supporting projection rotatably supporting the drum flange by contacting the inner surface of the drum flange, the supporting projection being projected in the direction of the rotational axis of the photosensitive drum toward a second end portion of the casing that is opposite to the first end portion of the casing in the direction of the rotational axis of the photosensitive drum, and (iv) a projected part projecting in a direction away from the second end portion of the casing in the direction of the rotational axis of the photosensitive drum, wherein a distance between at least a part of the supporting projection and the second end portion of the casing in the direction of the rotational axis of the photosensitive drum is shorter than a distance between the surface of the bearing member and the second end portion of the casing in the direction of the rotational axis of the photosensitive drum, wherein a distance between at least a part of the projected part and the second end portion of the casing in the direction of the rotational axis of the photosensitive drum is longer than the distance between the surface of the bearing member and the second end portion of the casing in the direction of the rotational axis of the photosensitive drum, wherein, as seen in the direction of the rotational axis of the photosensitive drum, (i) the projected part extends part way around the rotational axis of the photosensitive drum, (ii) the surface of the bearing member extends part way around the rotational axis of the photosensitive drum, and (iii) the rotational axis of the developing roller, the rotational axis of the photosensitive drum, and a part of the surface of the bearing member are positioned in this order along a first line, wherein a distance from the rotational axis of the photosensitive drum to at least a part of the projected part as measured along a second line that is perpendicular to the rotational axis of the photosensitive drum is shorter than a radius of the photosensitive drum that extends from the rotational axis of the photosensitive drum to an outer surface of the photosensitive drum, wherein a distance from the rotational axis of the photosensitive drum to at least a part of the surface of the bearing member as measured along a third line that is perpendicular to the rotational axis of the photosensitive drum and is different than the second line is shorter than the radius of the photosensitive drum, and wherein the surface of the bearing member is adjacent to an open space that extends to the rotational axis of the photosensitive drum in a direction perpendicular to the rotational axis of the photosensitive drum.

2. A cartridge according to claim 1, wherein, as viewed along the rotational axis of the photosensitive drum, the projected part is arc-shaped.

3. A cartridge according to claim 1, further comprising a rotatable shaft that extends in the direction of the rotational axis of the photosensitive drum and is operatively connected to the drum flange, the rotatable shaft being rotatable together with the drum flange, and at least a part of the rotatable shaft being positioned in the hollow portion of the drum flange.

4. A cartridge according to claim 3, wherein the space inside of the hollow portion is formed between the inner surface and the rotatable shaft in the direction perpendicular to the rotational axis of the photosensitive drum.

5. A cartridge according to claim 1, wherein at least a part of the projecting part extends in a direction that is perpendicular to the surface of bearing member.

6. A cartridge according to claim 1, further comprising a coupling member rotatable about an axis of the coupling member, the coupling member being operatively connected to the photosensitive drum by the drum flange such that a rotational force can be transmitted from the coupling member to the photosensitive drum.

7. A cartridge according to claim 6, wherein the coupling member is movable between a first position where the axis of the coupling member is coaxial with the axis of the photosensitive drum and a second position where the axis of the coupling member is inclined from the axis of the photosensitive drum.

8. A cartridge according to claim 1, wherein the open space extends parallel to the first line.

9. A cartridge according to claim 1, wherein, as seen in the direction of the rotational axis of the photosensitive drum, at least a part of the projected part, the rotational axis of the photosensitive drum, and at least a part of the surface of the bearing member are positioned in this order along a fourth line that is perpendicular to the first line.

10. A cartridge according to claim 9, wherein the open space extends in a direction perpendicular to the rotational axis of the photosensitive drum and parallel to the fourth line.

11. A cartridge according to claim 1, wherein the supporting projection includes an outer surface facing away from the rotational axis of the photosensitive drum and contacting the inner surface of the drum flange.

12. A cartridge according to claim 11, wherein the supporting projection is annular shaped around the opening of the bearing member.

13. A cartridge according to claim 1, further comprising a developing frame rotatably supporting the developing roller.

* * * * *